(12) United States Patent
Maas et al.

(10) Patent No.: US 11,027,298 B2
(45) Date of Patent: Jun. 8, 2021

(54) SYSTEMS AND METHODS TO PRECISELY CONTROL OUTPUT PRESSURE IN BUFFERED SPRAYERS (DUO1)

(71) Applicant: DISPENSING TECHNOLOGIES B.V., Helmond (NL)

(72) Inventors: Wilhelmus Johannes Joseph Maas, Someren (NL); Dominicus Jan van Wijk, Helmond (NL); Paulo Nervo, Duizel (NL); Petrus Lambertus Wilhelmus Hurkmans, Someren (NL); Aaron Haleva, Oakhurst, NJ (US)

(73) Assignee: Dispensing Technologies B.V., Helmond (NL)

( * ) Notice: Subject to any disclaimer, the term of this patent is extended or adjusted under 35 U.S.C. 154(b) by 0 days.

(21) Appl. No.: 14/073,835

(22) Filed: Nov. 6, 2013

(65) Prior Publication Data
US 2014/0246506 A1    Sep. 4, 2014

Related U.S. Application Data

(60) Provisional application No. 61/723,045, filed on Nov. 6, 2012, provisional application No. 61/805,044, filed on (Continued)

(51) Int. Cl.
*B05B 11/00* (2006.01)
*B05B 15/62* (2018.01)
(Continued)

(52) U.S. Cl.
CPC ....... *B05B 11/0075* (2013.01); *A47L 11/4088* (2013.01); *A47L 13/22* (2013.01);
(Continued)

(58) Field of Classification Search
CPC ... B05B 9/085; B05B 9/0883; B05B 11/0075; B05B 11/032; B05B 11/3011;
(Continued)

(56) References Cited

U.S. PATENT DOCUMENTS 4,174,052 A * 11/1979 Capra ................... B05B 9/0883
                                                    222/207
4,191,313 A *  3/1980 Blake .................. B05B 11/0064
                                                    222/335

(Continued)

FOREIGN PATENT DOCUMENTS

JP          05-104040          4/1993

*Primary Examiner* — Cody J Lieuwen

(57) ABSTRACT

Dispensing devices can include buffers. This obviates the need for continually pumping the device to dispense spray or foam. A buffer can be spring loaded, spring loaded combination, elastomeric or gas, and can be in line or adjacent to a piston chamber. Such sprayers and foamers can be mounted upside down. With a buffer, a piston chamber can deliver a greater amount of liquid per unit time than can be dispensed through the nozzle(s). The fraction of liquid that cannot be dispensed can be sent to the buffer for dispensing after the piston downstroke has completed. Volume of the piston chamber and buffer, pressure response of the buffer, throughput of the nozzle, and the minimum opening pressure of the outlet valve can be arranged to restrict the outlet pressures of liquid droplets exiting the nozzle within a defined range.

20 Claims, 120 Drawing Sheets
(7 of 120 Drawing Sheet(s) Filed in Color)

Related U.S. Application Data on Mar. 25, 2013, provisional application No. 61/810,697, filed on Apr. 10, 2013.

(51) Int. Cl.

| | |
|---|---|
| *A47L 11/40* | (2006.01) |
| *A47L 13/22* | (2006.01) |
| *B29C 65/18* | (2006.01) |
| *B29C 65/00* | (2006.01) |
| *B29C 65/78* | (2006.01) |
| *B29C 65/74* | (2006.01) |
| *B05B 9/08* | (2006.01) |
| *B29C 65/16* | (2006.01) |
| *B29C 65/08* | (2006.01) |
| *B29C 65/48* | (2006.01) |

(52) U.S. Cl.
CPC ........ *B05B 9/0883* (2013.01); *B05B 11/0032* (2013.01); *B05B 11/3011* (2013.01); *B05B 11/3038* (2013.01); *B05B 11/3073* (2013.01); *B05B 11/3074* (2013.01); *B05B 11/3076* (2013.01); *B05B 11/3077* (2013.01); *B05B 11/3098* (2013.01); *B05B 15/62* (2018.02); *B29C 65/18* (2013.01); *B29C 65/743* (2013.01); *B29C 65/7802* (2013.01); *B29C 65/7841* (2013.01); *B29C 66/0014* (2013.01); *B29C 66/0342* (2013.01); *B29C 66/1122* (2013.01); *B29C 66/439* (2013.01); *B29C 66/4312* (2013.01); *B29C 66/43121* (2013.01); *B29C 66/53262* (2013.01); *B29C 66/72341* (2013.01); *B29C 66/81419* (2013.01); *B29C 66/81465* (2013.01); *B29C 66/81815* (2013.01); *B29C 66/8322* (2013.01); *B29C 66/83221* (2013.01); *B29C 66/849* (2013.01); *B29C 65/08* (2013.01); *B29C 65/16* (2013.01); *B29C 65/48* (2013.01); *B29C 66/71* (2013.01)

(58) Field of Classification Search
CPC ............... B05B 11/3038; B05B 11/304; B05B 11/3073; B05B 11/3074; B05B 11/3076; B05B 11/3077; B05B 11/3088; B05B 11/3098; B05B 15/061; A47L 11/4088; A47L 13/22; B29C 65/18; B29C 65/743; B29C 65/7802; B29C 65/7841; B29C 65/08; B29C 65/16; B29C 66/0014; B29C 66/0342; B29C 66/1122; B29C 66/4312; B29C 66/43121; B29C 66/439; B29C 66/72341; B29C 66/81419; B29C 66/81465; B29C 66/81815; B29C 66/8322; B29C 66/83221; B29C 66/849
USPC ............... 239/333, 1; 222/321.8, 340, 383.1
See application file for complete search history.

(56) References Cited

U.S. PATENT DOCUMENTS

| | | | | |
|---|---|---|---|---|
| 4,241,853 | A * | 12/1980 | Pauls | B05B 9/0883 222/207 |
| 4,872,595 | A * | 10/1989 | Hammett | B05B 9/0883 222/209 |
| 5,183,185 | A * | 2/1993 | Hutcheson | B05B 9/0883 222/209 |
| 5,435,452 | A * | 7/1995 | Nishigami | B05B 11/0043 215/12.1 |
| 2002/0008164 | A1 * | 1/2002 | Yanagida | B05B 11/3059 239/525 |

* cited by examiner

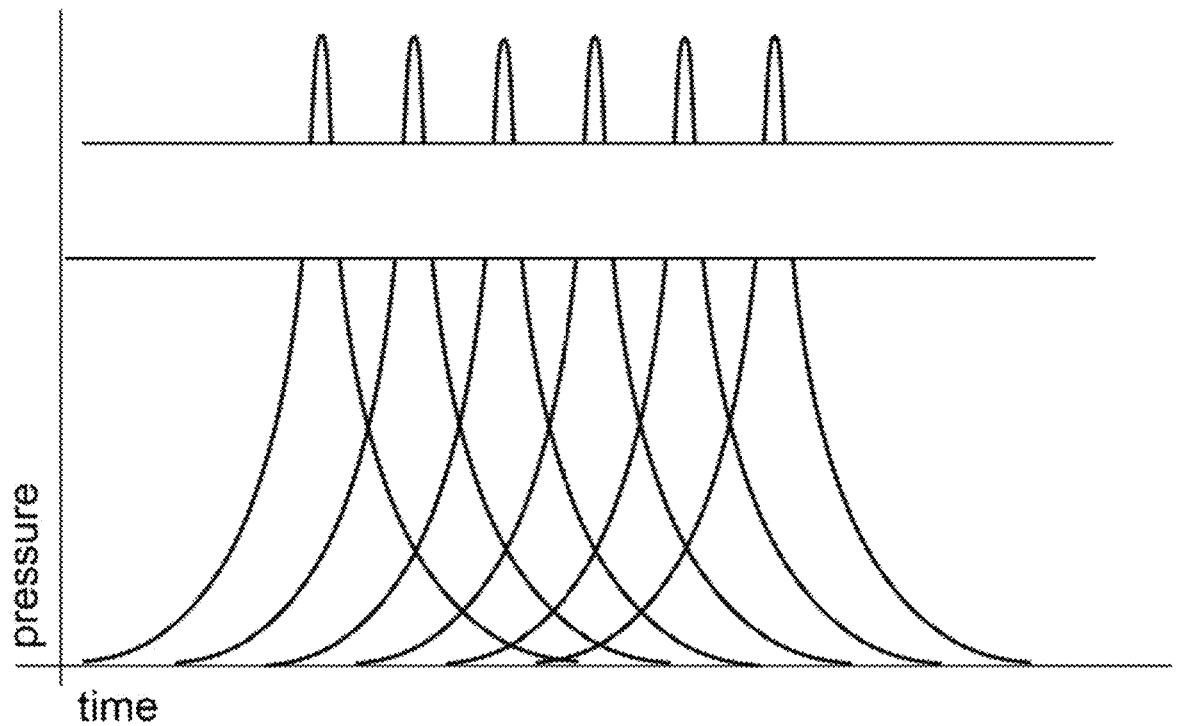
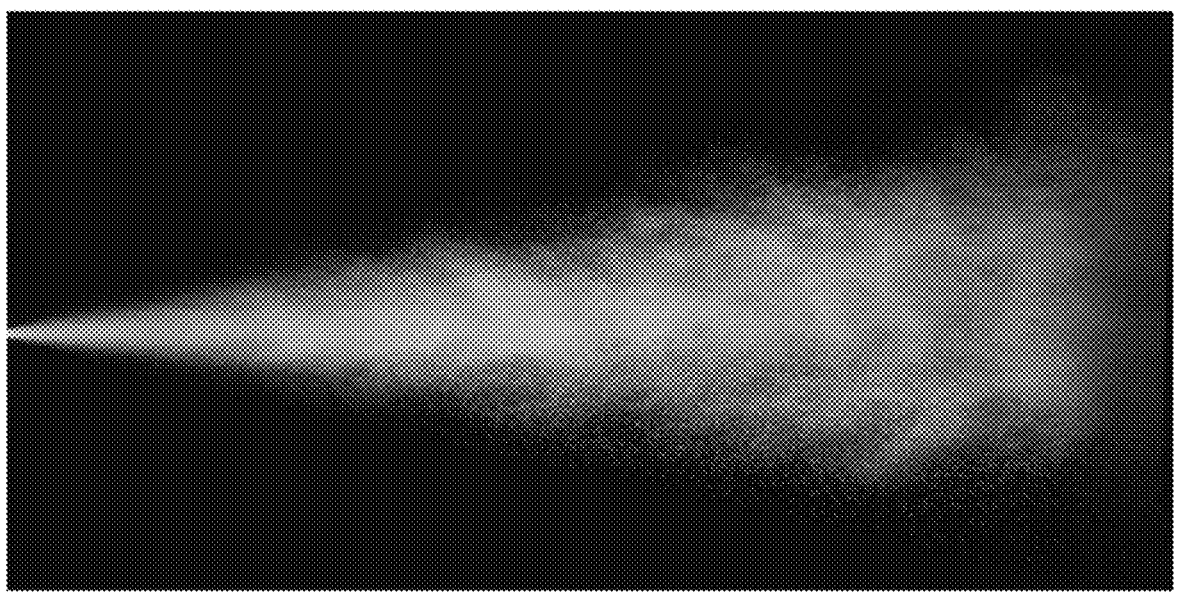
FIG. 7

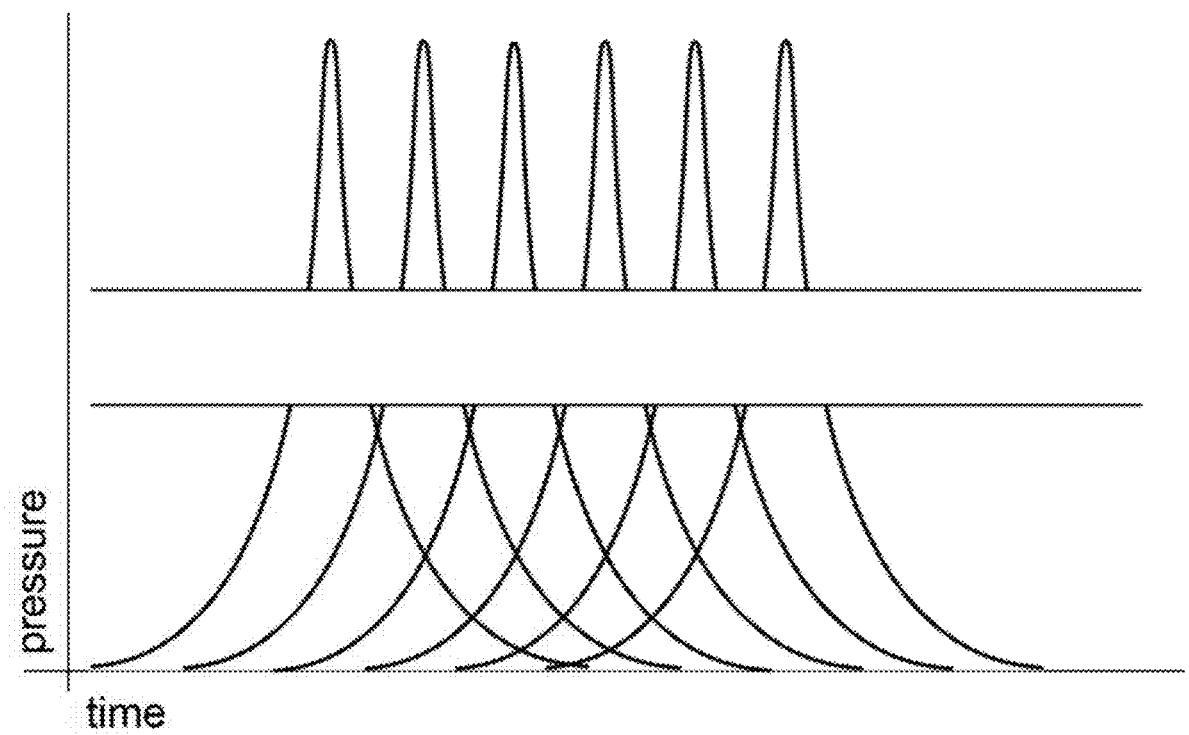
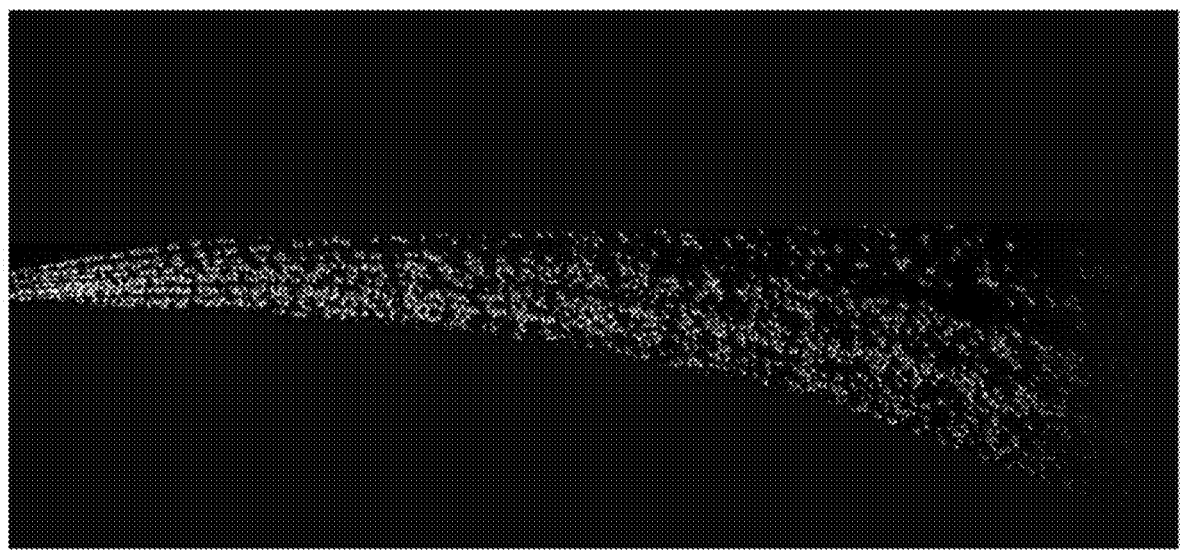
FIG. 8

| | example | liquid | performance | nozzle | Droplet size (µm) (Dv4,3) | Nozzle output average (ml/sec) | spray duration (single shot) (sec) | Frequency for continuous (Hz) | Pump output (ml) | Piston dia (mm) | Trigger force (N) | Buffer principle | Buffer V1 (ml) | Buffer P1 (barg) | Outlet valve P open (barg) | Outlet valve P close (barg) |
|---|---|---|---|---|---|---|---|---|---|---|---|---|---|---|---|---|
| low pressure | Floormop | water | flat angled | Fan spray nozzle | - | 7,0 | | 68 | 6,23 | 23 | < 40 | spring | 8 | 0,5 | 0,45 | 0,4 |
| medium pressure | Sprayer | liquid soap | Foam | Nozzle B + screen | > 10 | 1,5 | | 30 | 1,15 | 14,8 | < 40 | gas | 4 | 3,5 | 3 | 2 |
| high pressure | Flairosol dlite | water | spray | Nozzle A | 72 | 0,8 | 1,8 | 35 | 1,4 | 16,8 | < 40 | gas | 4 | 4 | 3,5 | 2,5 |
| high pressure | Flairosol 1 | water | spray | Nozzle B | 77 | 1,3 | 1,3 | 60 | 1,3 | 14,8 | < 40 | spring | 2 | 4,4 | 3,5 | 2,6 |
| high pressure | Flairosol 1 | water | spray | Nozzle C | 76,5 | 1,1 | 1,7 | 50 | 1,3 | 14,8 | < 40 | spring | 3 | 4,4 | 3,5 | 2,6 |

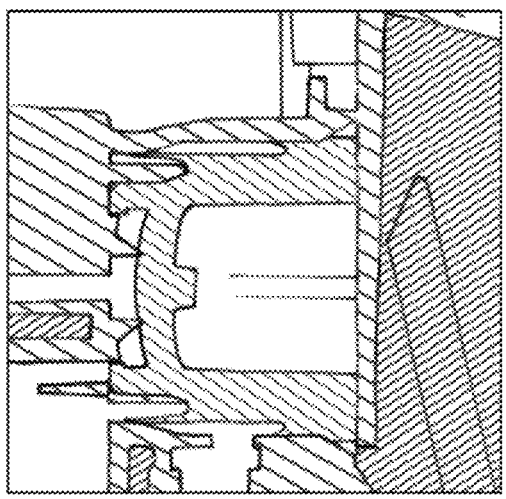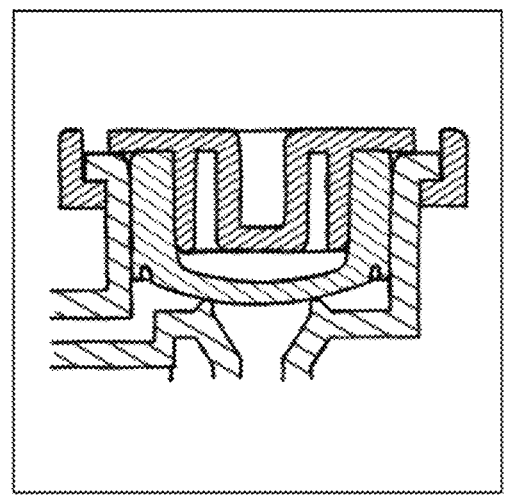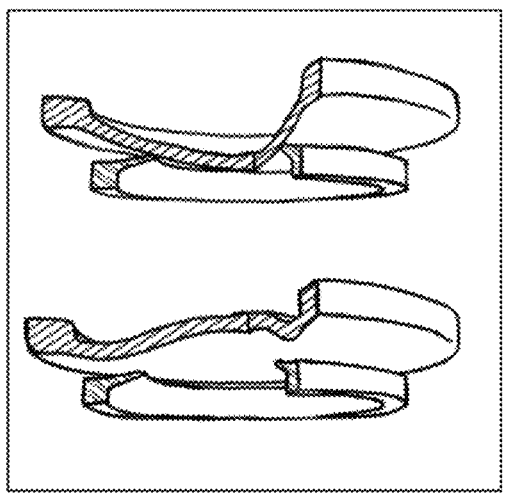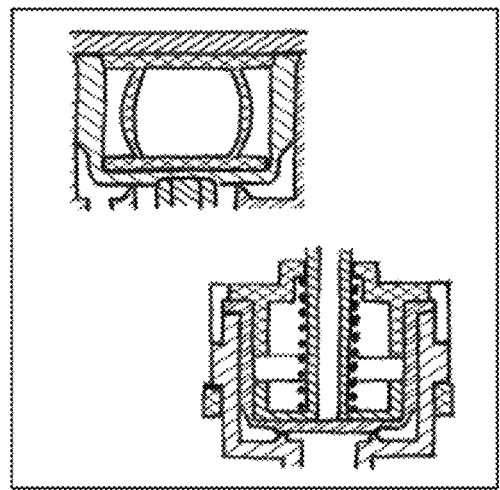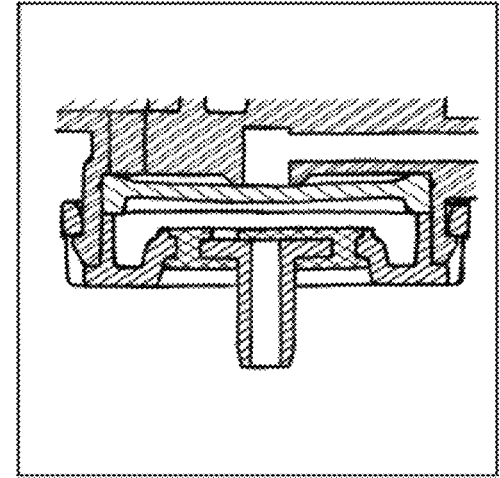
FIG. 10

| ITEM NO. | PartNo | Description | QTY. |
|---|---|---|---|
| 1 | | Buffer cap (is an integral part of the engine) | 1 |
| 2 | | Buffer core | 1 |
| 3 | | Elastic Buffer | 1 |
| 4 | | Buffer housing | 1 |

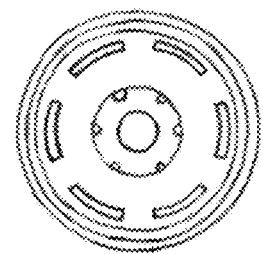 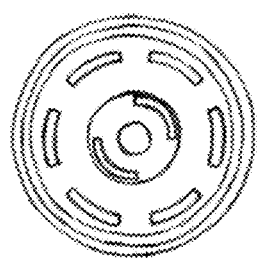 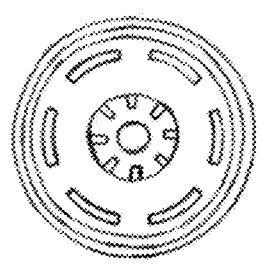
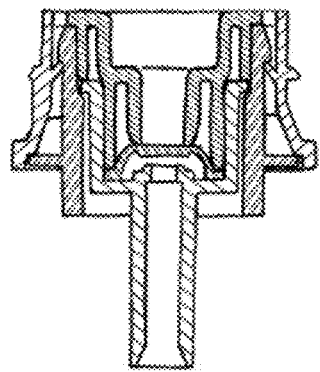 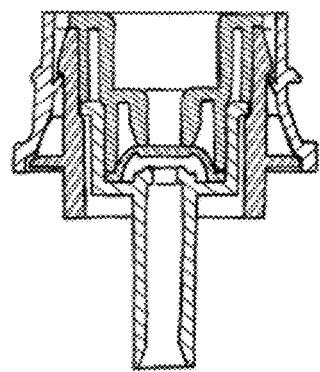 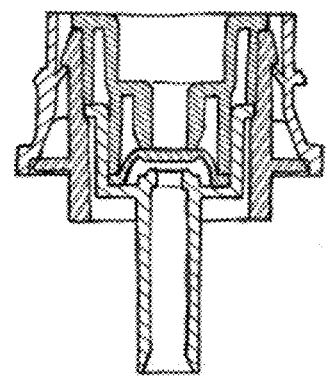
FIG. 18Aa   FIG. 18Ab   FIG. 18Ac

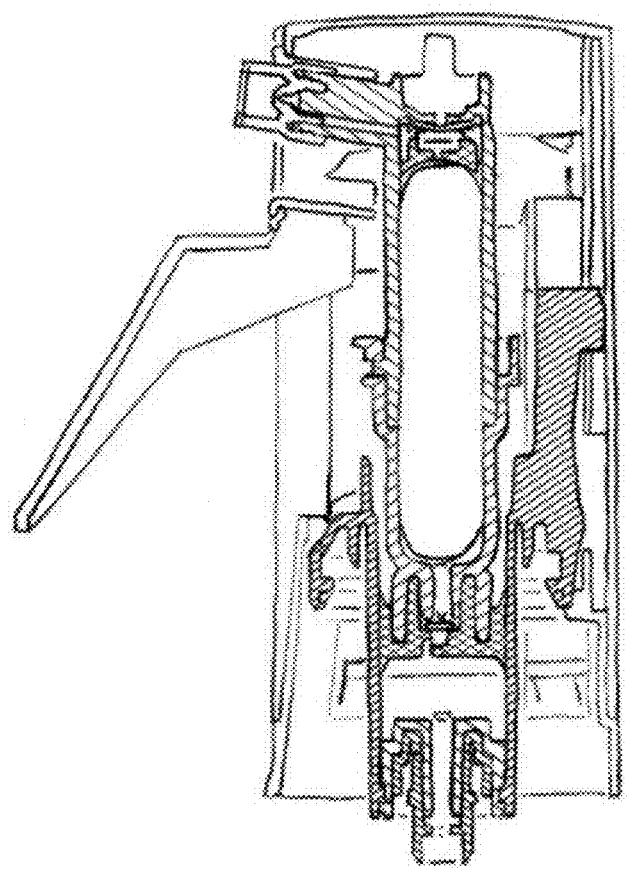
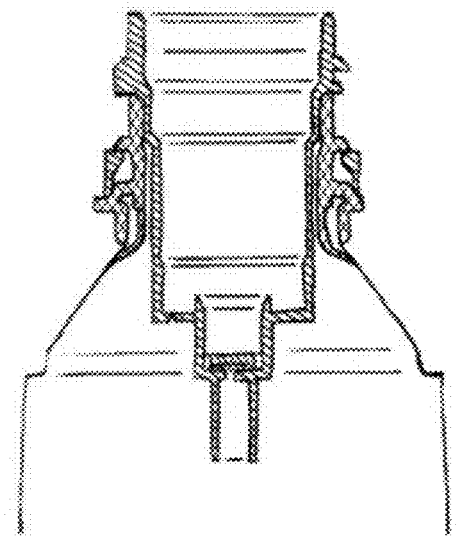
FIG. 19C

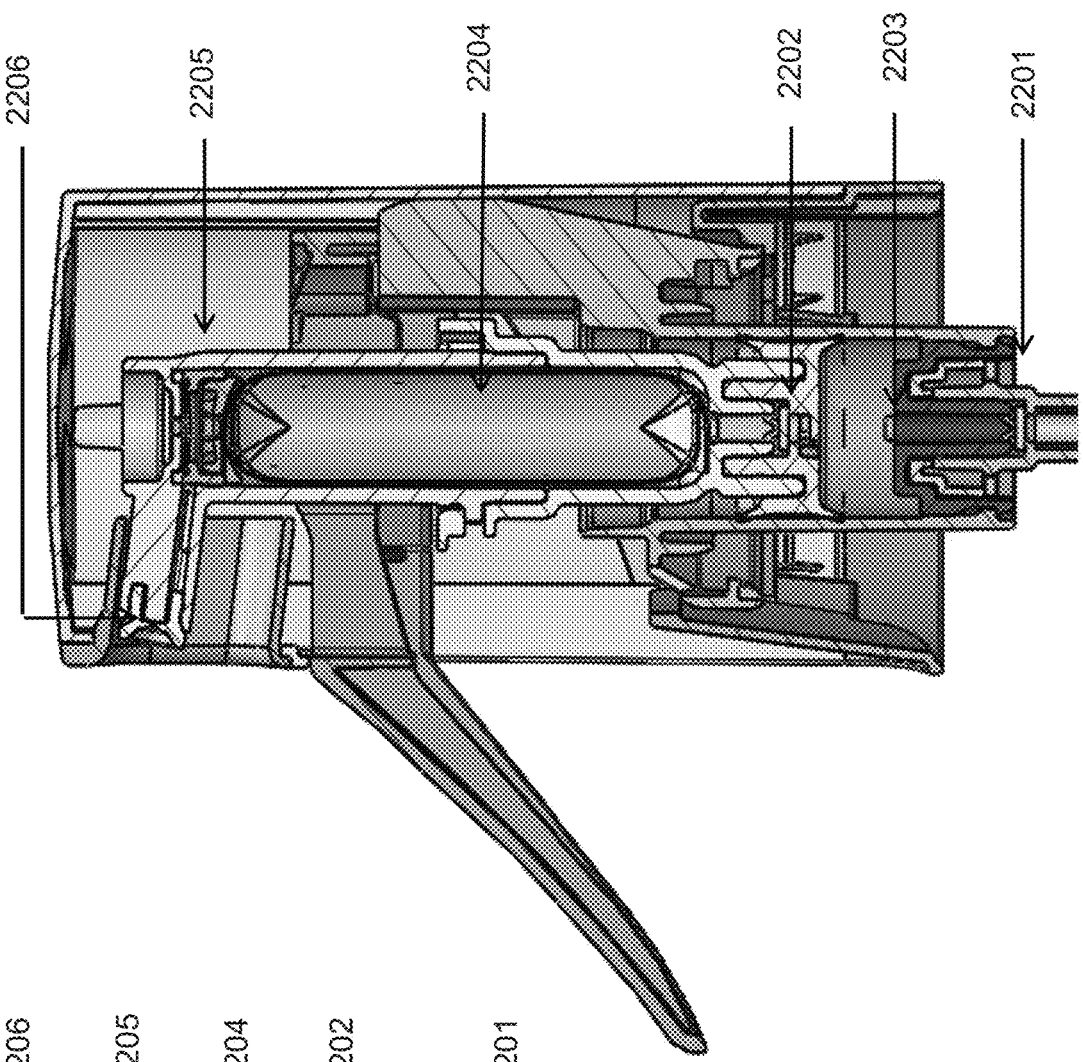
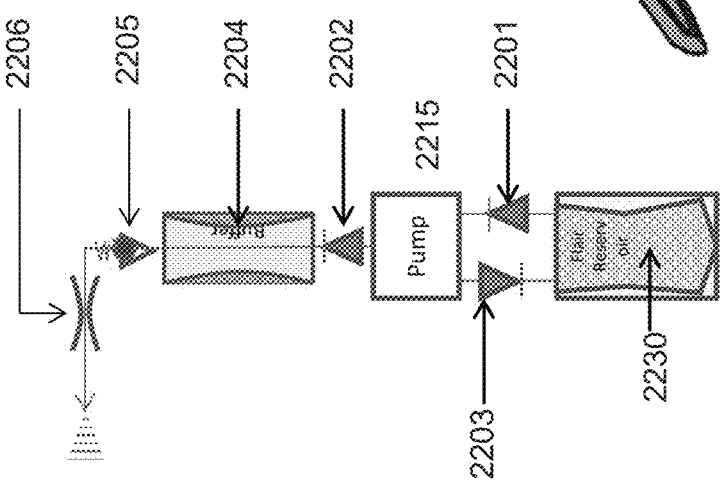

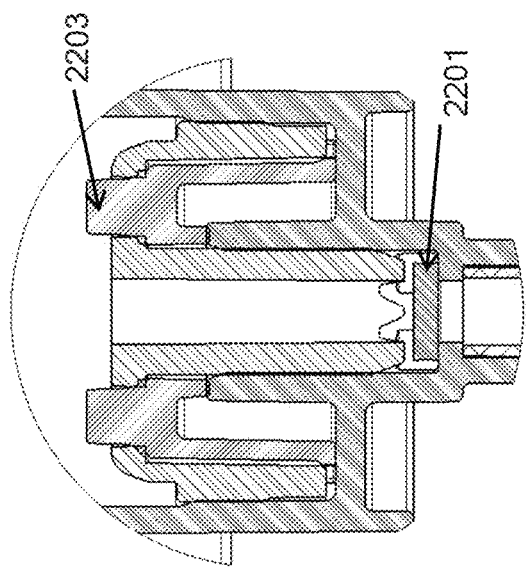
FIG. 24B
FIG. 24C
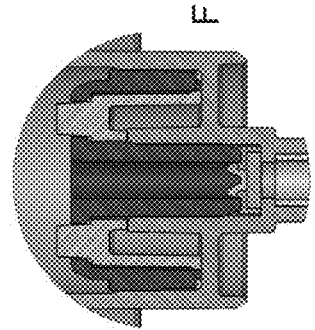
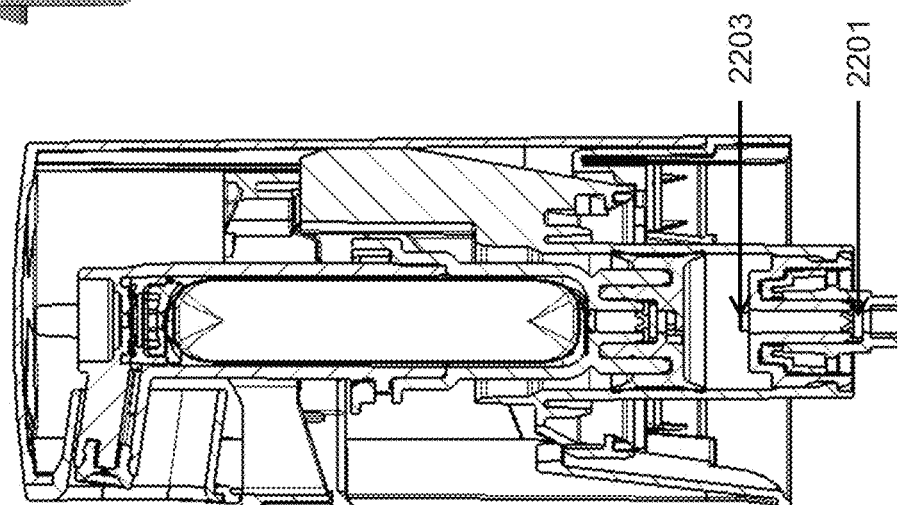
FIG. 24A
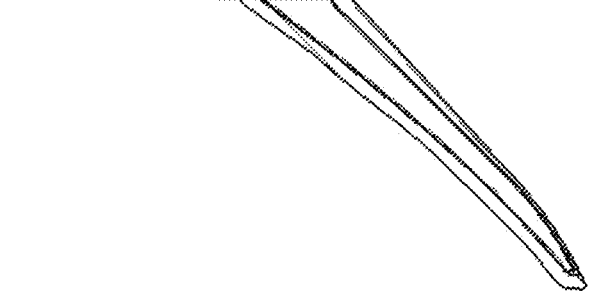

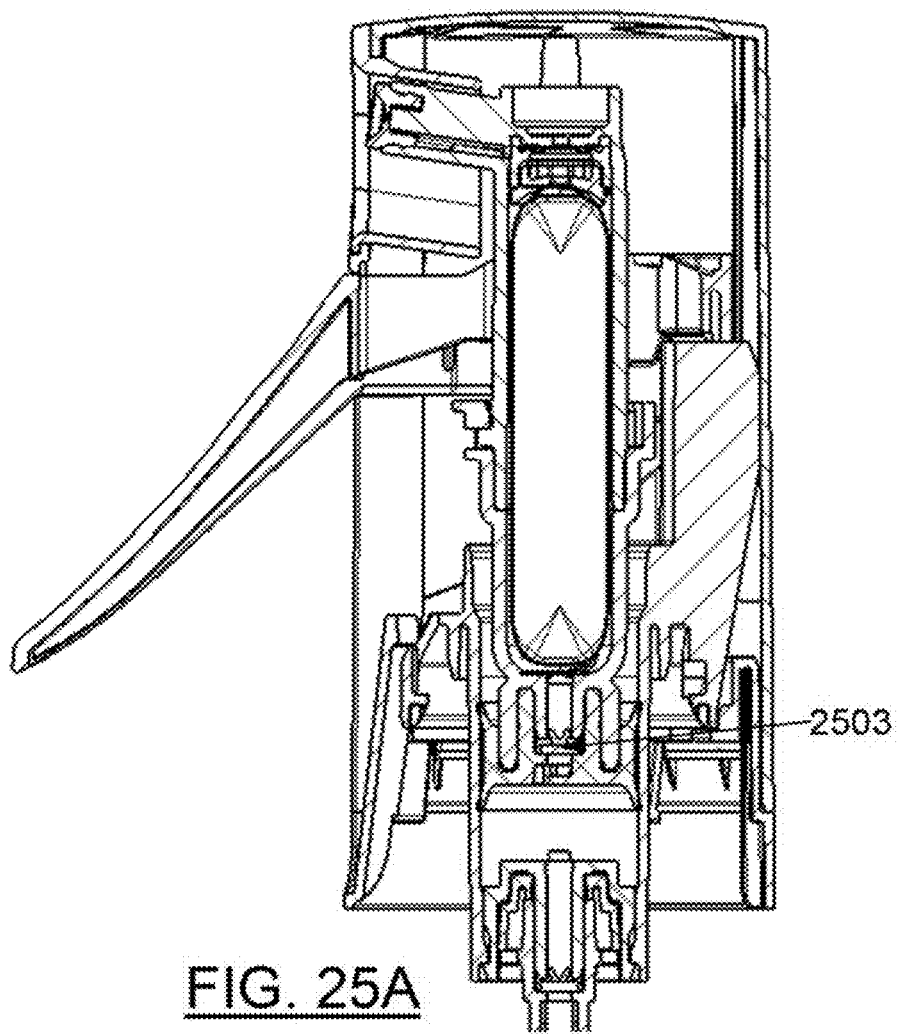
FIG. 25A
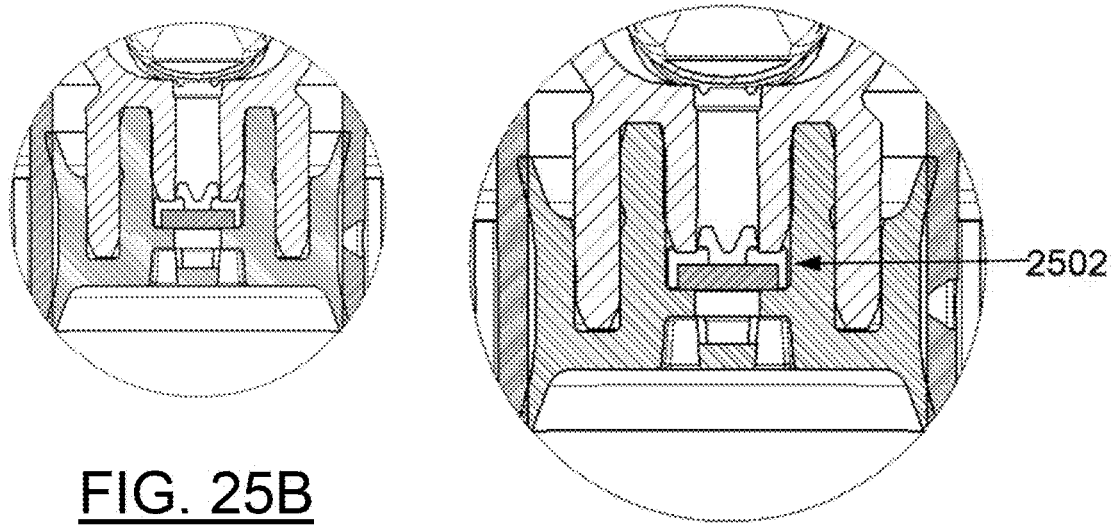
FIG. 25B
FIG. 25C

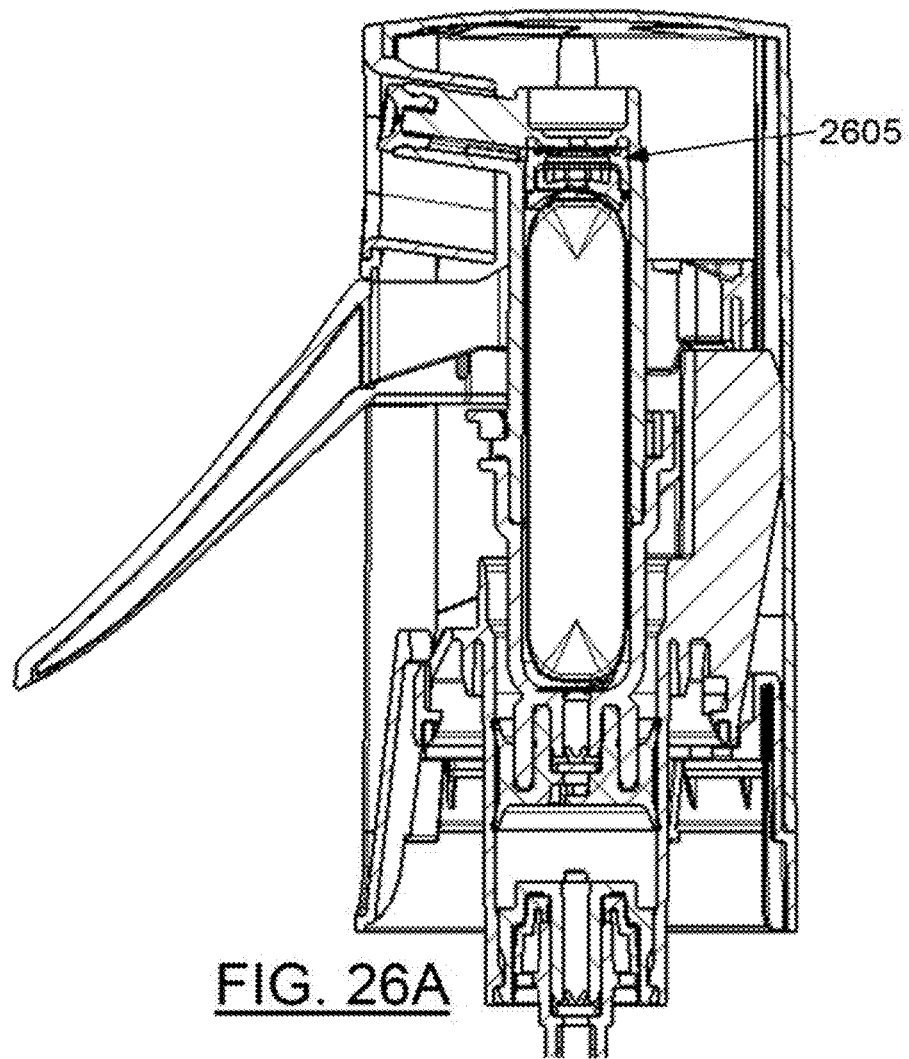
FIG. 26A
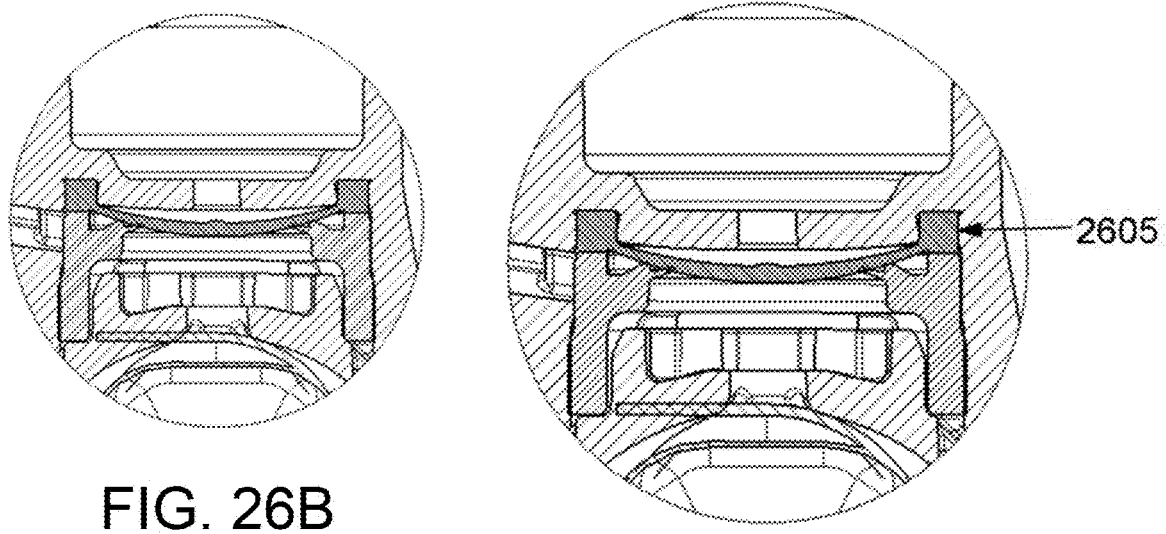
FIG. 26B
FIG. 26C

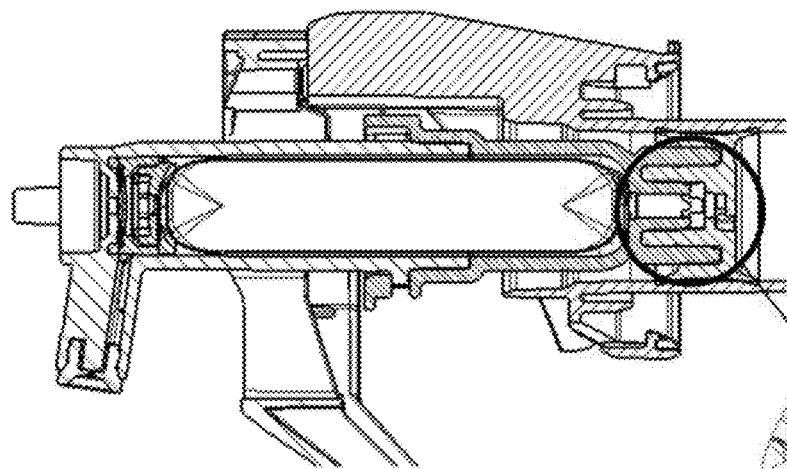
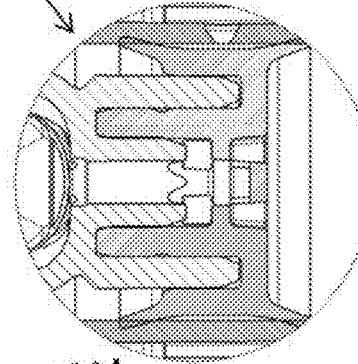
FIG. 28B
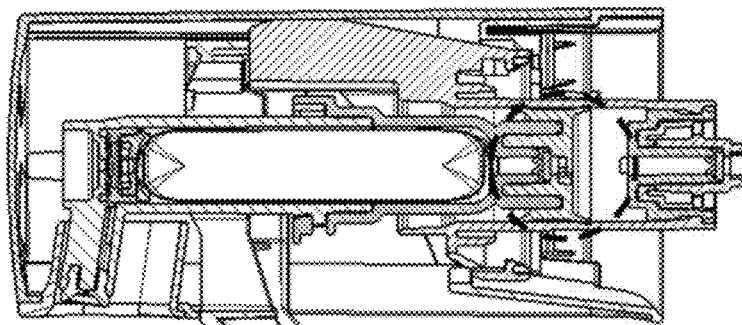
FIG. 28C
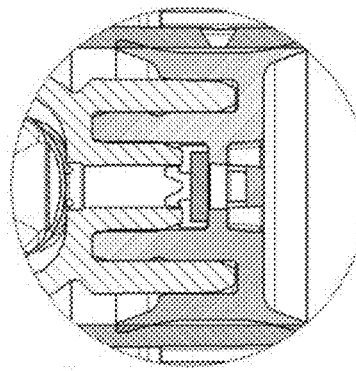
FIG. 28D
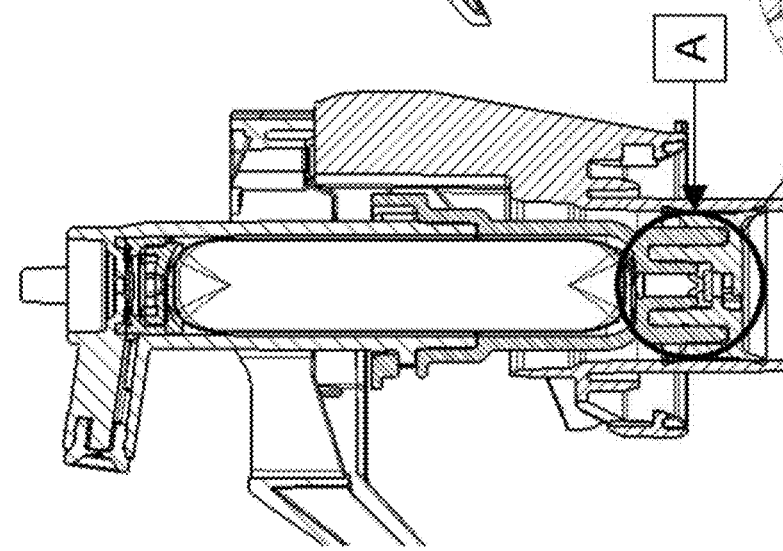
FIG. 28A  FIG. 28E

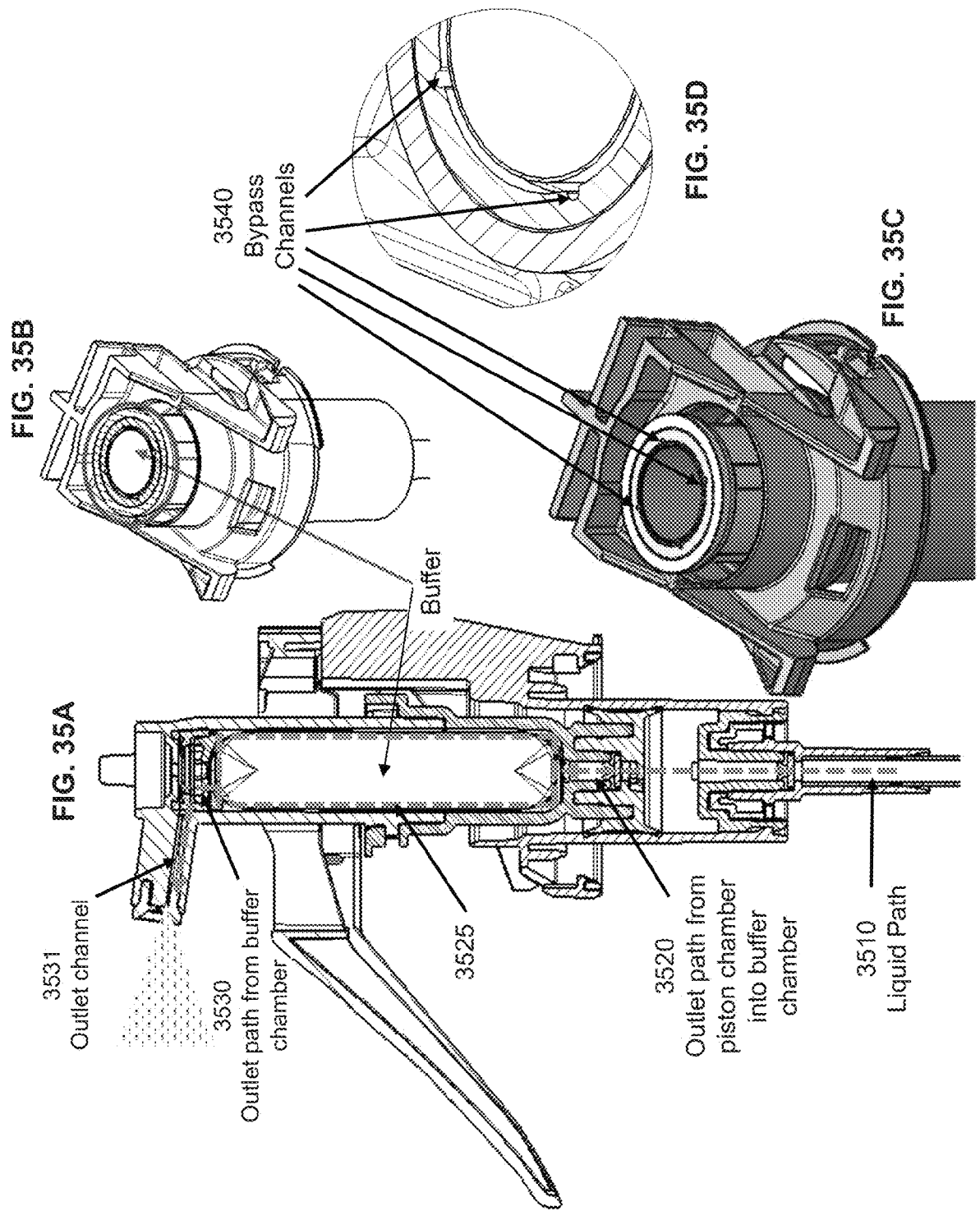

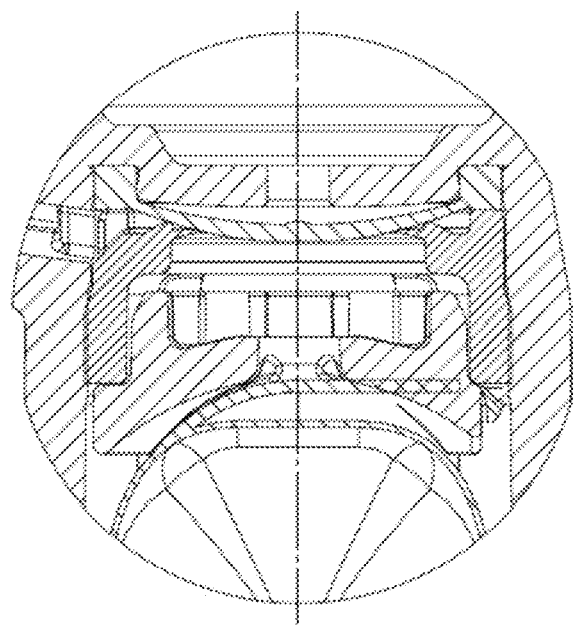
FIG. 41A
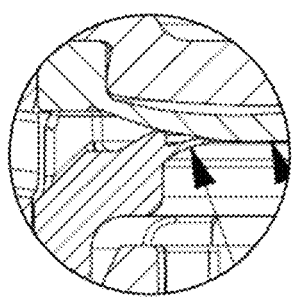
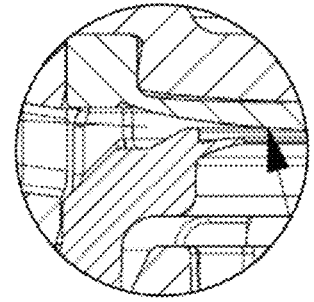
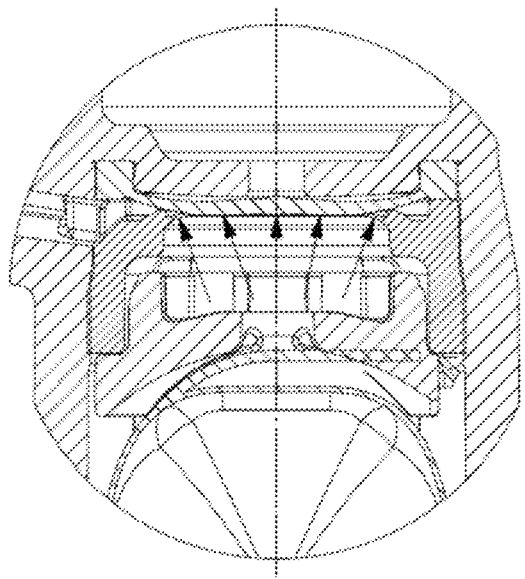
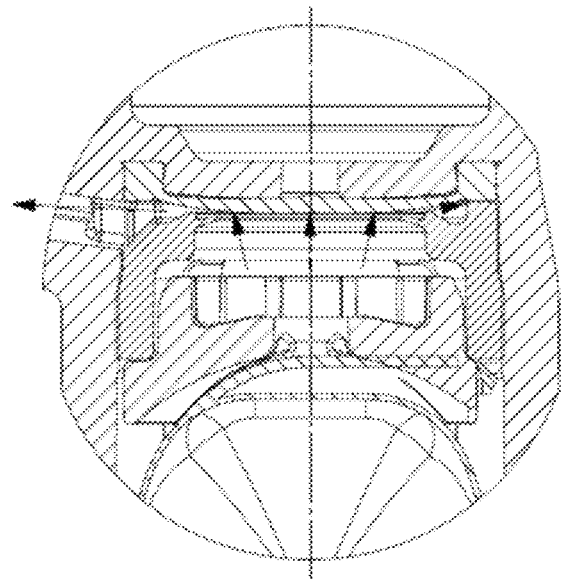
FIG. 41B                FIG. 41C

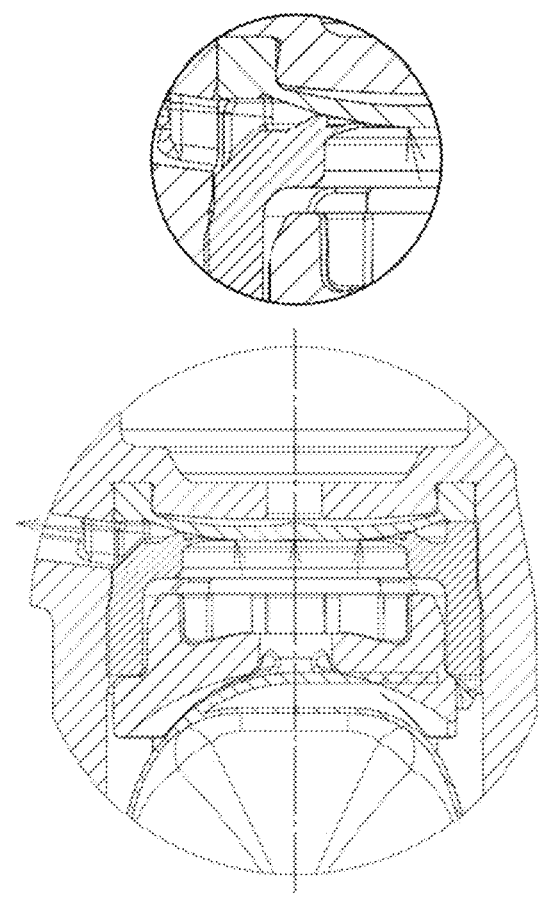
FIG. 42A
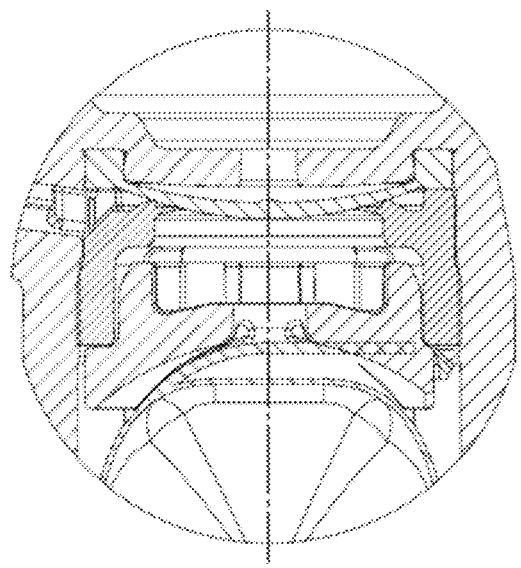 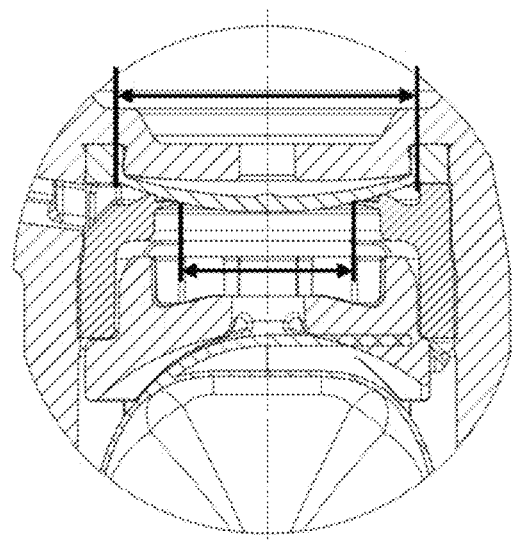
FIG. 42B  FIG. 42C

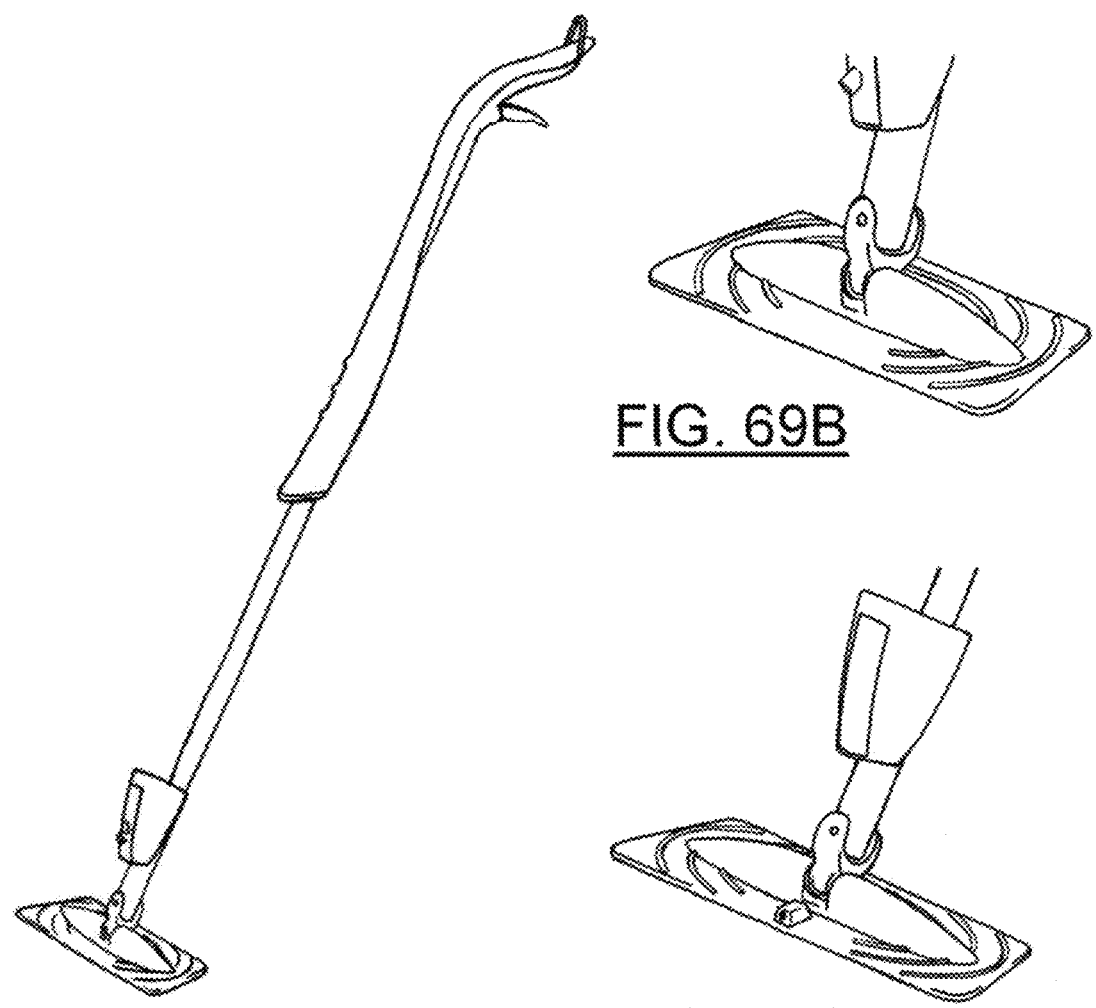
FIG. 69B
FIG. 69C
FIG. 69A
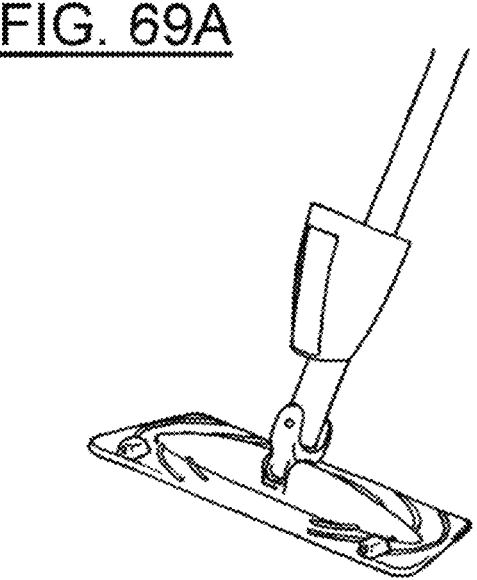
FIG. 69D
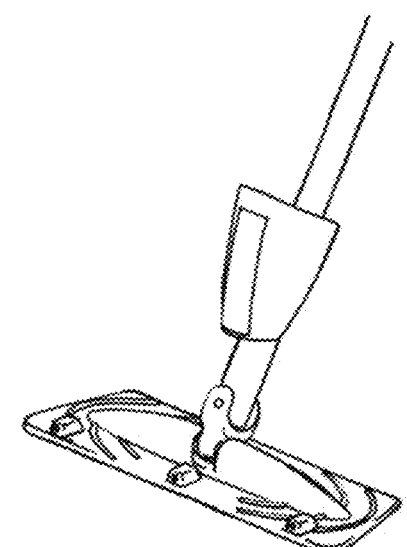
FIG. 69E

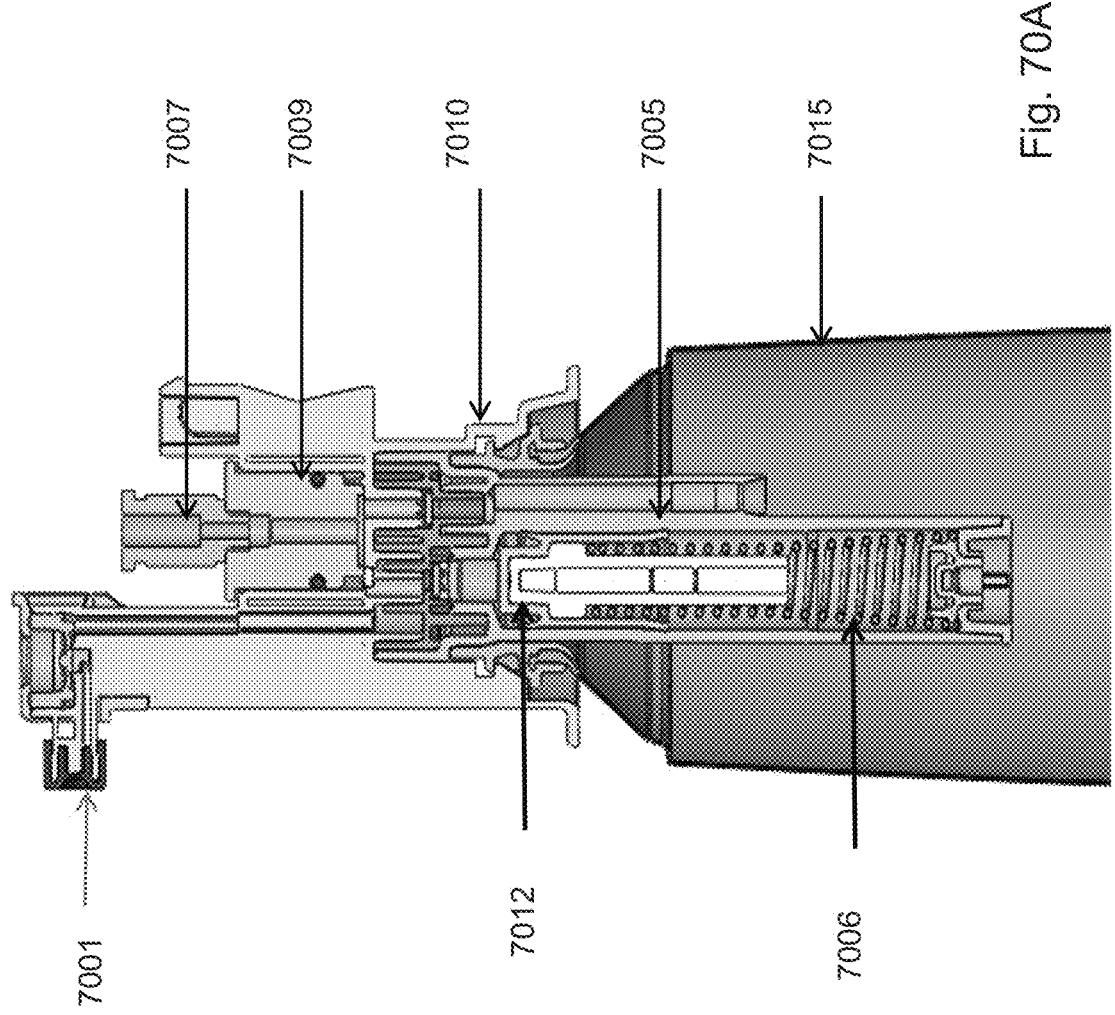

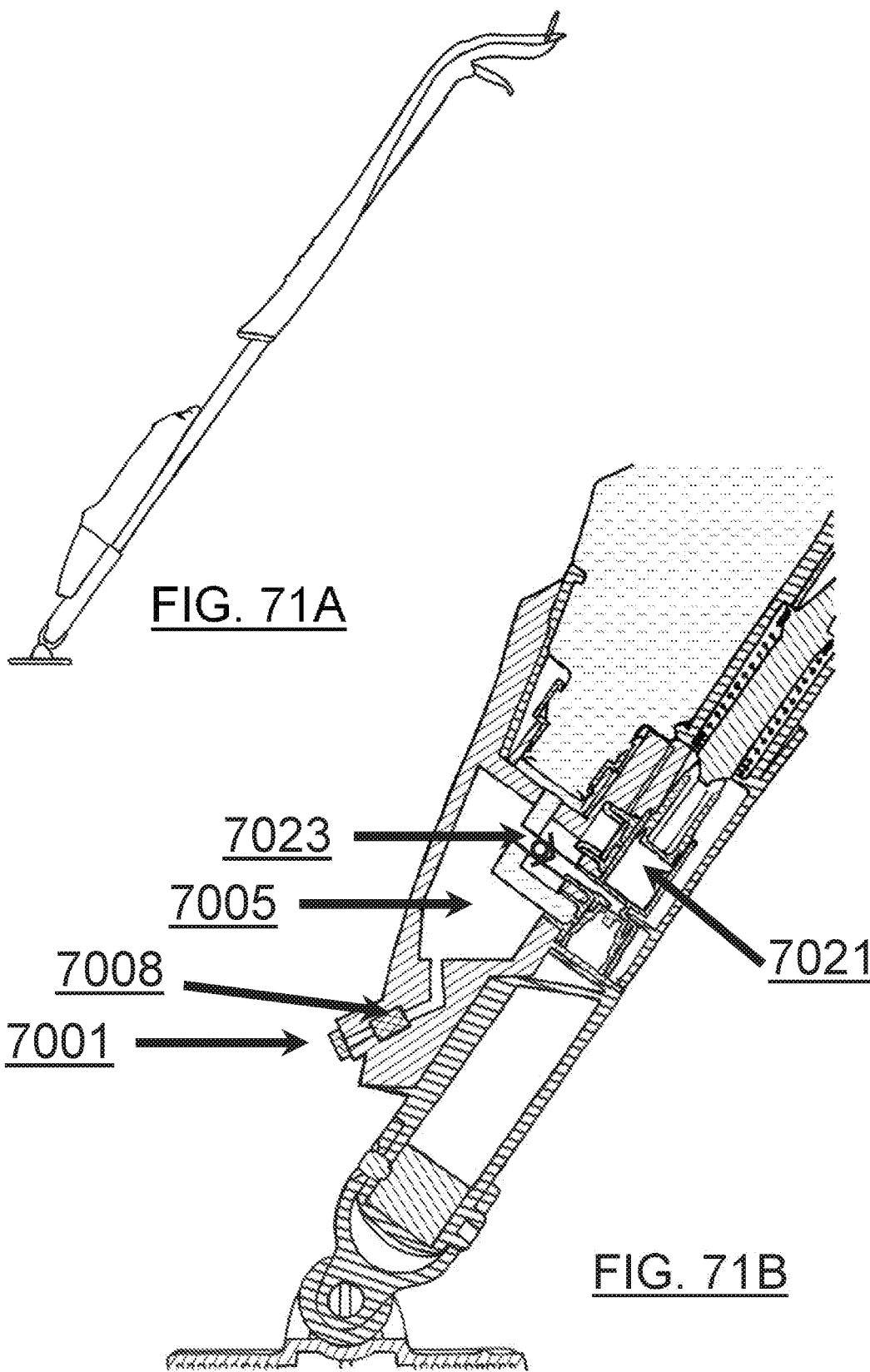

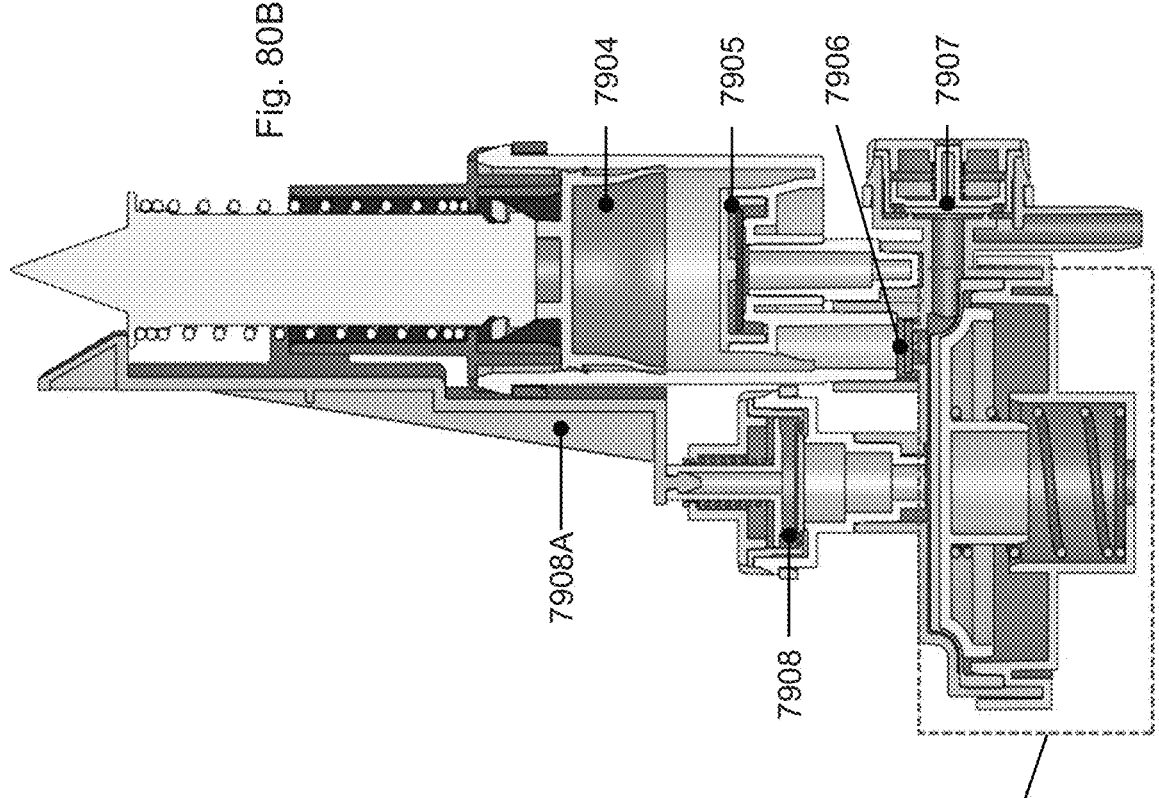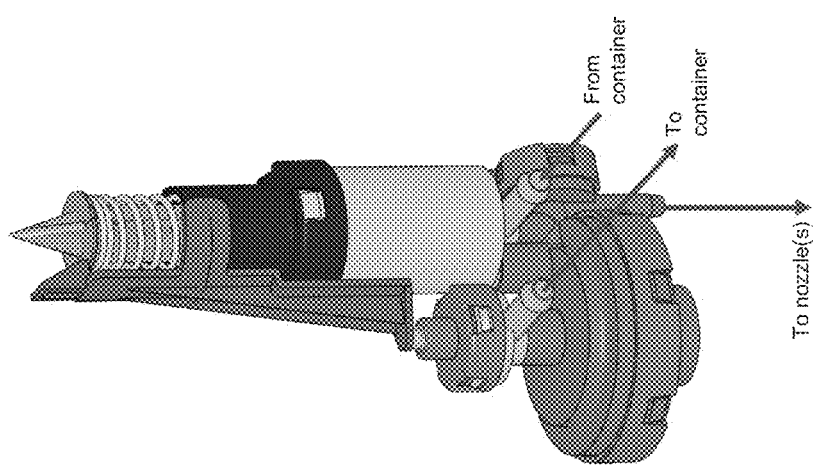

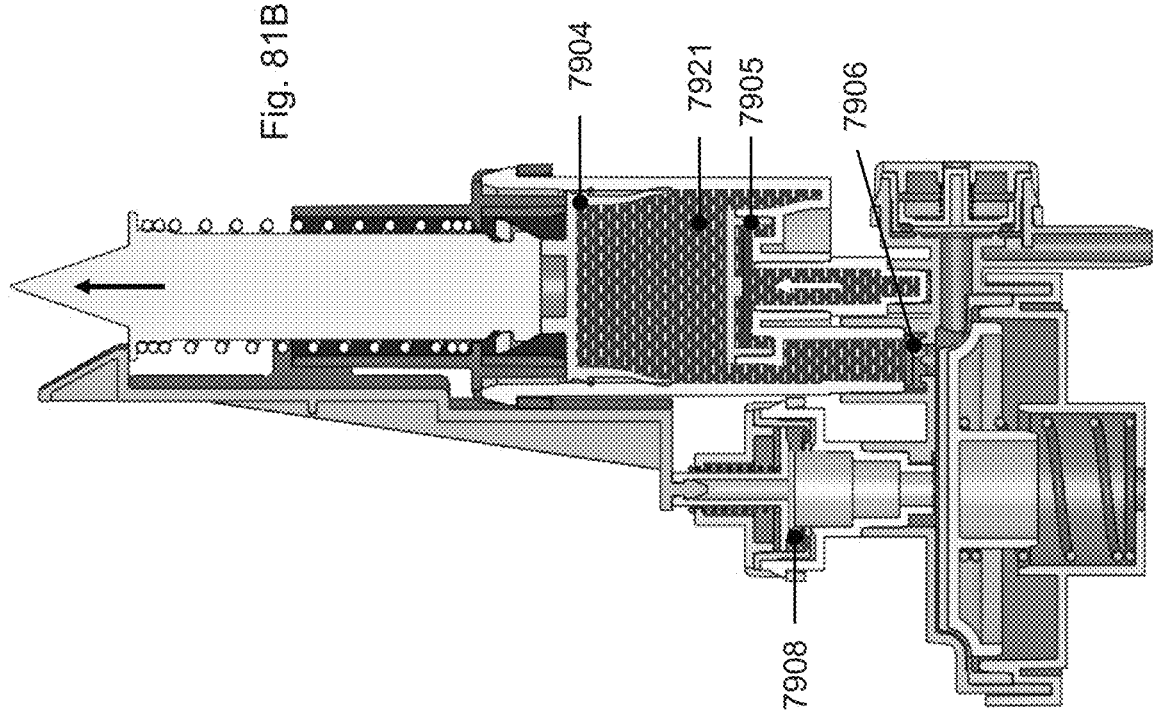
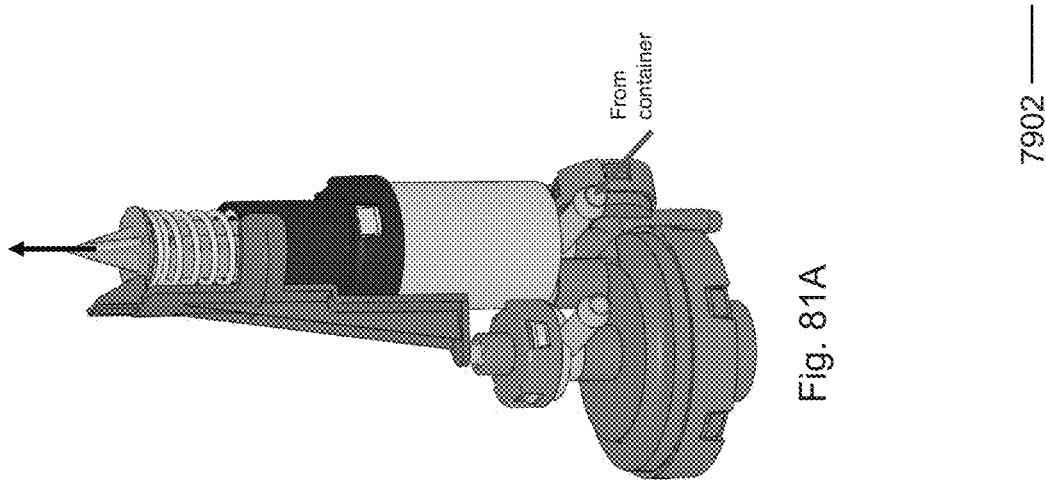

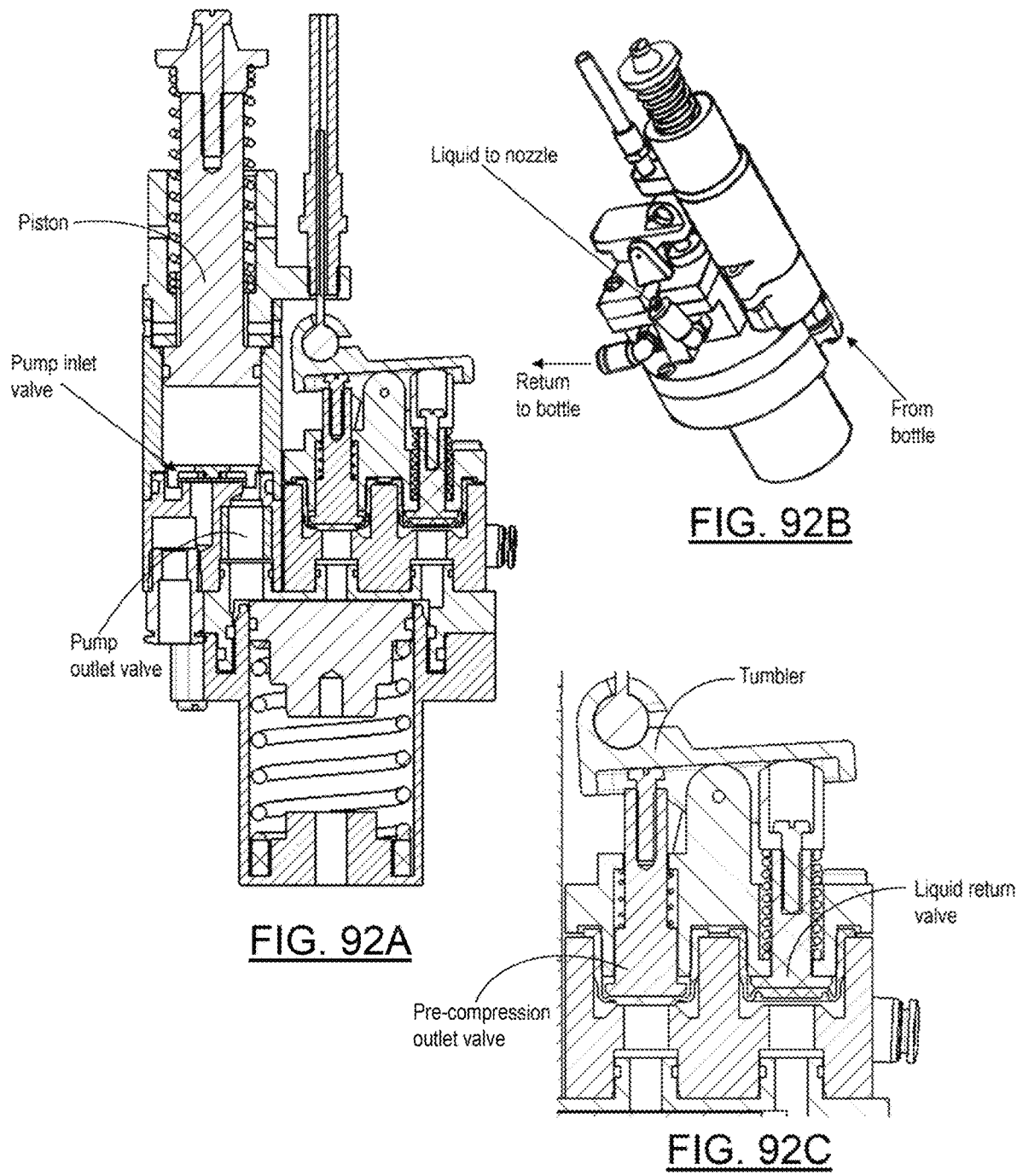

SYSTEMS AND METHODS TO PRECISELY CONTROL OUTPUT PRESSURE IN BUFFERED SPRAYERS (DUO1)

CROSS-REFERENCE TO RELATED APPLICATIONS

This application claims the benefit of United States Provisional Patent Application Nos. (i) 61/723,045, entitled NEW GENERATION SPRAY/FOAM DISPENSERS, WITH AND WITHOUT BUFFERING SYSTEMS ("NGOP"), filed on Nov. 6, 2012, (ii) 61/805,044, entitled IMPROVEMENTS TO FLAIROSOL TECHNOLOGY, filed on Mar. 25, 2013, and (iii) 61/810,697, entitled BUFFER SPRAYER WITH DIRECT ACTION RELEASE ("DUO1 PUMP"), filed on Apr. 13, 2013, the disclosure of each of which is hereby fully incorporated herein by reference.

TECHNICAL FIELD

The present invention relates to dispensing technologies, and in particular to improved sprayers/foam dispensers of various types, wherein output pressure, and thus droplet size, can be precisely controlled.

BACKGROUND OF THE INVENTION

Liquid dispensing devices such as spray bottles are well known. Some offer pre-compression so as to insure a strong spray when the trigger is pulled and prevent leakage. Sprayers and foamers can be easily manufactured and filled, and are often used to dispense cleaners of all types, for example. However, in many circumstances it is preferred not to have to continually pump a dispensing device to push out the dispensed liquid. Rather, it would be much more convenient to be able to continue the spray or foam substantially past the user pulling a trigger or otherwise actuating the sprayer head. For example, if by actuating a sprayer head a certain reasonable number of times per minute a continuous spray could be obtained, many users would find that optimal.

One set of dispensing devices that provide a continuous spray are aerosol dispensers, such as are used for cooking spray (e.g., Pam®), insect spray (e.g., Raid®), lubricants (e.g., WD-40®), and a host of other uses. Aerosols hold a liquid or other dispensate under pressure such that when a user activates the device (e.g., by pressing a button) the pressurized contents are allowed to escape. However, aerosols present both significant environmental hazards as well as packaging drawbacks, which result from the necessity of using an aerosol propellant in them, and the further necessity of pressurizing them. This requires filling such devices under pressure, using packaging strong enough to withstand the pressure, and taking steps to insure that the propellant maintains a uniform pressure over the life of the can or container. Such conditions often require use of non-environmentally friendly materials and ingredients.

Additionally, conventional aerosols do not continue spraying unless the user keeps their finger on the button. Inasmuch as people generally push on the aerosol can with the index finger of their dominant hand, this requirement precludes their ability to do anything with the spray or the surface/object on which the spray is directed with that hand making it difficult to clean, etc. Thus, users are forced to spray, for example, a cleaner on a surface, then stop spraying, then wipe or scrub, etc. Recently floor cleaning products have emerged to replace mops. Many try to spray a cleaning fluid or floor care product from one or more nozzles while a user is pushing the device along the floor or surface. Some of these devices utilize a motorized pump, run by a power cord or battery. However, such devices are often not robust, and do not last long. Or, for example, in the case of battery powered floor cleaners, any serious current draw requires large batteries, and frequent changing of same, which is both environmentally unfriendly, cumbersome and expensive.

Finally, although conventional pre-compression sprayers control the minimum output pressure, they do not control in any way the maximum output pressure. A conventional sprayer starts dispensing at a low pressure. During a trigger stroke, the pressure rises up to a peak pressure. The liquid is forced through an orifice, but only a part of the liquid can pass the nozzle, so the pressure will build up within the sprayer. Towards the end of the stroke, the liquid pressure drops to zero. The low pressure at the beginning and end of the stroke thus creates larger, non-uniform droplets at the right and left sides of the conventional sprayer pressure time curve. A pre-compression sprayer starts spraying when the liquid pressure is at a pre-determined pressure. This pre-determined pressure is known as the "cracking pressure" of the outlet valve. During the trigger stroke the pressure rises up to a peak pressure. When the pressure drops to a predetermined pressure (closing pressure of the outlet valve) dispensing stops immediately. The droplet size at the beginning and end of a dispensing stroke in a pre-compression sprayer are smaller because the pressure is higher. The peak pressure, creating even smaller droplets is also higher than that of a conventional sprayer, because the same amount of liquid is dispensed in a shorter time. Therefore more pressure builds up. Thus, relative to a conventional sprayer the pressure difference across the pressure time curve will still be there and even be greater. It is only shifted to a higher pressure range. Thus, difficulties with standard pre-compression sprayers include, for example, (1) wider spreading droplet sizes, and (2) too small droplet sizes.

To overcome these drawbacks, what is needed in the art is a sprayer/foamer device that can provide elongated spray or continuous spray, where a user does not need to continually pump or actuate, thus leaving the user's hands free to work between strokes (continuous spray), or following a stroke (elongated spray), but where output pressure is controlled to be within a specific pressure range.

What is further needed in the art is the adaptation of such functionality to floor cleaning systems, large surface cleaning systems, bathroom and toilet cleaning systems, and the like.

SUMMARY OF THE INVENTION

In exemplary embodiments of the present invention, various novel dispensing devices can be provided. Such devices can involve a range of sprayer heads and sprayer/foamer systems incorporating such heads. Novel sprayer/foamer heads can include buffers of various types. By using a buffer, a user need not continually be pumping the device in order for the device to be spraying or foaming. In exemplary embodiments of the present invention, such a buffer can be spring loaded, spring loaded combination, elastomeric or gas. In exemplary embodiments of the present invention, the buffer can be in line or adjacent to a piston chamber. If adjacent, it can be connected to the piston chamber with a one way valve, to provide for spray after a downstroke of the piston has been completed, or without, to allow spraying to cease once a user releases the trigger or other actuator. In exemplary embodiments of the present invention, such novel sprayers and foamers can be mounted upside down, in various "Flairomop" devices, used to clean floors or the like. When using a buffer, a piston chamber can be designed to deliver greater amount of liquid per unit time than can be possibly dispensed through the nozzle or nozzles. The fraction of liquid that cannot be sent through the nozzle(s), due to their inherent restriction, can thus be sent to the buffer for dispensing after the piston downstroke has been completed. A volume of the piston chamber, a volume of the buffer, a pressure response of the buffer, the throughput of the nozzle, and the minimum opening pressure of the outlet valve can be arranged to restrict the outlet pressures of liquid droplets exiting the nozzle within a defined range.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 7-8 illustrate high and low output pressure bands, respectively;

FIG. 9 provides various exemplary combinations of sprayer parameters used to control output pressure according to exemplary embodiments of the present invention;

FIGS. 10-11 depict various pre-compression technologies that can be used in exemplary embodiments of the present invention;

FIGS. 18A, 18B, 18C, 18D, 19A, 19B, 19C, 19D, 19E, 20A and 20B, depict various lock out systems according to exemplary embodiments of the present invention;

FIGS. 18E, 18F and 18G illustrate exemplary key parameters that can be varied to create user specific lock out keys;

FIGS. 21-33 illustrate an exemplary "Flairosol D'Lite" sprayer according to exemplary embodiments of the present invention;

FIGS. 34-40, next described, illustrate various technological advances of the exemplary Flairosol D'Lite type sprayer;

FIG. 40 illustrates the use of a novel all plastic binary dome valve according to exemplary embodiments of the present invention;

FIGS. 41-47 present details of the novel dome valve of FIG. 40;

FIG. 69 presents an exemplary "Flairomop" device and exemplary nozzle positions thereof according to exemplary embodiments of the present invention;

FIGS. 79-85 depict an exemplary continuous stop engine;

FIGS. 91-92 depict a further improvement thereto; and

DETAILED DESCRIPTION OF THE INVENTION

In exemplary embodiments of the present invention, various novel sprayers and related dispensing devices are presented. The sprayer heads shown can, in general, work with both standard bottles or reservoirs as well as the "bag within a bag" or "container within a container" Flair® technology developed and provided by Dispensing Technologies B.V. of Helmond, The Netherlands. The "bag within a bag" Flair® technology, which causes the inner container to shrink around the product, thus obviates headspace or air bubbles in the inner container. Because in Flair® technology the pressure applied to the inner bag results from a pressurizing medium, often atmospheric pressure vented between said inner and outer containers, venting of the liquid container is not required. Of course, whenever a product is dispensed from an inner bag in a Flair system, which shrinks to the remaining volume of the product as it dispenses, then the pressure has to be equalized in the gap between the outer container and the inner container. This can be done, for example, using a medium, such as, for example, air, whether at atmospheric pressure or higher. This can easily be done by venting the gap to ambient air somewhere between the inner container and the outer container. This can be done, for example, by providing a vent, such as, for example, on the bottom of the Flair container, or at any other convenient position of the outer container. In some exemplary embodiments such a vent is moved to the sprayer head itself, via a novel outlet valve.

Figure 1:
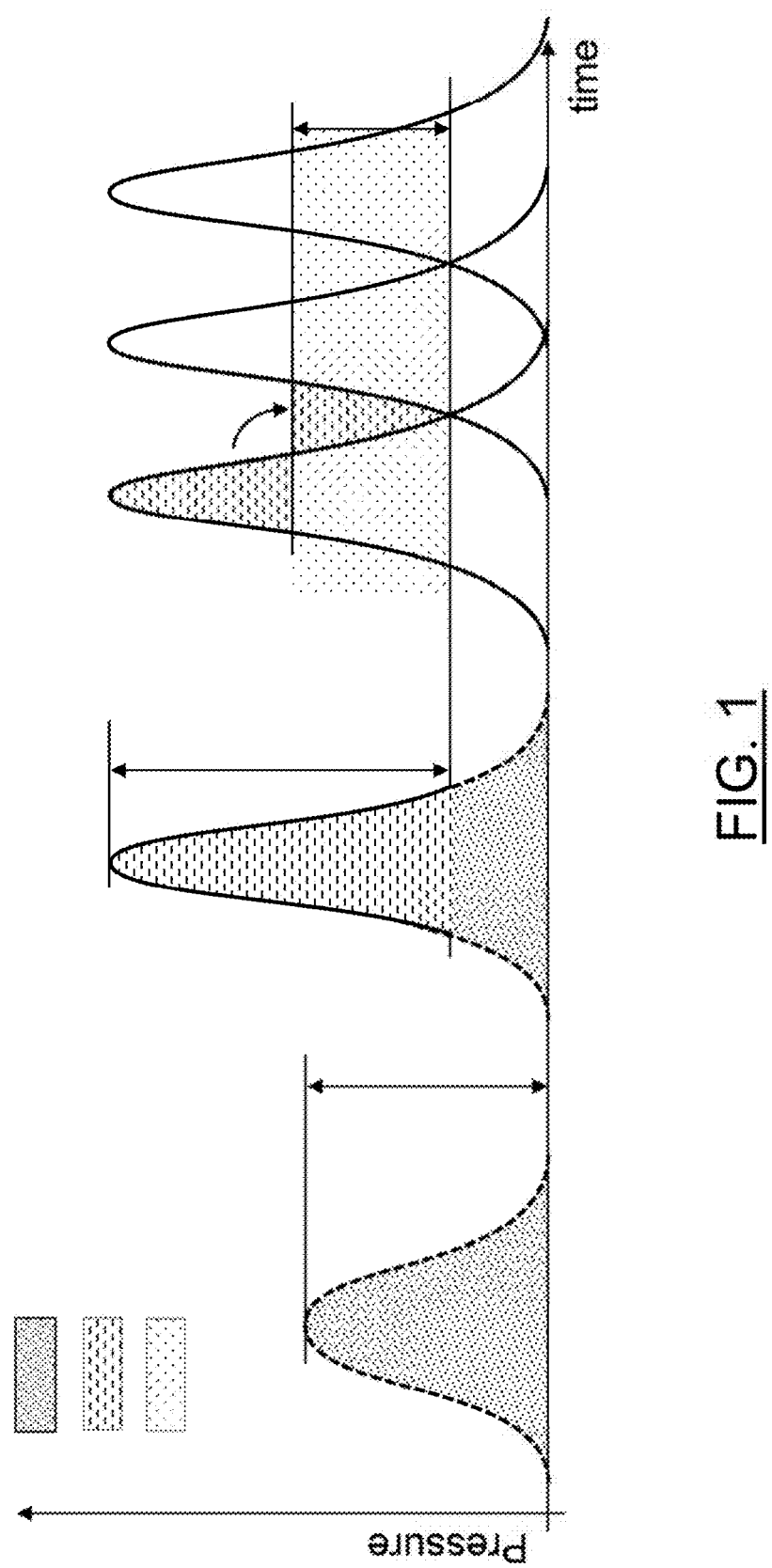
FIGS. 1-3 illustrate pre-compression and the problems with conventional pre-compression sprayers.
Figure 2:
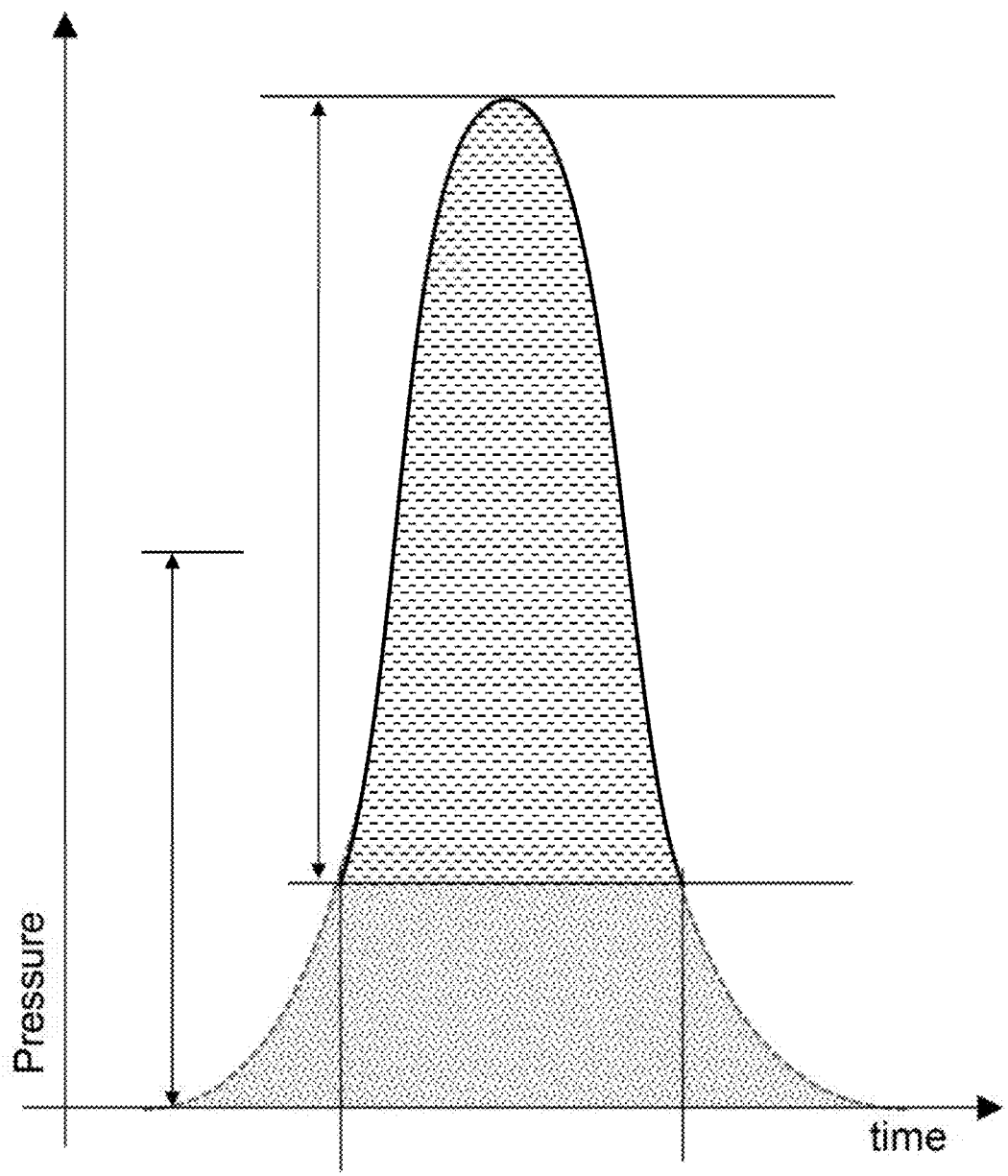
Figure 3:
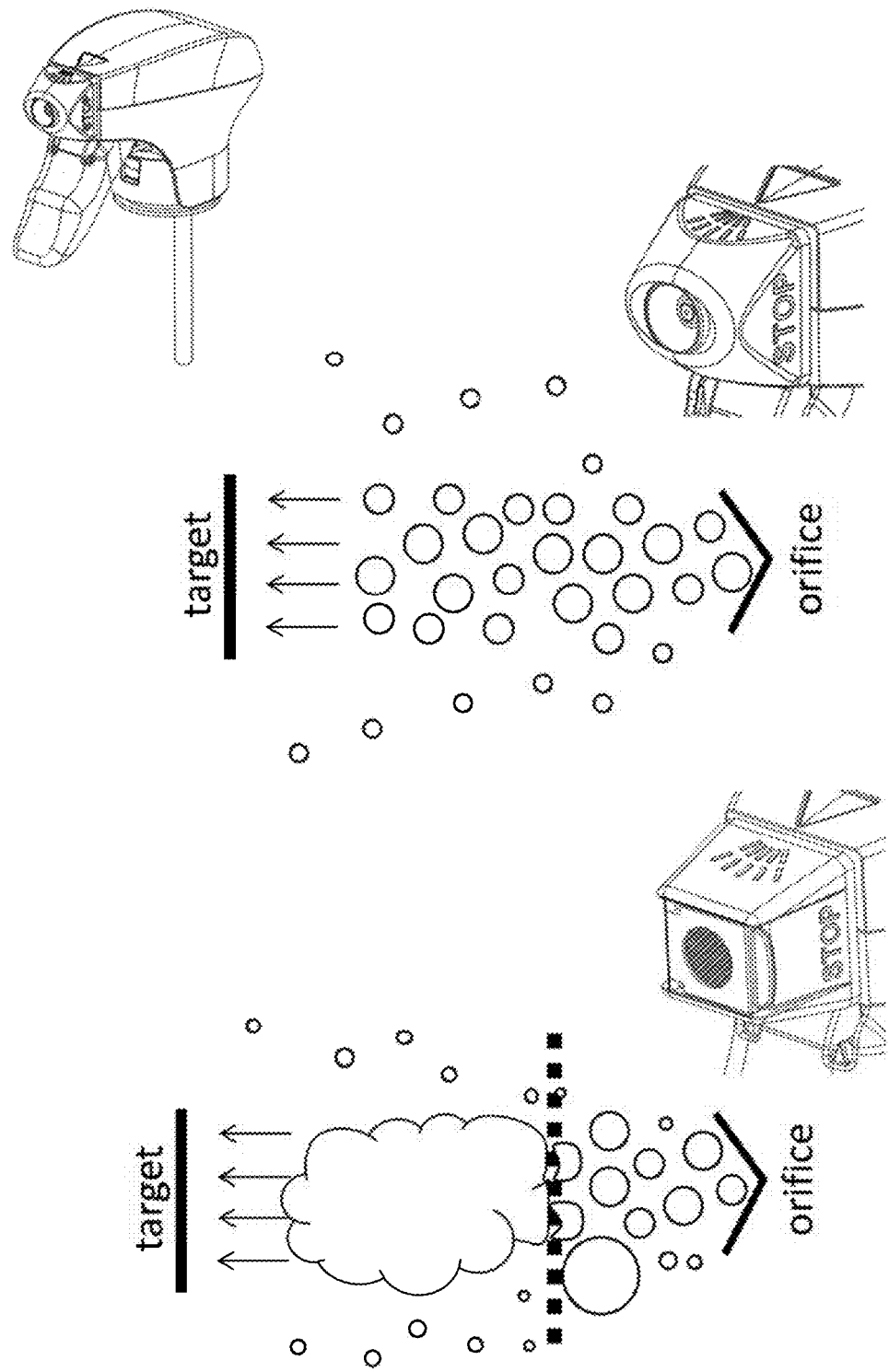

FIGS. 1 through 4, next described, illustrate the relationship between output pressure and time of the outflow of various types of sprayers. With reference to FIG. 1, the left-most image shows the pressure time curve of a conventional sprayer. There is a distribution of pressures, essentially a Gaussian curve, and with greater pressure there is a smaller droplet size. Thus, in the pressure curve of conventional sprayer there is a distribution of droplet sizes. A conventional sprayer has no closed valves. When the piston is actuated the sprayer immediately starts dispensing. Thus, slow actuation of the pump by a user results in large droplets or drips and the liquid pressure is low. On the other hand, fast actuating of the piston can decrease the amount of large droplets because the pressure then rises more quickly towards the peak pressure. Thus, in a conventional sprayer performance is highly dependent upon the user operating or the behavior of the user operating the sprayer. The middle image of FIG. 1 is the pressure curve of a pre-compression sprayer. Notably there is a larger range of pressures that are output from a pre-compression sprayer. A pre-compression sprayer has normally closed valves. The outlet valve therefore only opens at a pre-determined pressure. The displacement volume between inlet and outlet valve of the pump is to become zero during a compression stroke. If it does not, the pump cannot prime. When the piston is actuated by a user the sprayer only starts dispensing when the liquid pressure is above the cracking pressure of the outlet valve. Therefore slow actuation of the pump will give no drips because the pump starts dispensing at a higher pressure. Here in a pre-compression sprayer performance is less dependent upon the user's operating behavior than in the case of a conventional sprayer.

Figure 4:
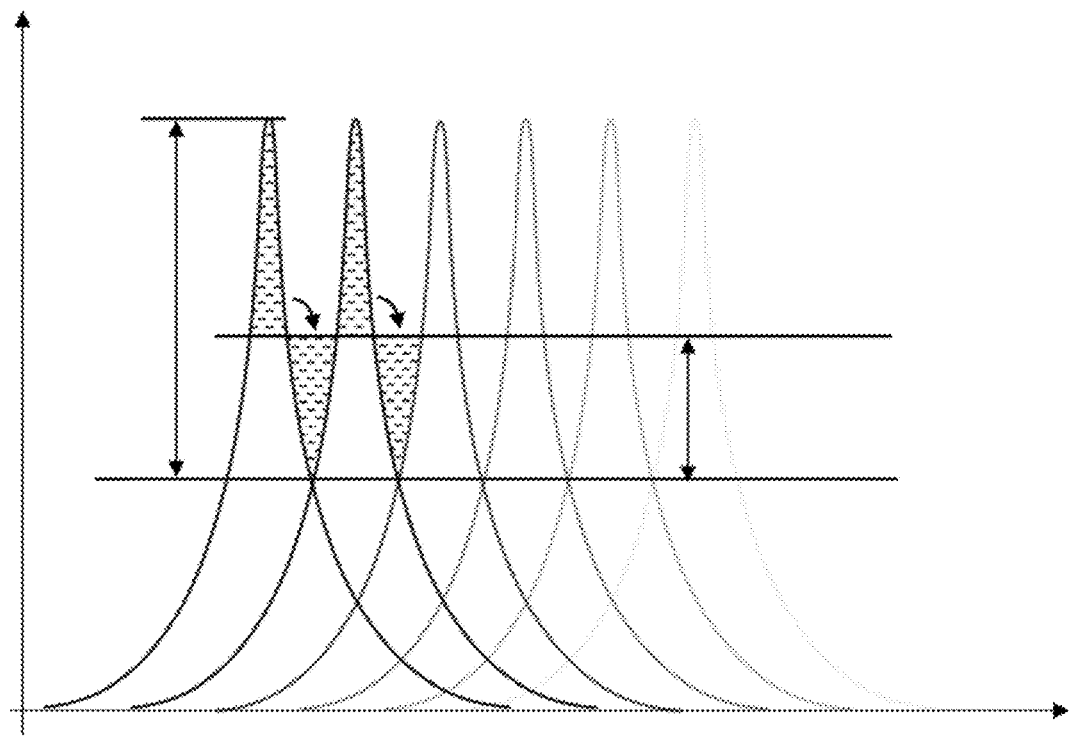
FIGS. 4-5 illustrate a novel combination of pre-compression and control of maximum pressure according to exemplary embodiments of the present invention.
Figure 5:
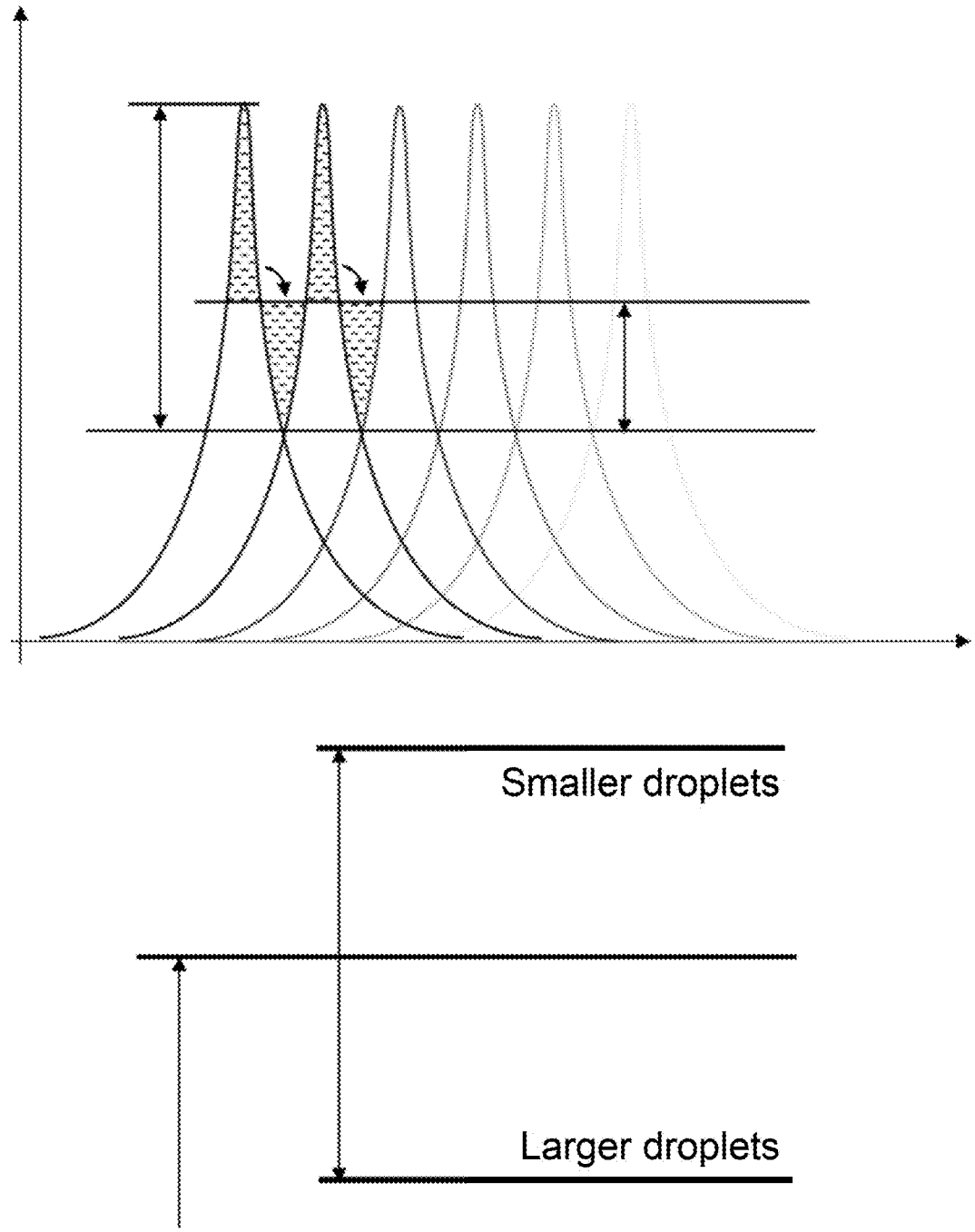
Figure 6:
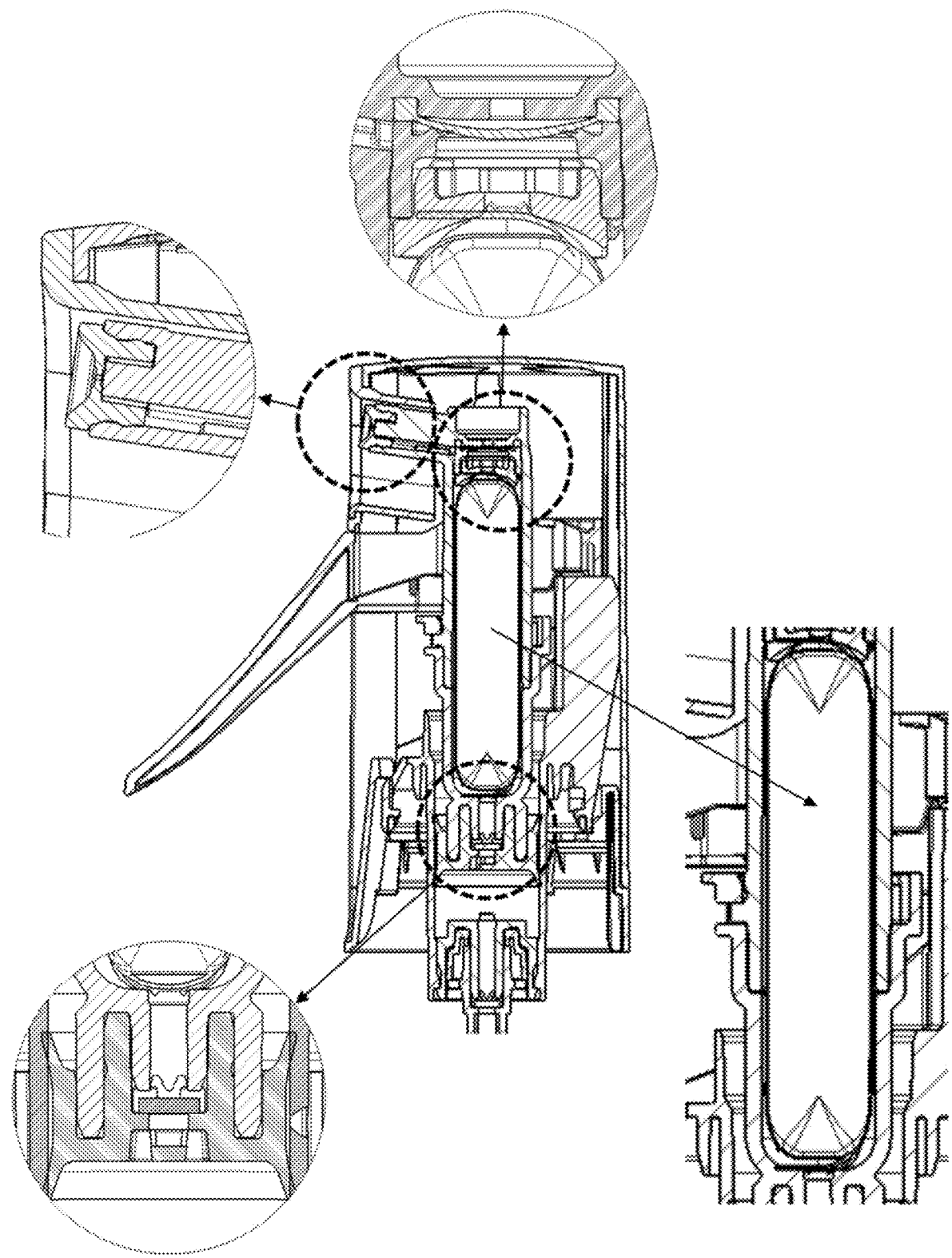
FIG. 6 illustrates correlation of various sprayer elements to control output pressure in a defined band according to exemplary embodiments of the present invention.

The right-most image of FIG. 1 illustrates the pressure time curve of a sprayer according to exemplary embodiments of the present invention. It is noted that on occasion the inventive sprayers described herein will be referred to as "DuO1" sprayers. A DuO1 dispenser has normally closed valves just as in the case of a pre-compression sprayer. Therefore the outlet valve only opens at a pre-determined pressure. There is also a buffer, however. The buffer immediately stores the overflow of liquid, thus preventing peak pressures. The DuO1 synchronized components determine the output performance. Fast or slow triggering by a user has little effect on the output, because the pressures are equalized through buffering. The performance of a DuO1 dispenser is very little dependent upon the operating behavior of the user. As noted in the right-most image of FIG. 1 there is a much-narrower range of output pressures because peak pressures are topped off by buffering the overflow and thus the pressures at the top of the pre-compression sprayer pressure curve are cut off at the maximum pressure which is the uppermost line in FIG. 1, right-most image. By buffering the overflow this reduces the pressure range/droplet size spread. And thus for a DuO1 sprayer, output pressure runs in a narrow band between the minimum pressure, that of the pre-compression valve, and the maximum pressure, which is a function of the pressure generated by the buffer during continuous strokes or during one single stroke in case of a direct stop embodiment (as described below). Various DuO1 synchronized components determine the output performance. Fast or slow triggering has little effect on the output, because the pressures are equalized through buffering. Output pressure tends to be at the buffer pressure.

FIG. 2, next described, provides further details of a pre-compression sprayer. As noted with reference to FIG. 1 a conventional sprayer starts dispensing at a low pressure. During a trigger stroke, the pressure rises up to a peak pressure. The liquid is forced through an orifice, but only a part of the liquid can pass the nozzle, so the pressure will build up within the sprayer. Towards the end of the stroke, the liquid pressure drops to zero. The low pressure at the beginning and end of the stroke thus creates larger, non-uniform droplets as shown at the right and left sides of the conventional sprayer pressure time curve shown in FIG. 2.

A pre-compression sprayer starts spraying when the liquid pressure is at a pre-determined pressure. This pre-determined pressure is known as the "cracking pressure" of the outlet valve. During the trigger stroke the pressure rises up to a peak pressure. When the pressure drops to a predetermined pressure (closing pressure of the outlet valve) dispensing stops immediately. The droplet size at the beginning and end of a dispensing stroke in a pre-compression sprayer are smaller because the pressure is higher. The peak pressure, creating even smaller droplets is also higher than that of a conventional sprayer as shown in FIG. 2, because the same amount of liquid is dispensed in a shorter time. Therefore more pressure builds up. Thus, relative to a conventional sprayer the pressure difference across the pressure time curve will still be there and even be greater. It is only shifted to a higher pressure range.

Thus, a conventional sprayer starts dispensing at a low pressure, and during a trigger stroke the pressure rises up to a peak pressure. The liquid is forced through an orifice, but only a part of the liquid can pass through the nozzle, so pressure will build up. Towards the end of the stroke the liquid pressure drops to zero. The low pressure seen at the beginning and the end of the stroke creates larger non uniform droplets.

A pre-compression sprayer starts spraying when the liquid pressure is at a pre-determined pressure (the cracking pressure of the outlet valve). During a trigger stroke the pressure rises up to a peak pressure. When the pressure drops to a predetermined pressure (closing pressure of the outlet valve), dispensing stops immediately.

The droplet sizes at the start and end of the dispensing stroke are smaller, because the pressure is then higher. The peak pressure (creating even smaller droplets) is higher than in a conventional sprayer because the same amount of liquid is dispensed in a shorter time. (more pressure build up). Compared to a conventional sprayer the pressure difference will still be there, or be even larger. It only shifted to an higher pressure level Issues with pre-compression sprayer: (1) a wider spread in droplet sizes, and (2) too small droplets sizes due to very high peak pressure, as shown.

FIG. 3 illustrates the difficulties with standard pre-compression sprayers. These include, for example, (1) wider spreading droplet sizes, and (2) too small droplet sizes. For many liquids a wider spread of droplet sizes is not a problem. Sometimes, however, the range of droplet sizes is required to be smaller in order to have better performance of the liquid, such as, for example to create a foam. Too small droplet sizes (less than or equal to 10 microns) can cause a health hazard when they are of such a size that can be inhaled and wherein the liquid can be dangerous, such as, for example when using bleach contained liquids. Also, too small droplet sizes can stray off when dispensed and not hit the target. Rather they can land on a non-intended surface which they can damage. For example a hard surface cleaner which causes stains when it lands on a fabric. These processes are illustrated at the bottom of FIG. 3. Additionally, as shown, in a foamer context, screen is sized for a particular droplet size which would hit its grid and thus become foam. Too small droplets do not hit the foaming screen, and thus pass through without making foam, can stray off, be inhaled, and fail to land on an intended target. On the other hand, too large droplets are held back by the foamer screen, and drop down, also not reaching the target. FIGS. 4 and 5, as do the rightmost image of FIG. 1, illustrate a solution to the above-described problems with standard pre-compression sprayers.

As shown in FIG. 4, DuO1 technology avoids the issues which evolve when using a pre-compression sprayer. To do so, it avoids the pressure peaks which cause the droplet sizes to be too small, and makes the range of droplet sizes smaller. In other words the pressure range in which the dispenser operates needs to be made smaller.

DuO1 technology does this because the amount of liquid displaced by the pump which cannot leave the nozzle within a given dispense time causes pressure peaks. This overflow of liquid needs to be temporarily stored. DuO1 stores this liquid within a buffer. The pressure peak is then avoided and makes the pressure range smaller.

When no more liquid is displaced by the pump, the buffer releases* the stored liquid. The buffer releases the liquid either through the nozzle (continuous or prolonged output) or by return to the piston chamber or container (direct stop). By coordinating the components of the DuO1 technology, a tailor fit dispenser can be created to fit any specified performance requirements.

A DuO1 technology equipped dispenser includes at least: a pump engine (stroke volume/absolute flow at a certain stroke rate); a pre-compression outlet valve (opening/closing pressure); an orifice/nozzle (performance at a certain flow); and a buffer (overflow storage capacity, overflow storage pressure).

It is desired to avoid the issues which come about when using a standard pre-compression sprayer. In order to do so it is necessary to avoid the pressure peaks at the top of a down stroke cycle which cause the droplet sizes to be too small. Therefore we need to make the range of droplet sizes smaller. In other words, the pressure range in which the dispenser operates needs to be narrowed. In exemplary embodiments of the present invention this is done as follows. The amount of liquid displaced by the pump which cannot leave the nozzle within the given dispense time, causes the pressure peaks. This overflow of liquid needs to be temporarily stored. This liquid can be stored within a buffer in exemplary embodiments of the present invention. The pressure peak can then be avoided and this makes the pressure range smaller. When no more liquid is displaced by the pump the buffer releases the stored liquid. The buffer releases the liquid either through the nozzle (continuous or prolonged output) or returns the liquid to the piston chamber or container direct stop). The difference between continuous or prolonged output and direct stop is whether or not a one-way valve is provided between the buffer and the piston chamber or not. If the valve is provided then liquid cannot leave the buffer in a backwards direction running back to the piston chamber and therefore the sprayer exhibits continuous prolonged output. If there is no such one way valve any liquid remaining in the buffer can return to the piston chamber and be used in the next downspout.

By synchronizing, or coordinating, the components of an exemplary DuO1 sprayer a dispenser can be created that is tailor-made to fit the performance requirements of any user or customer. The narrow output range and concomitant droplet size range that is possible with an inventive DuO1 sprayer is illustrated in FIG. 4.

Therefore in exemplary embodiments of the present invention, a DuO1 equipped dispenser includes at least a pump engine (stroke volume/absolute flow at a certain stroke rate), a pre-compression outlet valve (opening/closing pressure), an orifice/nozzle (performance at a certain flow) and a buffer (overflow storage capacity, overflow storage pressure).

FIG. 5 illustrates further details of the correlations between elements of an exemplary DuO1 sprayer. The opening pressure of the outlet, responsible for the larger droplet sizes and the maximum dispensing pressure, responsible for the smaller droplet sizes, are the controls which can be used to set the limits of the pressure range/droplet size spread. The right side of FIG. 5 illustrates a desired pressure level/droplet size which can be provided by a specification or by a user or by a customer. Given the desired pressure level/droplet size in exemplary embodiments of the present invention, a DuO1 sprayer can be created which outputs a range of pressures or droplet sizes centered on the desired pressure size and running from {p minus delta p} and {p plus delta p}. The minus delta p is the opening pressure of the outlet valve and the p plus delta p is the maximum dispensing pressure at a certain stroke rate.

When a desired pressure level/droplet size and a range (limits) is given, the DuO1 technology enables this to be achieved by setting the controls mentioned above. When a desired pressure level/droplet size and a range is given in exemplary embodiments of the present invention DuO1 technology and it allows this to be achieved by setting the controls mentioned above. As noted above, output pressure tends to be at the buffer pressure.

FIG. 6 illustrates the various elements of a DuO1 sprayer which need to be correlated to provide the desired pressure range illustrated in FIG. 5. With reference to FIG. 6 there is a pump, a dome valve, a buffer, and an outlet orifice. The maximum dispensing pressure is a function of the flow of the pump at a certain stroke rate, the flow at which the orifice/nozzle performs, and the capacity and pressure of the buffer. The opening and closing pressure of the pre-compression outlet valve, is, in exemplary embodiments of the present invention, always set lower than the default buffer pressure. The default buffer pressure of the buffer gives all liquid stored in the flow needed for the orifice/nozzle to perform. The flow of the pump at a certain stroke rate will always be greater than the flow at which the orifice nozzle performs. This ensures that there will be an overage of liquid in every down stroke which cannot possibly be handled by the throughput of the office or nozzle. The difference between the flow of the pump at a certain stroke rate and the flow at which the orifice/nozzle performs is the overflow and the overflow and the overflow is the excess liquid that can be delivered between strokes. Therefore the capacity of the buffer should be greater than or equal to the overflow such that the buffer can always take up the overflow and then allow it to be released later. If the buffer could not take up the entire overflow in its capacity pressure would rise and the situation seen in the standard pre-compression valve would occur in that higher pressures and smaller droplet sizes at the peak of a down stroke would ensue. The maximum dispensing pressure multiplied by the surface area of the piston or diameter multiplied by the trigger torque equals the operating force. When peak pressures exist in a system (unlike the DuO1 system described herein) the trigger force required to be supplied by a user is thus higher when such peak pressures prevail in a sprayer. Thus, it takes more force to continue the spraying operation in such sprayers. This is in contrast to the DuO1 systems described herein, where buffering eliminates the peak pressures, and the system operates most of the time at an essentially constant lower pressure (i.e., the upper horizontal line in FIG. 5—maximum dispensing pressure).

Thus, in a sprayer of the type shown FIG. 6, the maximum dispensing pressure is correlated to:

The flow of the pump at a certain stroke rate,

The flow at which the orifice/nozzle performs, and

The capacity and pressure of the buffer.

Opening and closing pressure of the pre-compression outlet valve < The default buffer pressure. The default buffer pressure of the buffer gives all liquid stored the flow needed for the orifice/nozzle to perform.

The flow of the pump at a certain stroke rate > The flow at which the orifice/nozzle performs, creating overflow. The difference between the flow of the pump at a certain stroke rate and the flow at which the orifice/nozzle performs, (which is the overflow) ≥ than that which the orifice needs to perform in between strokes of the before mentioned stroke rate The capacity of the buffer ≥ The overflow The (maximum dispensing pressure)×(Surface area of piston bore diameter)×(Trigger torque)=Operating force.

FIGS. 7-9 illustrate further details of correlation of various elements within an exemplary DuO1 sprayer. With reference to FIG. 7, superimposed on a standard pressure time curve is a white band which is a narrow range of pressures between Pmin and Pmax which shows a consistent output pressure of a DuO1 sprayer. If smaller droplets are desired this pressure bandwidth is high as shown in FIG. 7.

FIG. 7 thus depicts a high pressure bandwidth to create an output range with smaller droplets. With high pressures a small piston diameter is needed to maintain an ergonomic operating force. A maximum possible piston stroke is set to maintain an ergonomic actuation of the trigger. The (small piston diameter)×(the max. piston stroke)=a small displacement volume. The small displacement volume, having a large flow caused by the high pressure, requires a nozzle/orifice with a lower flow. So the large flow, small liquid volume is partially blocked by the low flow orifice. This overflow is stored in the buffer.

FIG. 8 illustrates a lower bandwidth of output pressure which is a low pressure bandwidth to create an output range with larger droplets. Here to achieve this result a low pressure dome and buffer are used. FIG. 8 thus depicts a low pressure bandwidth to create an output range with larger droplets. This uses a low pressure dome and buffer. With low pressures a larger piston diameter can be used to maintain an ergonomic operating force. A maximum possible piston stroke is set to maintain an ergonomic actuation of the trigger. The (larger piston diameter)×(the max. piston stroke)=a large displacement volume. The large displacement volume having a low flow caused by the low pressure, can use a nozzle/orifice with a larger flow to generate large droplets. So here the large liquid volume needs to have overflow with a larger flow nozzle. This overflow is stored in the buffer. This is essentially the opposite of the situation illustrated in FIG. 7.

Generalizing from FIGS. 7 and 8 one can easily see that by manipulating the various parameters of an exemplary DuO1 sprayer any desired output pressure band whether low, medium or high can be achieved. FIG. 9 is the table of possible correlation values for such a range of pressure bands and providing example uses for such pressure bands and example liquids It is noted that the frequency for continuous spray is the number of strokes per minute to have an output in between strokes. And the spray duration single stroke is the time between the start and stopping of dispensing when a user makes one stroke and holds the trigger for prolonged spray.

FIG. 10 illustrates various pre-compression technologies which can be used for the dome valve, or pre-compression valve. Pre-compression technology can be used in all kind of dispensing applications. For example Floor mops, Window washers, Sprayers, etc. Pre-compression technology can be used in a wide pressure-range of dispensing applications, from low to high pressures. Pre-compression valves can be made in all kind of types, configurations and combinations of configurations and materials, for example, as shown in FIG. 10: (1) All plastic elastic dome valve with integrated inlet valve; (2) All plastic elastic dome valve; (3) All plastic Binary dome valve; (4) Spring loaded membrane valve; and (5) Membrane valve.

Pre-Compression Valves

Figure 11:
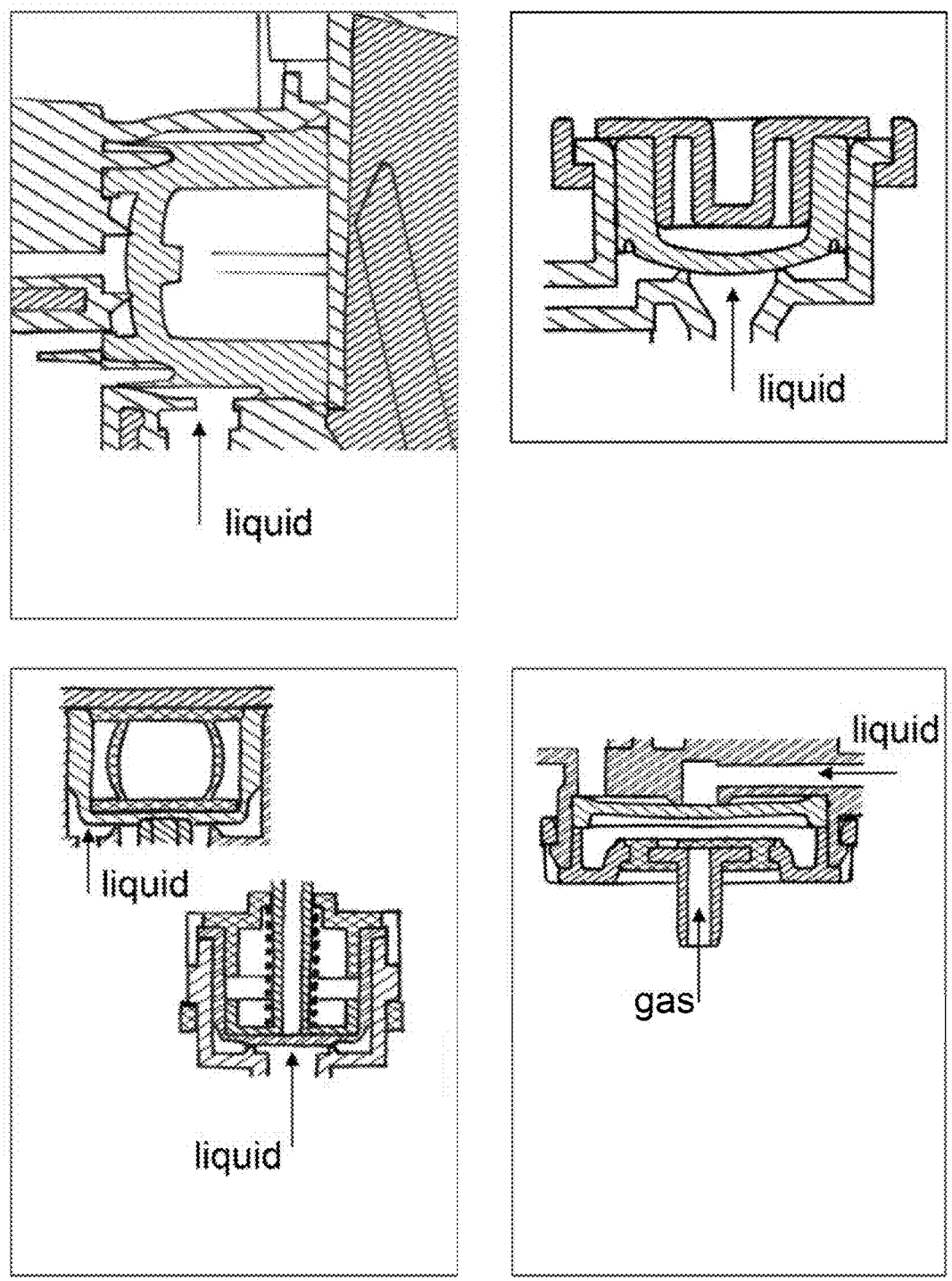

FIG. 11 illustrates various types of pre-compression valves. With reference thereto, there is an all plastic elastic dome valve (with and without integrated inlet valve). Here the closing force of the valve and therefore the force needed to open the valve is determined by the elasticity of the material and the pre-tension in assembly. Additionally, there is a spring loaded membrane valve. Here the closing force of the valve and therefore the force needed to open the valve is determined by the force of the metal or plastic spring placed behind the membrane. The membrane is the seal between spring and liquid. Finally, there is a membrane valve. Here the closing force of the valve, and therefore the force needed to open the valve, is determined by gas pressure behind the membrane. The gas pressure acts like a spring. The membrane is the seal between gas and liquid.

Buffers

Figure 12:
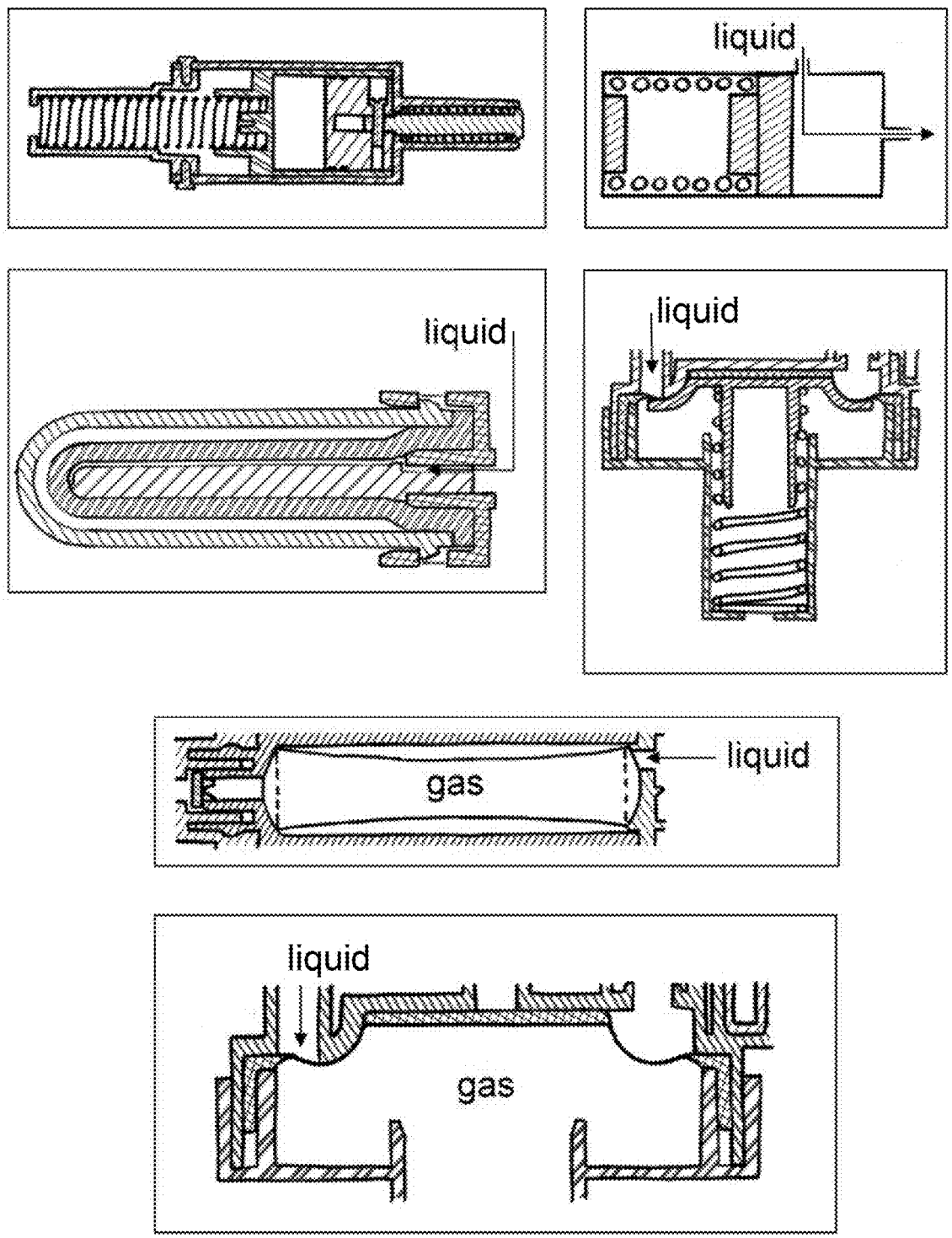
FIGS. 12, 13A, 13B, 14A, 14B, 15A and 15B describe various buffers that can be used in exemplary embodiments of the present invention.

FIG. 12 illustrates various types of buffers that can be used in exemplary embodiments of the present invention. With reference thereto, there is a spring loaded buffer, where the buffer pressure is set by the properties of the metal spring behind the buffer piston. The buffering volume is set by the maximum travel of the buffer piston. Additionally, there is an elastic material buffer, where the buffer pressure is set by the properties of the buffer; material, thickness. The buffering volume is set by size of the elastic part and the buffer housing volume which limits the stretch of the elastic part. There is a gas loaded buffer, where the buffer pressure is set by the size of the buffer bag and the pressure of the gas inside the bag. The buffering volume is set by the size of the buffer bag. There is a spring loaded membrane buffer, where the buffer pressure is set by the properties of the metal spring behind the membrane. The buffering volume is set by the maximum travel of the membrane. Finally, there is a membrane buffer, where the buffer pressure is set by gas pressure put behind the membrane. The gas pressure acts like a spring. The membrane is the seal between gas and liquid. The buffering volume is set by the maximum travel of the membrane.

Figure 13A:
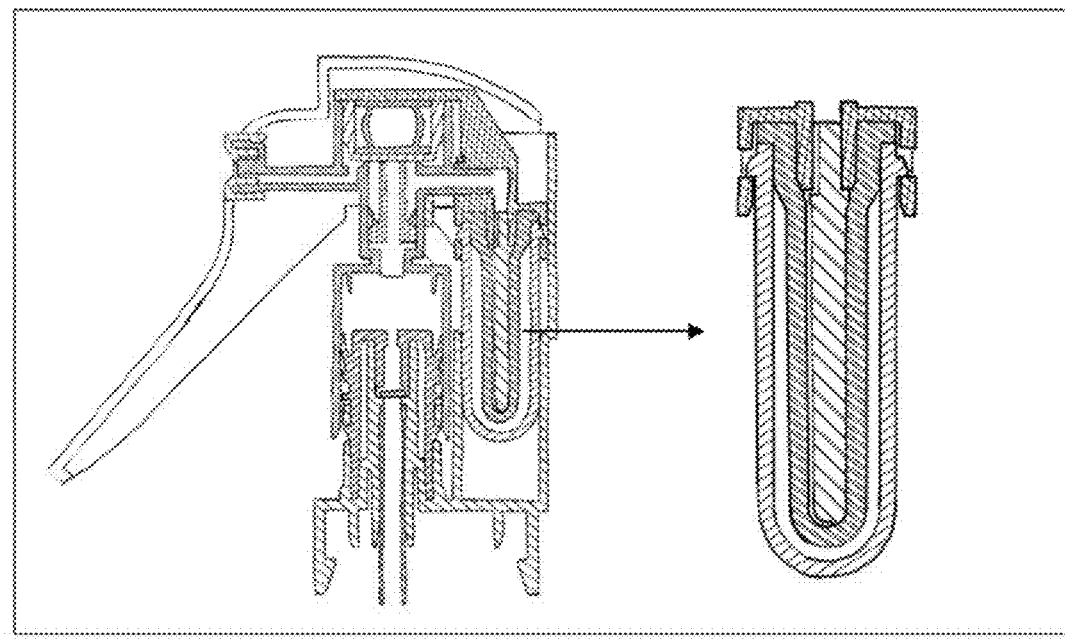
Figure 13B:
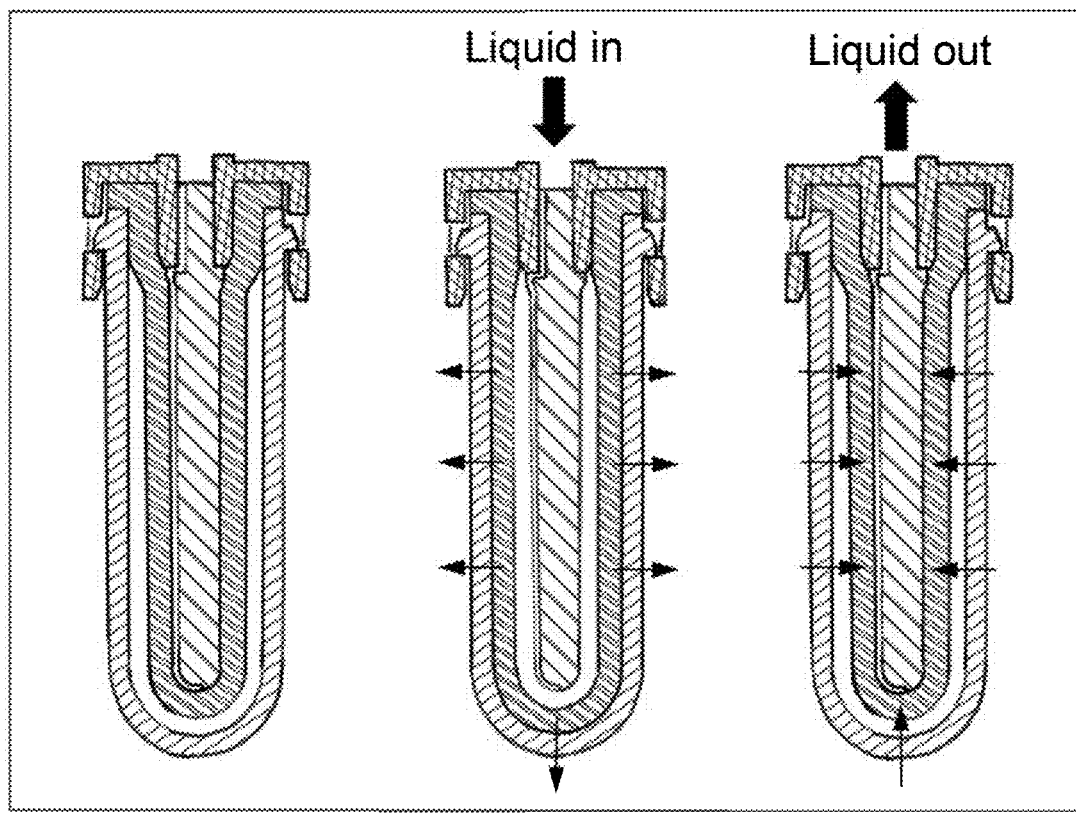
Figure 13C:
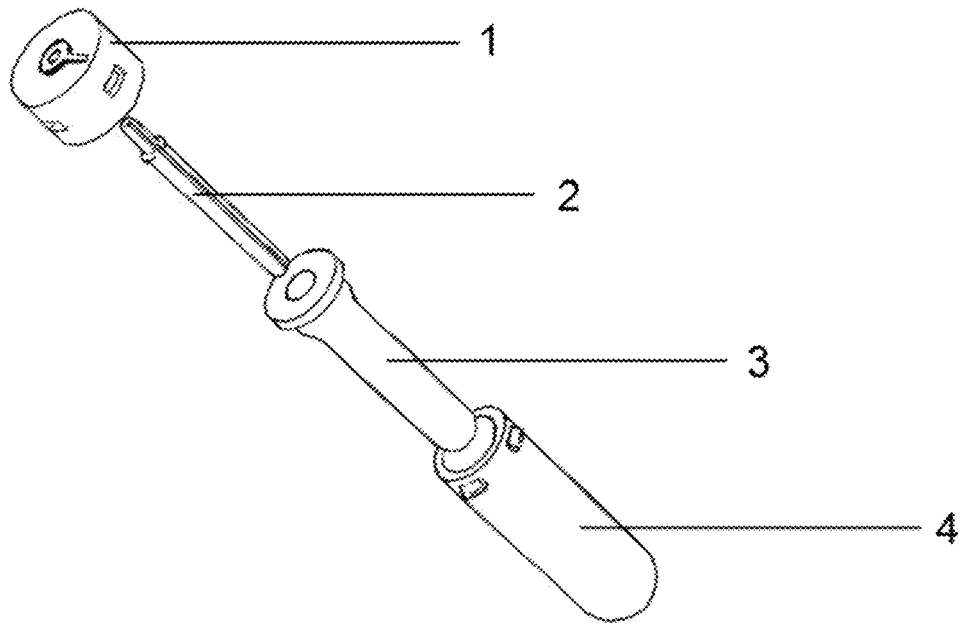

FIG. 13 illustrates assembly and operation of an exemplary elastic material buffer. With reference to FIG. 13, the elastic buffer is placed over a core, and liquid is pumped between the buffer and core. The buffer will thus stretch. Then, liquid is pushed out of the buffer until the buffer pushes against the core.

Figure 14A:
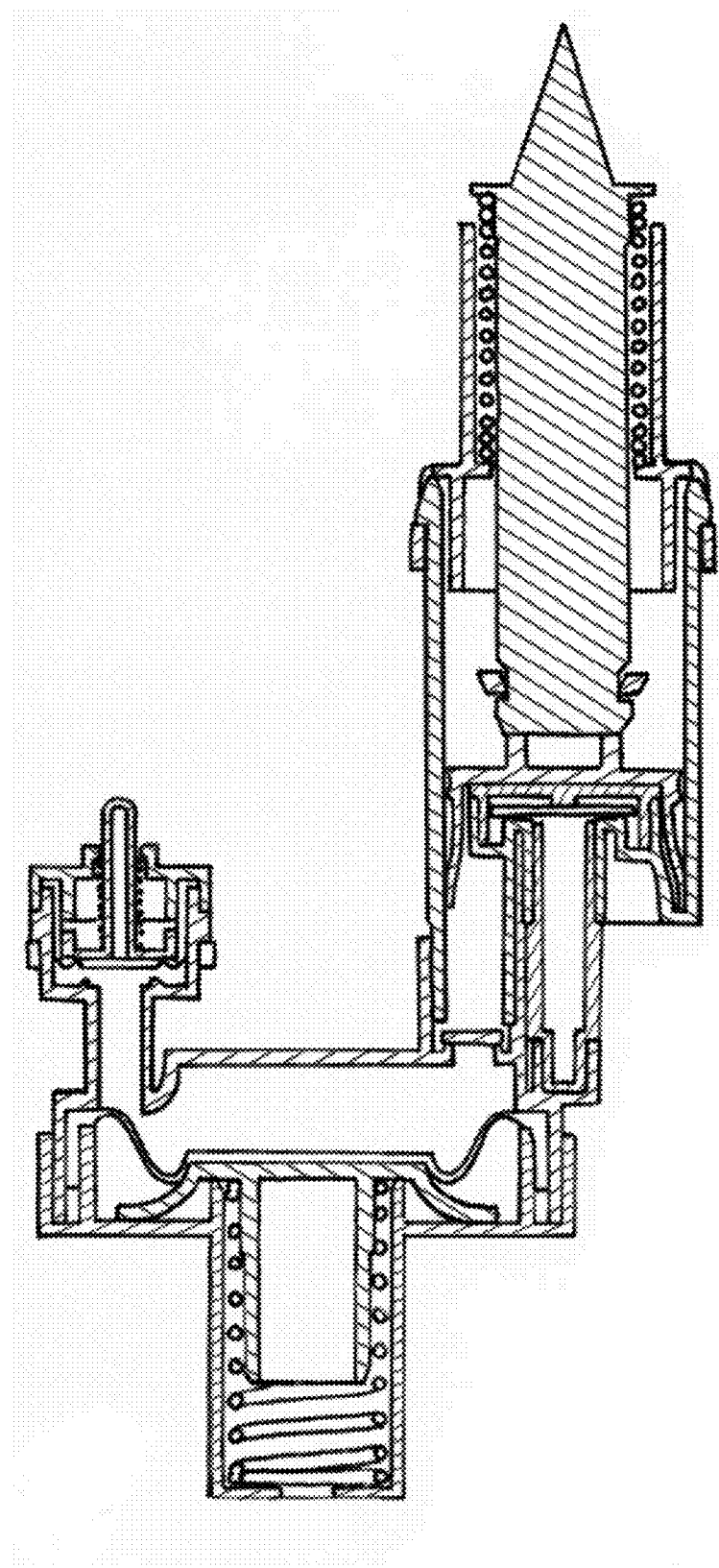
Figure 14B:
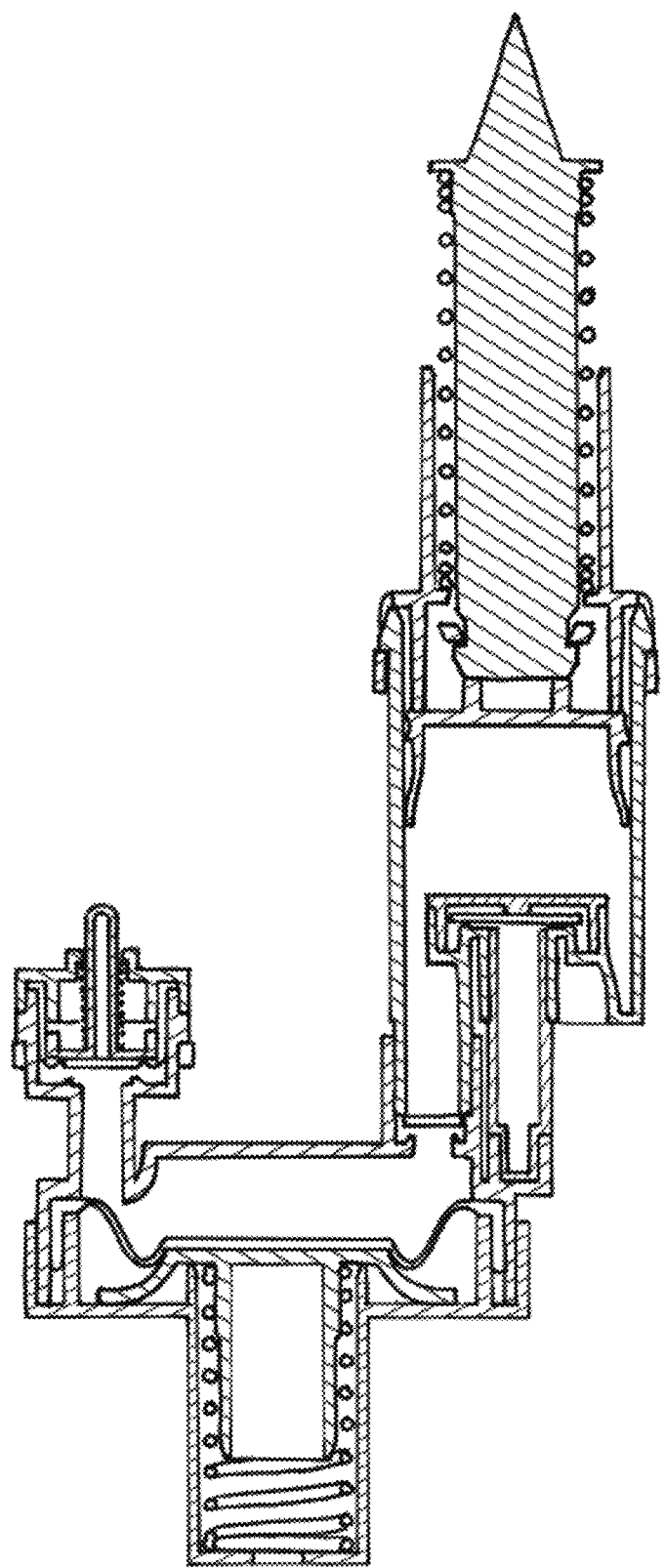
Figure 15A:
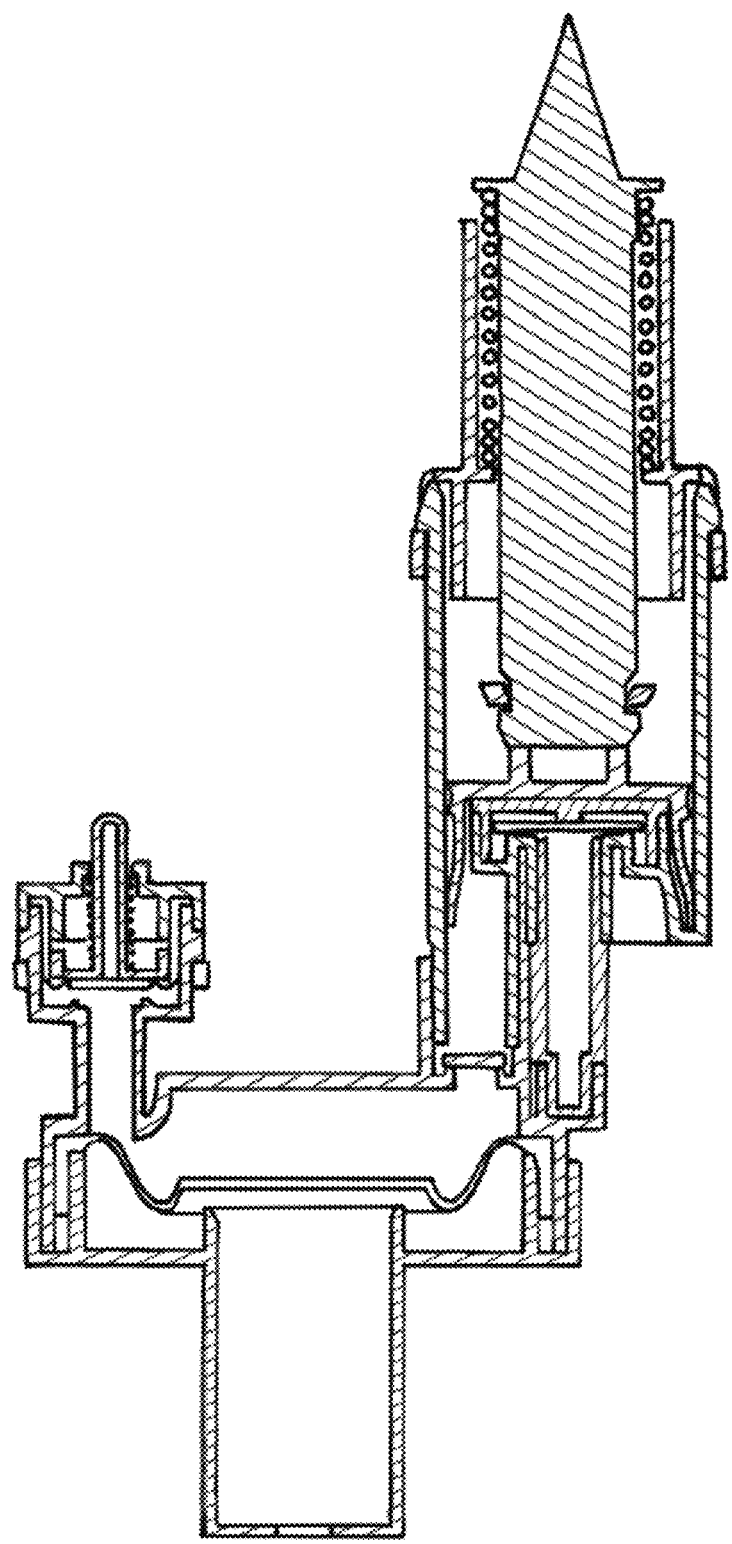
Figure 15B:
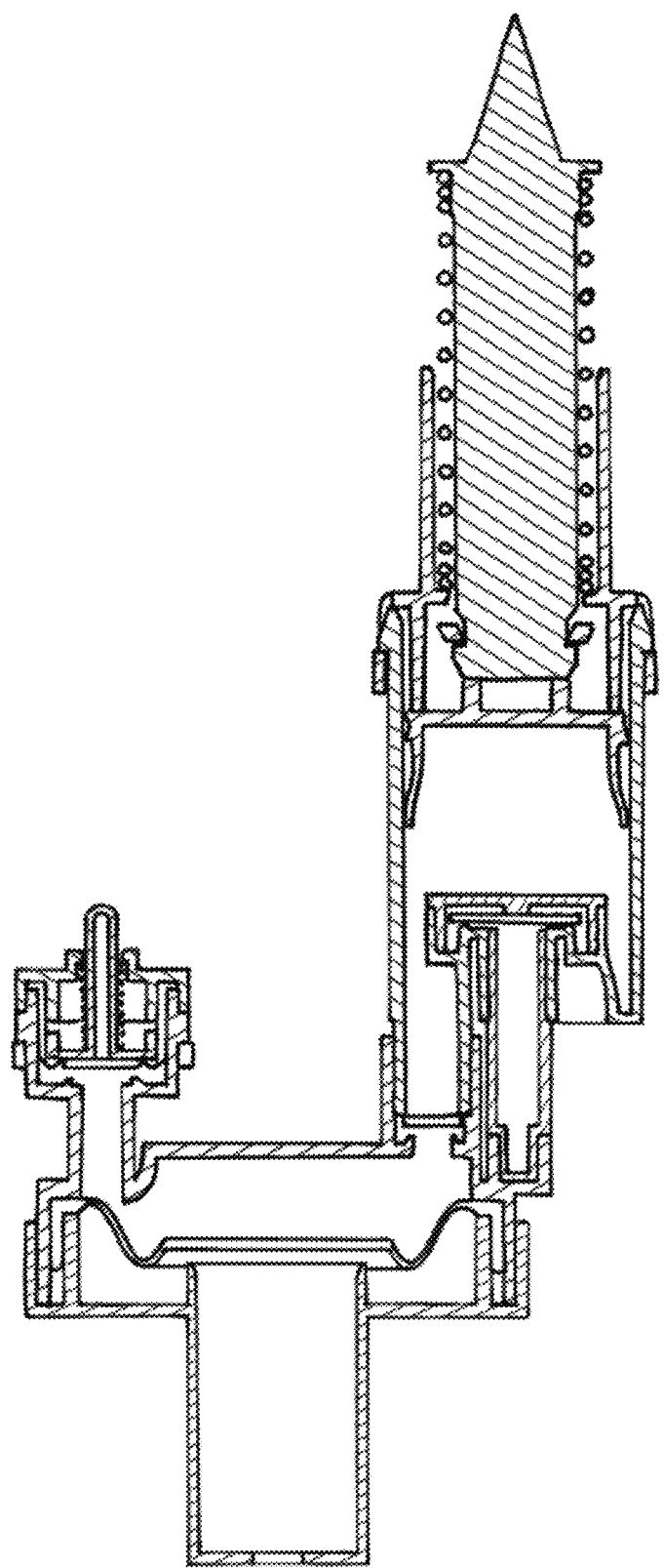

FIGS. 14 and 15 illustrate operation of a spring loaded membrane buffer, and a membrane buffer, respectively. As shown in FIG. 14, when the piston moves down liquid from piston chamber is pushed via the buffer towards the nozzle(s). The overflow of liquid which cannot leave the nozzle(s) is stored in the buffer (01). The buffer spring compresses and the membrane moves down. When the piston moves up, the spring pushes up the membrane of the buffer. The overflow of liquid stored in the buffer is pushed toward the nozzle(s).

As shown in FIG. 15, when the piston moves down, liquid from piston chamber is pushed via the buffer towards the nozzle(s). The overflow of liquid which can not leave the nozzle(s) is stored in the buffer (01). The gas behind the membrane compresses and the membrane moves down. When the piston moves up, the gas behind the membrane pushes up the membrane. The overflow of liquid stored in the buffer is pushed toward the nozzle(s). It is here noted that the buffers of FIGS. 14 and 15 are not in line with the piston chamber.

DuO1 Engines

Figure 16A:
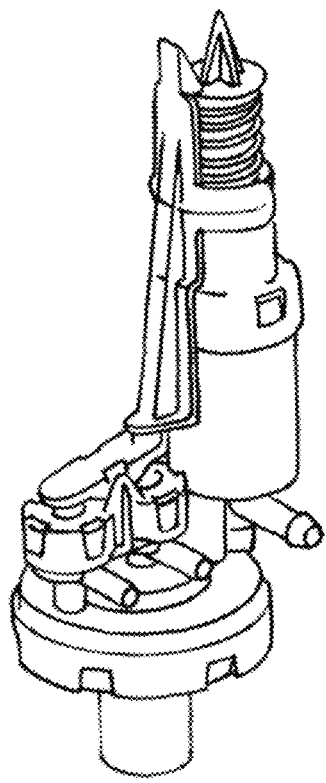
FIGS. 16A, 16B, 16C, 17A, 17B and 17C depict the various functionalities sprayer engines can have in exemplary embodiments of the present invention.
Figure 16B:
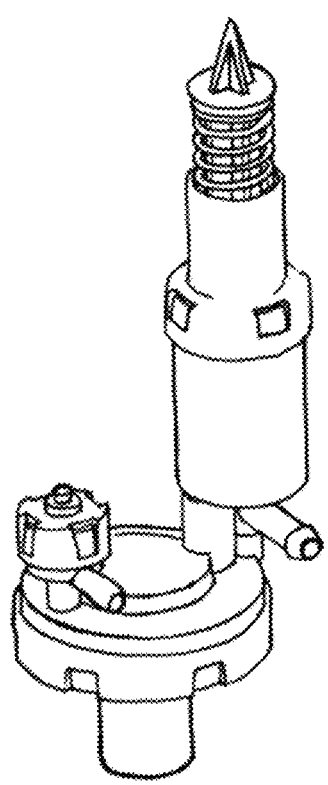
Figure 16C:
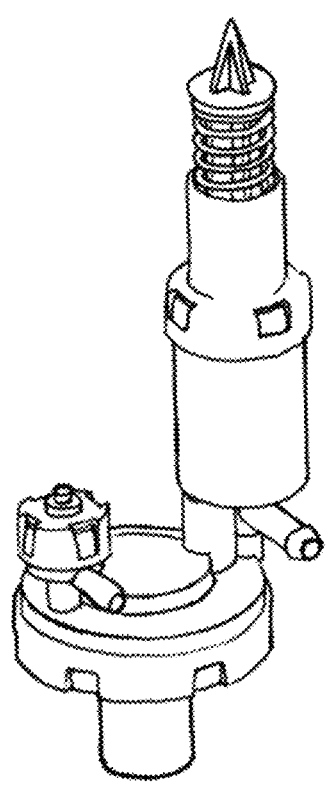
Figure 17A:
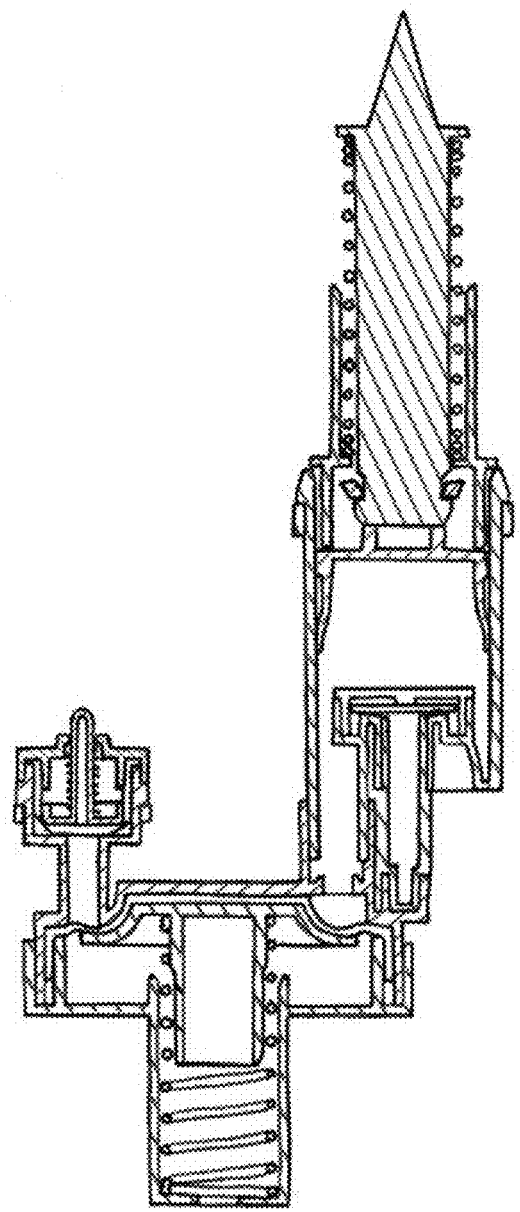
Figure 17B:
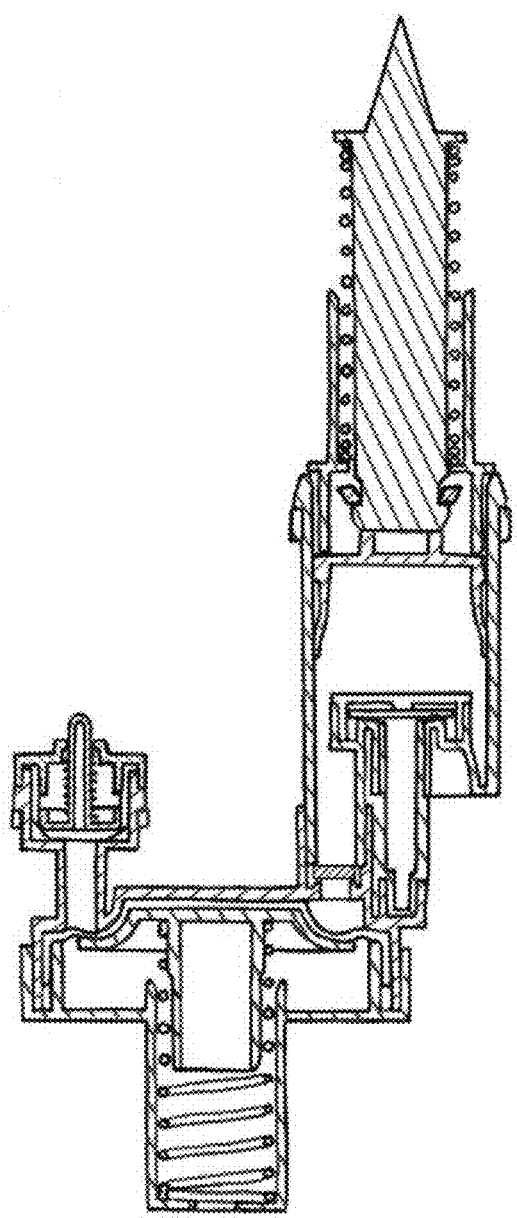
Figure 17C:
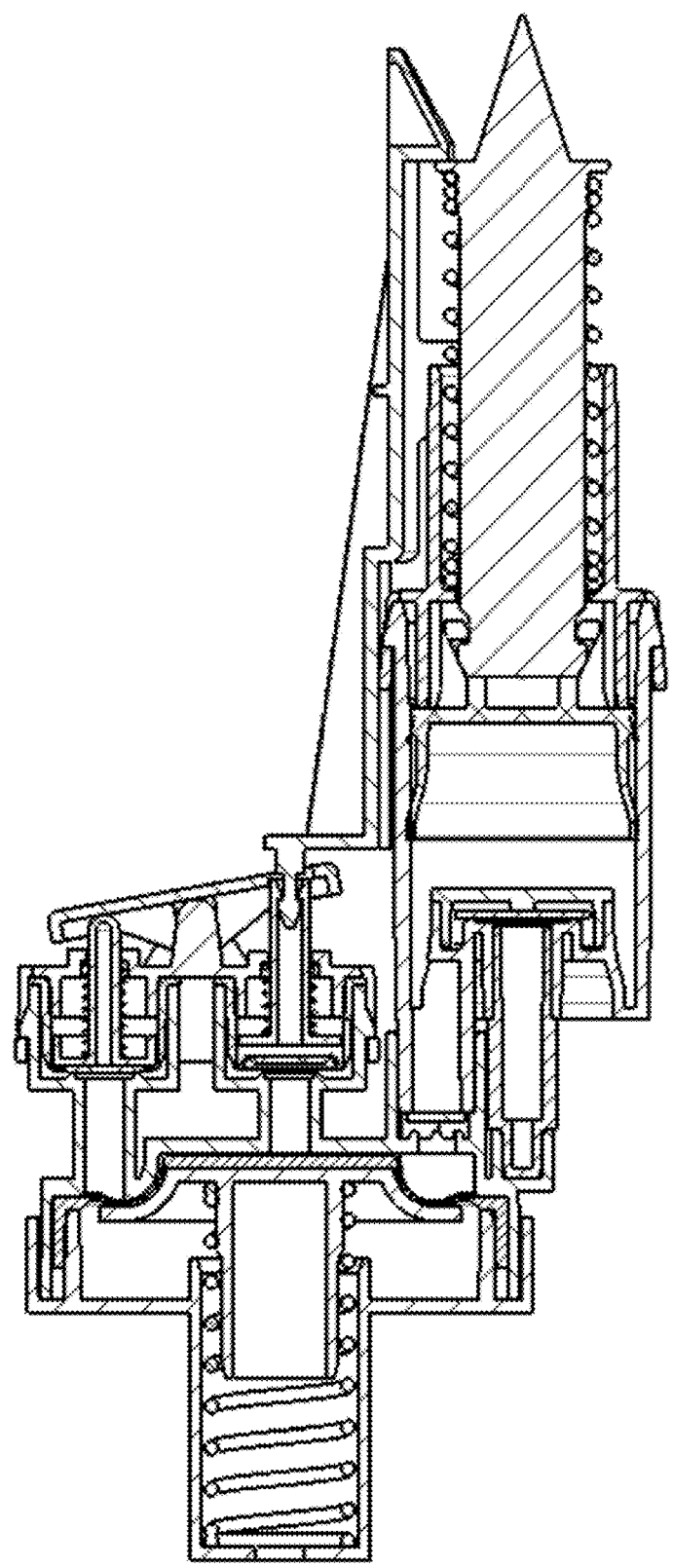

FIG. 16 illustrates how in exemplary embodiments of the present invention, various DuO1 engines may be used, including a continuous stop engine, a continuous spray engine, and one with direct stop functionality. Cross sections of these engines, and further details, are provided in FIG. 17.

Thus, for DuO1 Engines:

These engines are based upon the DuO1 platform technology.

They use a buffer to store the overflow of liquid.

Additionally, these engines can be fitted with the OnePak platform technology.

All DuO1 Engines can be executed in 3 main functionalities: (01) Direct Stop, (02) Continuous (=Direct Stop+One way valve), and (03) Continuous-Stop (=Continuous+Release valve).

Within these functions, parameters can be changed to meet custom requirements. Parameters that may be changed include, for example:

Output volume (stroke and bore of the piston);

Working pressures (pressure set of buffer and pre-compression valve, nozzle configuration); and Spray performances (nozzle configuration).

Lock Out

FIGS. 18-20 illustrate exemplary lock-out systems that can be used in exemplary embodiments of the present invention. A lock out system prevents a different supplier's bottle from being used with a given sprayer head. It also prevents users from refilling a container supplied with a sprayer with competitor's or imitator's liquids. Such a lock out system can be controlled and owned by a sprayer manufacturer, who provides and controls the various "keys" to open each bottle. In exemplary embodiments of the present invention, a sprayer manufacturer, provides, owns and controls the lock-out system. A unique key is given to a customer to protect against competitors within his own field of use during a licensing period. The lock out prevents competitors from selling products compatible with the dispenser, preventing consumers to refill the bottle with competitor products. The lock out thus acts as an interface between a bottle and the dispenser.

As noted, the lock out incorporates the inlet valve of the pump system; this means that the dispenser cannot operate without being connected to the lock out. The lock-out has unique 'key' features, dedicated to a customer. The geometry of the lock-out can be changed to create these unique features. For example: the diameter, depth and added geometries. Thus, in general, the lock out geometry has to match the interfacing geometry of the dispenser in order to be connected.

It is noted that to have a dispensing system which is a 100% lock out of competitors, a Flair bottle is to be used. In this case the dispenser does not have to vent a Flair system, or a closed bag within a bag, or container within a container, system needs no venting (and no headspace in the inner container), and the bottle cannot be refilled by drilling a hole in the bottle wall. Any tampering disables the dispensing system.

FIG. 18 illustrates lock out systems for underpressure sprayers. In a lock out for under pressure, the inlet valve can be normally open in the output direction of the bottle. The passage way to the bottle is closed during a compression stroke or when refilling is attempted. Removing the valve disables the use of the bottle, since the valve also acts like the inlet valve of the pump. The passage way to the dispenser is open when the valve rests against the upper valve seat when liquid enters the pump by under pressure. The upper valve seat has openings, providing the passage of liquid. There is a 'Key' interface, a set compatible interface features between lock out and dispensing head, which is customer dedicated.

Figure 18A:
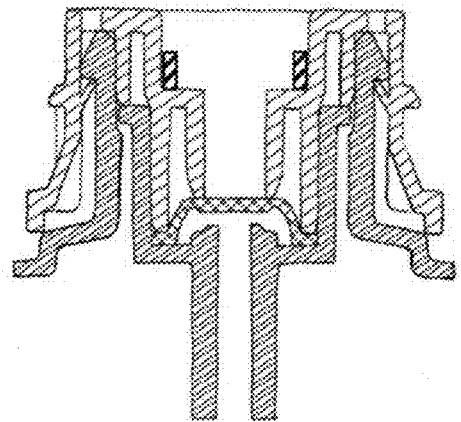
Figure 18C:
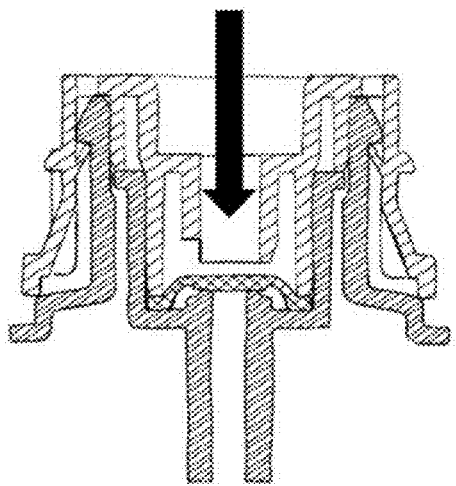
Figure 18B:
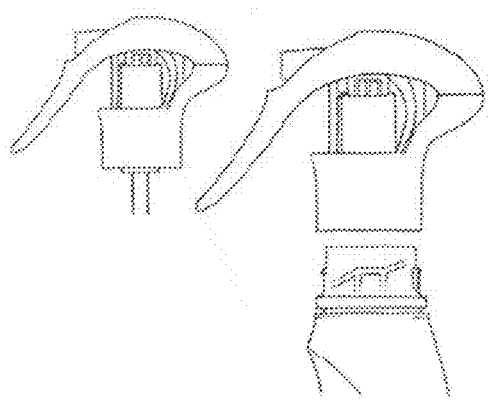
Figure 18D:
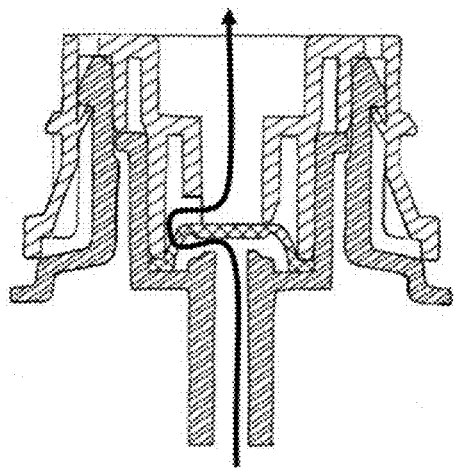
Figure 19A:
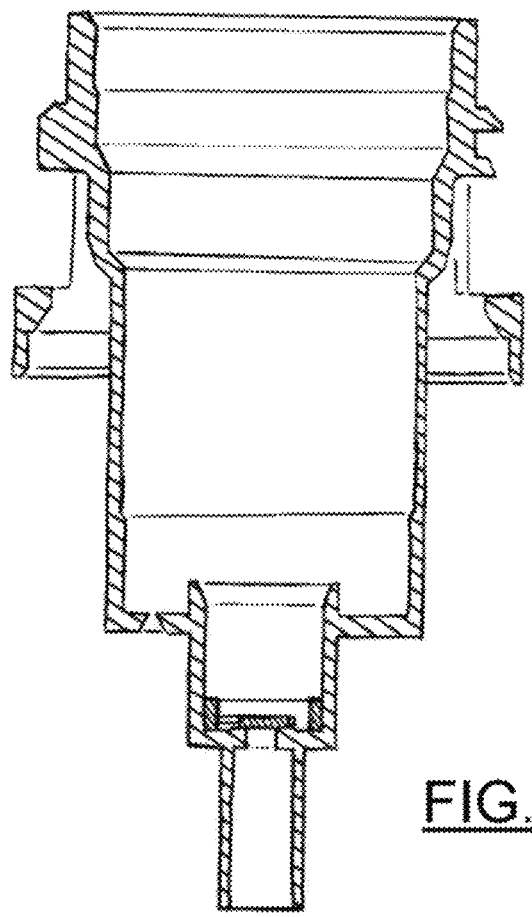
Figure 19B:
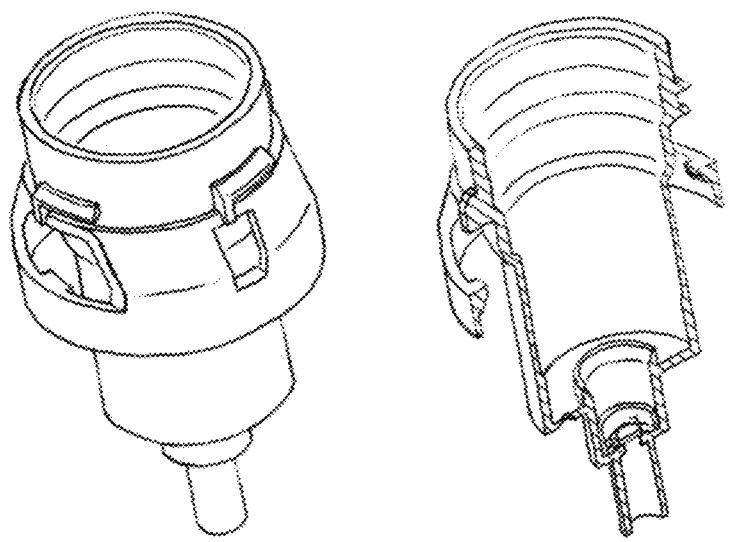
Figure 19D:
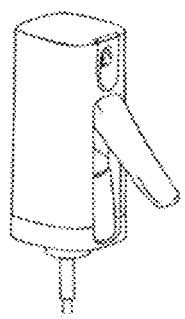
Figure 19E:
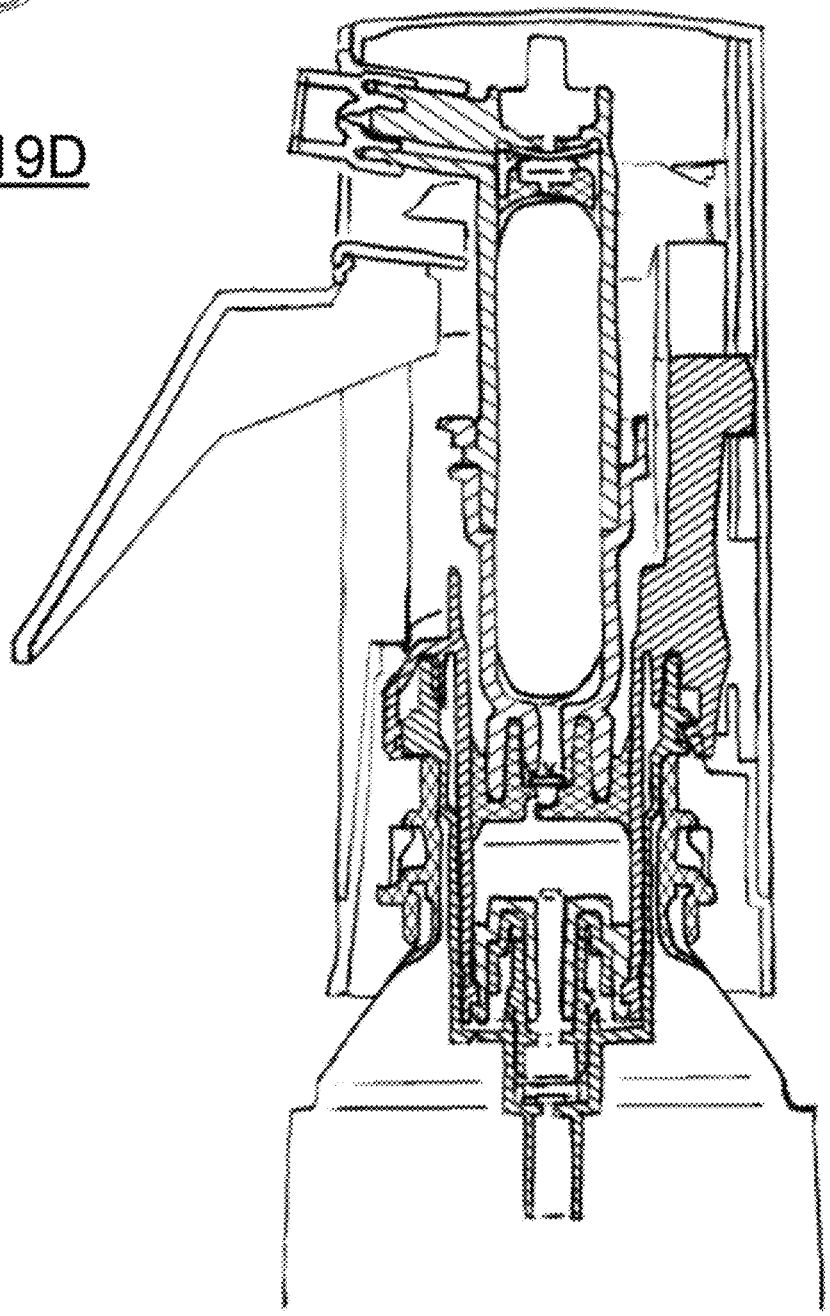

FIGS. 18A, 18B, 18C, 18D, 18E, 18F and 18G illustrate exemplary key parameters that can be varied to create user specific lock out keys. For example, working with various heights and diameters, and rib geometries, as shown in FIG. 18A, heights h3 and h4 can be used to lock a custom bottle to a custom lock out key. Moreover, diameter d1, heights h1, h2, and rib feature geometry can be used to lock a dispense head to a custom lock system. The dispenser has to be fitted with matching geometries. For example, when the rib features of the lock out and contra rib features on the dispenser do not correspond, the combination of bottle and dispensing head cannot be made. Thus, a dispenser geometry matching height h1 of example lock out key B cannot fit to height h1 of example lock out key A. As well, a dispenser geometry matching diameter d1 of example lock out key A cannot fit to diameter d1 of example lock out key B. In exemplary embodiments of the present invention, the sprayer manufacturer can own all such keys and variations, and assign/license to a set of customers or distributors a particular field of use specific to one lock out key. Thus the manufacturer can control which bottles can interoperate with which sprayer heads. Similarly, FIG. 19 illustrates a lock out that can be used with an exemplary sprayer according to the present invention. As shown, there is a 'Key' interface, i.e., a set of compatible interface features between lock out interface on bottle and dispensing head, which is customer dedicated. As noted, these can include a blocking geometry, a certain diameter, and a certain depth.

Figure 20A:
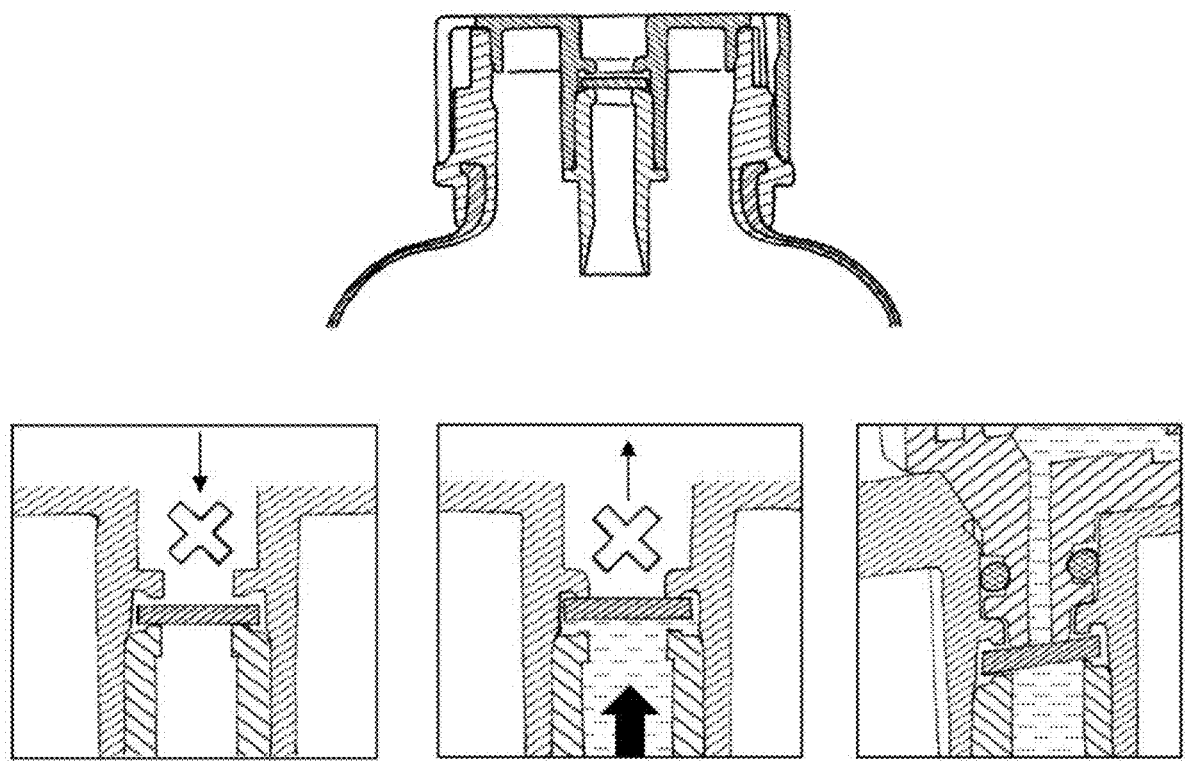
Figure 20B:
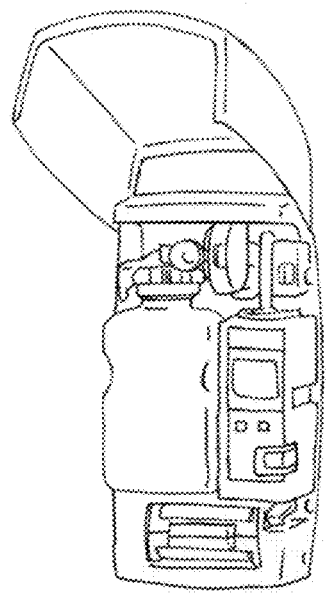

FIGS. 20A and 20B illustrate a lock out system for an overpressure system, where the Flair bottle (bag within a bag, or bottle within a bottle system) is actively pressurized between the layers to squeeze out the liquid or product in the inner layer. Such an overpressure system is disclosed, for example, in U.S. patent application Ser. No. 13/467,971, filed on May 9, 2012. As shown, In a lock out for over pressure, the inlet valve is normally closes in inlet and outlet direction. There is a 'Key' interface, a set compatible interface features between lock out and dispensing head, which is customer dedicated.

The passage way to the bottle is closed during a compression stroke or when refilling is attempted. Removing the valve disables the use of the bottle, since the valve also acts like the inlet valve of the pump. When the bottle is disconnected from the dispenser, the valve is pushed to close by the liquid pressure in the bottle. Liquid will not leave the bottle. When bottle and dispenser are connected, a protrusion part of the dispenser needs to hold the valve in intermediate position it not touching both seat valves. When the pump performs a compression stroke, the valve is pushed on the lower valve seat, closing the passage way to the bottle. During the recovery stroke of the pump, liquid can enter the pump, because the protrusion prevents the valve to close on the upper valve seat.

Flairosol D'Lite

Figure 21A:
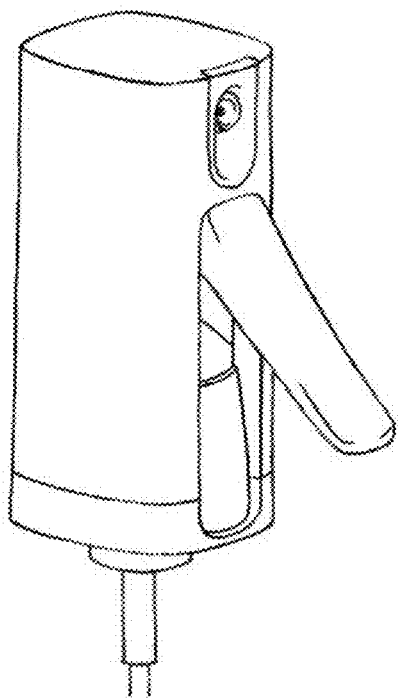
Figure 21B:
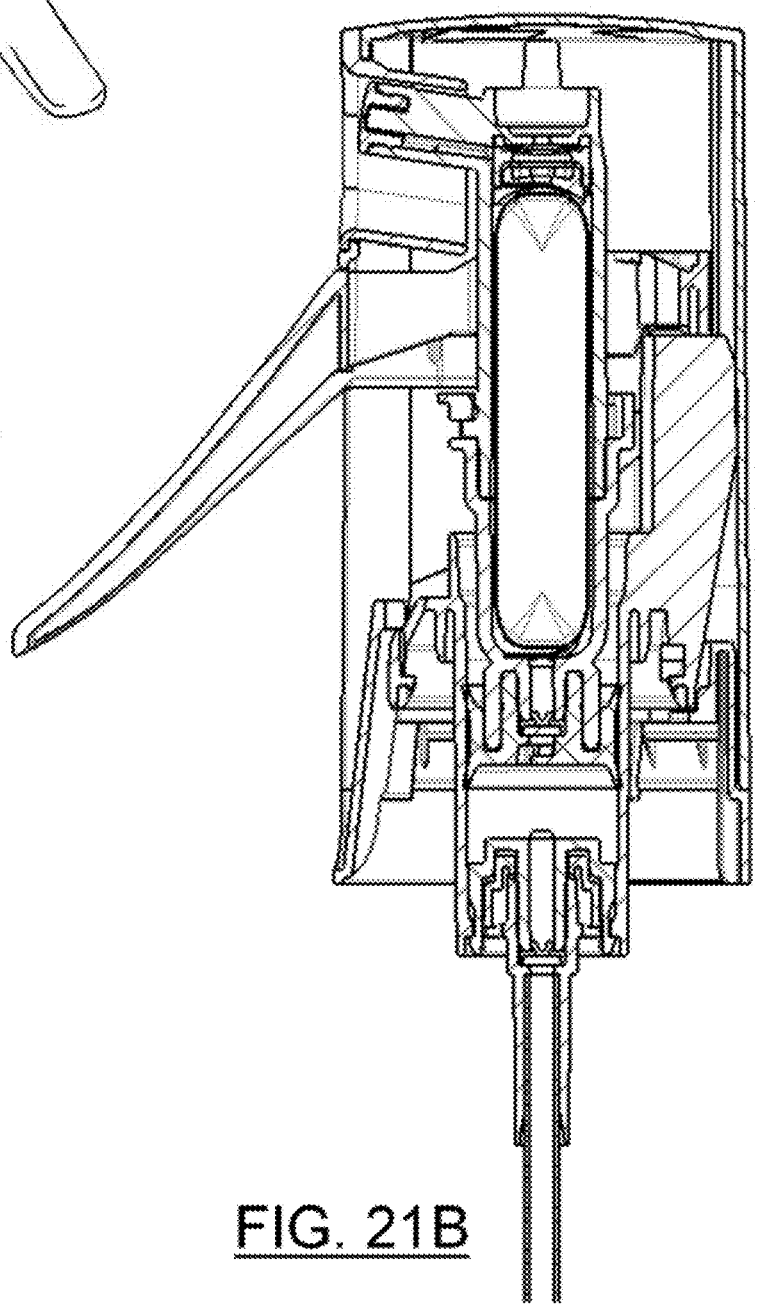
Figure 22A:
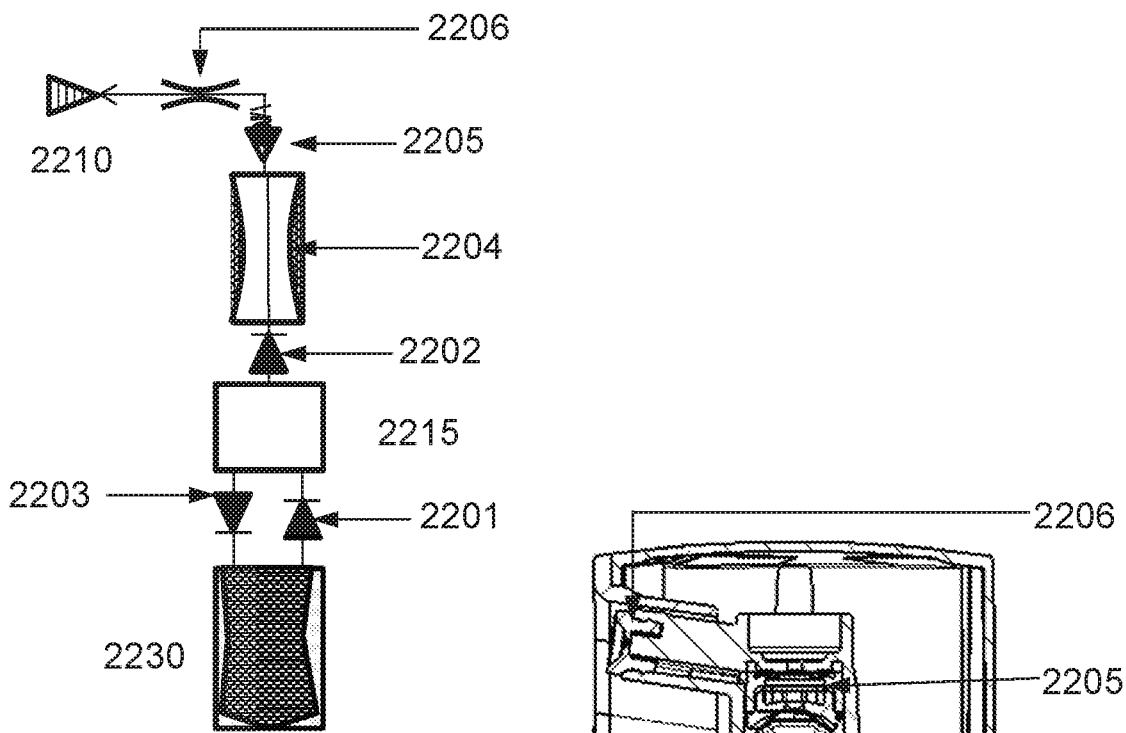
Figure 22B:
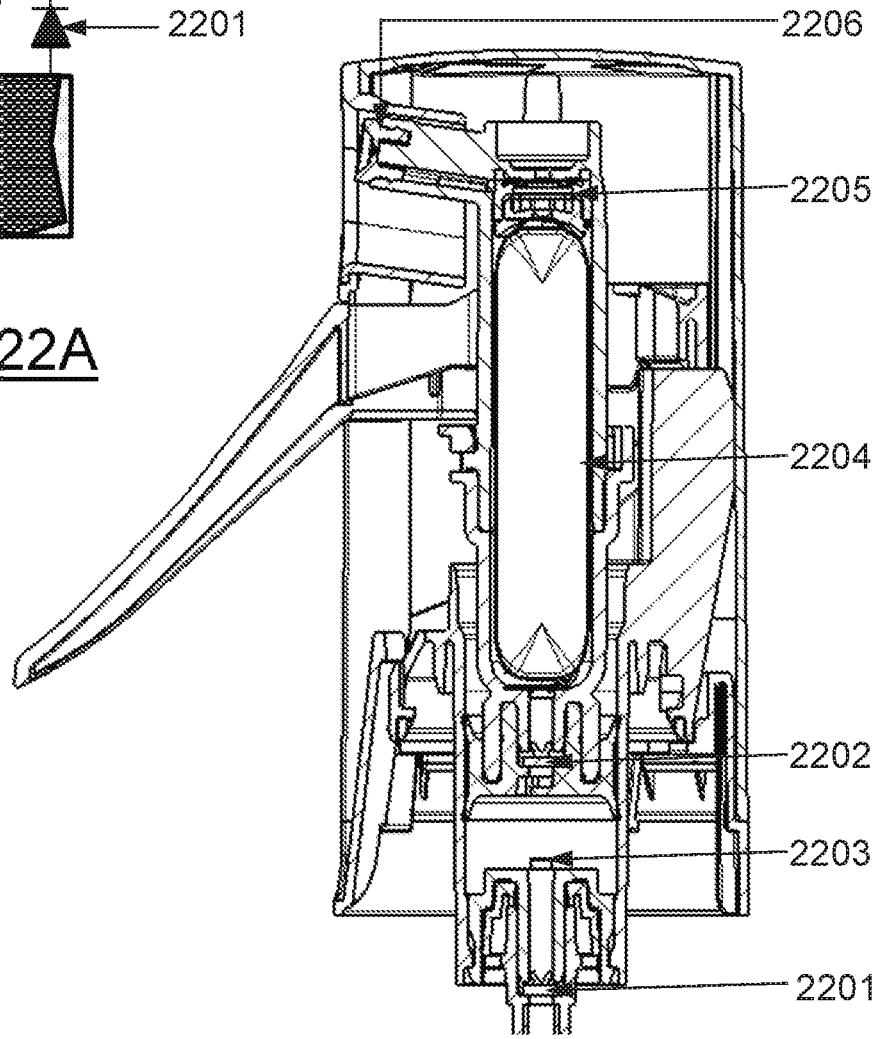
Figure 27A:
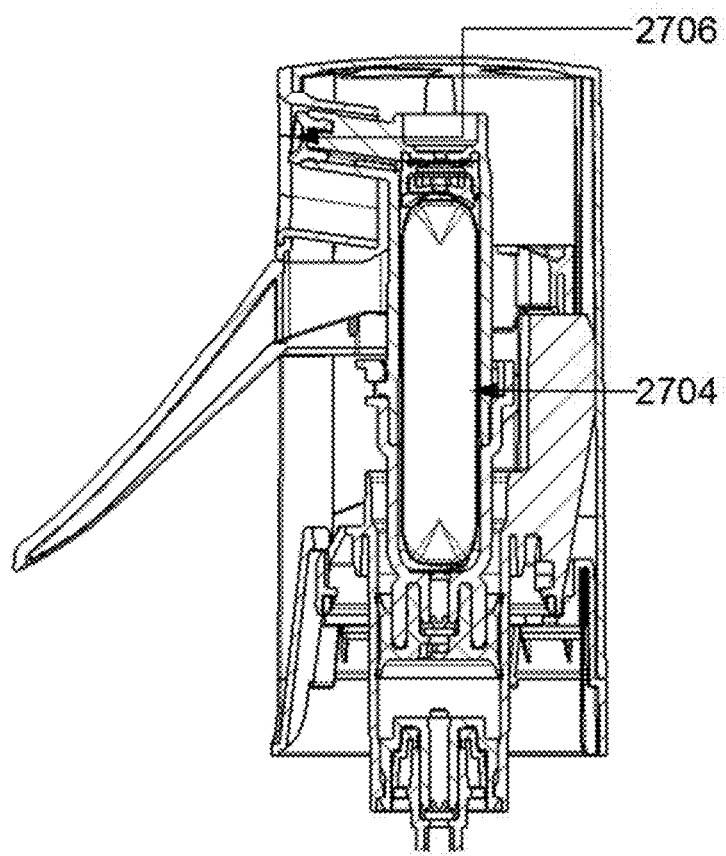
Figure 27B:
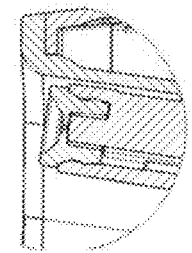
Figure 27C:
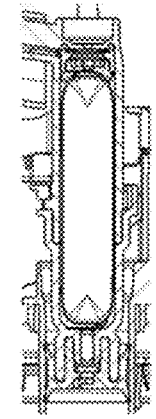
Figure 27D:
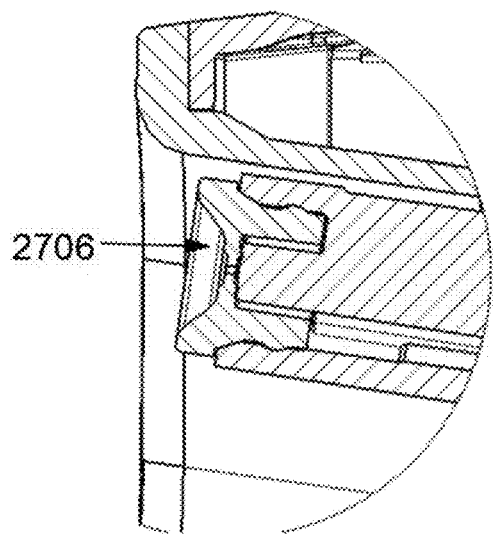
Figure 27E:
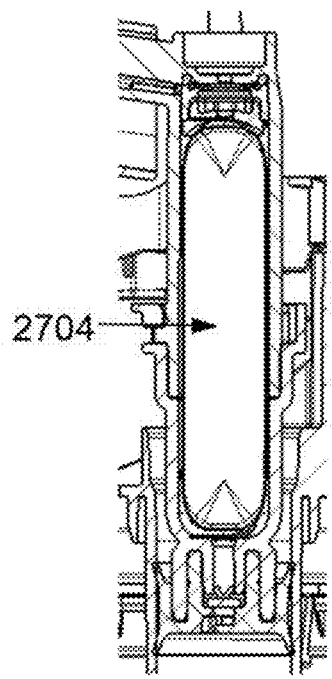
Figure 29E:
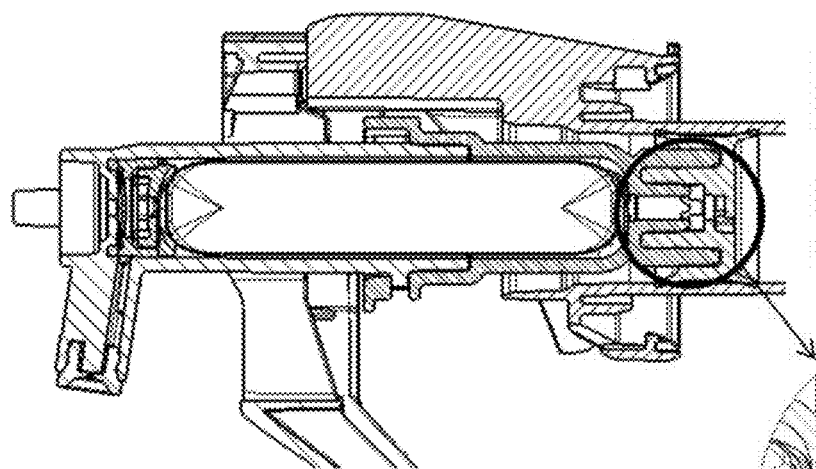
Figure 29D:
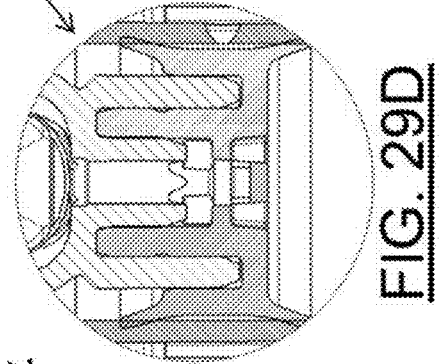
Figure 29C:
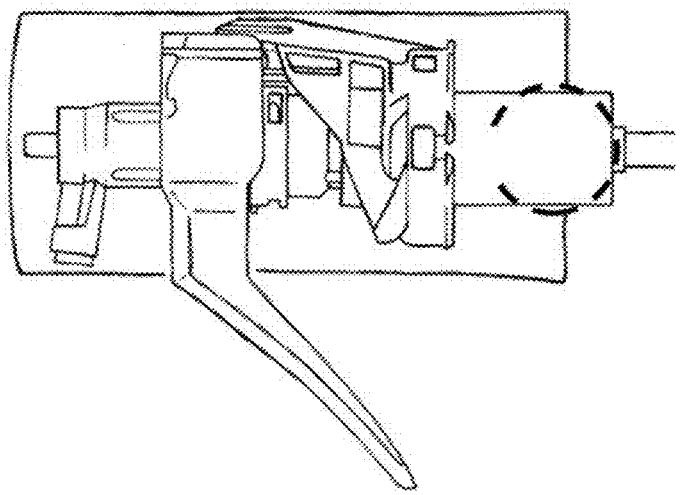
Figure 29B:
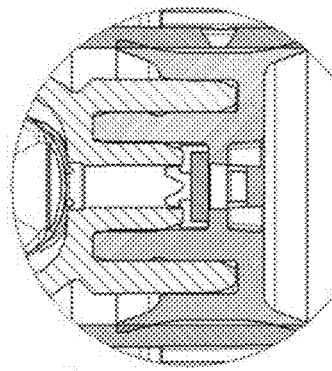
Figure 29A:
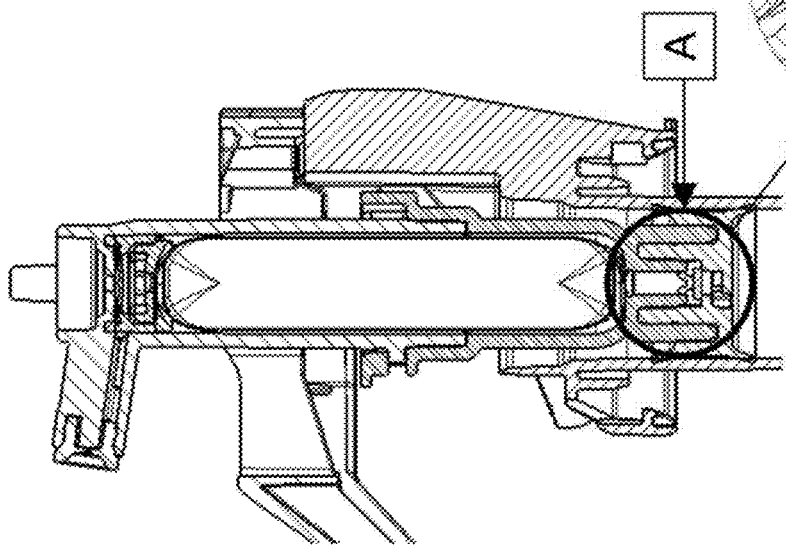
Figure 30A:
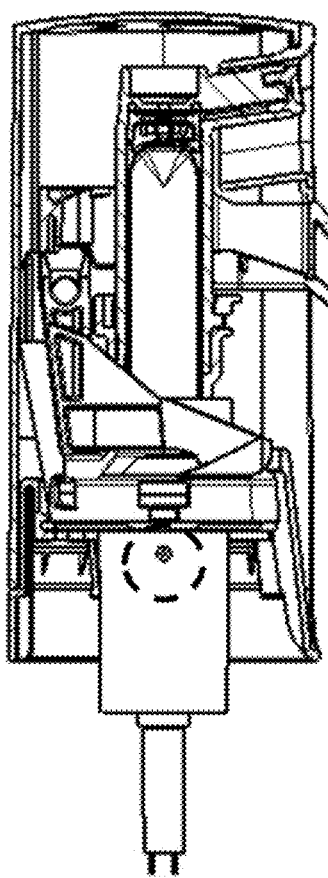
Figure 30C:
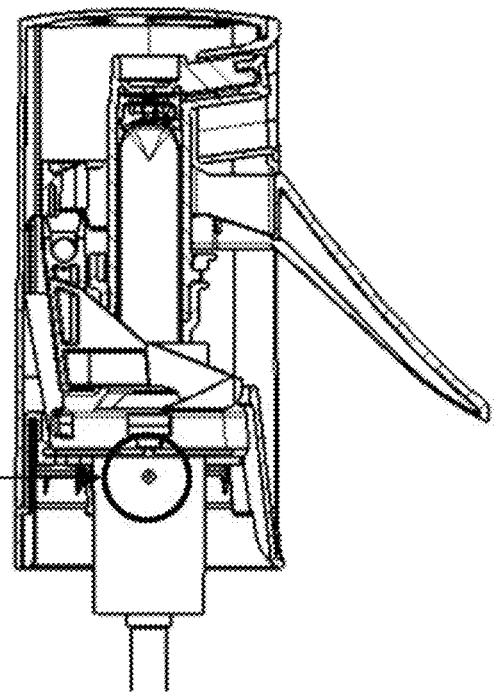
Figure 30B:
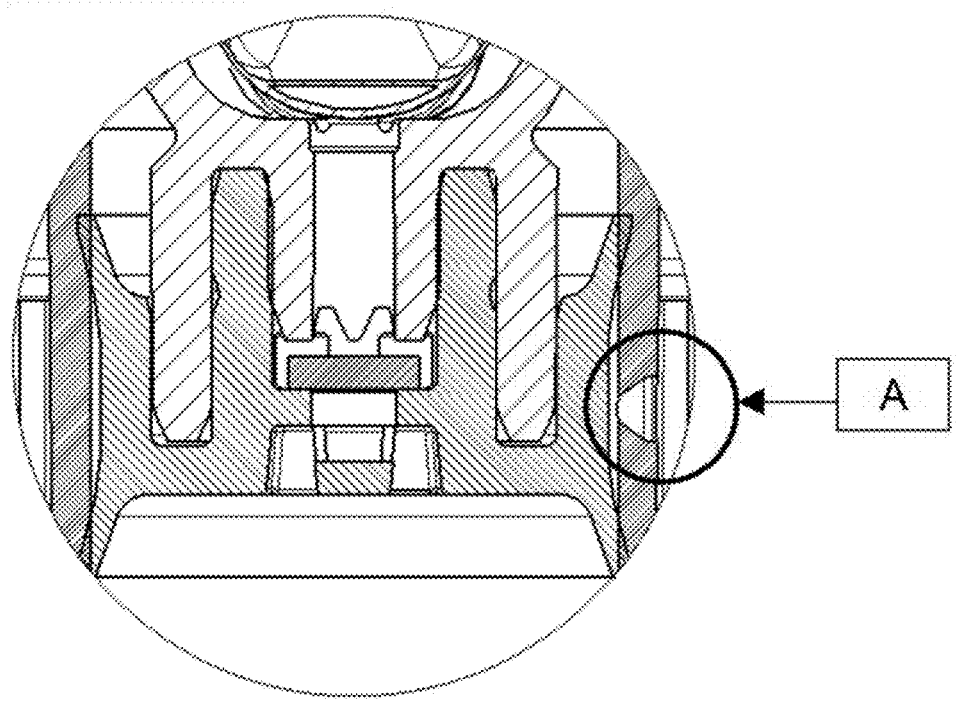
Figure 30D:
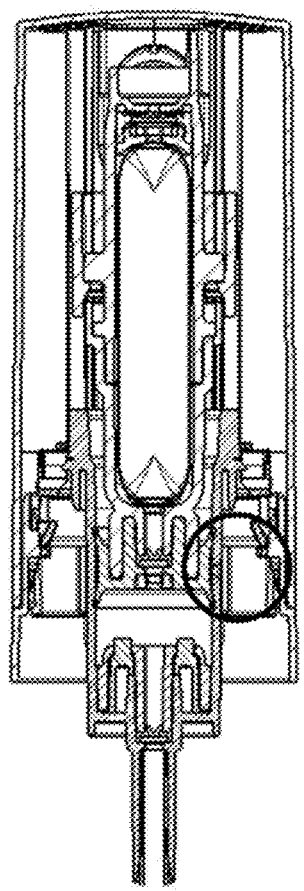
Figure 30E:
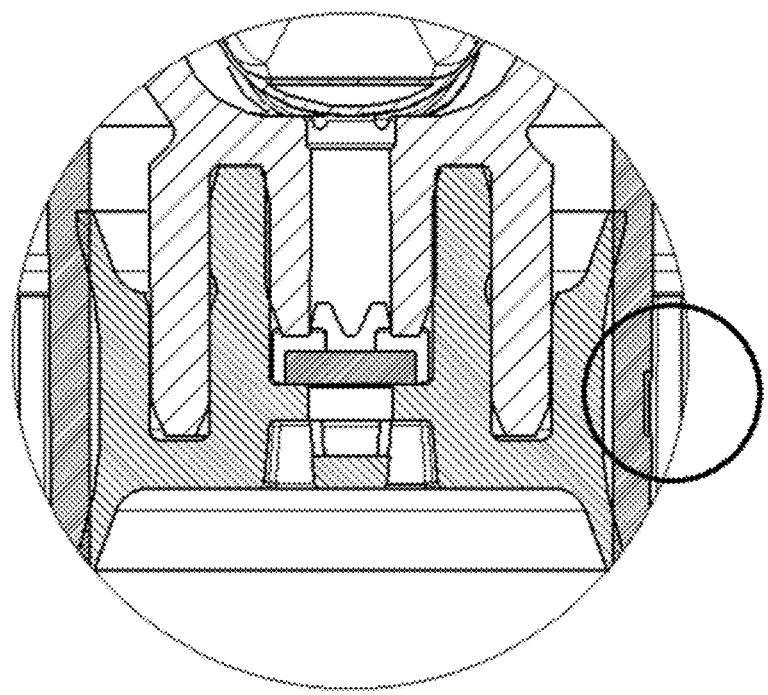
Figure 31B:
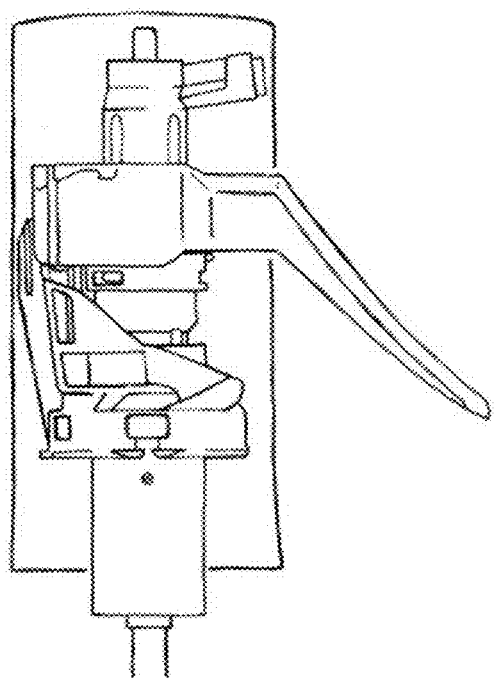
Figure 31A:
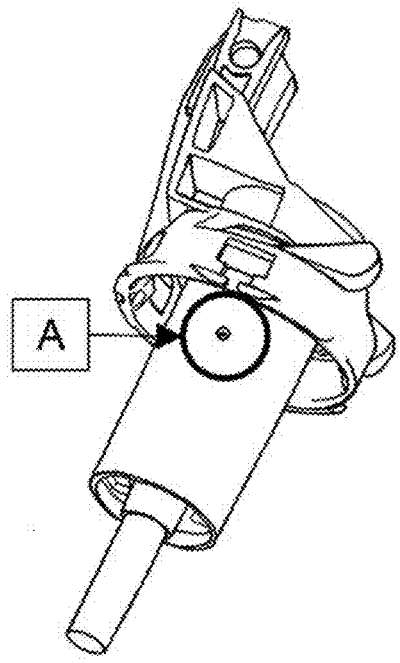
Figure 31C:
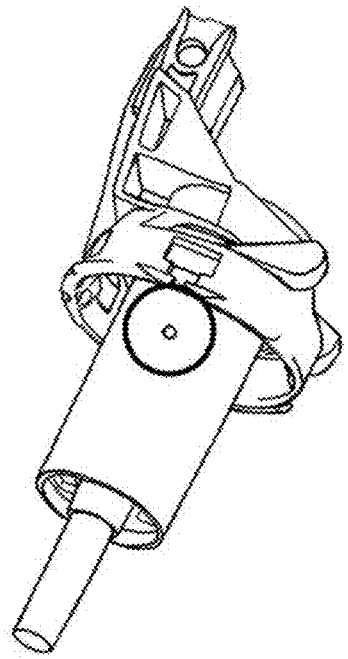
Figure 32A:
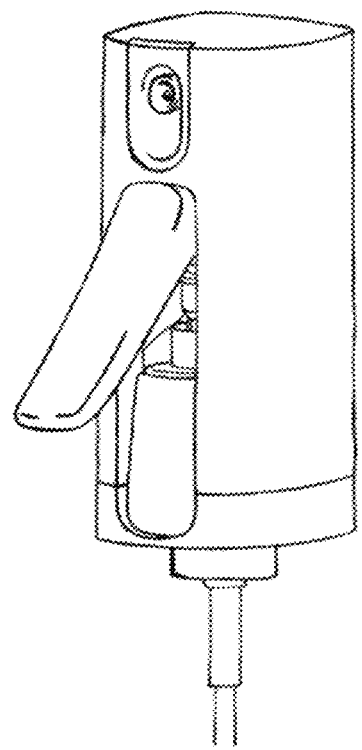
Figure 32B:
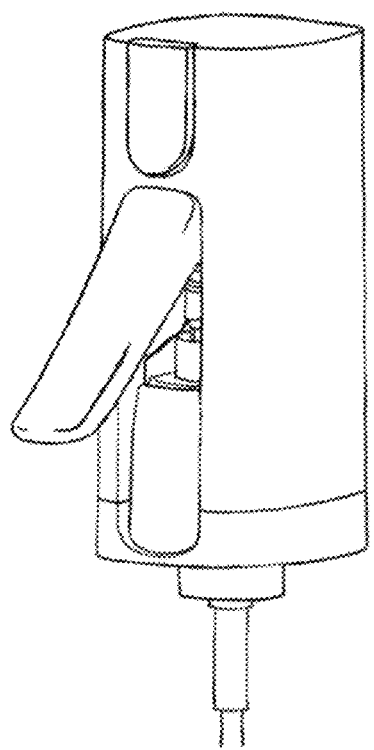
Figure 32C:
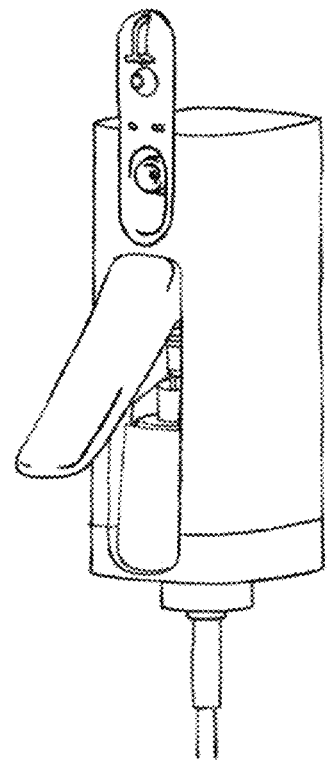
Figure 33A:
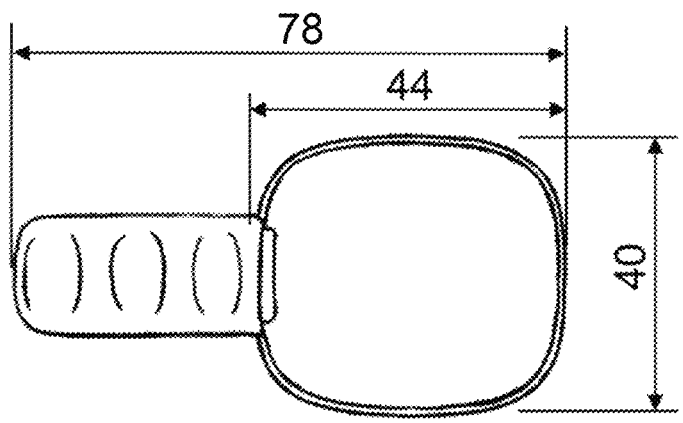
Figure 33B:
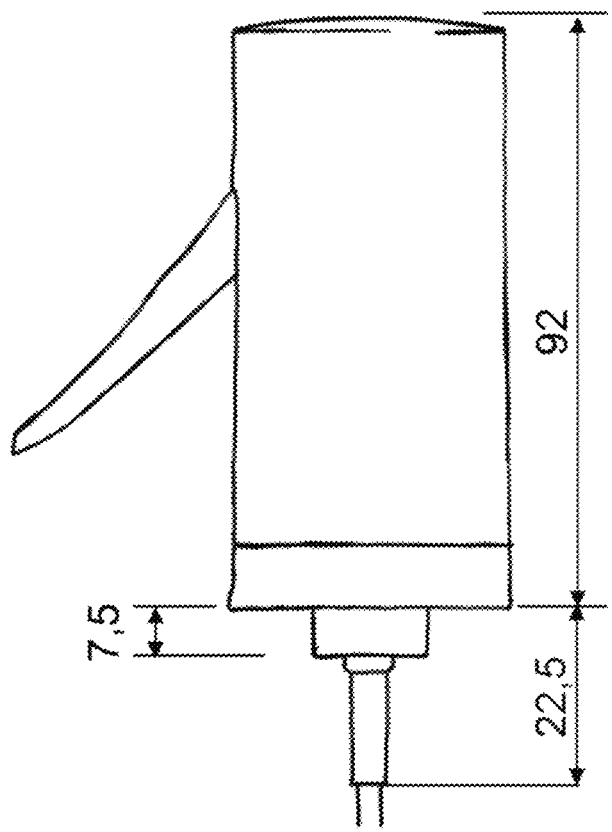
Figure 33C:
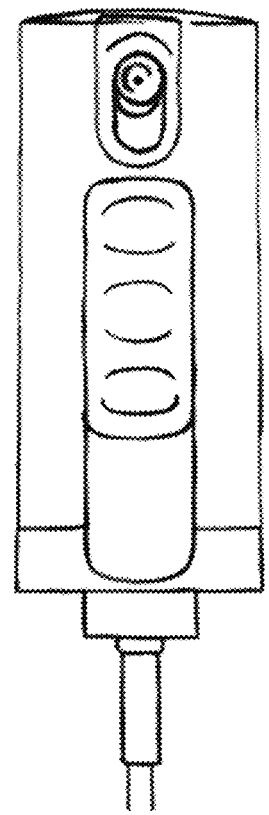
Figure 34A:
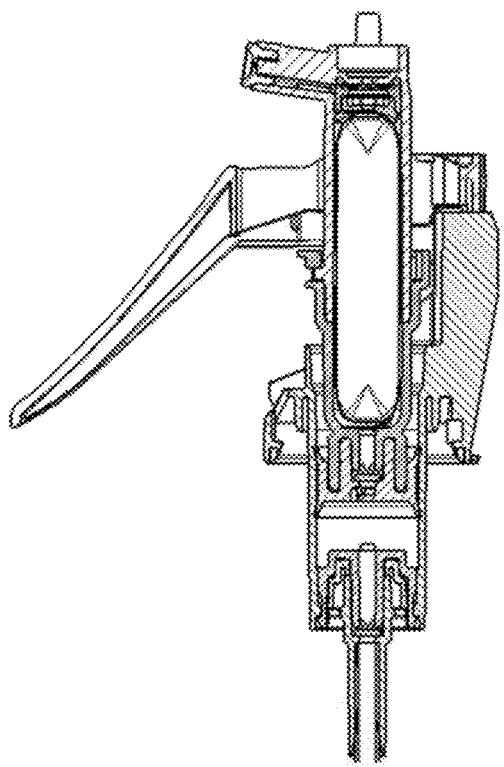
Figure 34B:
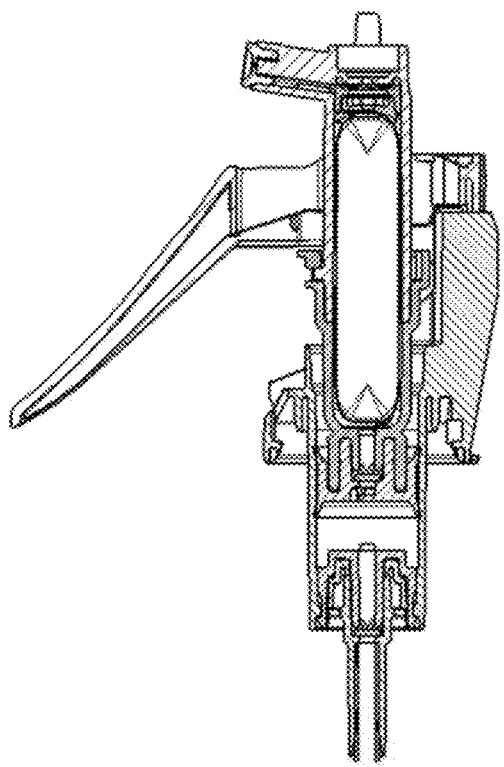
Figure 34C:
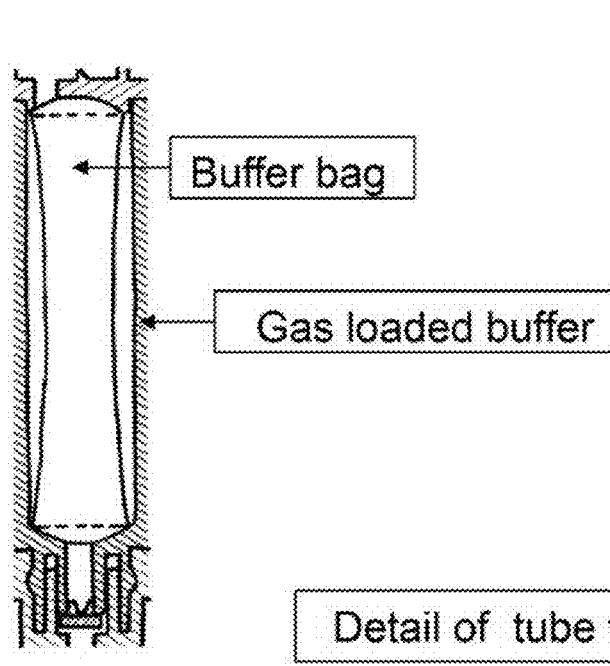
Figure 34D:
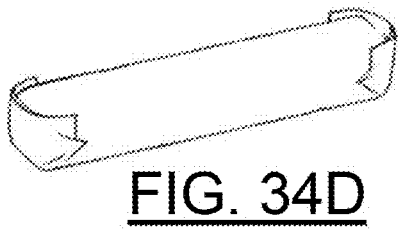
Figure 34E:
Figure 34F:
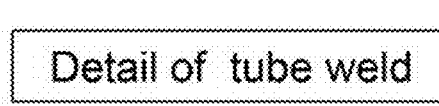

FIGS. 21-33 illustrate an exemplary "Flairosol D'Lite" sprayer according to exemplary embodiments of the present invention. FIG. 21 provides exemplary materials for the sprayer, and FIGS. 22-32 highlight each of these in detail. FIG. 33 provides exemplary dimensions of such a sprayer.

Features/Objectives

Flairosol D'Lite has certain features, with defined objectives, as follows:

1. Buffer

No metal, all plastic. Store and release the overshoot of liquid in order to get a continuous and constant output. This technology gives more possibilities to adjust the Flairosol to the customer application, when necessary.

2. Prime/Over Pressure Valve

Remove air out of the pump during priming, to avoid no or to late priming, due to the normally closed valve. When the internal pressure increases too much, the valve will release this pressure.

3. Dome Valve Configuration

Obtain greater control of the dome valve mechanical behavior and hysteresis.

Flairosol D'Lite Technological Features

Figures 36A, 36B:
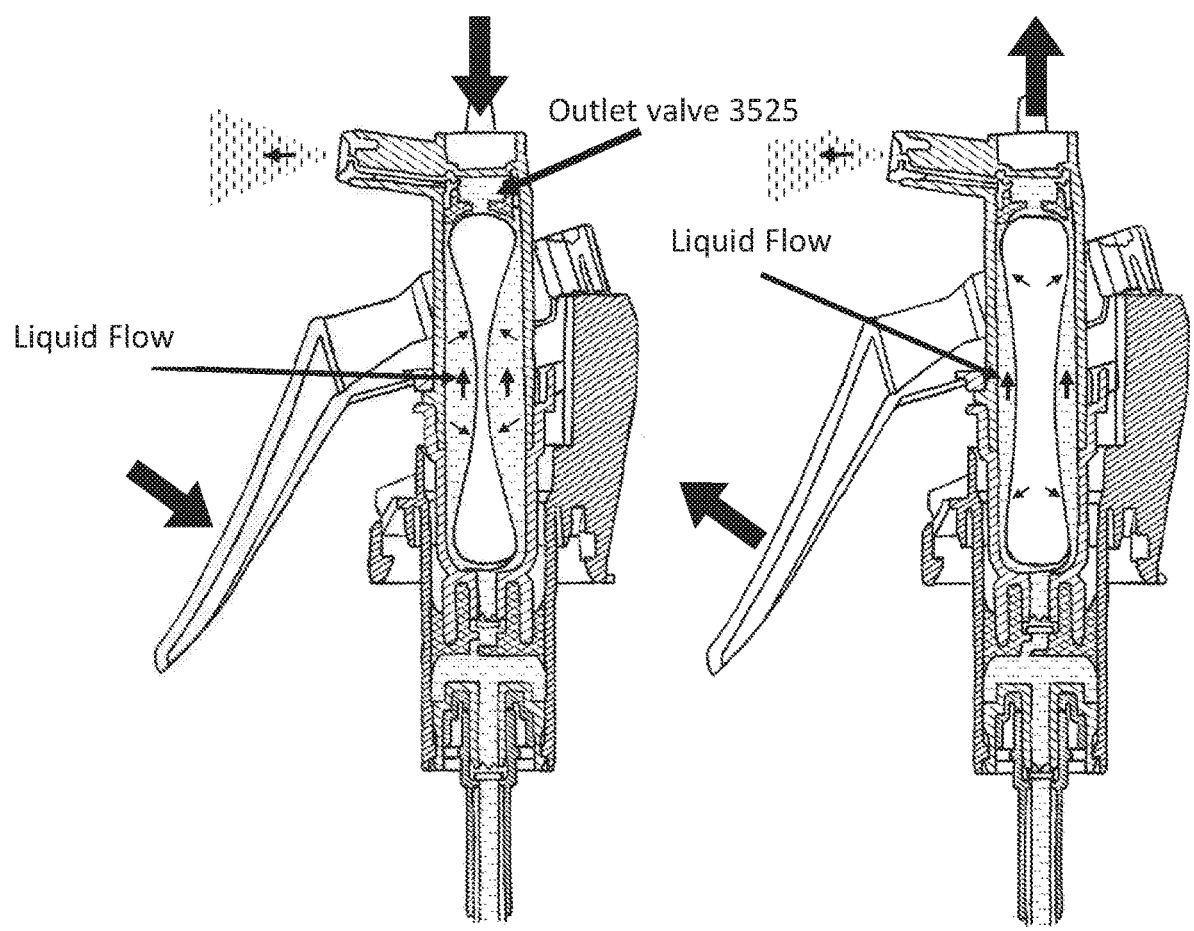
Figure 37A:
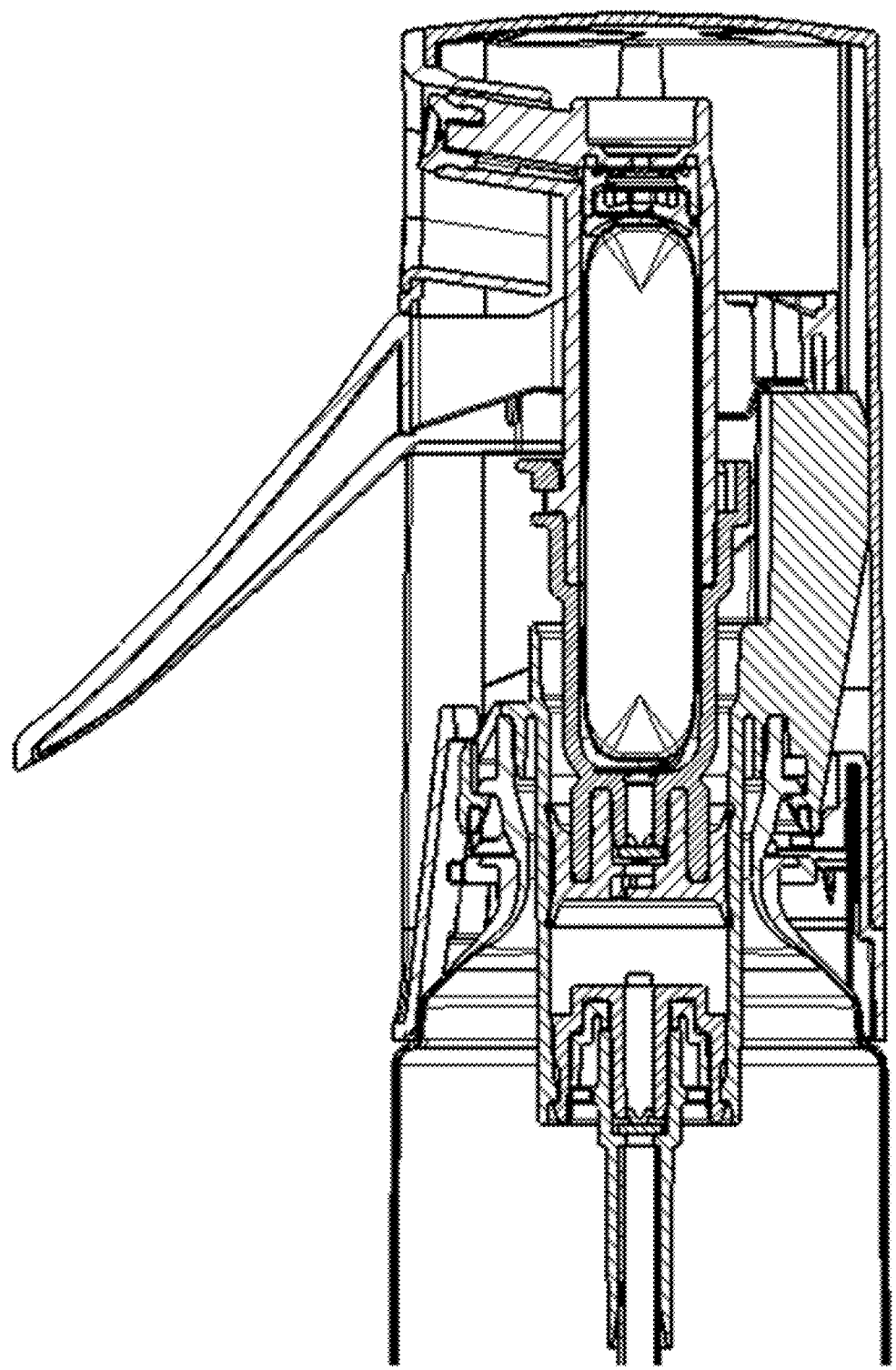
Figure 37B:
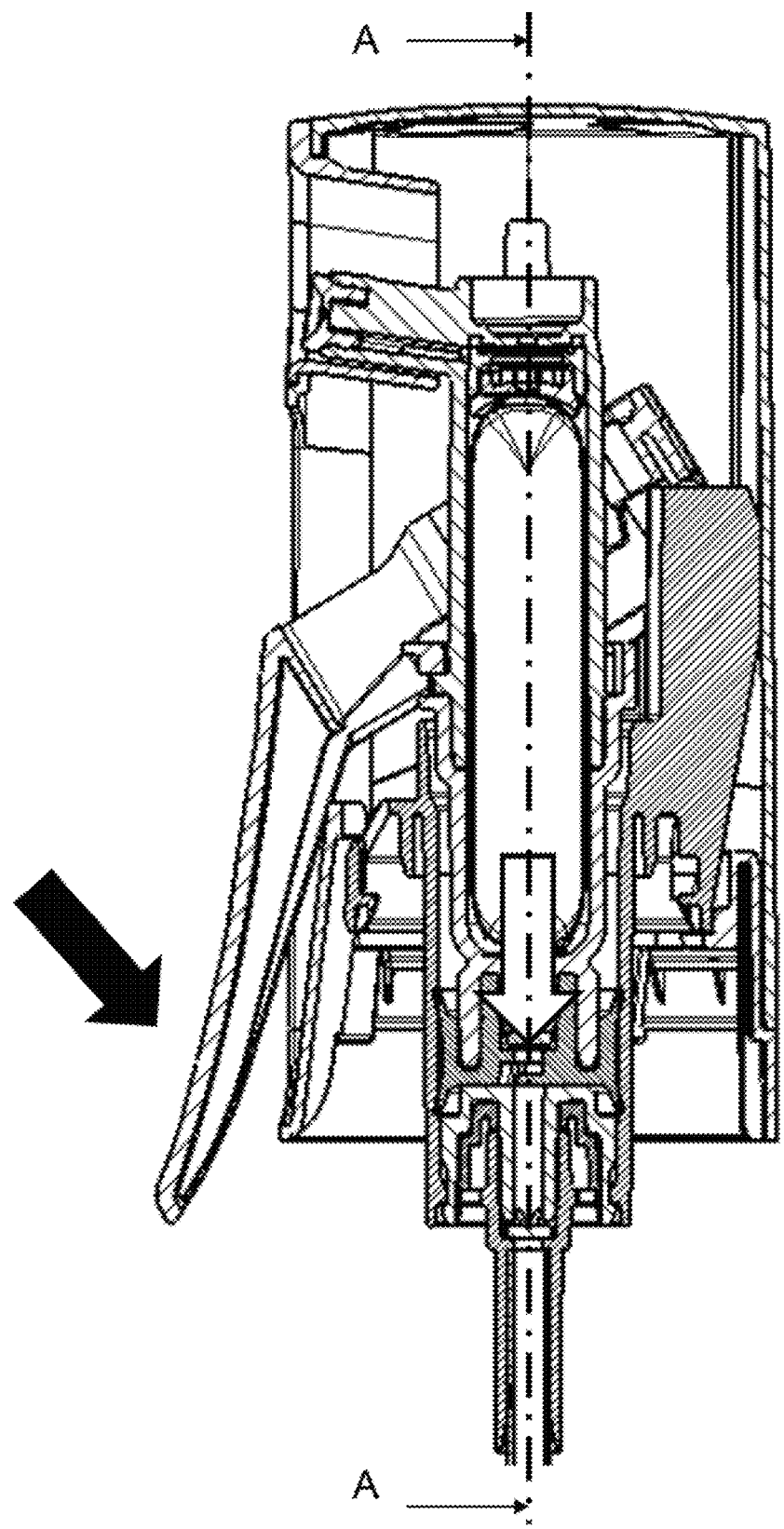
Figure 37C:
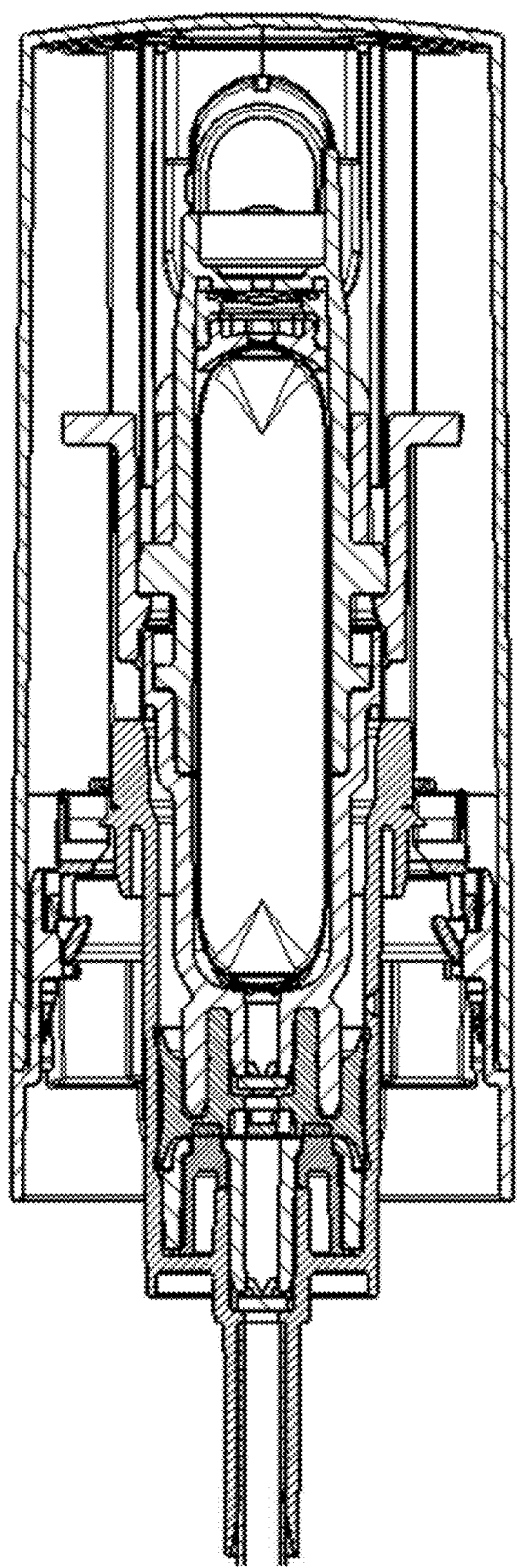
Figure 37D:
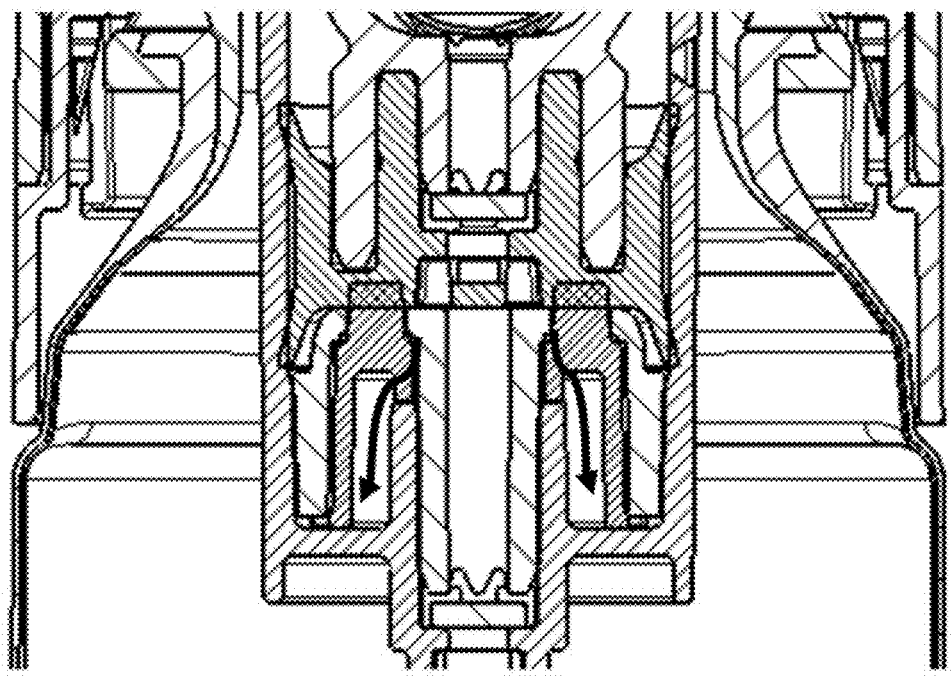
Figure 37E:
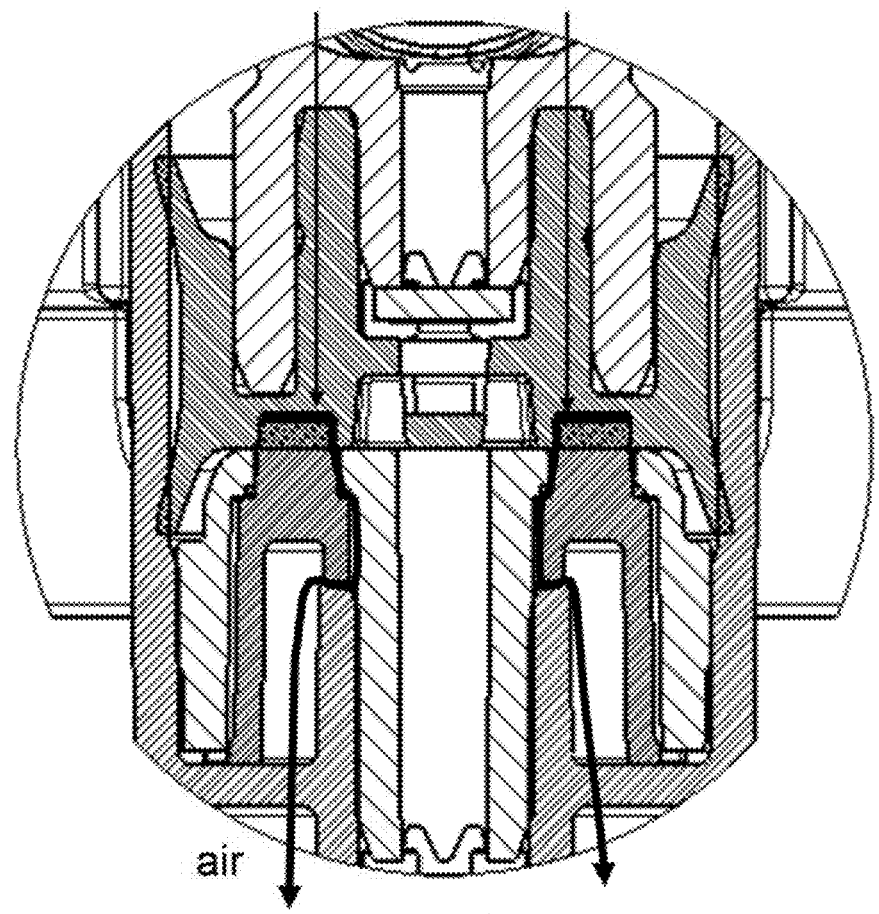
Figure 38:
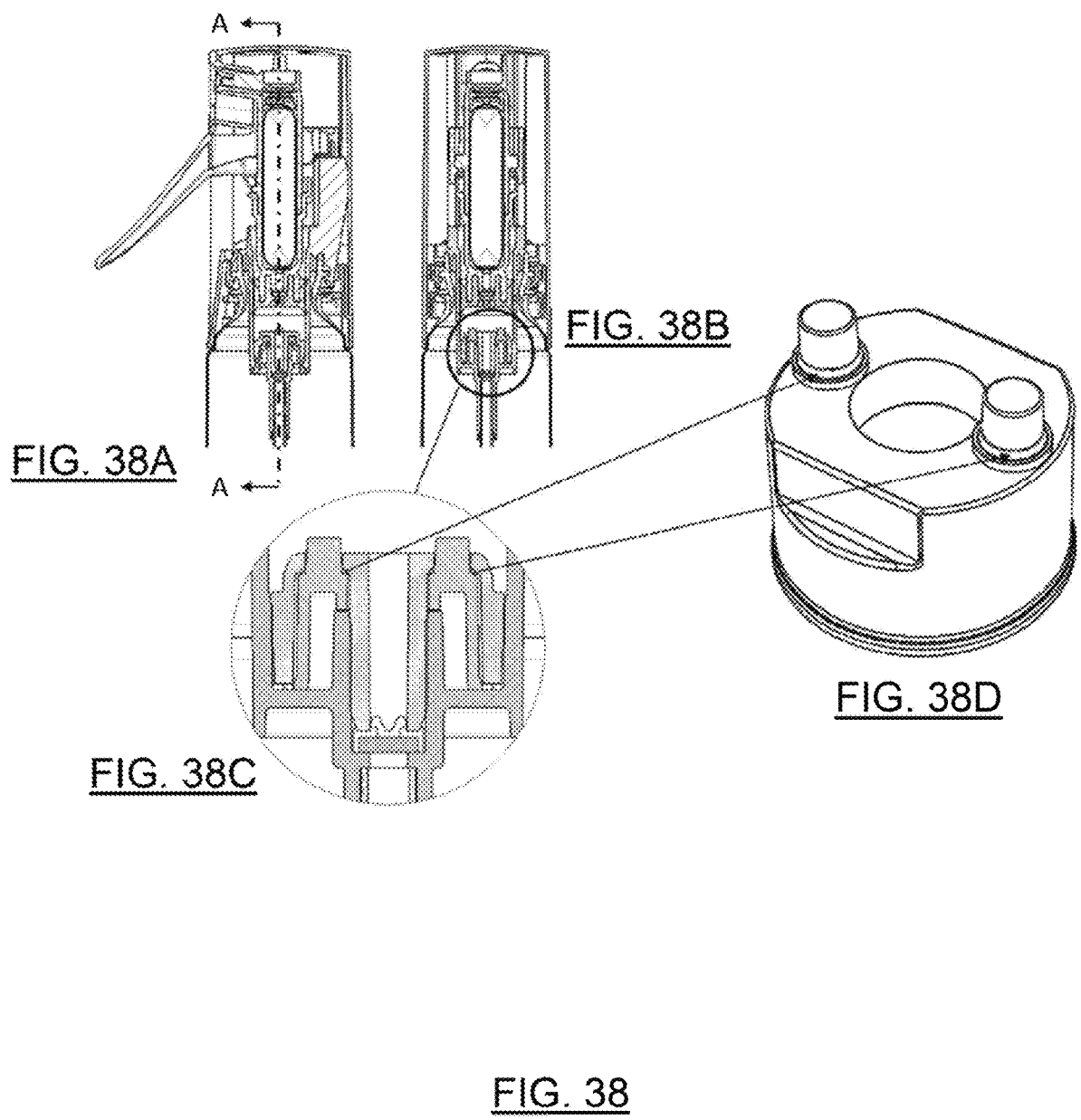
Figure 39:
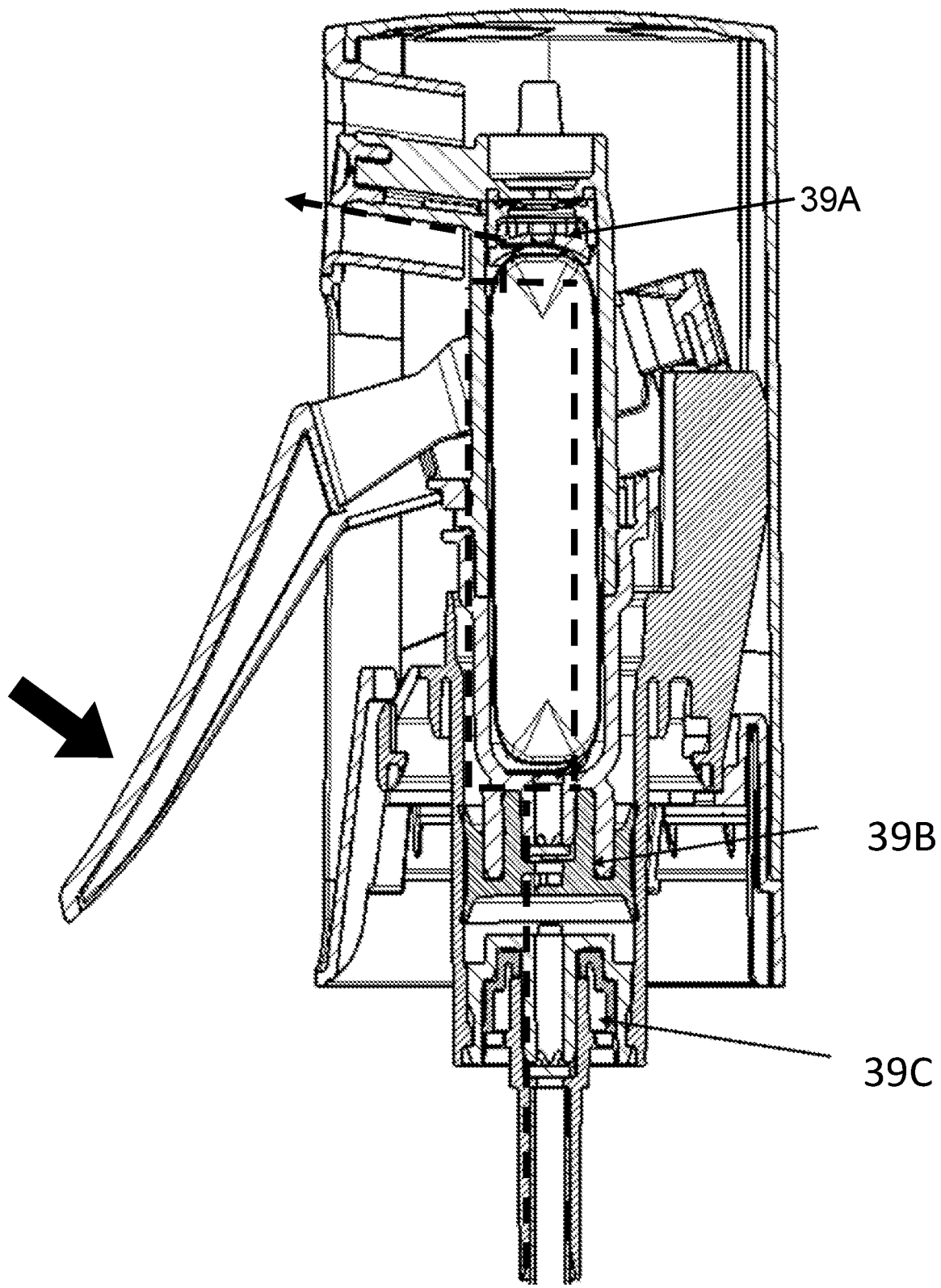

FIGS. 34-40, next described, illustrate various technological advances of a Flairosol D'Lite type sprayer. With reference to FIG. 34, a gas loaded buffer can be used. The buffer pressure is set by the size of the buffer bag and the pressure of the gas inside the bag. As shown in FIG. 35, the buffer is placed inside the piston. This improves compactness, the liquid travels in a straight upwards direction which helps to prevent entrapment of air, and one or more bypass channels are made to ensure the flow of liquid around the buffer. The buffering volume is set by the size of the buffer bag. As shown in FIG. 36, when the piston moves down: liquid is pushed to the nozzle. The overshoot of liquid not leaving the nozzle is stored by compression of the gas loaded buffer. When the piston moves up: the gas loaded buffer pressure pushes out the stored liquid FIGS. 37-39 illustrate a novel Prime-Overpressure valve. When priming, the valve is mechanically opened by the piston. When the piston reaches the end of the stroke, it mechanically forces the normally closed Prime-Overpressure Valve to open. Air escapes into the bottle and the engine primes. FIG. 38 shows the sealing surfaces of the valve. Finally, FIG. 39 Priming the DuO1 Engine: illustrates in detail its operation.

Prime issue with DuO1 Engine: When the piston 39B moves down it compresses air within the system and the air wants to get passed the normally closed outlet valve 39A. When the air pressure created is not high enough, the outlet valve is not opened and the engine does not work. The Prime—Overpressure Valve 39C makes sure the engine primes.

Pressure build up issue (DuO1 Engine Continuous): When trigger frequency and speed is high, the internal pressure could be build up to a critical level. If this level is reached, the pressure needs to be released. The Prime-Overpressure Valve 39C acts as an overpressure valve as well.

Novel Dome Valve

Figure 40A:
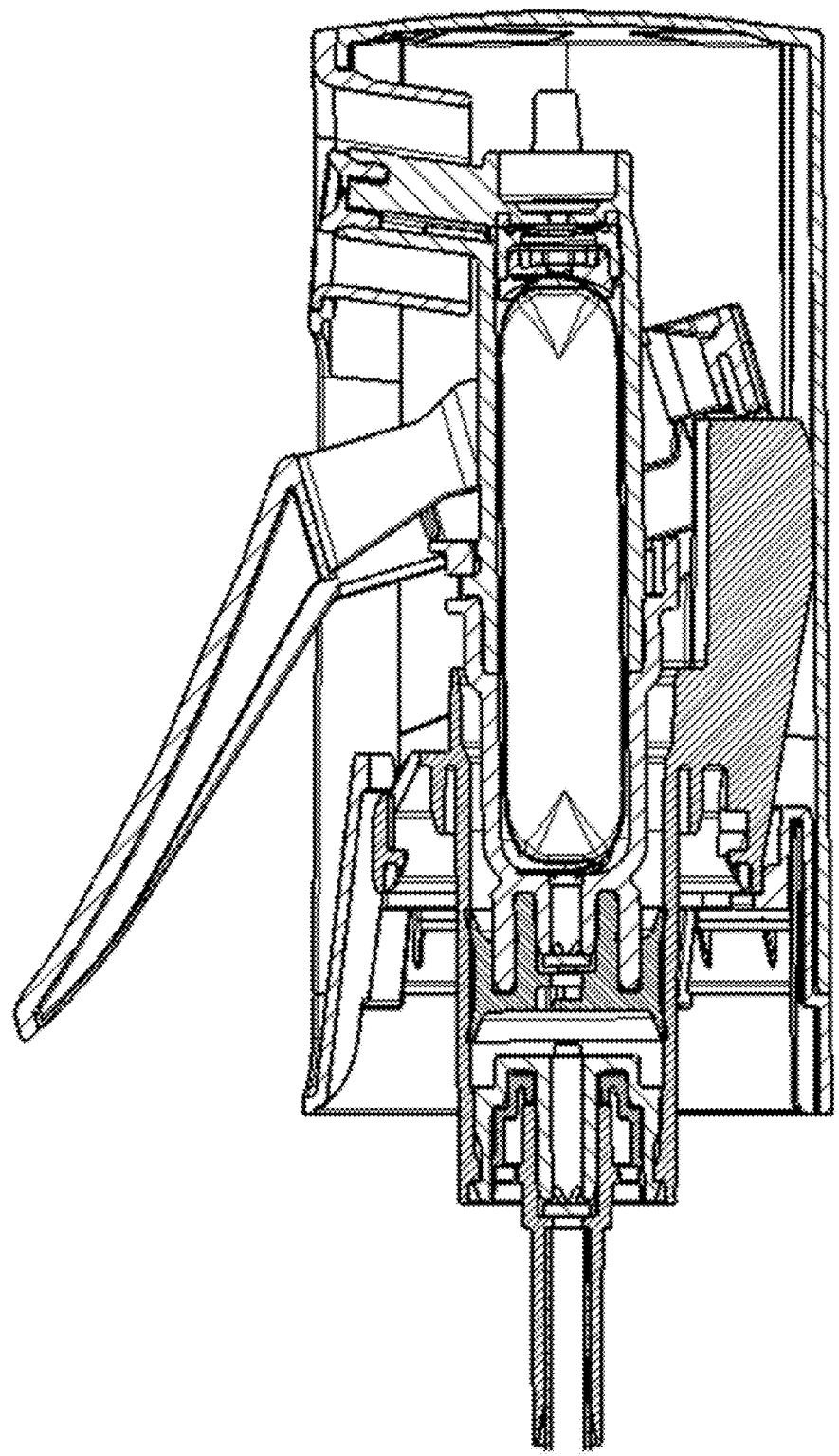
Figure 40B:
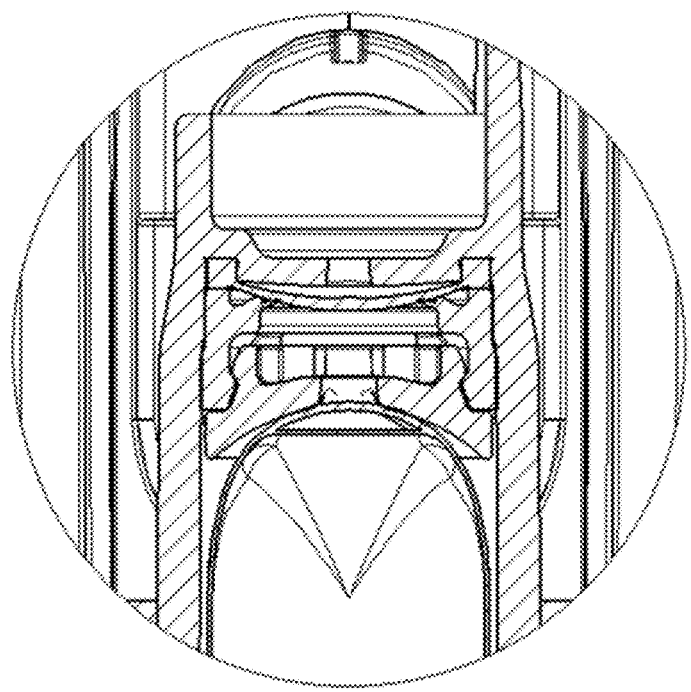
Figure 40C:
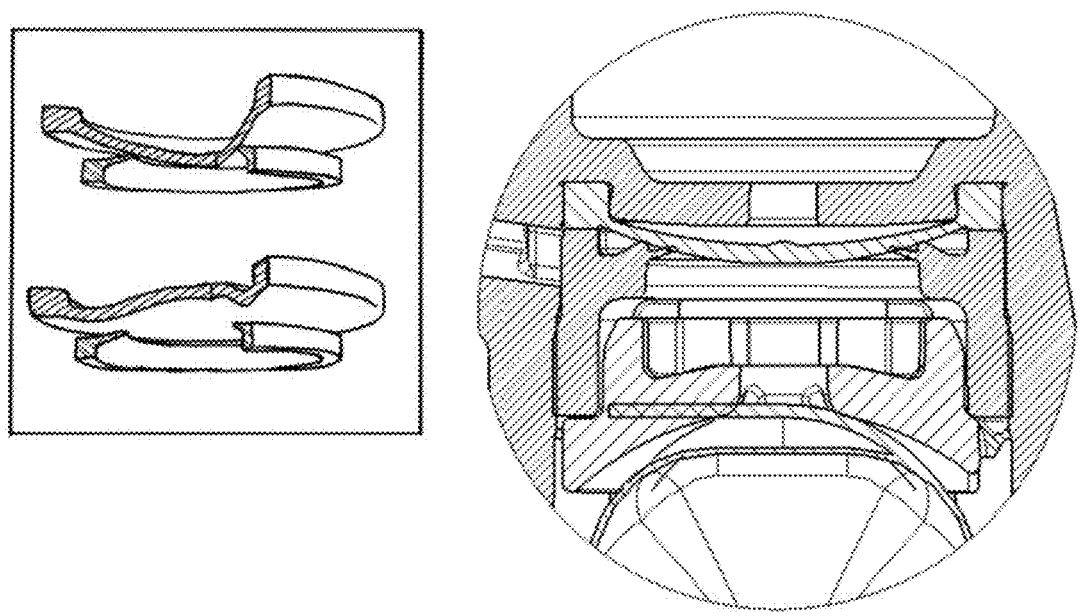
Figure 43A:
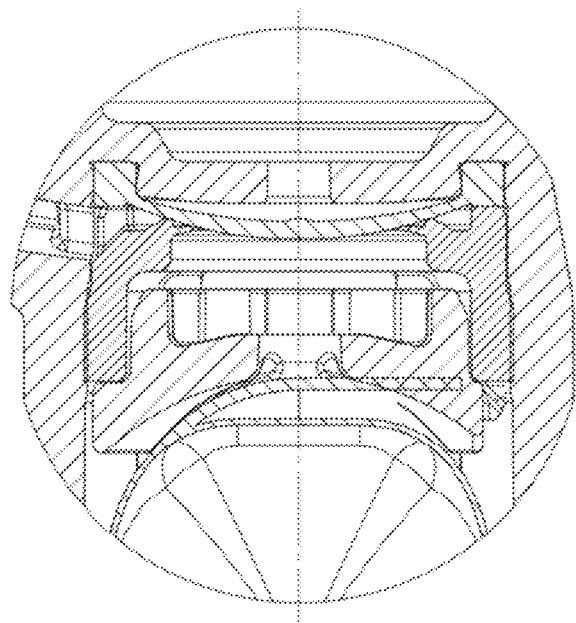
Figure 43E:
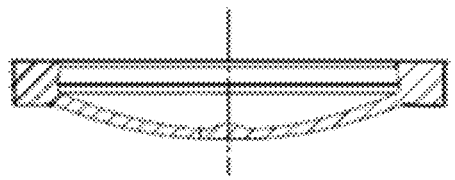
Figure 43F:
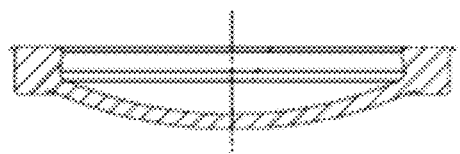
Figure 43G:
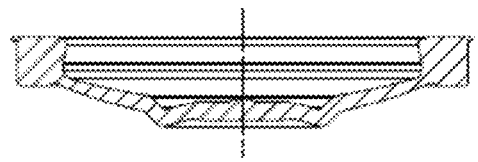
Figure 43B:
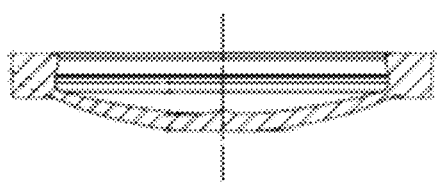
Figure 43H:
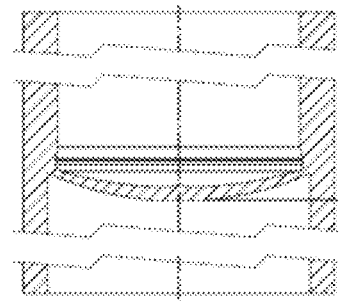
Figure 43C:
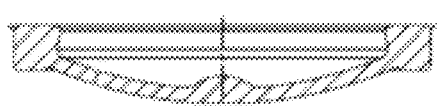
Figure 43D:
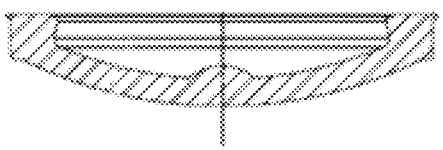
Figure 43I:
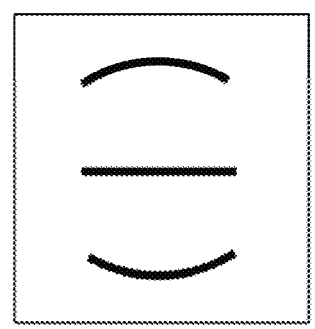

FIG. 40 illustrates the use of a novel all plastic binary dome valve. This pre-compression valve was developed to get a more "snappy" response on changes in pressure. I.e., digital opening and closing of this valve, without drips or bigger droplets in the spray, which improves the nozzle performance. FIG. 40 shows where the exemplary dome valve is placed within an exemplary DuO1 engine or application.

FIGS. 41-47 present details of the novel dome valve. As noted in FIG. 41, the main inventive goal was to create a dome valve having a more binary behaviour. I.e., a more instantaneous opening and closing of the dome with as little as possible differences in these pressures (small hysteresis). For this purpose a dome valve was created which interacts with a flexible seal. FIGS. 41 and 42 show six snapshots of the dome valve in operation. These are as follows:

A. Dome valve and dome seat at default. The dome seat seal rests against the dome valve with pre-tension;
B. Pressure deforms the dome valve. The seal of the dome seat flexes and still rests against the dome valve;
C. The dome valve deforms even more. The seal valve has flexed to default position and no longer rests against the dome valve. An opening between seal and dome valve is created;
D. When the pressure decreases, the dome valve swiftly deforms back again touching the seal. Dispensing stops instantaneously;
E. Dome valve and dome seat at default. The dome seat seal rest s against the dome valve with pre-tension; and
F. The dome valve diameter is equal or larger than the seal diameter. A larger the difference increases the hysteresis, the opening pressure will be higher than the closing pressure of the dome valve.

As shown in FIG. 43, the dome and seal can be changed in order to adapt or modify properties such as the opening and closing pressure and flow. Changes made can be for example the wall thickness, diameter, material, height, curviness (convex, flat, concave). The material of the dome valve is ideally a semi-crystalline plastic such as a PP or PE grade. This suitable for a wider range of liquids. If the dome needs specific properties such as a higher flexible modulus, other materials can be used such as POM grades. This limits compatibility with liquids, bleach for instance is not compatible with POM. Various shapes, sizes and executions of the dome valve can exist, such as are shown in FIG. 43, for example. In these examples, dimensions are merely exemplary.

Figure 44A:
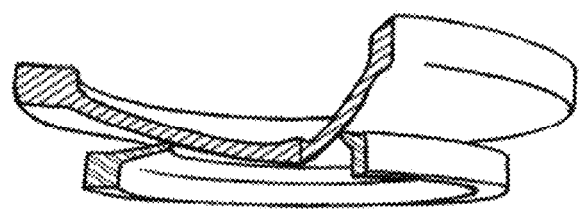
Figure 44B:
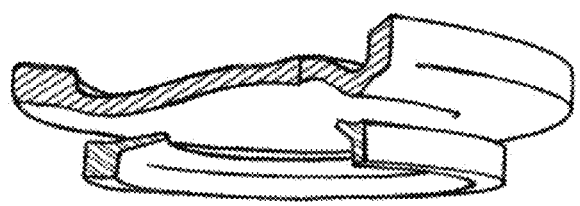
Figure 44C:
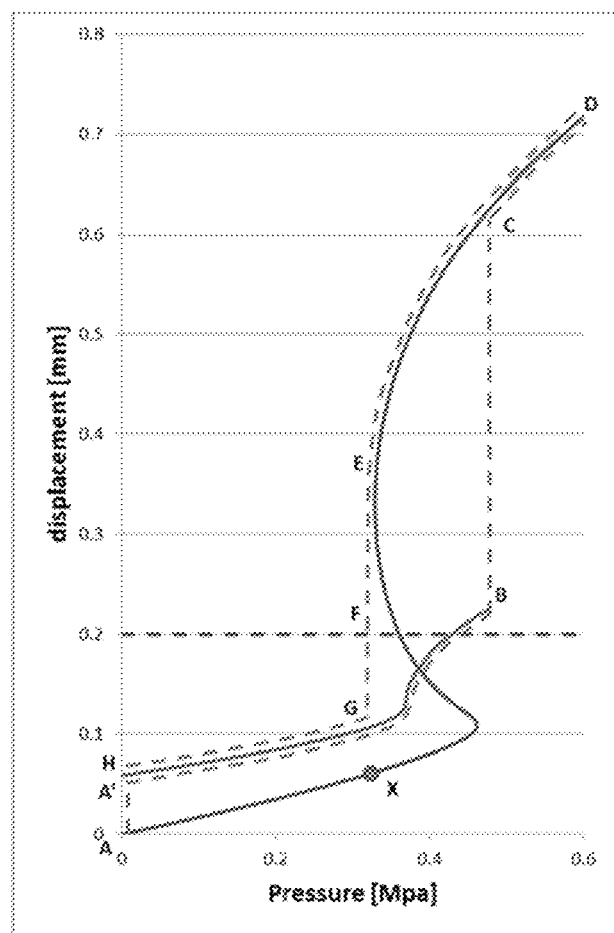
Figure 46A:
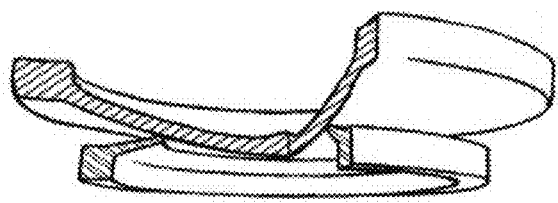
Figure 46B:
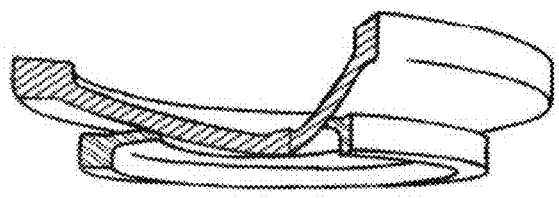
Figure 46C:
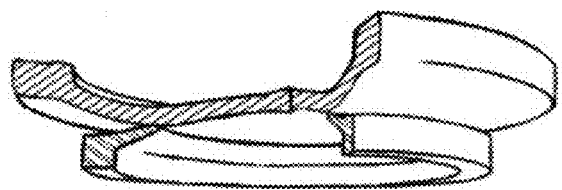
Figure 46D:
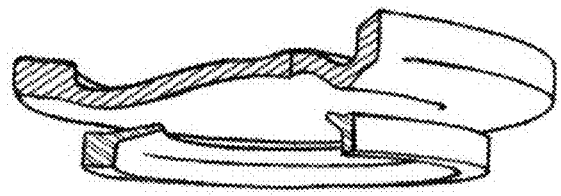
Figure 46E:
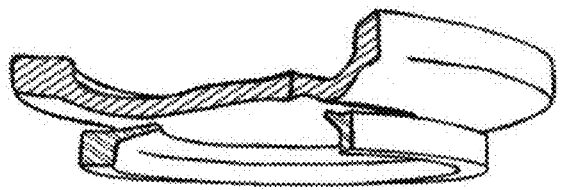
Figure 46F:
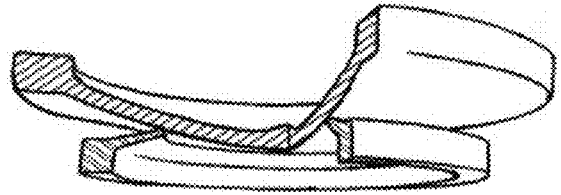

FIG. 44 depicts a graph and two load cases for an exemplary dome valve. The graph shows the displacement of the point of the dome which is in contact with the seal. There are two possible load cases:

Case 1—Closed situation where only part of the dome is pressurized and there is a pressure difference over the seal (solid blue line (initially upper line) in graph)

Case 2—Open situation where the complete dome is pressurized and there is no pressure difference over the seal (solid green line (initially lower line that crosses upper line at 0.4 Mpa) in graph). The dashed blue line (horizontal line at displacement=0.2 mm) is the position of the seal in the "open" situation. FIG. 45 shows the graph of FIG. 44 more magnified.

With reference to the graph of FIG. 45, there are various operational states of the valve:

A-A' The seal is pre-tensioned by moving the seal 0.2 mm relative to the dome;

A'-B Pressure buildup gives a displacement of the dome accompanied with the seal up to the point B. At this point the contact force between the dome and the seal becomes zero and the valve opens;

B-C When the valve is open the behaviour of the dome changes due to the fact that the seal is no longer pushing against the dome and the pressurized section on the dome has become larger. The seal which is no longer pressurized will go back to its neutral position at 0.2 mm while the dome jumps to 0.62 mm. This gives a sudden opening of 0.42 mm over a theoretic infinitesimal small pressure step. This binary behaviour is necessary to make sure that the pressure drop over the valve is small enough to have a negligible effect on the flow through the nozzle; C-D When the pressure increases further the displacement of the dome will increase.

(this can be limited by establishing a contact between the dome and another part); D-E When the pressure decreases the dome will become instable at point E. At this point the distance between the seal and the dome is still 0.35-0.2=0.15 mm. This opening is necessary to make sure that the pressure drop over the valve is small enough to have a negligible effect on the flow through the nozzle; E-F Due to the instability the displacement of the dome will decrease instantaneously and the seal (in neutral position) comes into contact with the dome at point "F". The neutral position of the seal has to be between point "E" and "X" to ensure the functionality of the seal;

F-G When the seal is in contact with the dome the "closed" situation is established and the seal will accompany the dome to point G. This will happen instantaneously as well; and G-H Further decrease in pressure will result in gradual decrease in displacement.

FIG. 46 illustrates the dome shape and configuration during some of the above-identified operational states.

Figure 47:
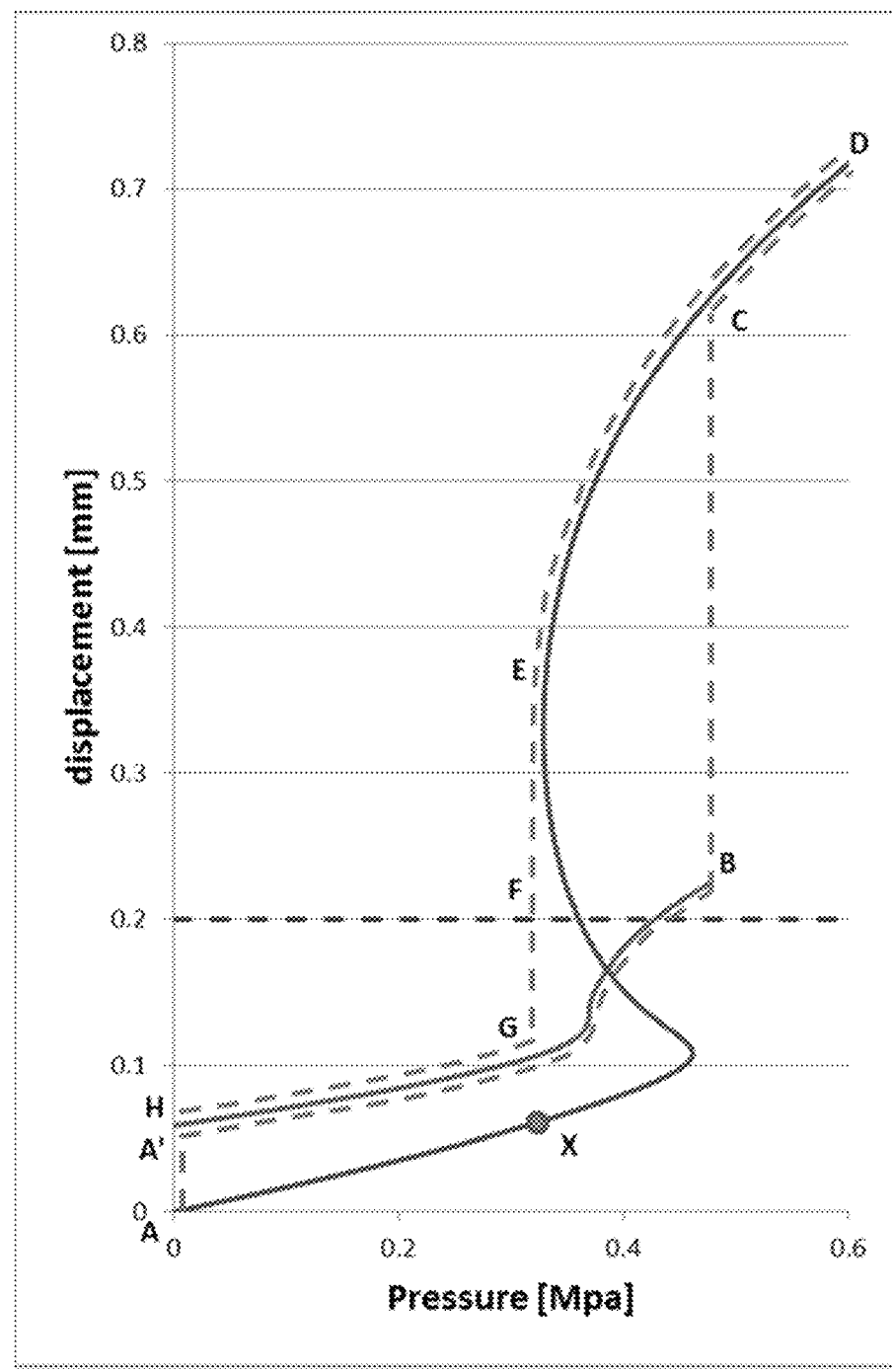
Figure 48A:
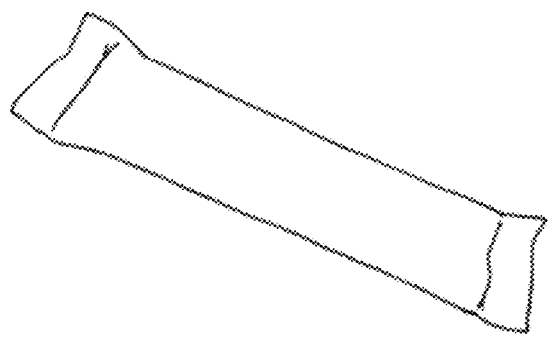
FIGS. 48-52 illustrate exemplary gas buffers that can be used in exemplary embodiments of the present invention.
Figure 48B:
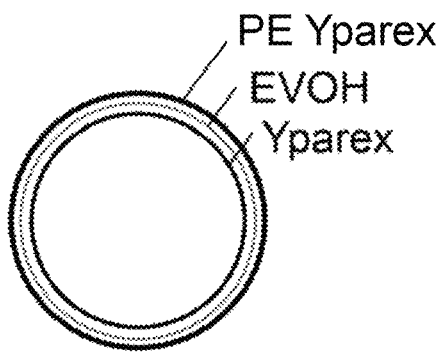
Figure 48C:
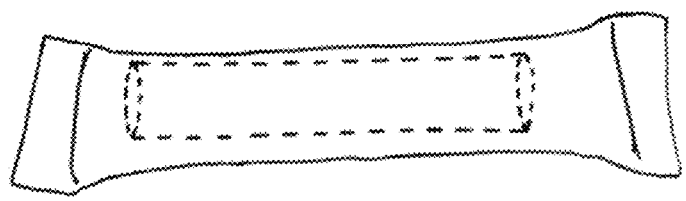
Figure 48D:
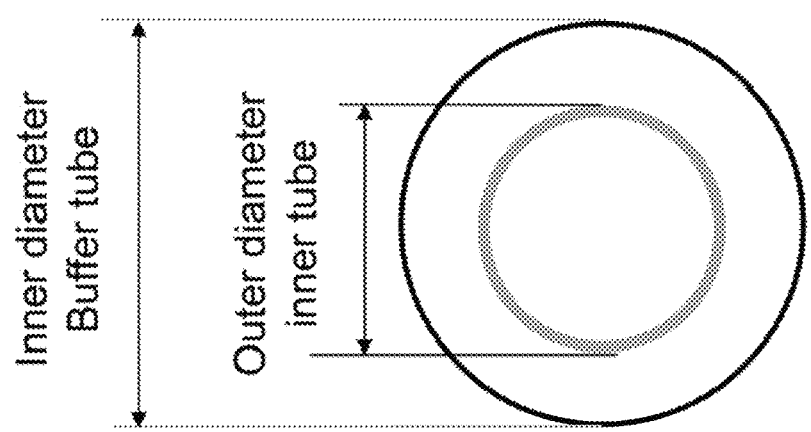

Finally, FIG. 47 illustrates how in time the pre-stresses in the seal and dome will relax. This will particularly change the "closed" behaviour. In the graph presented in FIG. 47 the effect of a 50% relaxation is presented. It shows that the valve will continue to function as described in the previous slides.

Gas Buffer Technology

Figure 49A:
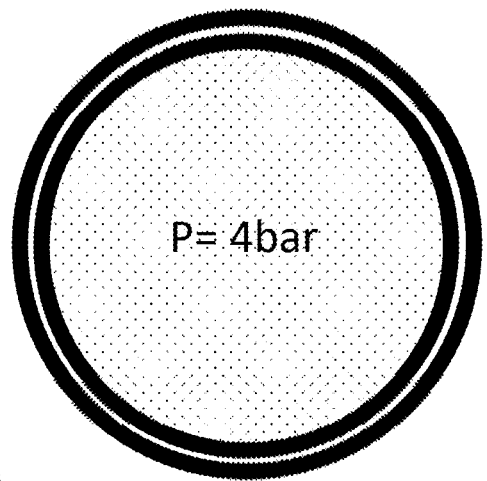
Figure 49B:
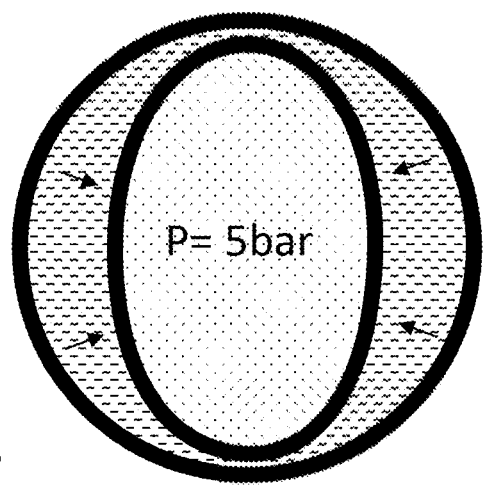
Figure 49C:
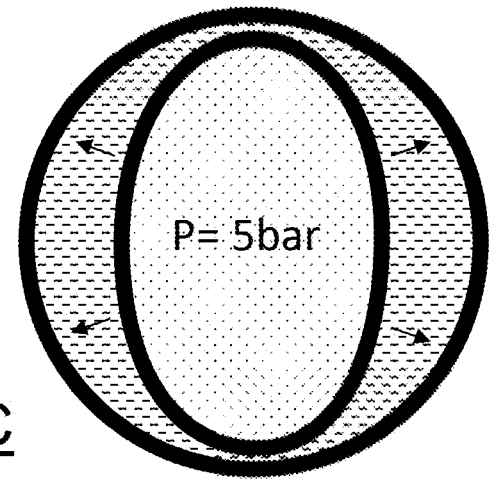
Figure 65:
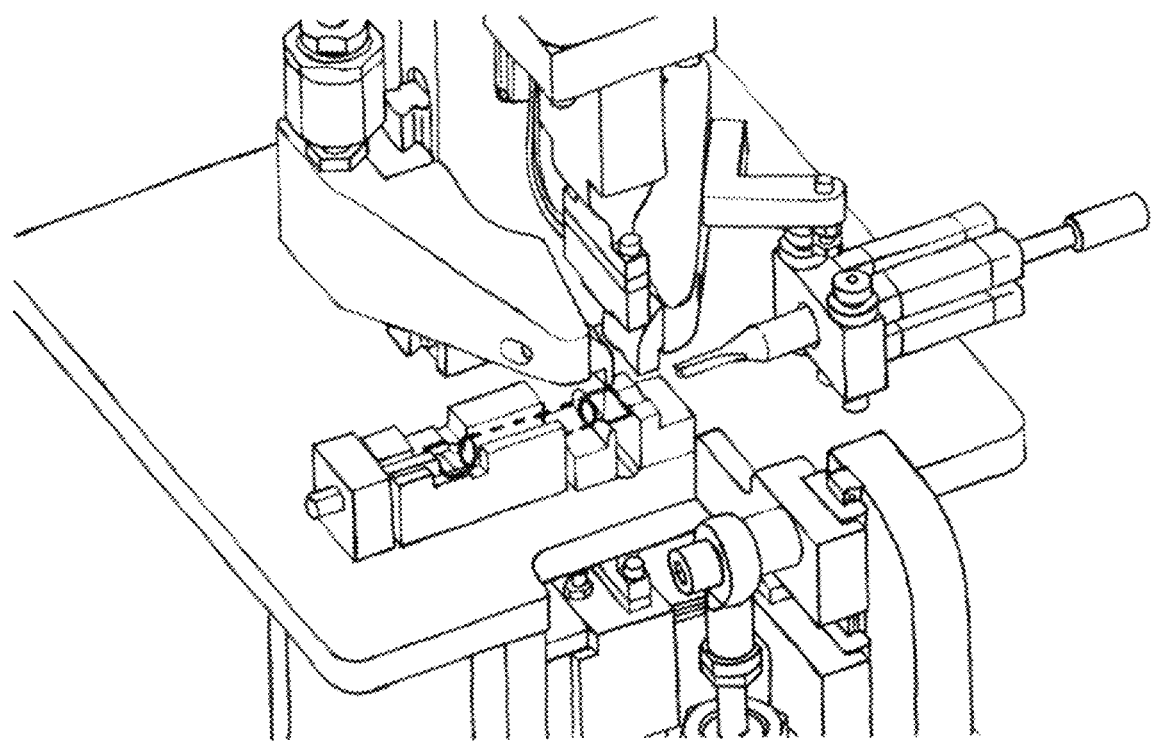
Figure 66:
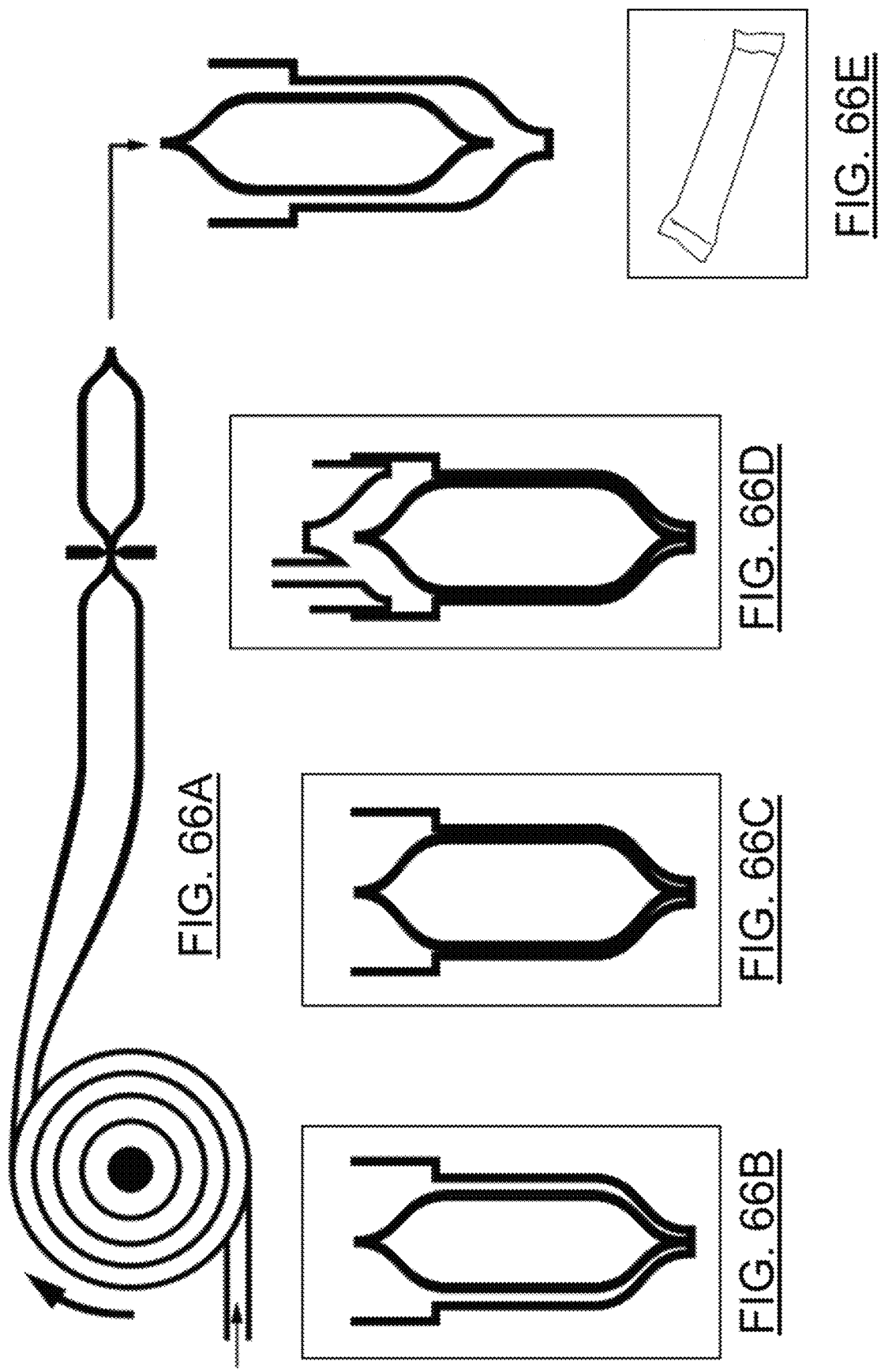
FIGS. 66-67 illustrate an alternate manufacturing technique for gas buffers.
Figure 67:
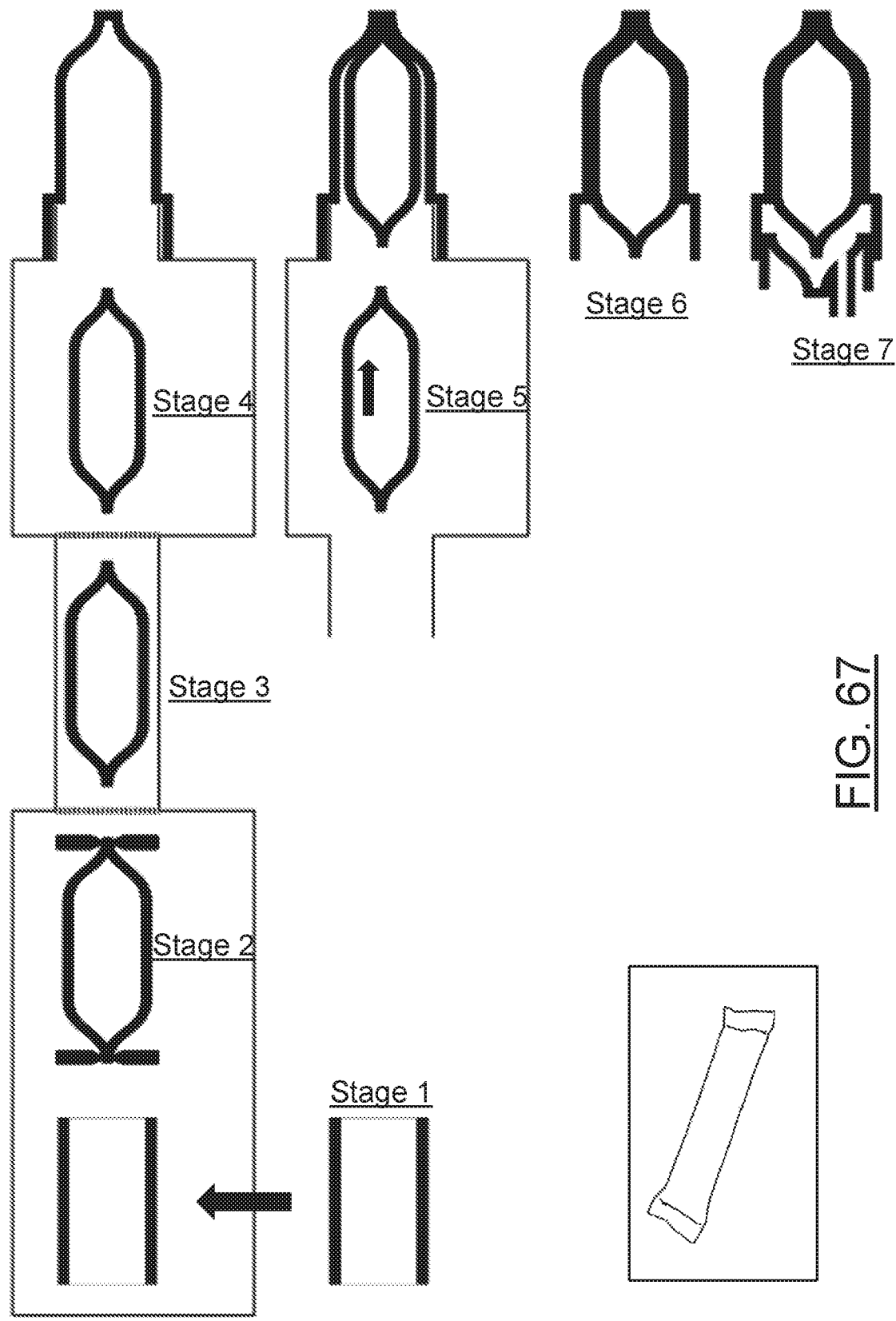

FIGS. 48-65 illustrate exemplary gas buffers that can be used in exemplary embodiments of the present invention, as well as exemplary methods of manufacturing them. FIGS. 66-67 illustrate alternate manufacturing methods. With reference to FIG. 48, the buffer can be made from a multi-layer tube containing for example; PE, EVOH, or Yparex. It is pressurized by filling with a gas such as, for example, air, nitrogen or other gasses. The multi-layer is needed to provide the desired properties like; The ability to be welded, Maintaining flexibility so all energy is stored and released by the enclosed compressed gas, Blocking the gas from leaving the buffer and therefore maintaining the pressure over time, and Chemical resistance to the liquid dispensed. A gas buffer can have, for example, an inner tube. The difference between the inner tube outer diameter and the buffer tube inner diameter is related to the buffer capacity. The greater the difference, the more the capacity. In theory, the external pressure applied to the could increase to a level in which the buffer would collapse to an extend it fails. A tube with open ends can be placed in the buffer to prevent the collapse which leads to failure. This will limit the extend to which the buffer can collapse when a external pressure is applied As shown in FIG. 49, the buffer is an accumulator to store energy. In a gas buffer, the gas temporarily stores the energy delivered by the liquid pressure. The pressures are equalized. This energy is returned when the external liquid pressure is less than the internal pressure of the gas buffer. As shown in the schematics of FIG. 49, in a default buffer position: The buffer tube is filled with a gas having a pressure of e.g. 4 bar. The gas buffer housing retains the gas buffer tube from gradually expanding by the internal gas pressure. In a stored energy state: by pressure an amount of liquid has entered the gas buffer housing. The liquid pressure compresses the gas in the gas buffer tube and therefore storing energy and equalizing the pressure. The external liquid pressure is equal to the internal gas pressure. In a releasing energy state: When the external pressure applied by the liquid is decreases, the gas pressure returns the energy. The liquid is displaced by the expanding gas. As long as the external liquid pressure is less than the internal gas pressure, the gas keeps expanding until the buffer has returned to its default position and therefore default pressure.

Figure 50A:
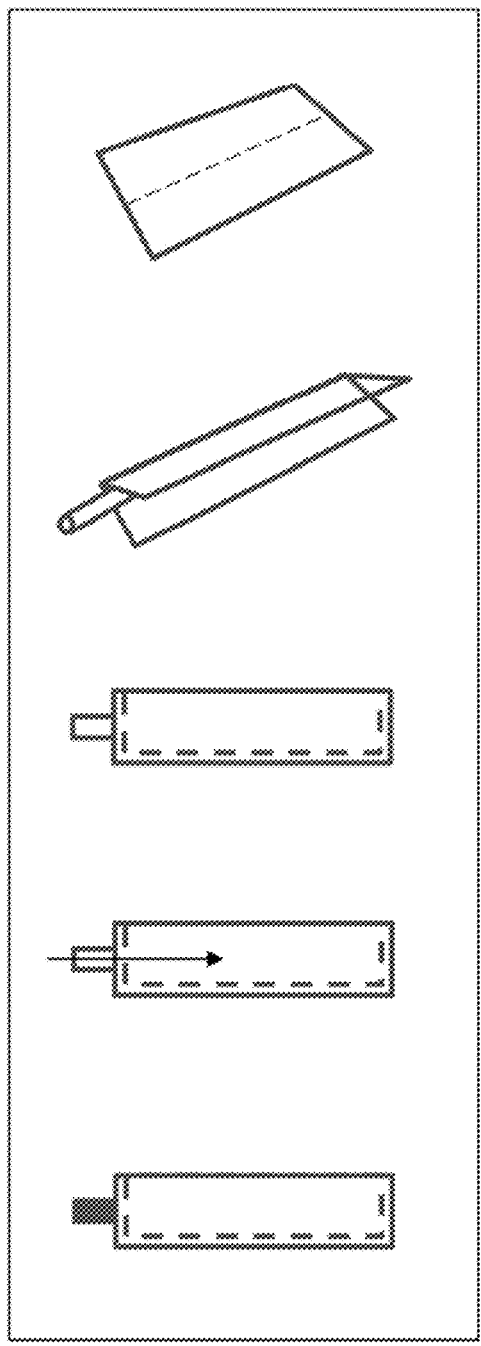
Figure 50B:
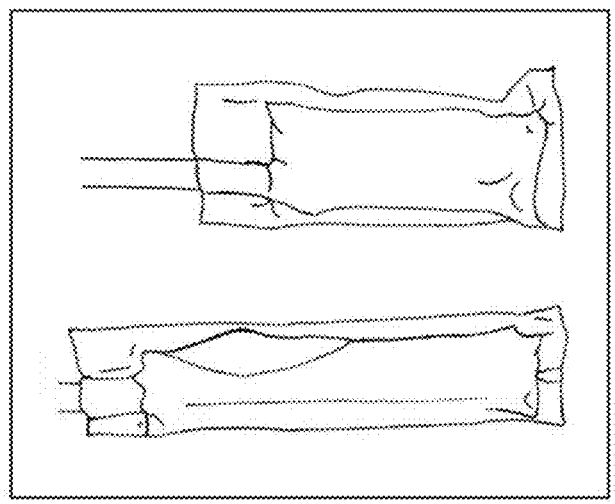
Figure 50C:
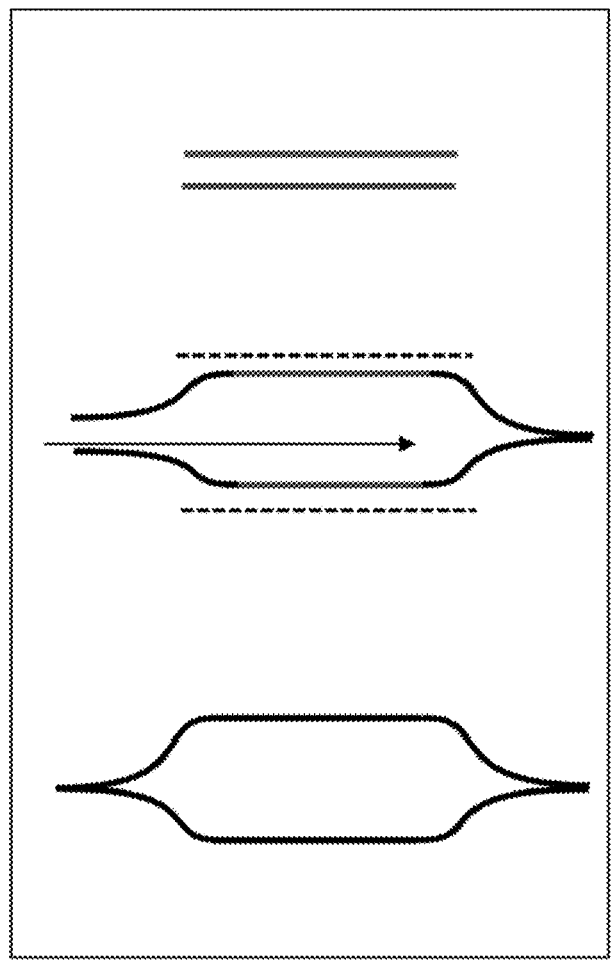
Figure 51A:
Figure 51B:

As shown in FIG. 50, besides the gas buffer being made with an multi-layer extruded tube, it can also be made in alternative ways, such as, for example: buffers made from single or multi-layer foil, welded to become a buffer bag which can be filled by a gas. The foil can, for example, be a laminate comprising various layers, each layer being a specific material with specific properties. For example, to have better chemical resistance, better barrier properties. With laminates, almost all materials can be used. Buffers can, for example, be made with blow molding techniques like extrusion blow molding, one stage blow mold processes, and in mold stretch blow molding. FIG. 51 illustrates alternate techniques by which gas buffers can be made, for example, and FIG. 52 illustrates use of a dispenser using gas buffer technology. FIG. 51 thus shows a buffer made by injection molding techniques. For example, a buffer made by welding a bag in a bag. First, a single layer extruded tube is filled with gas and welded similar to the multi-layer tube. Then, the single layer welded is inserted in a second single layer tube or bag, and welding is performed to close. Thus, the buffer may be made, for example, by injection molding techniques. The welding techniques can include, for example, ultrasonic welding, laser welding, hot stamp welding, gluing, etc.

FIGS. 53-65 illustrate exemplary manufacturing techniques for gas buffers. In particular, FIG. 53 lays out a sequence that can be implemented on an automated or semi-automated machine. With reference thereto, this sequence includes 12 steps: (1) Feed the tube to the manufacturing line; (2) Press to close one end of the tube; (3) Weld one end of the tube (=Weld 1); (4) Cool down weld; (5) Place injection needle; (6) Press to seal needle and inject air pressure; (7) Press to close tube; (8) Remove the needle; (9) Weld to seal the tube (=Weld 2); (10) Cool down weld; (11) Check pressure; and (12) Check dimensions.

Figure 54A:
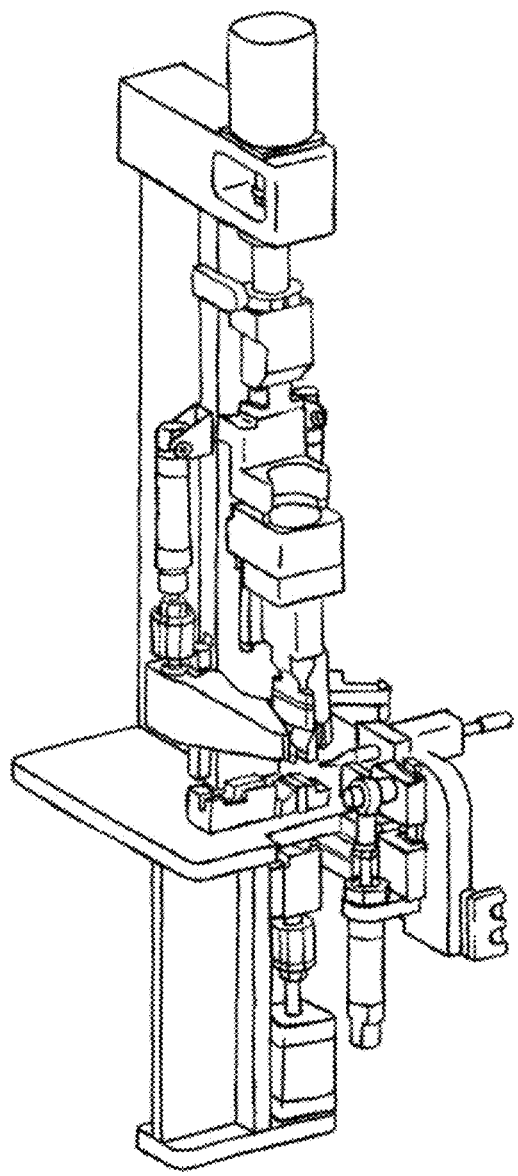
Figure 54B:
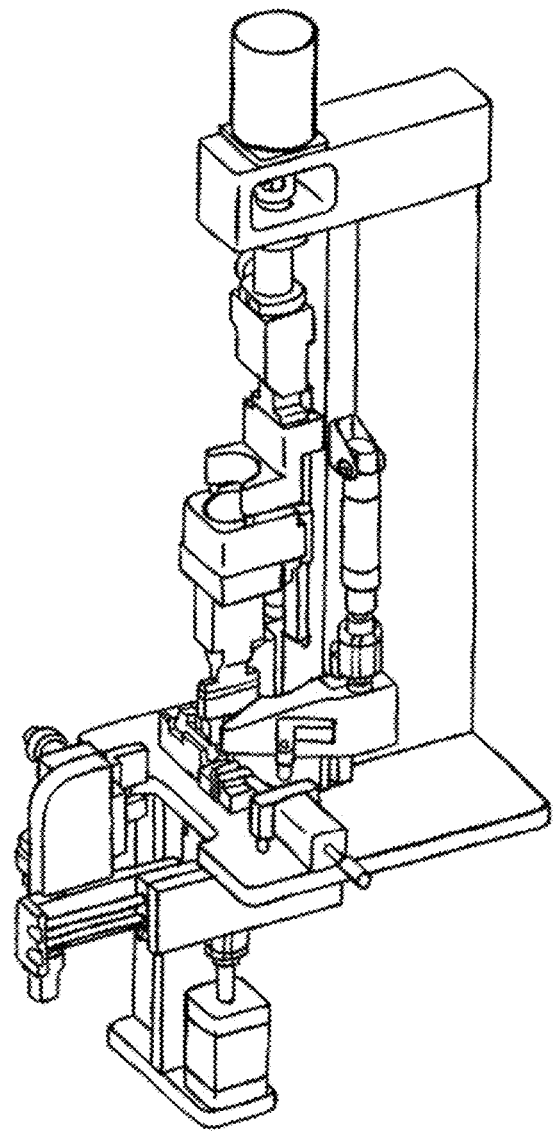
Figure 55:
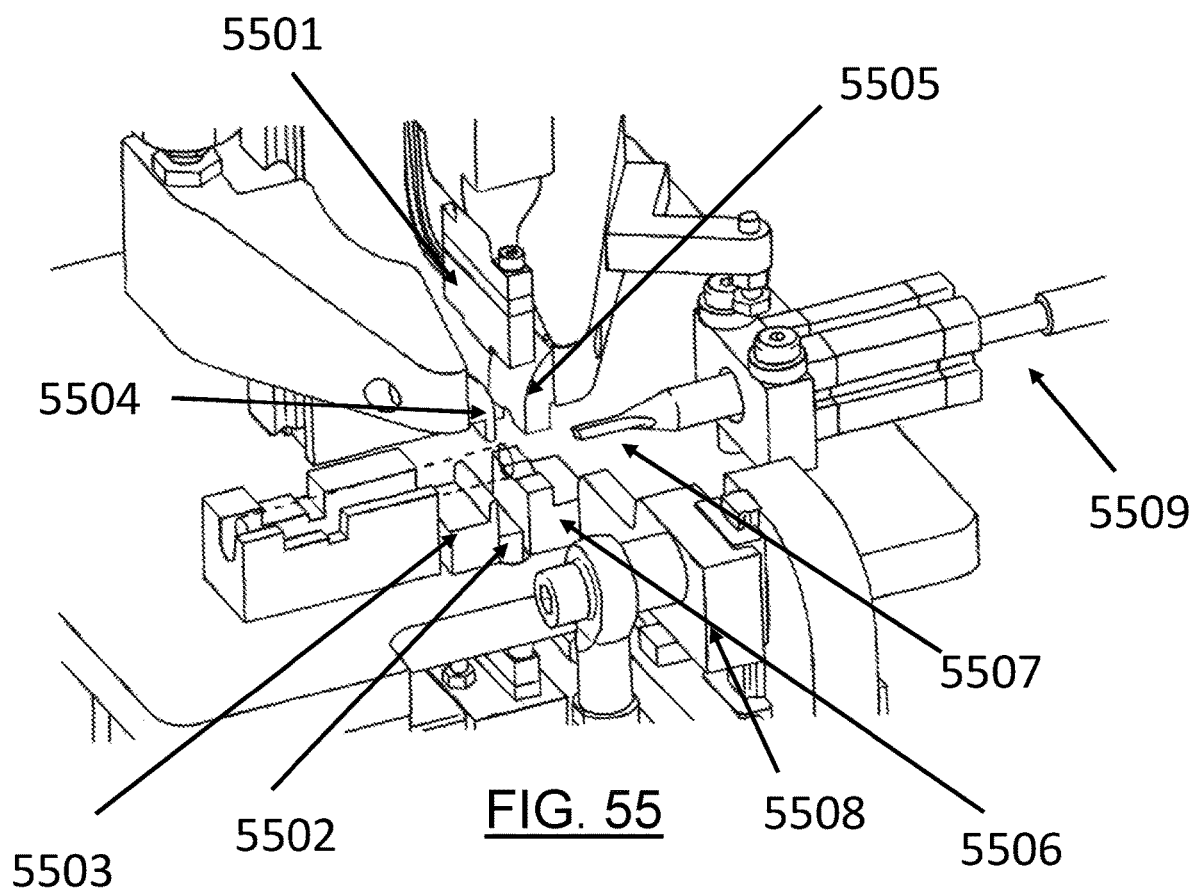

FIG. 54 depicts an exemplary machine for manufacturing a gas buffer using essentially the sequence of FIG. 54, and FIG. 55 presents an overview and key part list for the exemplary machine. There is, for example, an Upper welding head 5501, a Lower welding head 5502, a Lower clamp left 5503, an Upper clamp left 5504, an Upper clamp right 5505, a Lower clamp right 5506, a Needle 5507, Cooling clamps 5508 and a pressurized gas 5509.

Figure 56:
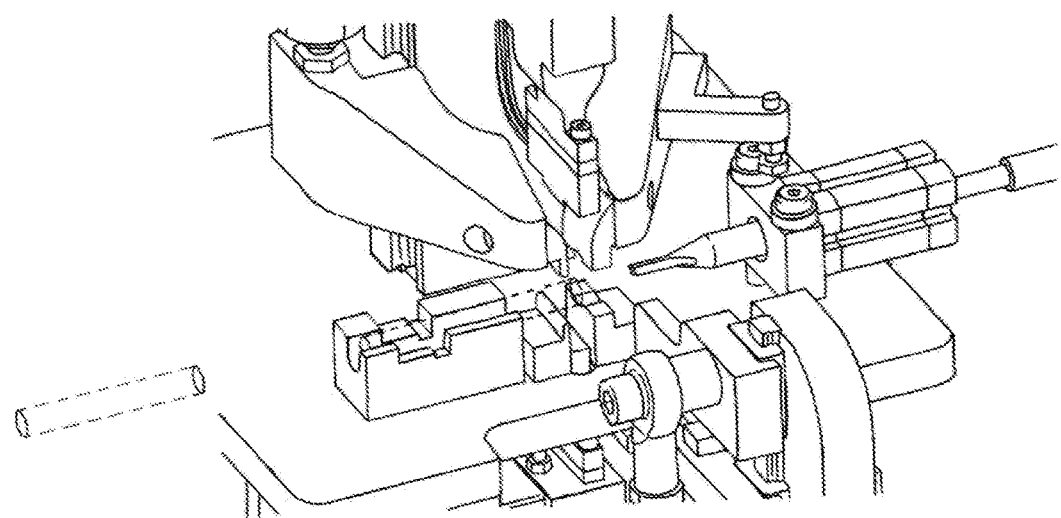
Figure 57:
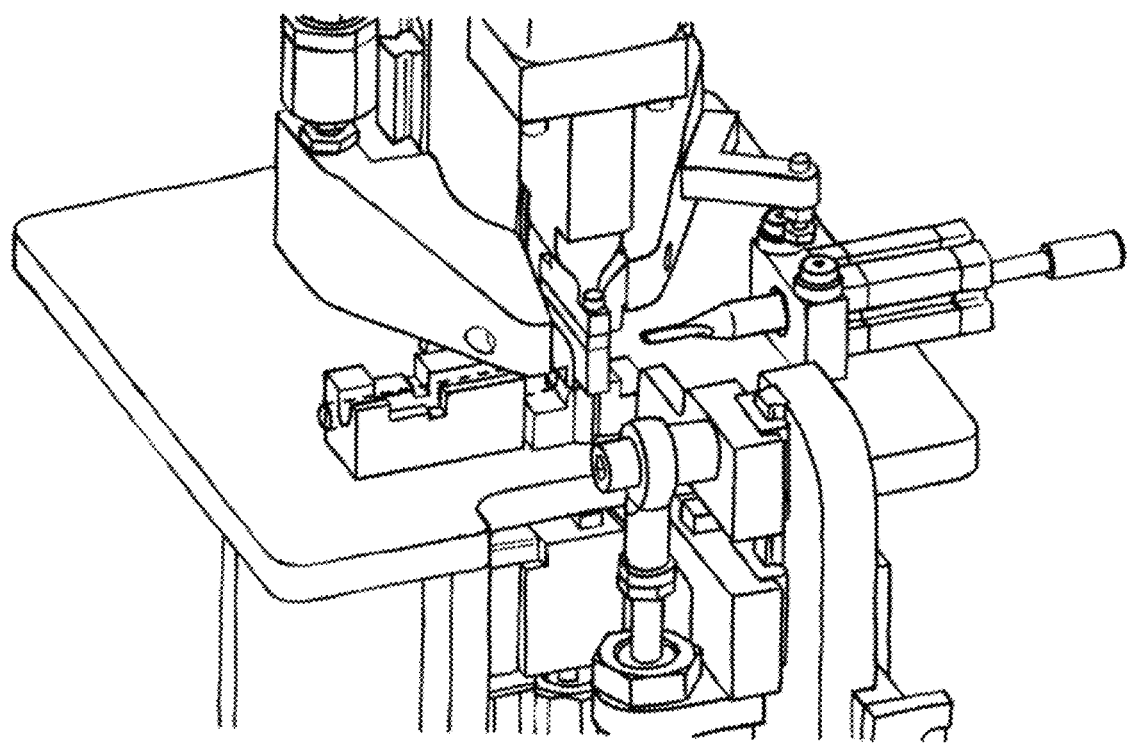
Figure 58:
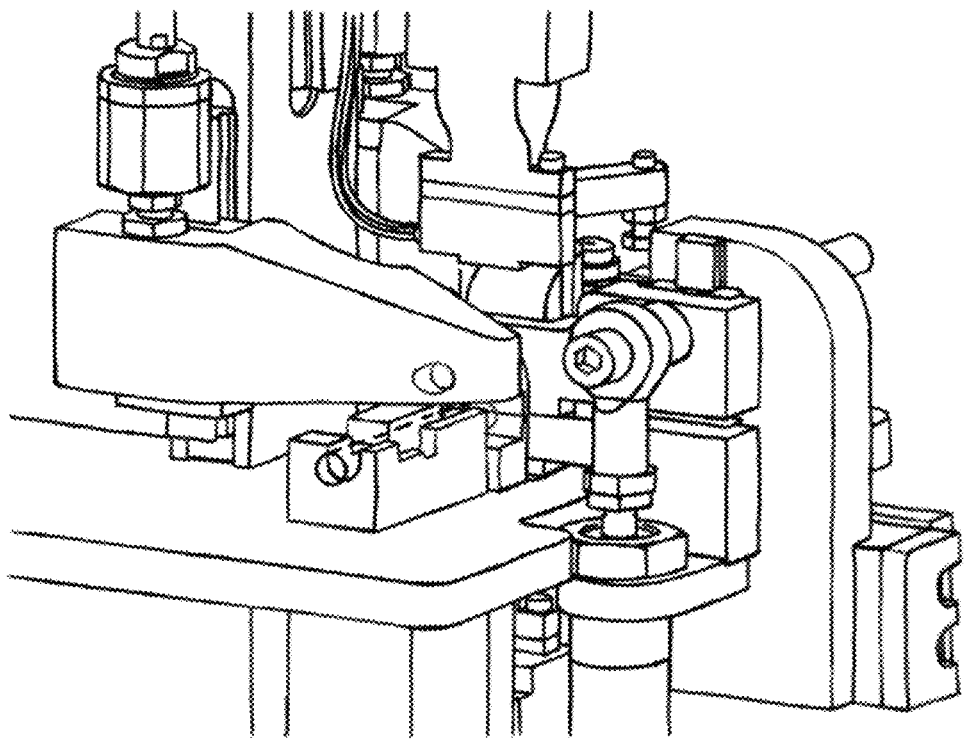
Figure 59:
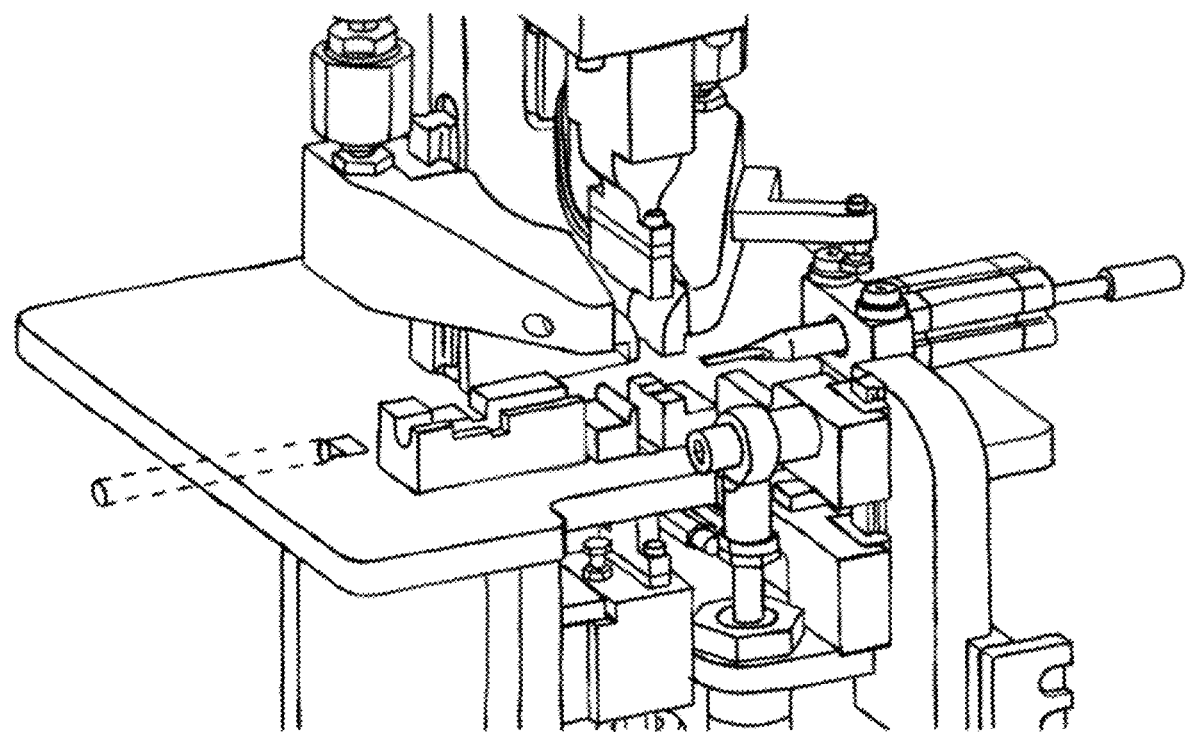
Figure 60:
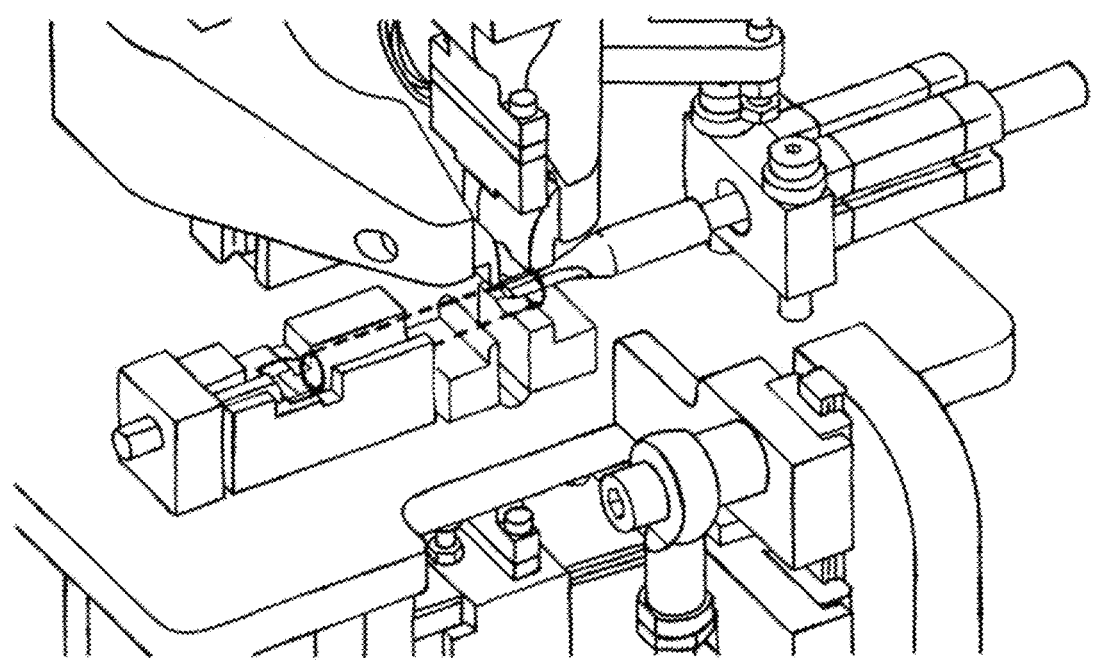
Figure 61:
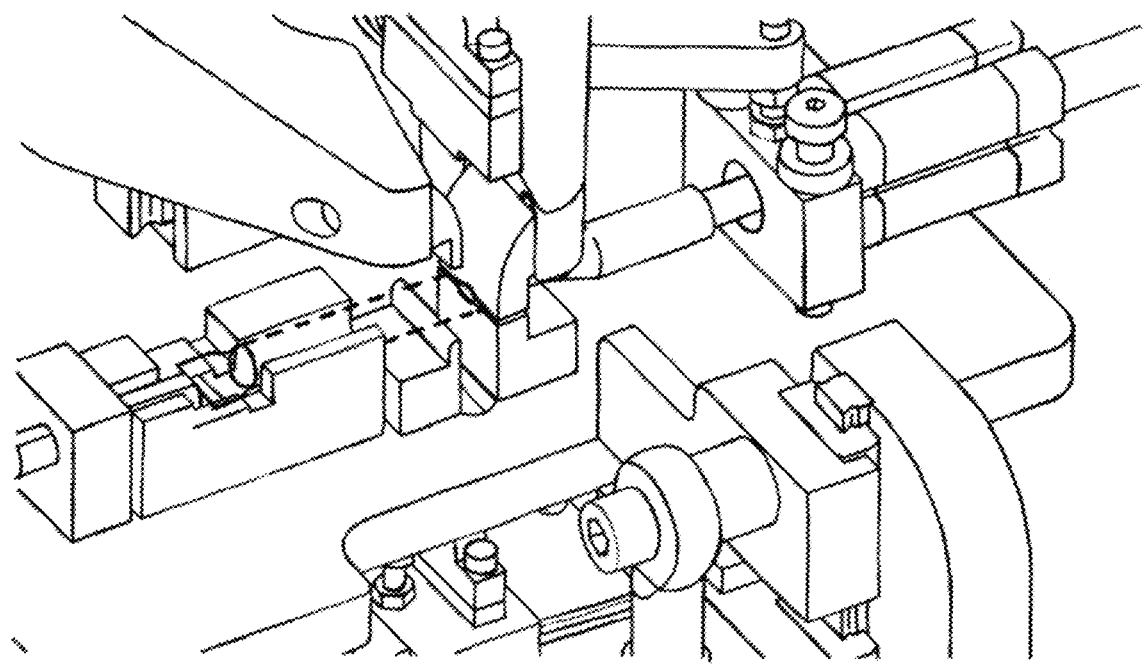
Figure 62:
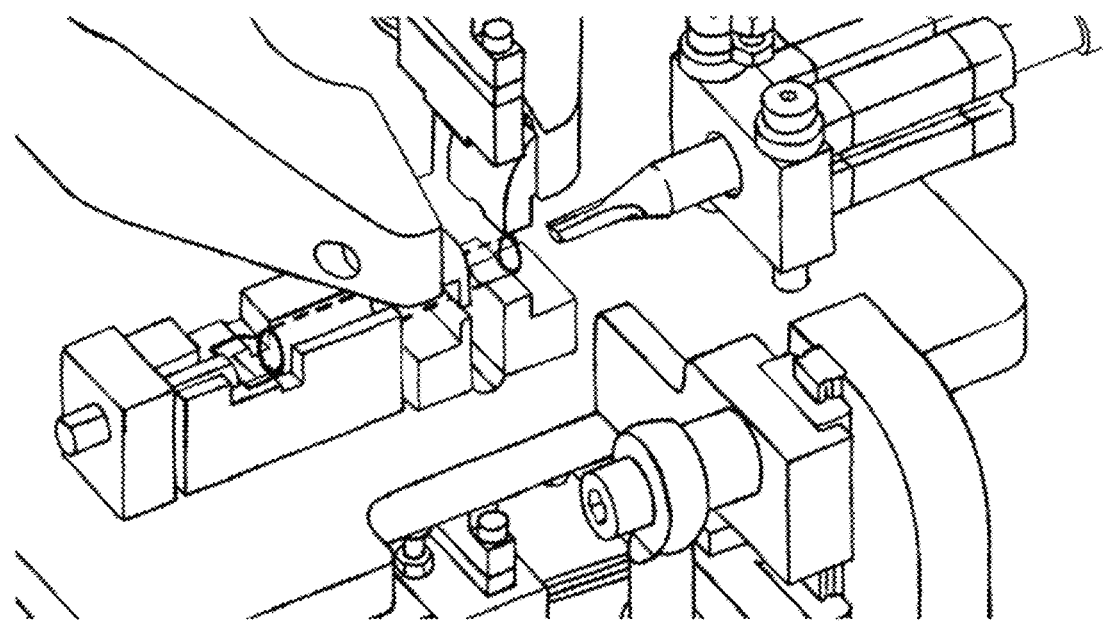
Figure 63:
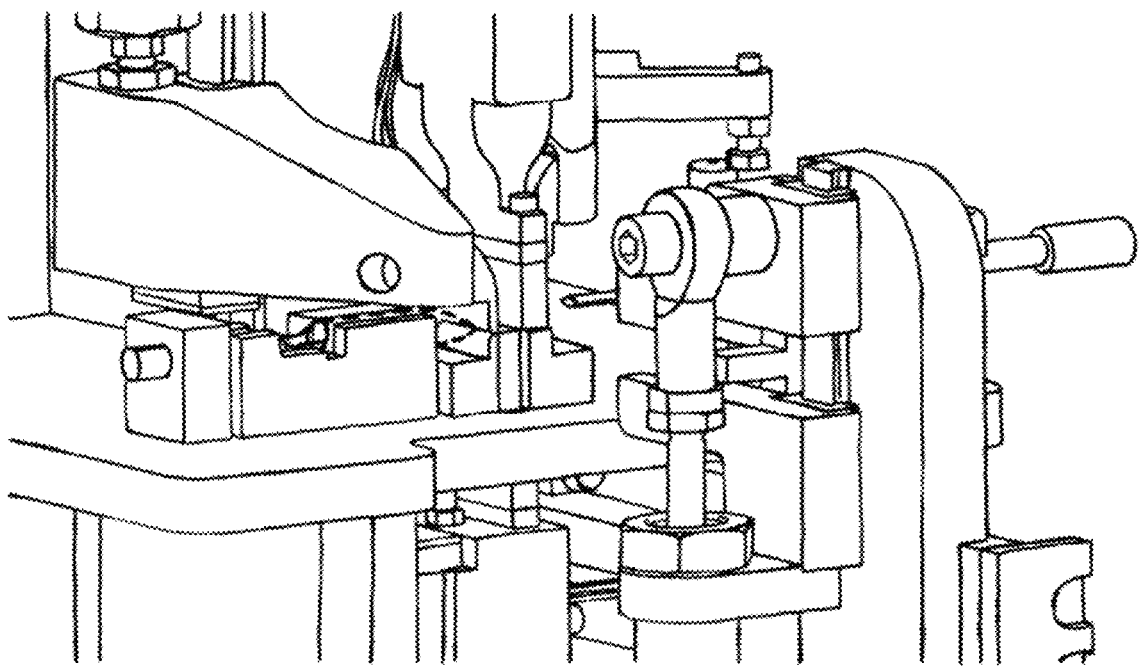
Figure 64:
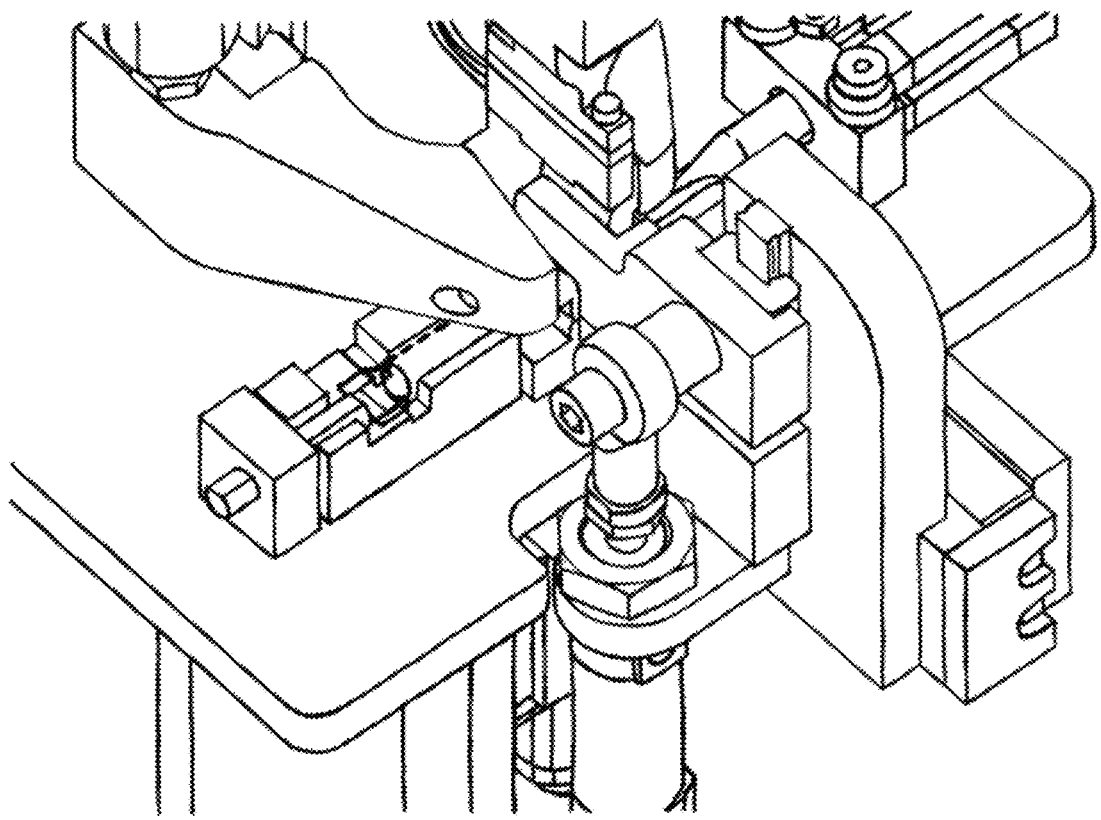

FIGS. 56-65 set forth exemplary steps in creating a gas buffer using the exemplary apparatus of FIG. 54, as follows:

FIG. 56 shows Step 1, enter the tube to weld the first end. FIG. 57 shows Step 2, after the upper and lower clamp left closes, the upper and lower welding heads close, welding is in progress. FIG. 58 shows Step 3, where after the upper and lower welding heads open, welding stops, and cooling clamps comes in and squeezes around the weld. FIG. 59 shows Step 4, where after cooling the tube, the cooling clamps open, and the buffer tube with one side welded can be removed. FIG. 60 shows Step 5, where after the buffer with one side welded is placed with the opposite open side towards the needle, the open side of the buffer tube is pushed over the needle. FIG. 61 shows Step 6, where after the upper and lower clamp on the right closes, the buffer tube around the needle is sealed, and gas enters the buffer through the needle. FIG. 62 depicts Step 7, where after the upper and lower clamp on the left closes, the buffer tube is at pressure when the needle retracts, and the right clamps open again. FIG. 63 shows Step 8, where the 2nd side is thermally welded and the upper and lower welding heads close, welding is in progress and the 2nd weld is made. FIG. 64 shows Step 9 where the upper and lower welding heads open, the welding stops and the cooling clamps comes in and squeezes around the weld. Finally, FIG. 65 shows Step 10, where after cooling the tube, the cooling clamps open, and the welded buffer can be removed.

Alternate Gas Buffer Fabrication

As noted, FIGS. 66A-67 illustrate an exemplary alternate gas buffer manufacturing technique. With reference to FIG. 66A, one can create the gas buffer by beginning with a co-extruded tube on a reel. The pressure in the tube can be, for example, 3.5 barg. The tube can be made of, for example, polyethylene, polypropylene, polyamides, silicone, AVOH, a sandwich of layers of aluminum, polyester and polyethylene, to name a few possibilities, depending upon the gas buffer properties needed, and the types of chemical resistance needed, in various sprayer devices. The end of the tube can be pinched or welded and cut, and the sealed bag can be quickly placed into the buffer chamber, as shown in FIG. 66E. Next, as shown at FIG. 66B, the sealed bag is a bit smaller that the buffer chamber, but the bag will expand, as shown in FIG. 66C. This will cause the material in the bag to creep until it hits the buffer chamber wall. As a result of this expansion, the pressure inside the bag is now dropped to the pressure needed, for example, approximately 2.5 barg. Finally, the buffer chamber can be capped to hold the buffer in place and otherwise seal the chamber as shown in FIG. 66D.

FIG. 67 shows yet another method for assembling a gas bag-type buffer chamber. With reference to FIG. 67, at stage 1 there can be provided a co-extruded tube inserted into a pressure chamber. The pressure in the chamber can be, for example, 3.5 barg. It is within the pressure chamber that the co-extruded tube is welded on both ends at stage 2, and then, at stage 3, transported, still under pressure, to a second pressure chamber whose internal pressure is approximately 5 barg, for example, (or some value greater than the pressure in the first chamber). Due to the higher pressure in this second pressure chamber the bag shrinks at stage 4. At stage 5, the bag is pushed from the second pressure chamber into the buffer chamber, and at stage 6 the bag expands until it hits the wall of the buffer chamber, thereby losing internal pressure and dropping from 5 barg to 3.5 barg which is the desired final pressure. At this point the buffer chamber can be capped as shown at stage 7. This results in a 3.5 barg gas buffer, for example, matching the initial pressure of the first pressure chamber.

Figures 52A, 52B:
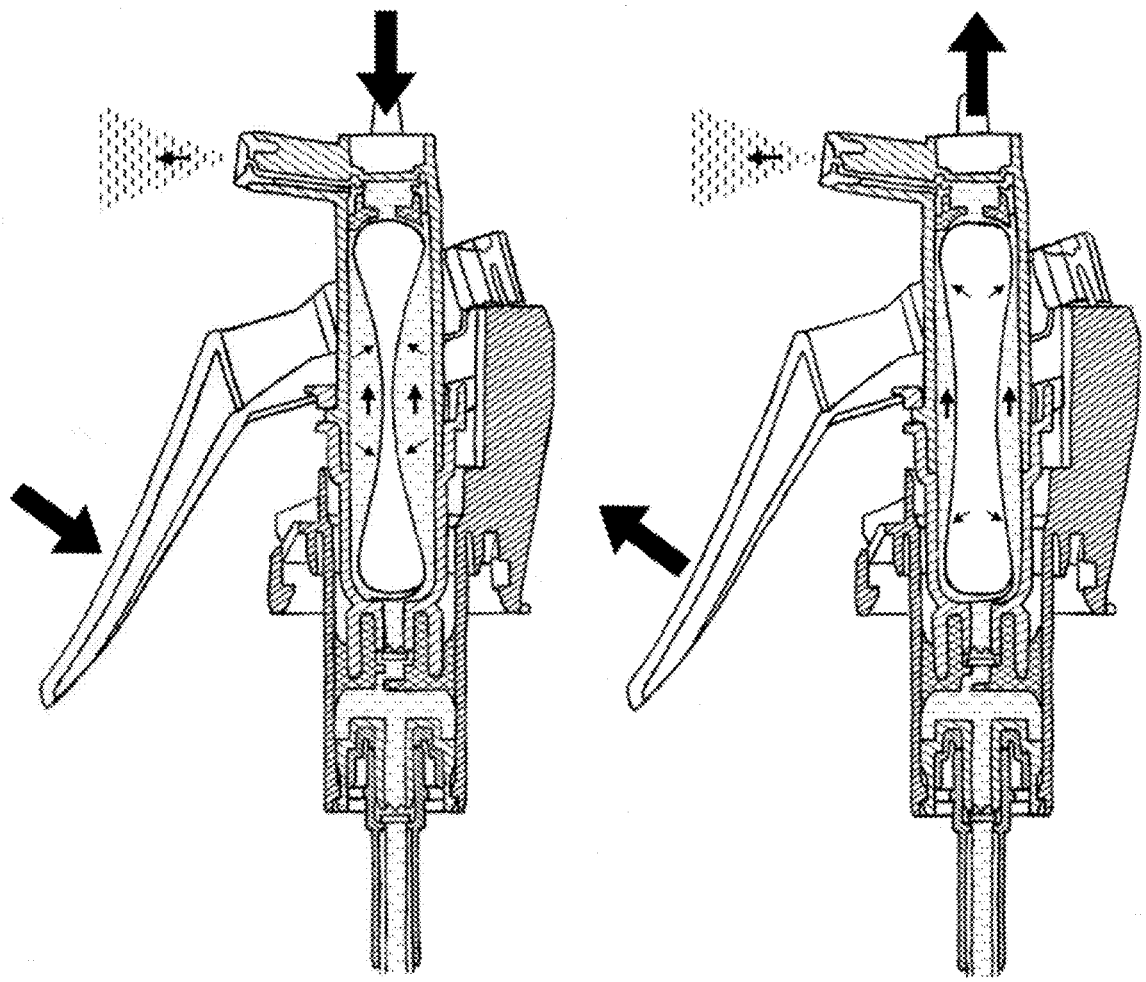
Figure 53:
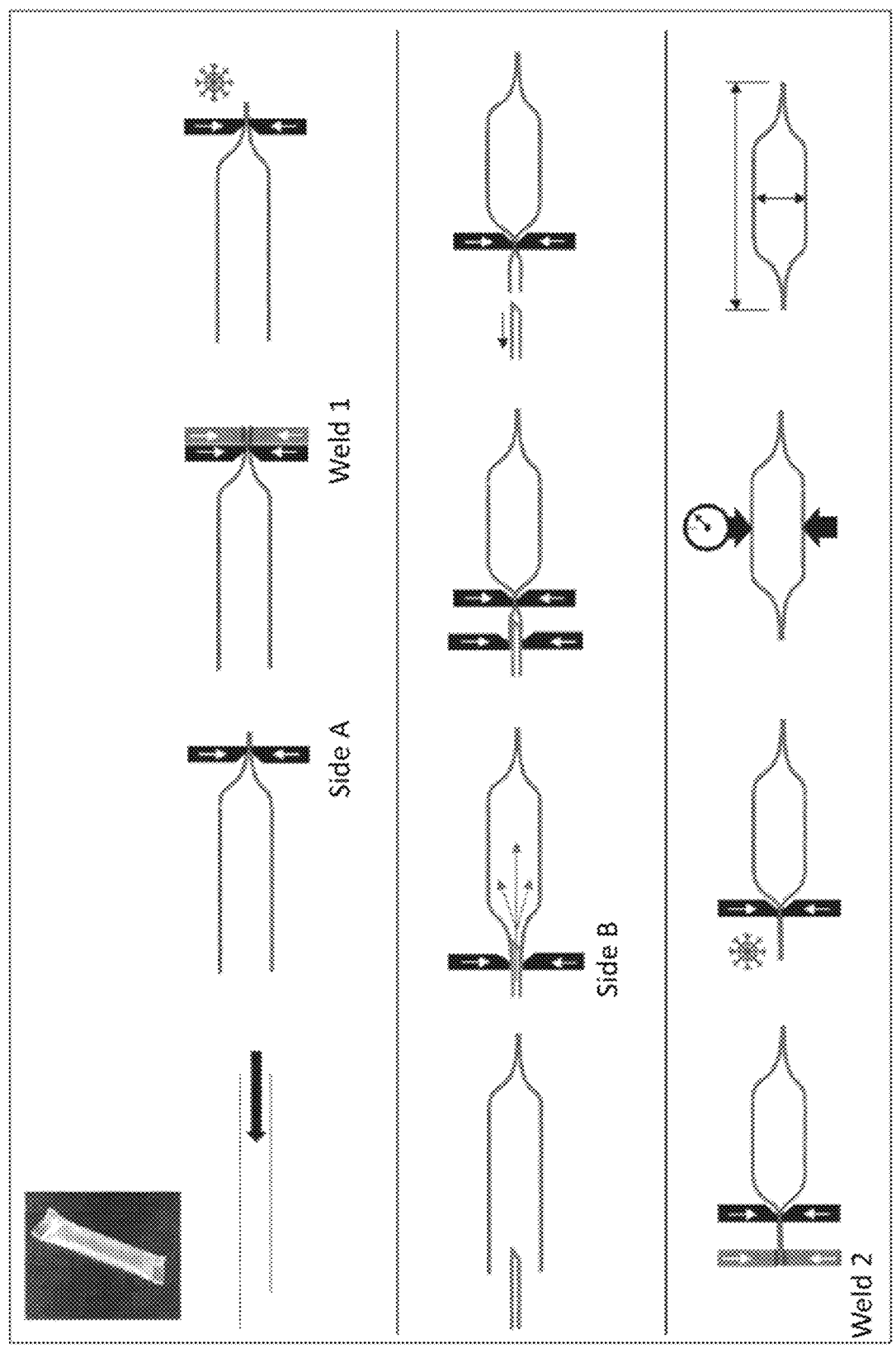
FIGS. 53-65 illustrate exemplary manufacturing techniques for gas buffers.

Returning now to FIGS. 52A and 52B, this shows how a gas buffer can operate in practice. With reference thereto, there is a gas buffer with an exemplary 2.5 barg in its bag, as shown as the end result of the process depicted in FIG. 66, i.e., FIG. 66D. In FIG. 54A, liquid is pumped into the buffer, in particular in between the buffer housing and the buffer bag. The air in the bag is thus further compressed due to the pressure of the liquid, creating a higher pressure than the original 2.5 barg. With reference to FIG. 52B, when the additional liquid under pressure ceases to be pumped into the buffer (i.e., the downstroke of the piston has completed), the liquid in the buffer is now pushed out of the buffer because the buffer bag naturally expands until it once again hits the wall of the buffer housing. In this manner the energy stored in compressing the bag to continue the outflow of liquid through the sprayer head in between strokes, thus offering continuous spray.

Duo1 Pump Engine for Various Applications:

In exemplary embodiments of the present invention, the DuO1 Pump engine can be used in all kind of dispensing applications, such as, for example, floormops, window washers, sprayers, and applicators. The DuO1 Pump engine can be used in a wide pressure-range of dispensing applications, from low to high pressures. The DuO1 Pump engine can be made in all kind of types, configurations and combinations of configurations and materials, adjusted to specific needs of each application.

For example, such as multiple pumps, dimensions of the pump or pumps, length of the stroke, nozzle or multiple nozzles, position of the nozzles, direct stop, continuous, continuous-stop, low pressure, and high pressure.

Multiple Pumps in Parallel to Increase Output

Figures 68A, 68B:
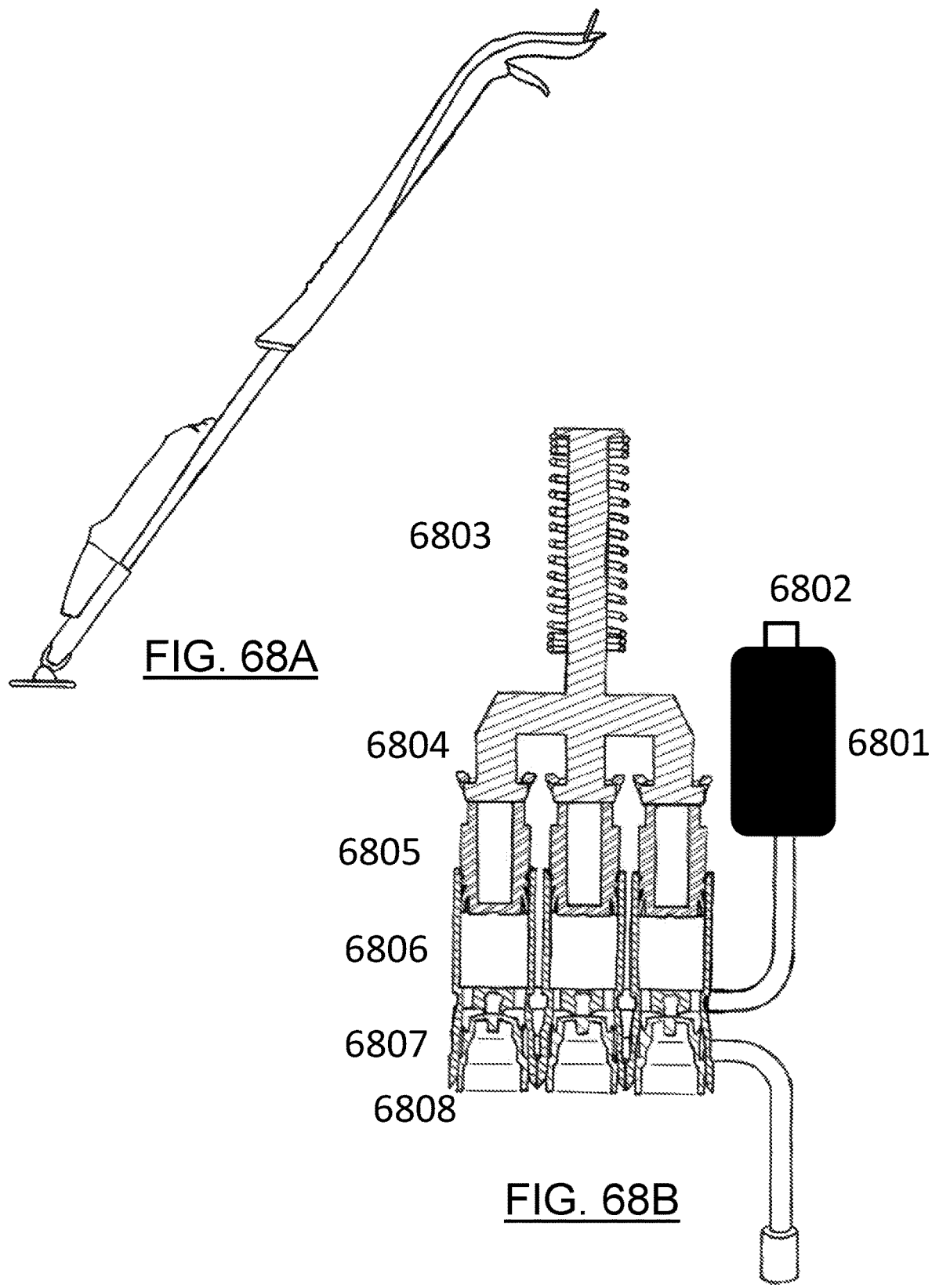
FIG. 68 shows how multiple pumps can be used with common inlet line and a common outlet or output line to increase output, according to exemplary embodiments of the present invention.
Figure 68C:
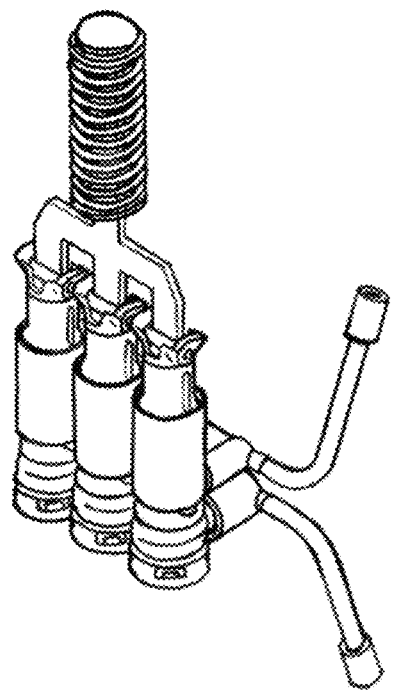
Figure 68D:
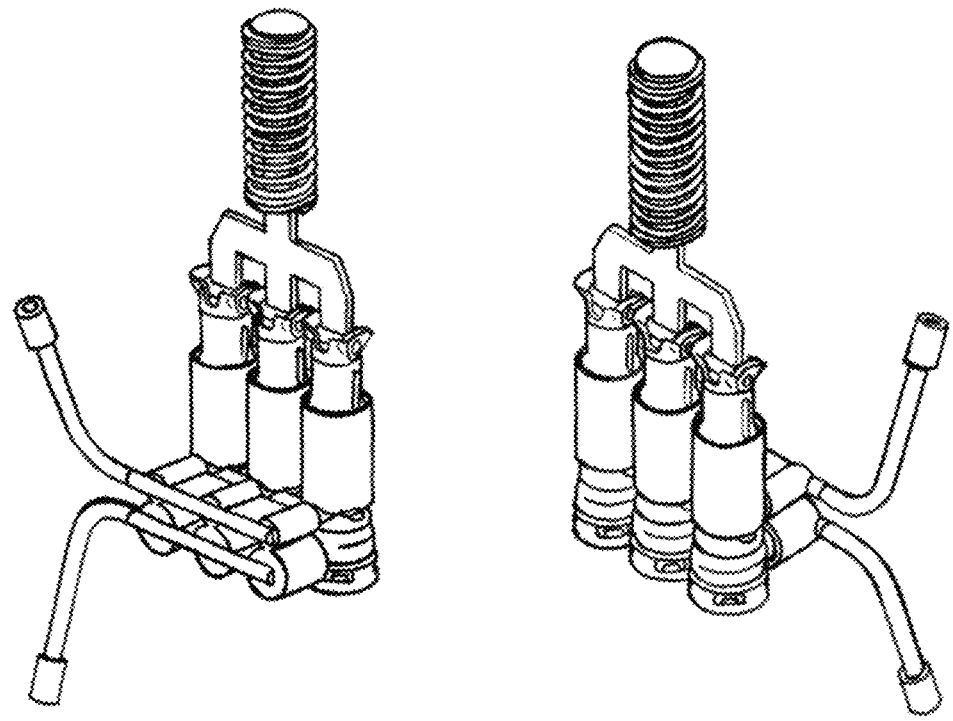

FIGS. 68A through 68D show how multiple pumps can be used with common inlet line and a common outlet or output line to increase output using a DuO1 type system. This is especially useful in contexts such as a "Flairomop" device, described below, and shown in FIG. 68A. As shown in FIGS. 68B and 68D, there can be a liquid container 6801 with container venting 6802 Container venting 6802 is not needed, of course, if a Flair bottle is used, because the venting in a Flair bottle is integrated in the container/bottle, and no head space is necessary to be maintained above the liquid in the liquid container. There can also be a spring 6803, a pusher 68044, pistons 6805, piston housing 6806, non-return valve inlet piston 6807, a separate inlet valve 6807A, which is optional, a non-return valve inlet to the nozzle or buffer 6808, and a separate valve inlet to the nozzle buffer 6808A. It is noted that inlet valve 6807A, when used, is connected to the container bottle and outlet line 6808A is connected to the buffer, and from there to the nozzle. As can be seen in FIG. 68, one can use one, two, three, four or more pistons and piston chambers in parallel, all of which may be, for example, simultaneously actuated by pusher 6804. Although to achieve similar results one could simply increase the size of the piston chamber, using multiple chambers in parallel allows for a standard unit to be manufactured, and increase of size simply achieved by adding units.

Flairomop—Floor Cleaner Using DuO1 Sprayer Technology

Finally, a novel device for cleaning floors and the like is next described. This device utilizes the novel new generation sprayer technologies described above, where the sprayer is essentially mounted upside down so as to spray on a floor. These devices are known as a "Flairomop" or a "Flairo-Washer", for example. They operate in similar fashion to the upright buffered sprayers described above, FIGS. 69A through 69E illustrate details of nozzle placement an exemplary Flairomop. As shown in FIG. 69B, the nozzles can be provided above the floor plate, or at the bottom of the floor plate, as shown in FIGS. 69C, 69D and 69E. If provided on the floor plate, for example, they can have either a single nozzle configuration as shown in FIG. 69C, a double nozzle configuration as shown in FIG. 69D, or multiple nozzles, such as is shown in FIG. 69E. A Flairomop can use a sprayer, of the various types described above, with various buffer types.

Thus, in exemplary embodiments of the present invention, a Flairomop can have three basic types: (i) small fanspray-nozzle, high pressure, useable with all buffers; (ii) small fanspray-nozzle, high pressure, useable with all buffers, direct action; and (iii) low pressure useable with all buffers.

General Features

General features of an exemplary Flairomop can include, for example, an output greater than 3 cc, the ability to produce a fan spray, the ability to produce all types of spray and foam functions, the use of pre-compression with a normally closed front or outlet valve, the use of a Flair container holding between 250 and 1000 cc's, no blockage of opening due to drying in of liquid, broad chemical resistance to detergents solvents, olive oil etc., a low trigger force required to actuate. Optionally, for example, the Flair bottle can also be used with a lock-out mechanism, as described above.

Flairosol Based Flairomop

Figure 70B:
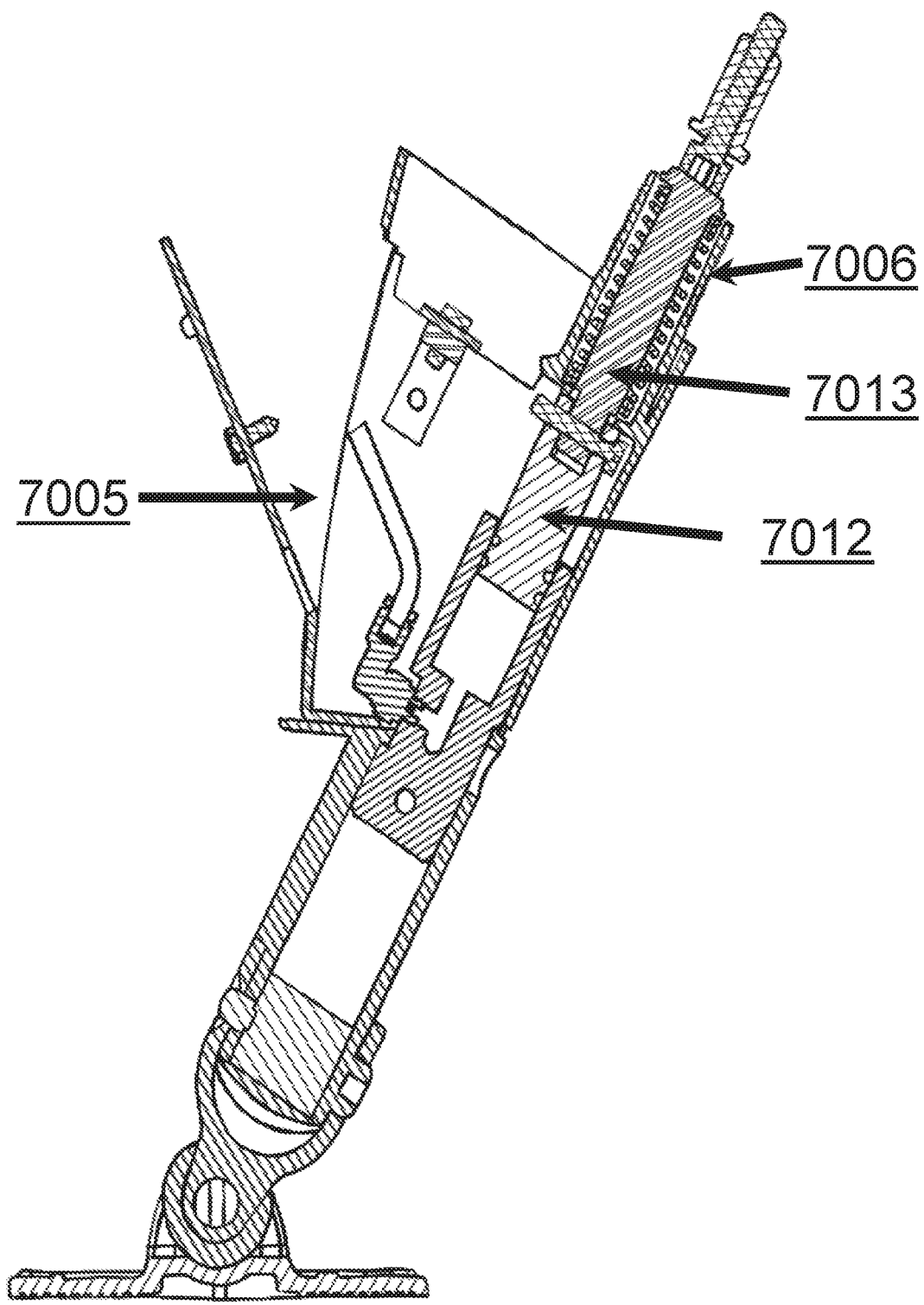
FIG. 70 presents the general properties of a Flairomop device according to exemplary embodiments of the present invention.

FIG. 70 illustrates an exemplary Flairomop using a standard Flairosol sprayer mechanism. This is essentially a spring buffered non-inline sprayer system built onto an existing Flairomop prototype. As shown in FIG. 70(*a*), there can be a fanspray nozzle, and liquid can be pushed into the integrated buffer. After triggering, the spring will push back the buffer piston to dispense the contents of the buffer, as described above. Thus, there is a connector, a piston closure, a standard Flairosol sprayer head, a Flairosol integrated buffer and a Flair bottle. As shown in FIG. 70(*b*), by triggering the handle at the shaft, the piston can be pushed downwards and the spring biasing the piston will push it back upwards, making it available once again for a user. In this particular example, using a 16 mm boring and a 21 mm stroke length for the piston chamber, about 4 cc of liquid can be moved per stroke. Of this, a certain amount is pushed through the nozzle, but the remaining portion goes into the integrated buffer.

High Pressure Continuous Spray Single Nozzle

FIGS. 71 and 72, show an exemplary embodiment of a Flairomop designed to produce a high pressure continuous spray. As shown in FIG. 71, when a user triggers, the complete volume of the piston chamber will be dispensed. Because the output of the piston chamber is bigger than that which the nozzles can handle, the remainder of the liquid from the piston chamber will be stored in the buffer for later dispensing. There is no direct stop, however, as in the case of a direct action sprayer ("direct stop" and "direct action" are used inter-changeably in this disclosure, for a sprayer that ceases spraying immediately upon a user letting go of the trigger), and dispensing will stop as the buffer is emptied and the liquid falls below the set pressure of pre-compression valve 8, which can be, for example, between 2-6 barg, such as, for example, say 2.2 barg in some embodiments.

Figure 71C:
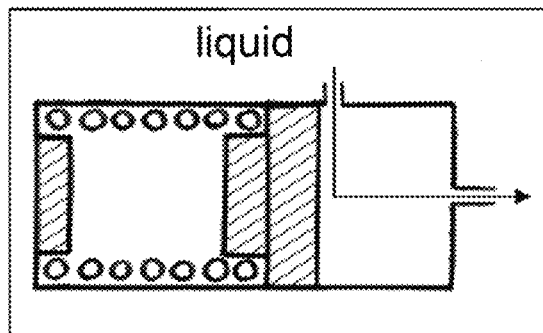
FIGS. 71 through 74 illustrate details of producing a high pressure continuous spray for a Flairomop device according to exemplary embodiments of the present invention.
Figure 71D:
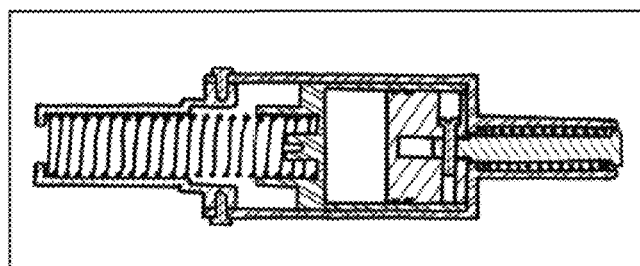
Figure 71E:
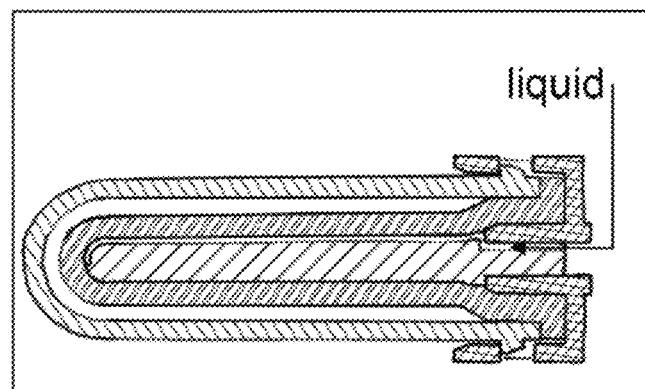
Figure 71F:
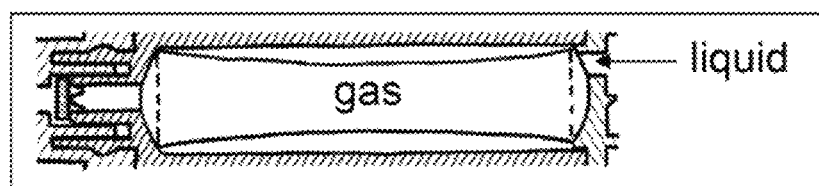
Figure 72A:
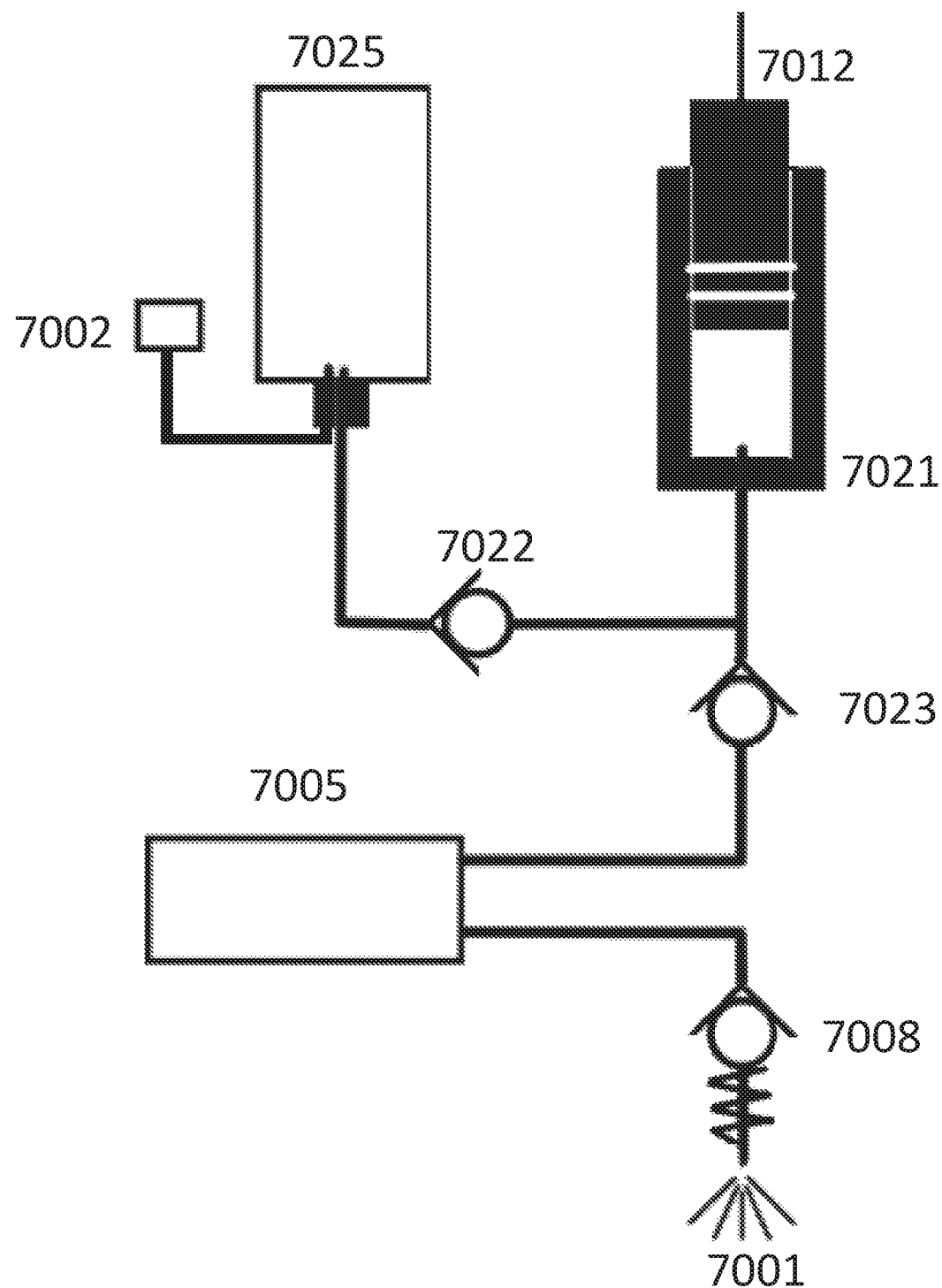
Figure 72B:
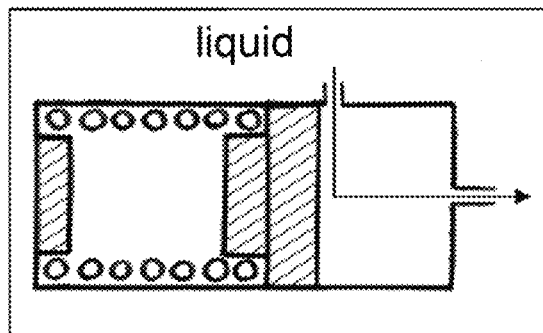
Figure 72C:
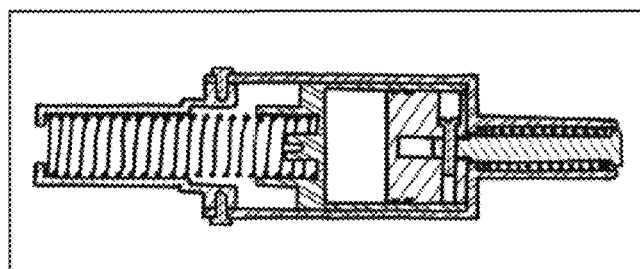
Figure 72D:
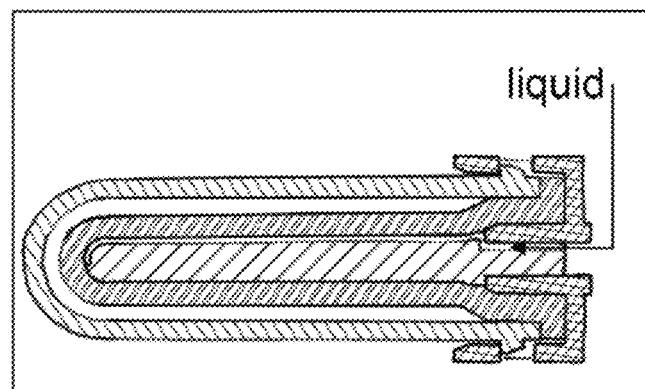
Figure 72E:
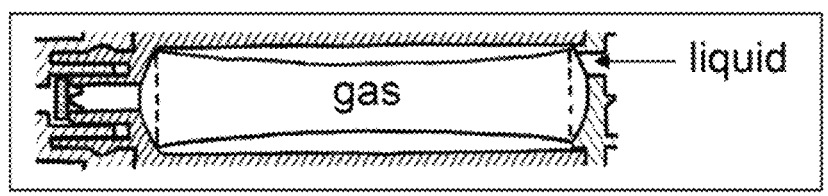

FIG. 72A is a schematic diagram of the system of FIG. 71. With reference thereto, there is shown a liquid container 7701, optional container venting 7702 for use with non-Flair bottles, piston 7703, piston housing 7704, and non-return inlet valve for the piston 7705, non-return inlet valve for the buffer 7706, buffer 7707, pre-compression valve 7708 and nozzle 7709. It is noted that this embodiment uses a standard separate piston, but, as noted above, a novel stretched piston could also be used. As shown in FIG. 72A, this is a high pressure system with a liquid buffer. As the piston moves upwards, liquid is drawn from the liquid container due to the under-pressure which is created. The container either needs to have air venting 2, or needs to use a Flair type bottle, as described above, which requires no venting.

Next, by a user pushing the piston downwards the liquid is forced to go to the nozzle, or multiple nozzles, as shown in FIG. 69 above. Because of the restriction of the nozzles as far as handling volumes of liquid per unit of time, a certain portion of the liquid will go into the buffer, such as, for example, ⅔ of the liquid, and generally always more than half of the liquid in the piston chamber, the exact fraction depending upon the piston chamber volume and diameter, and the restriction in the nozzle(s). The buffer will then be filled with liquid and the pressure in the buffer will increase. As the piston reaches the end of its downstroke, the liquid collected in the buffer will then be dispensed through the nozzle(s) as there is no longer any liquid being pushed out of the piston chamber. As shown in FIGS. 72B through 72E, the buffer can be any of the various types described above such as, for example, spring loaded, spring loaded in-line, elasticity material, or gas loaded. In preferred exemplary embodiments, a gas loaded buffer can be used. Additionally, gas buffers can be used that hold the liquid on the outside of a central gas filled bag, or for example, a liquid can be pumped in the interior of a surrounding gas shell, in the nature, shape wise, of the elasticity material buffer shown in FIG. 71.

High Pressure Continuous Spray Multiple Nozzle

In a manner wholly analogous to FIGS. 71 and 72, FIGS. 73 and 74 show an exemplary high pressure continuous spray Flairomop embodiment with two nozzles on the floor plate, as opposed to one nozzle provided on the handle, under the buffer, as shown in FIG. 71B. In all other respects it is identical to the exemplary embodiment of FIGS. 71 and 72. The continuous spray is achieved by use of the buffer, as described above. As shown above in FIG. 1, as long as the buffer volume v2 is at least as large as the volume of liquid sent to it in each stroke v1, the buffer can then dispense such excess (shown as top of curve above upper pressure line Pmax, and then moved to fill in between pumping strokes, in far right image of FIG. 1) v1 between strokes. The number of strokes per minute necessary to maintain continuous spray is thus a function of the fraction of the liquid in the piston chamber sent to the buffer each stroke, the type of nozzle, and the opening pressure in the pre-compression outlet valve, and can be adjusted using those parameters, for various systems as desired.

Figures 73A, 73B:
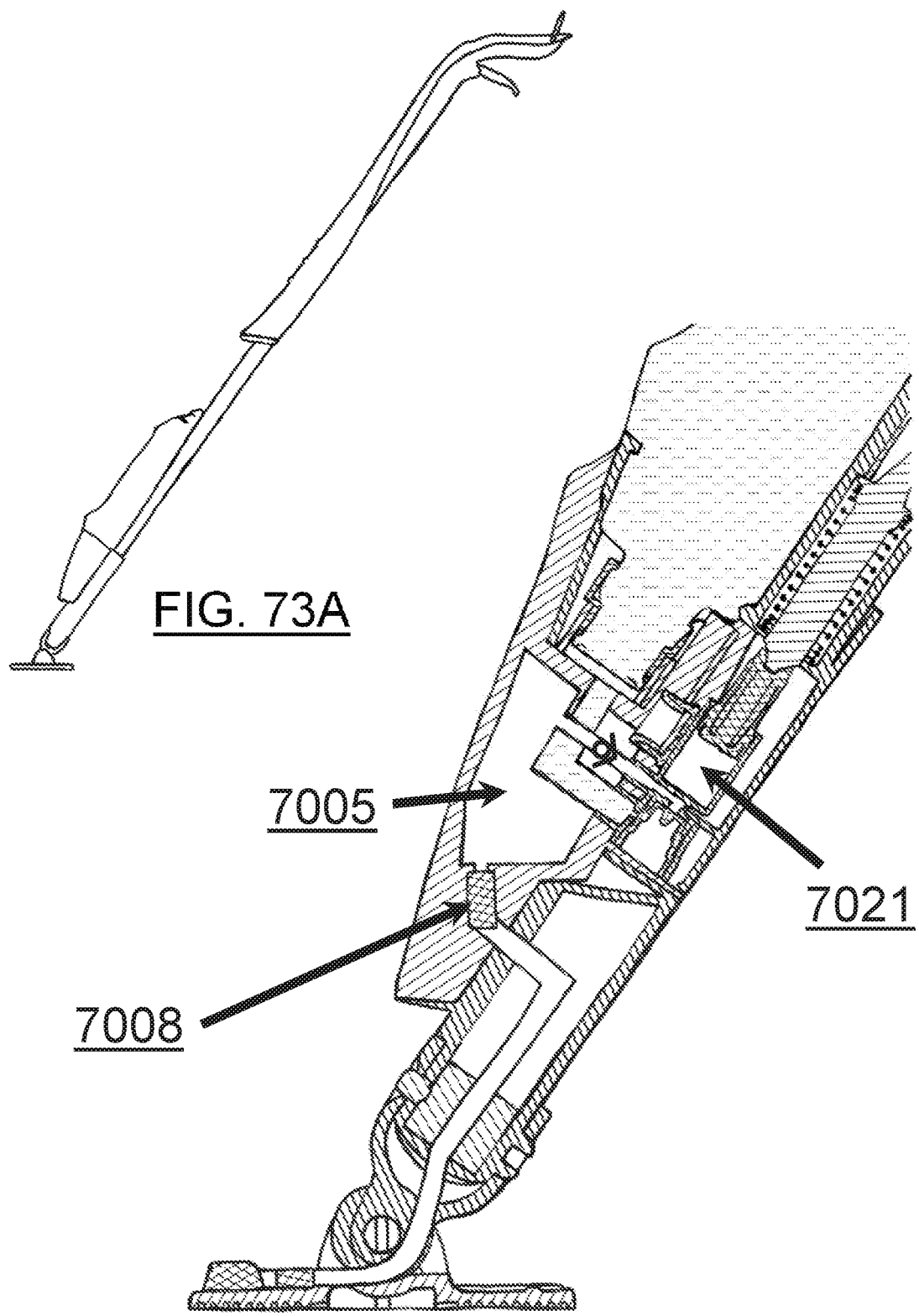
Figure 73C:
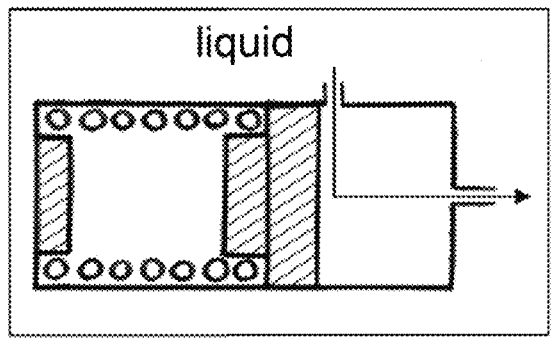
Figure 73D:
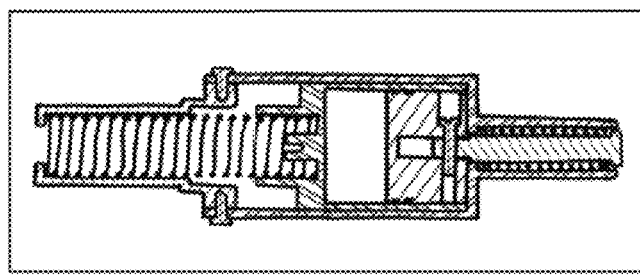
Figure 73E:
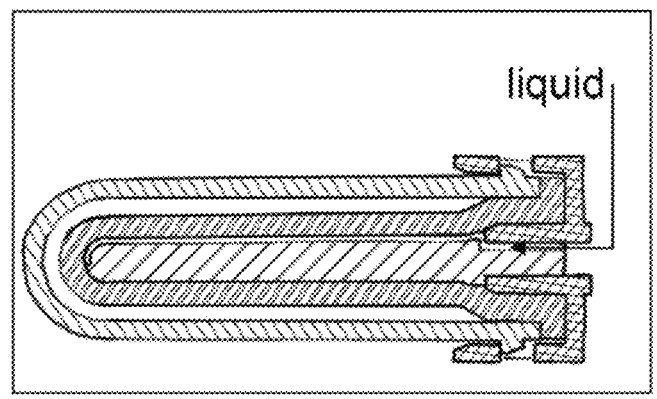
Figure 73F:
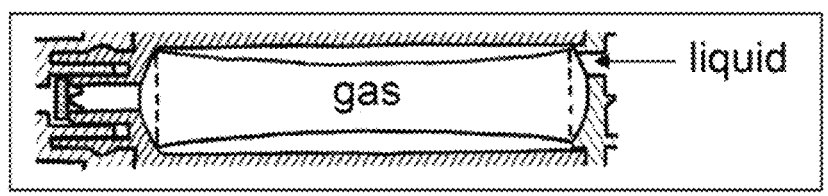

As shown in FIGS. 73A and 73B, once a user has triggered, the complete volume of the piston will be dispensed. Because the output of the piston is bigger than that which the nozzle(s) can handle to dispense, the rest of the liquid will be stored in the buffer, and will be dispensed later. There is no direct stop in this embodiment. The dispensing will thus stop as the buffer empties at the set pressure of the pre-compression valve.

Figure 74A:
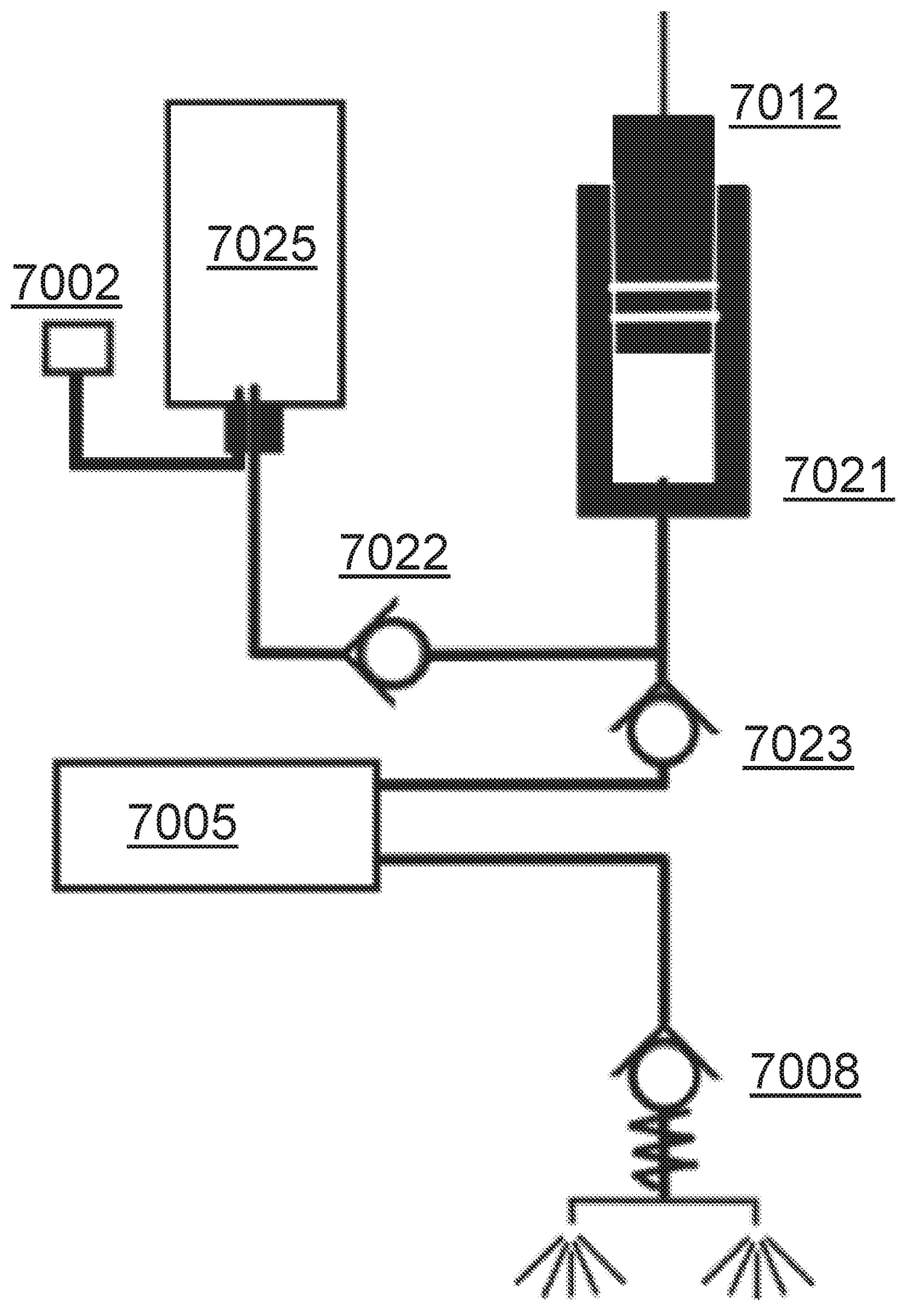
Figure 74B:
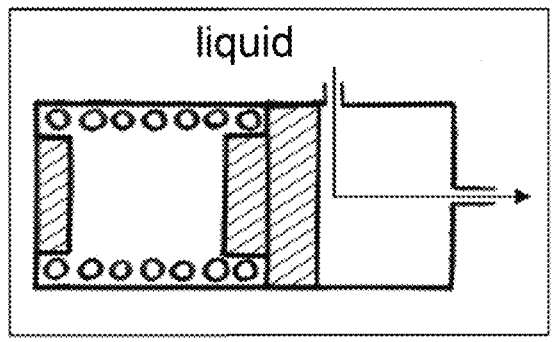
Figure 74C:
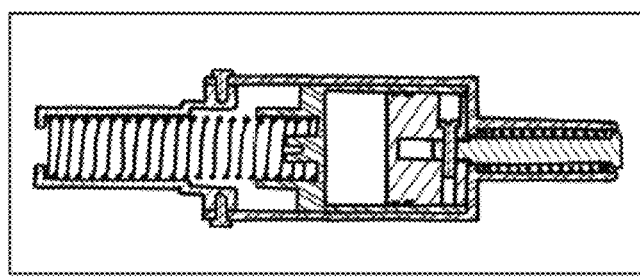
Figure 74D:
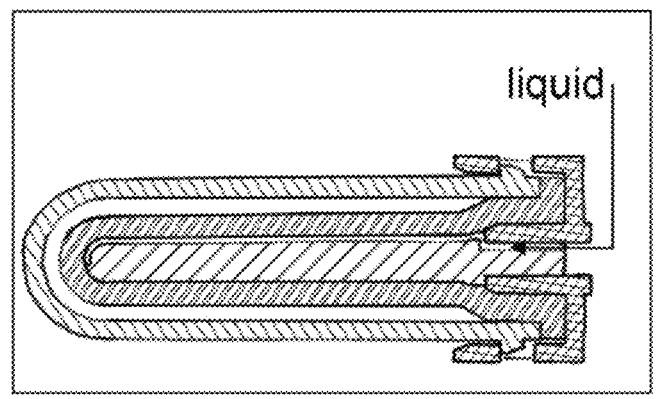
Figure 74E:
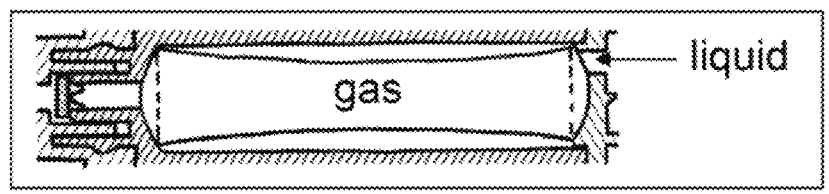
Figures 75A, 75B:
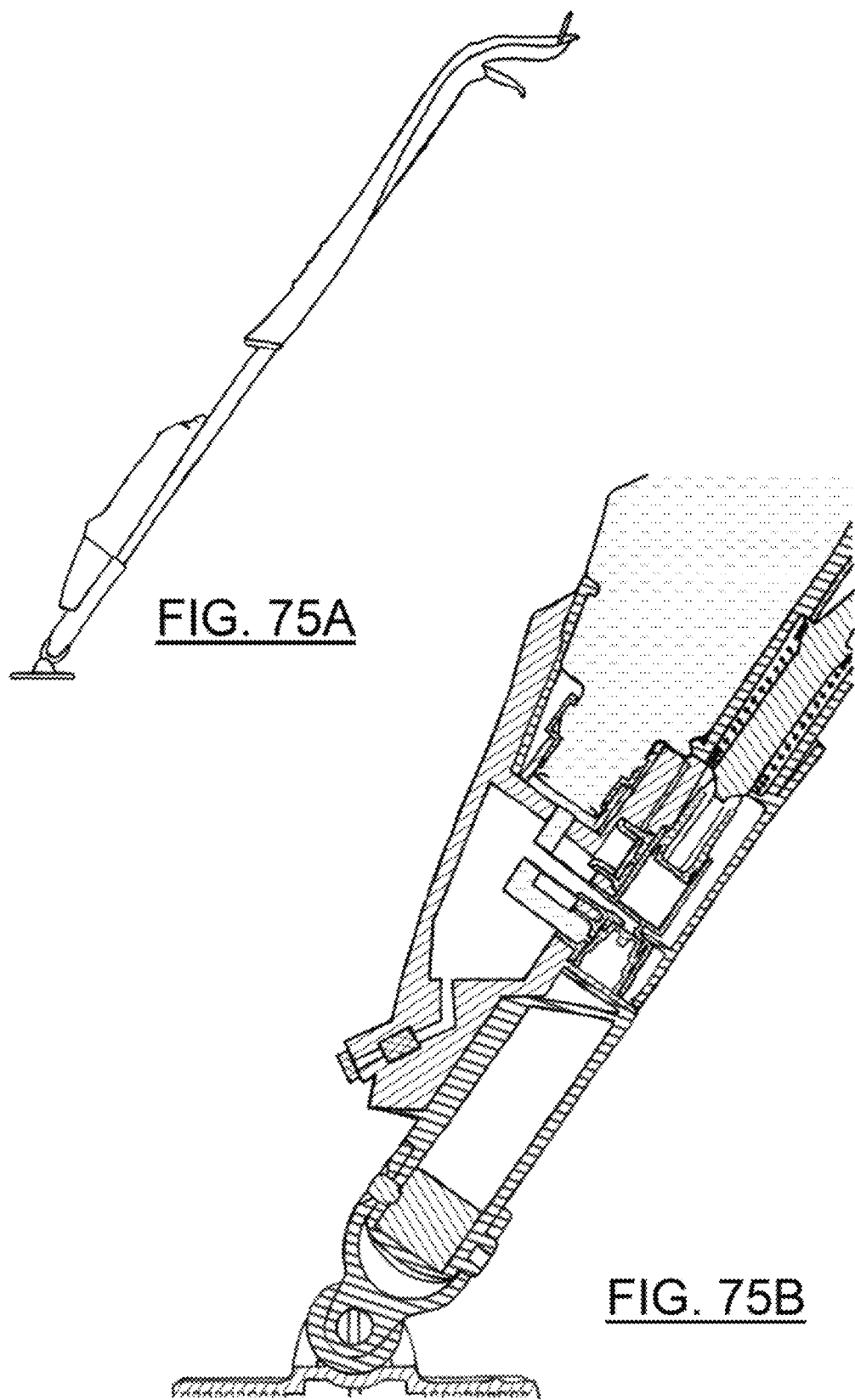
FIG. 75 illustrates an exemplary Flairomop device operating under high pressure with direct action according to exemplary embodiments of the present invention.
Figure 75C:
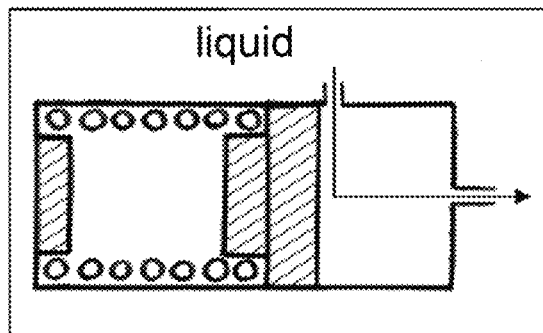
Figure 75D:
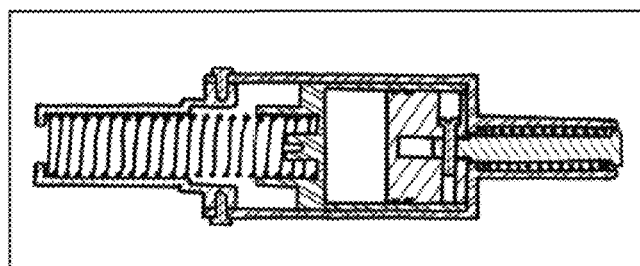
Figure 75E:
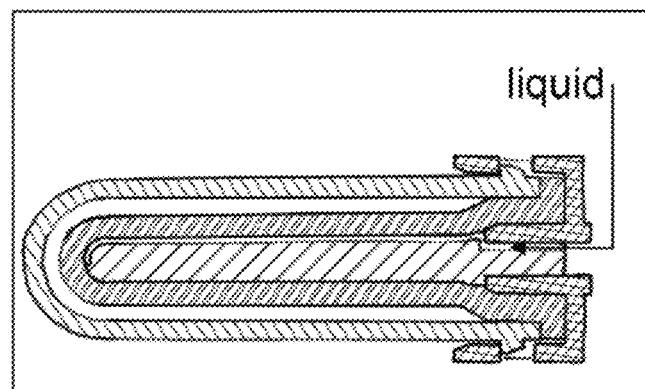
Figure 75F:
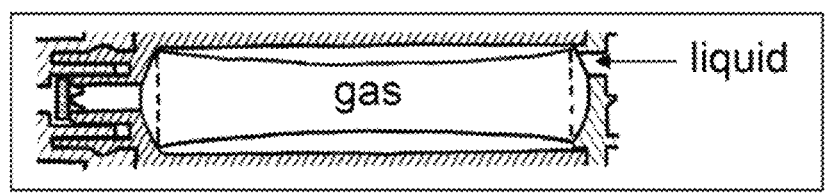
Figure 76A:
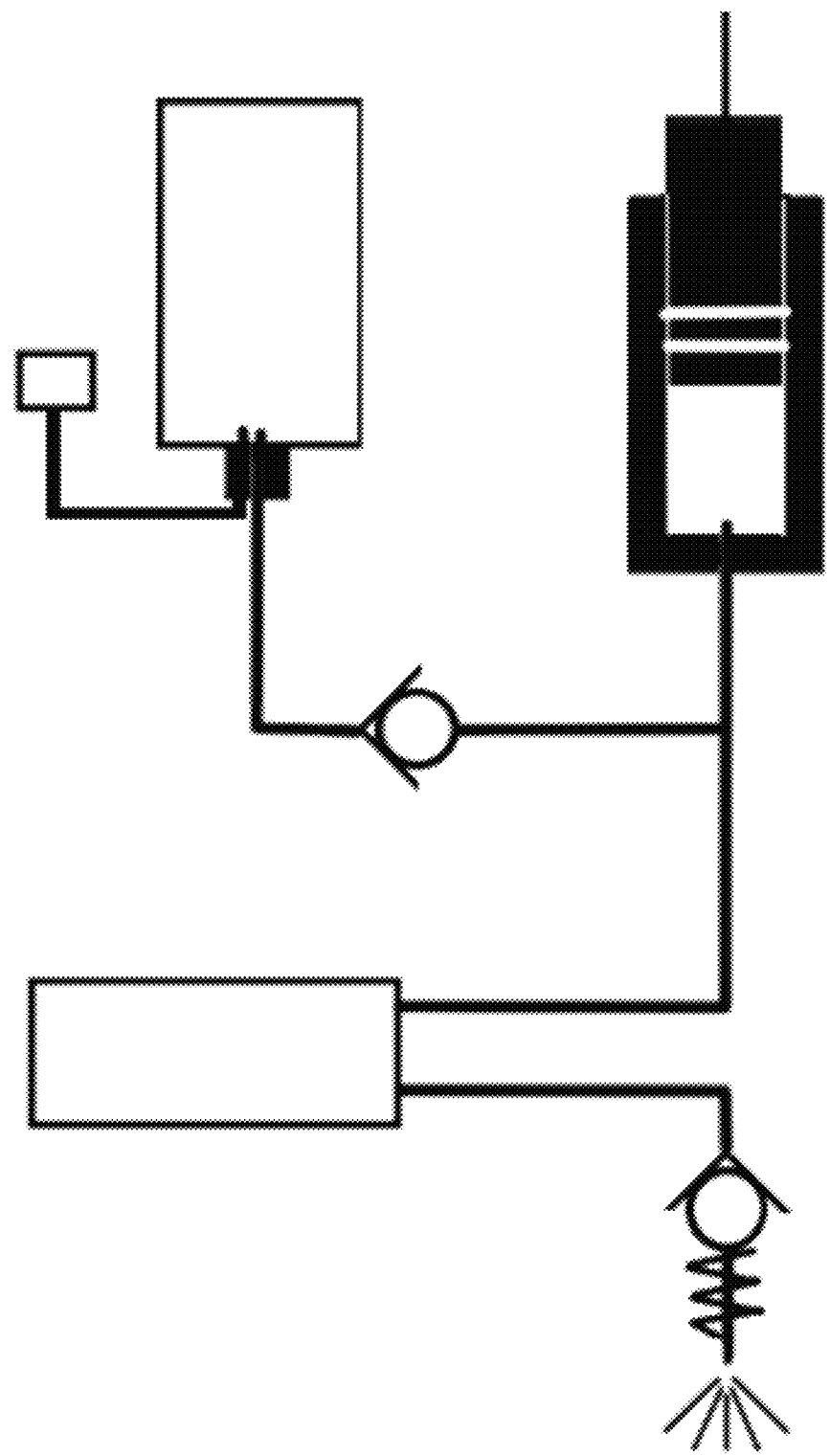
FIG. 76 provides operational details of the exemplary Flairomop high pressure direct action device presented in FIG. 75.
Figure 76B:
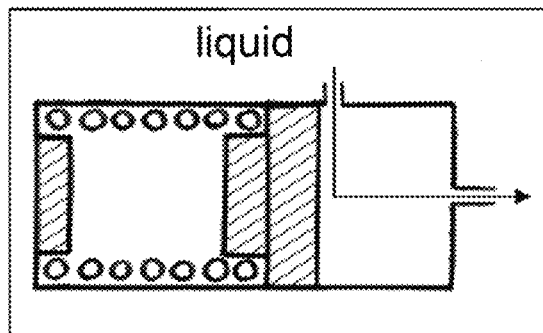
Figure 76C:
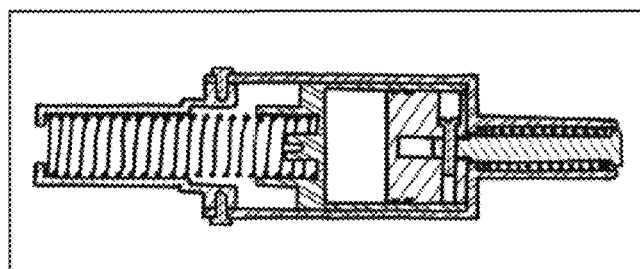
Figure 76D:
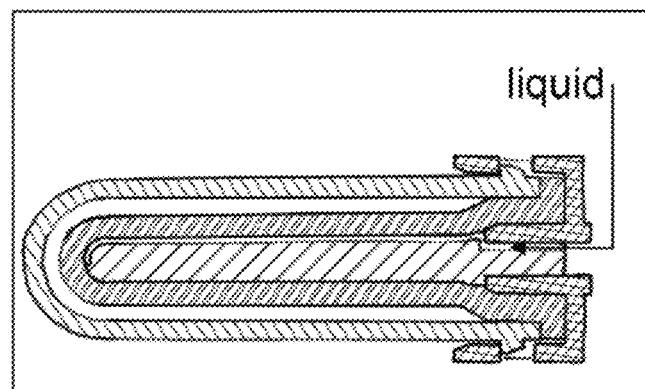
Figure 76E:
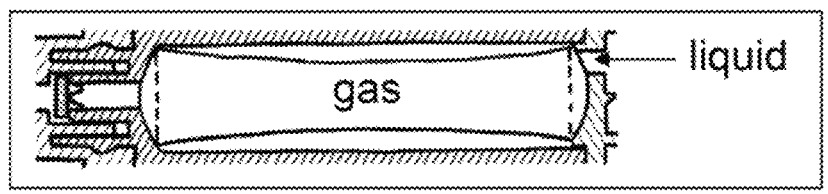
Figures 77A, 77B:
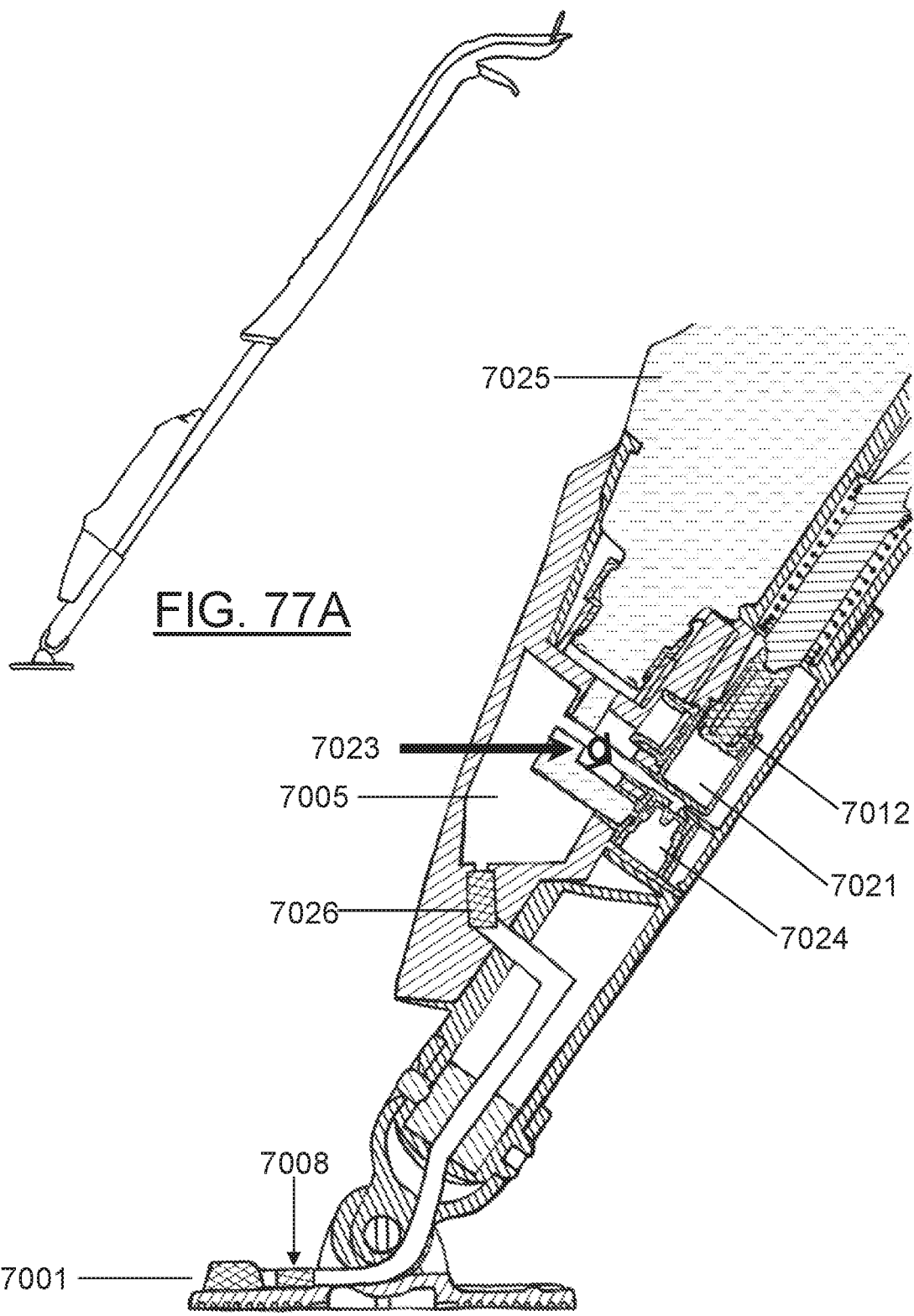
FIG. 77 presents an exemplary Flairomop operative at low pressure device according to exemplary embodiments of the present invention.
Figure 77C:
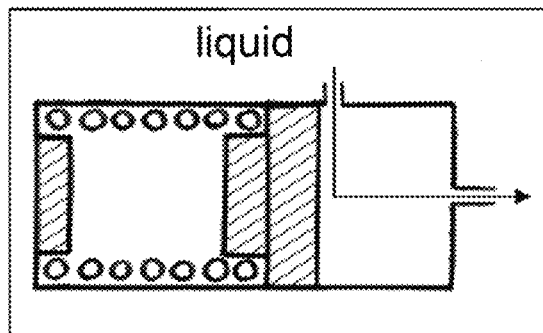
Figure 77D:
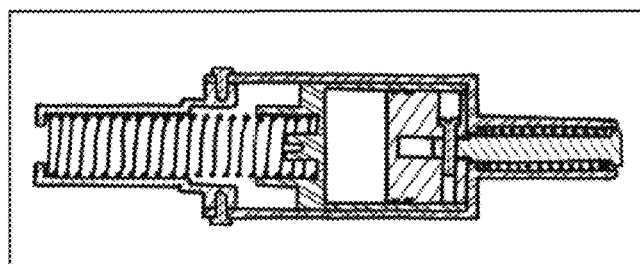
Figure 77E:
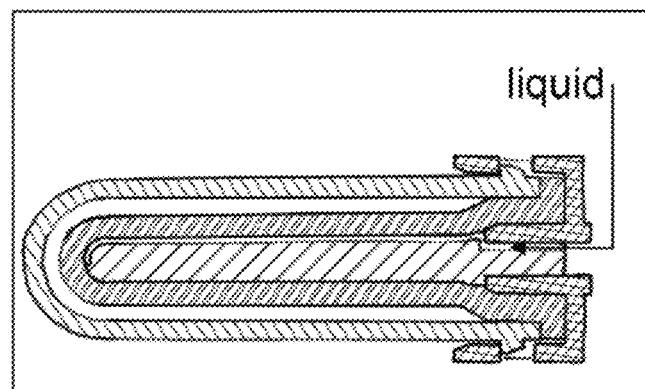
Figure 77F:
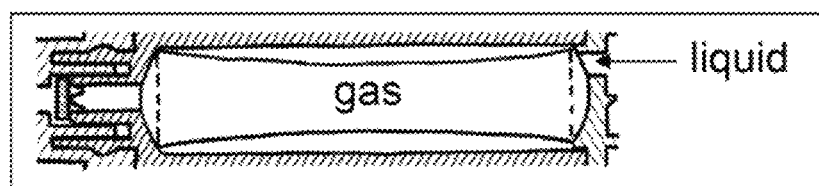
Figure 78A:
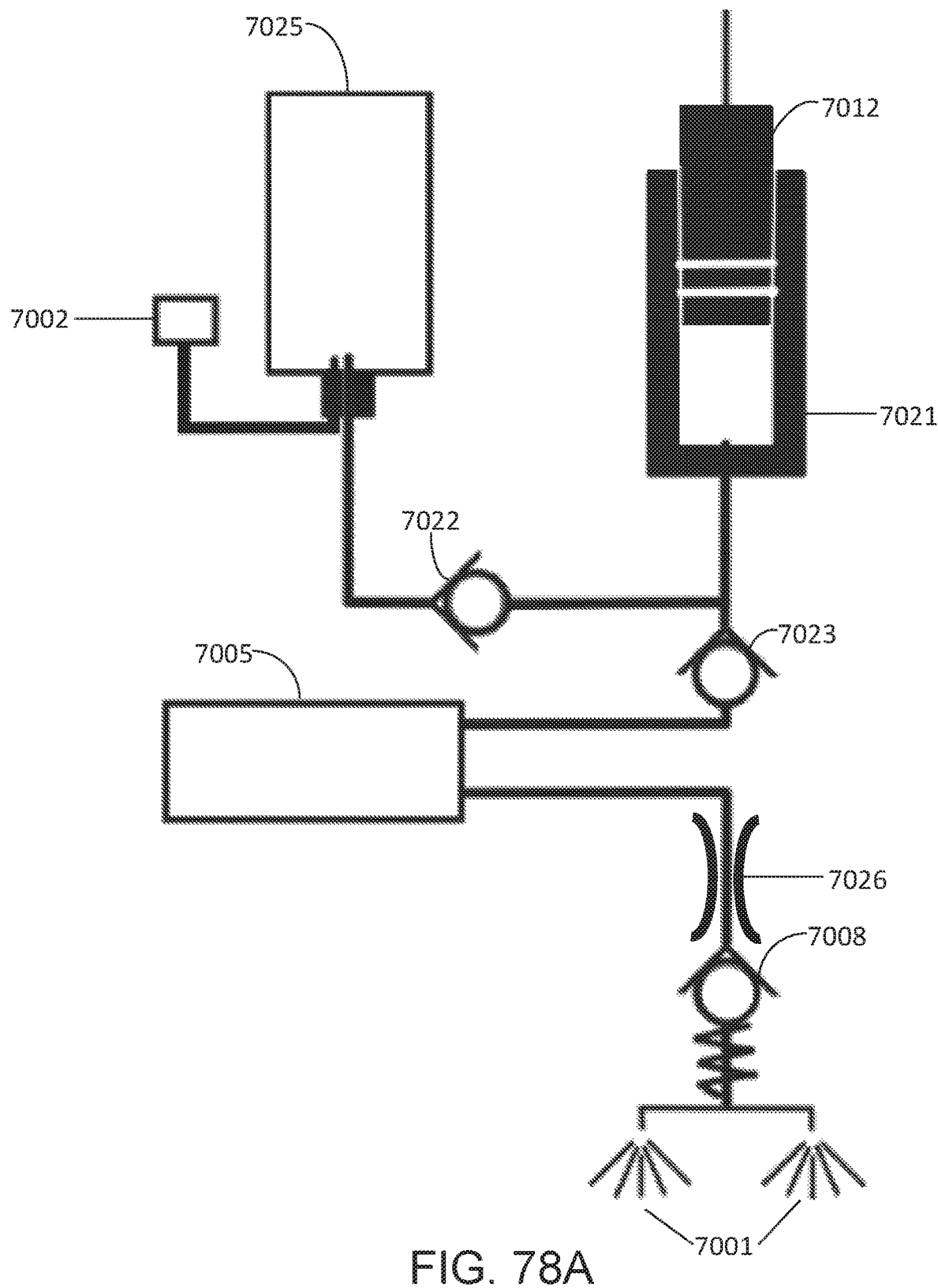
FIG. 78 illustrates further operational details of the Flairomop low pressure device presented in FIG. 77.
Figure 78B:
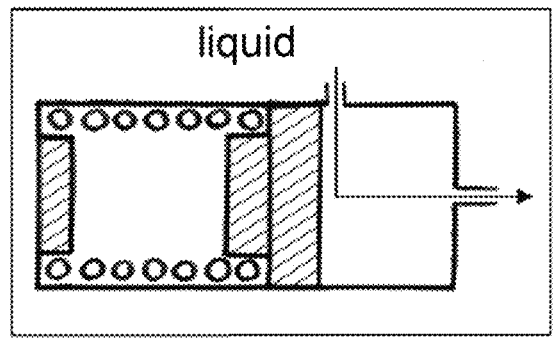
Figure 78C:
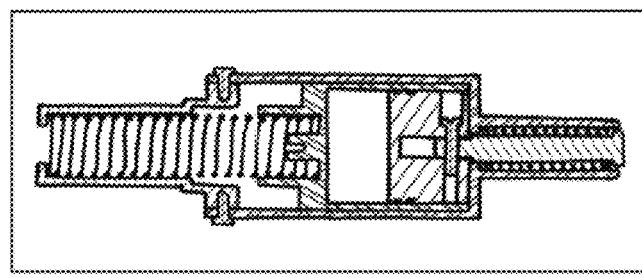
Figure 78D:
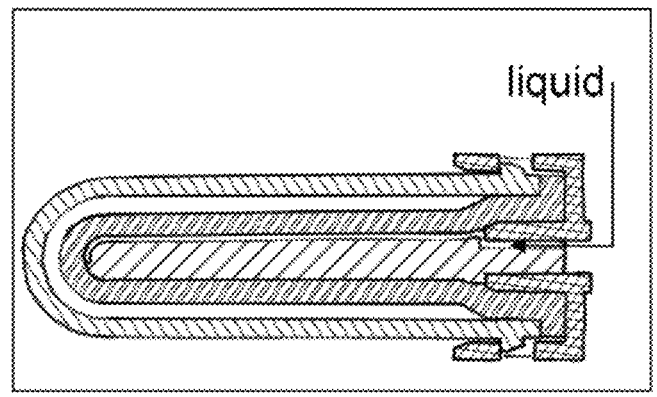
Figure 78E:
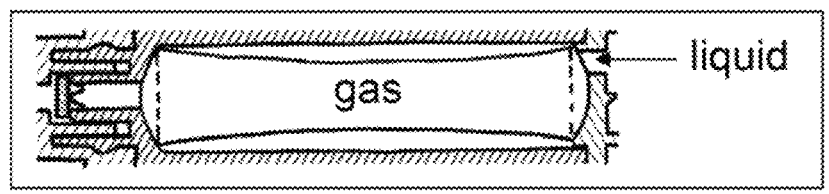

As shown in FIG. 74A, this is a high pressure system with liquid buffer.

By the piston movement upwards liquid is taken from the liquid container due to the under pressure which is created. The container needs an air venting or Flair (bag within a bag) bottle.

By pushing the piston downwards the liquid is forced to go to the (multiple) nozzle(s) AND due to the nozzle output restriction, into the buffer. The buffer will be filled with liquid and the pressure in the buffer will increase.

As the piston is at the end of its stroke downwards, the liquid collected in the buffer will be dispensed through the nozzle(s). With Flairosol (or other Flair type systems) venting is not necessary because the venting is integrated in the container/bottle. Venting is needed when a standard container/bottle is used.

High Pressure Direct Action

FIGS. 75 and 76 illustrate an exemplary high pressure direct action Flairomop device with one nozzle. In all other respects it is identical to that shown in FIGS. 71 and 72 except that, being a "direct action" type, there is no non-return inlet valve for the buffer keeping liquid form escaping the buffer back to the piston chamber. Thus, when a user releases the trigger, there is a direct stop: liquid will flow back into the piston chamber, thus stopping the spray.

As shown in FIG. 75, once a user has triggered, the complete volume of the piston will be dispensed as long as the user holds the trigger. Because the output of the piston is bigger than that which the nozzle(s) can handle to dispense, the rest of the liquid will be stored in the buffer, and will be dispensed later. There is a direct stop in this embodiment once the trigger is released. Liquid will flow back into the piston chamber (no non-return valve inlet buffer).

As shown in FIG. 76, this is a high pressure system DIRECT ACTION with liquid buffer. By the piston movement upwards liquid is taken from the liquid container due to the under pressure which is created. The container needs an air venting or Flair (bag within a bag) bottle.

By pushing the piston downwards the liquid is forced to go to the (multiple) nozzle(s) AND due to the nozzle output restriction, into the buffer. The buffer will be filled with liquid and the pressure in the buffer will increase.

As the piston is at the end of its stroke downwards, the liquid collected in the buffer will be dispensed through the nozzle(s). With Flairosol (or other Flair type systems) venting is not necessary because the venting is integrated in the container/bottle. Venting is needed when a standard container/bottle is used.

Low Pressure Flairomop

Finally, FIGS. 77 and 78 illustrate an alternate exemplary embodiment of a Flairomop, one that operates at low pressure. In this exemplary embodiment there are two nozzles 7709 on the floor plate, as described above. There is also added a restrictor 7707 to control the amount of output that can be sent through the nozzle path each stroke. The main differences between the lower pressure Flairomop of FIGS. 77 and 78 and the high pressure versions of FIGS. 71-76 is the opening pressure of pre-compression valve 7708. Because the size of the piston 7703, as well as the piston housing 7704, are increased in this exemplary embodiment, the operating pressure must be lowered in order to reduce the necessary triggering force. This results in greater output with a lower force required for each stroke, which is useful for people, such as, for example, older persons, who wish to clean a floor or other surface and do not have the strength to really push hard many strokes per minute. Once a user has triggered, the complete volume of the piston 7703 will be dispensed. However, because the output of the piston chamber 7704 is by design larger than that which the nozzles 7709 can handle, the rest of the liquid will be stored in the buffer 7706 for later dispensing. In contrast to some of the embodiments described above, such as are shown in FIGS. 75-76, there is no direct stop as the trigger is released. Thus, there is a non-return inlet valve 7705 for the buffer, which causes the buffer 7706 to dispense its contents until the pressure in the buffer 7706 drops below that of the opening pressure of pre-compression valve 7708, even after the user releases the trigger. Alternatively, a direct action embodiment of this version could also be made, which allows a user to stop the dispensing form the buffer immediately upon releasing the trigger. Although this gives greater control, it requires holding the trigger down (against the force of the spring) at all times dispensing is desired, which is often less convenient. FIG. 78, analogous to the other schematics described above, is a schematic for the exemplary embodiment of FIG. 77. Thus, shown in FIG. 78 are liquid container 7701, container venting 7702, piston 7703, piston housing 7704, non-return valve inlet piston 7705, non-return valve inlet buffer 7705A, buffer 7706, restrictor 7707, pre-compression valve 7708 and nozzles 7709.

As shown in FIG. 78, this is a low pressure system with liquid buffer.

By the piston movement upwards, liquid is taken from the liquid container due to the under pressure which is created. The container needs an air venting or Flair bottle.

By pushing the piston downwards the liquid is forced to go to the (multiple) nozzle(s) AND due to the nozzle output restriction, into the buffer.

The buffer will thus be filled with liquid and the pressure in the buffer will increase.

As the piston is at the end of its stroke downwards, the liquid collected in the buffer will be dispensed through the nozzle(s). With Flairosol (bag in a bag technology), venting is not necessary because the venting is integrated in the container/bottle. Venting is needed when a standard container/bottle is used.

Continuous Stop Engine

FIGS. 79-85, next described, illustrate a continuous stop engine. Following that, FIGS. 86-90 illustrate an improved stopping feature. Finally, FIGS. 91-92 illustrate a further improvement to the stopping feature.

Figure 79:
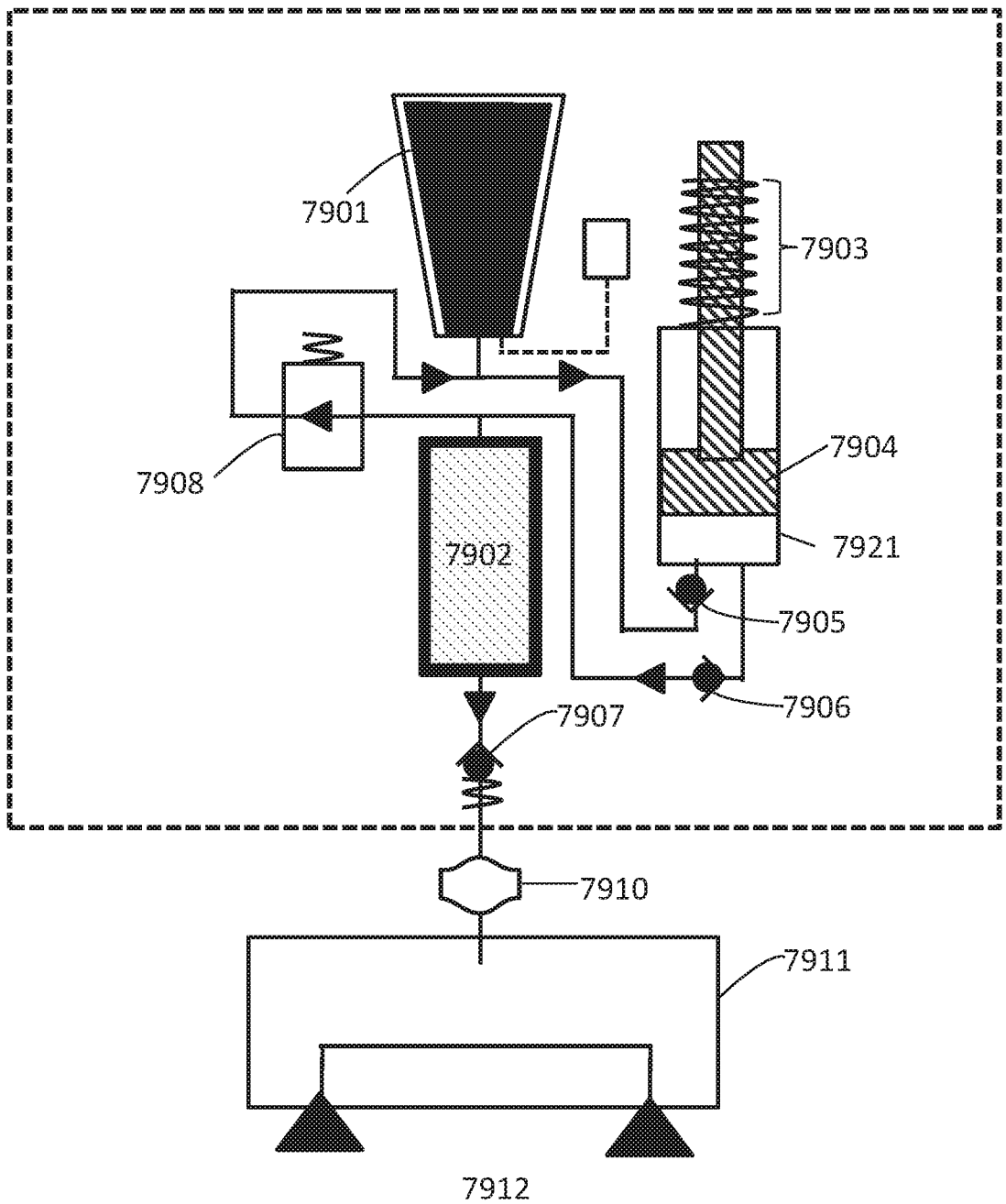
Figure 80C:
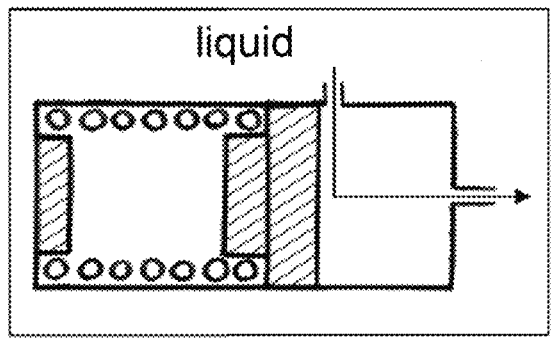
Figure 80D:
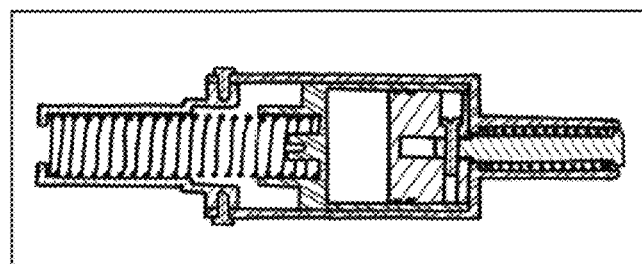
Figure 80E:
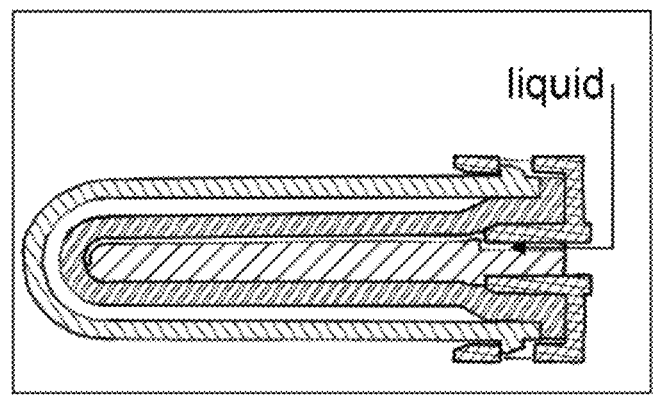
Figure 80F:
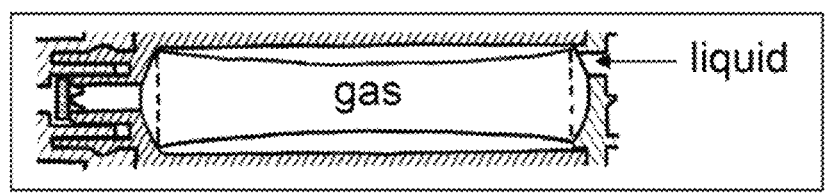
Figure 82A:
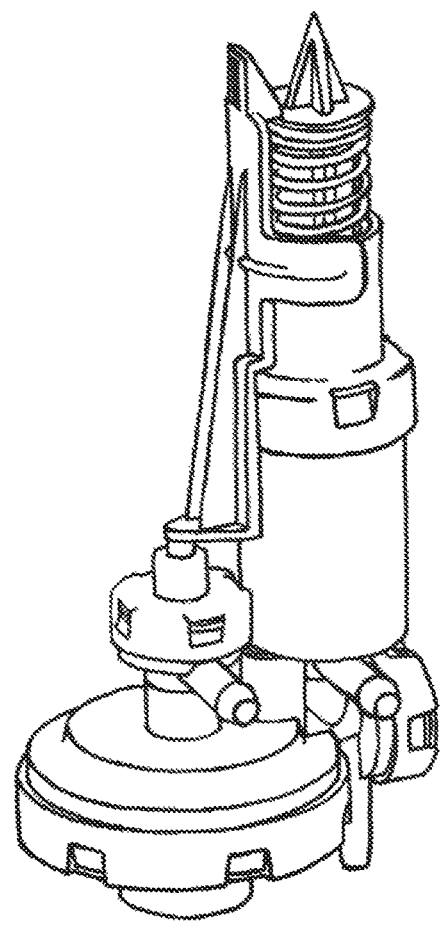
Figure 82B:
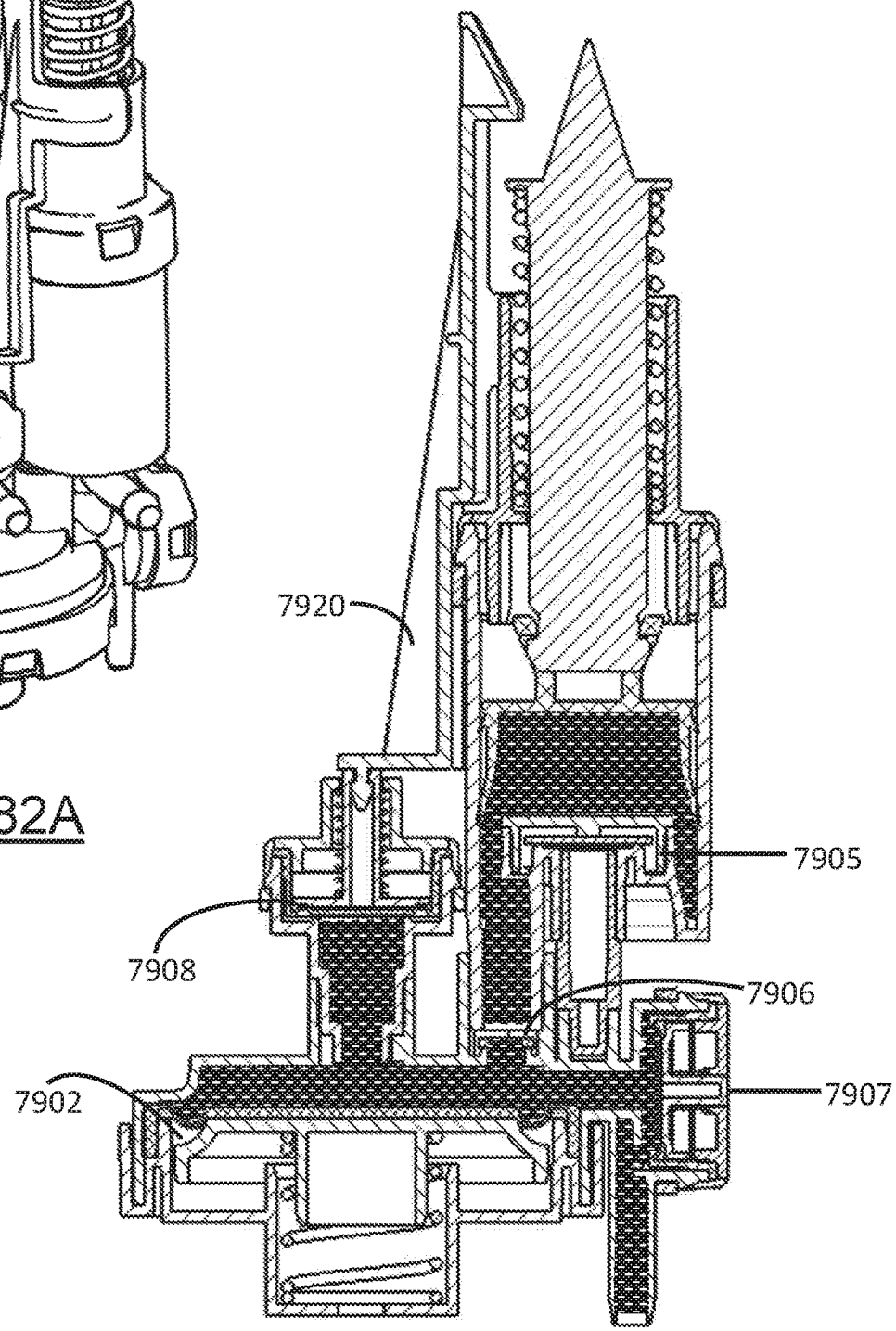
Figure 83A:
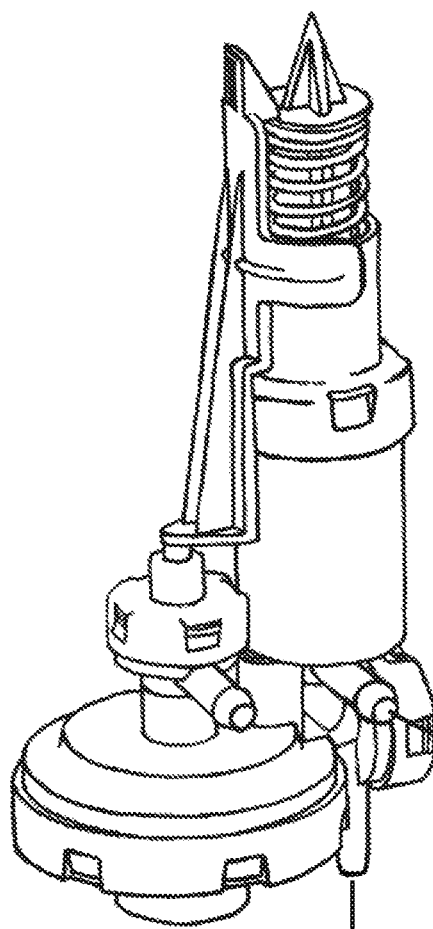
Figure 83B:
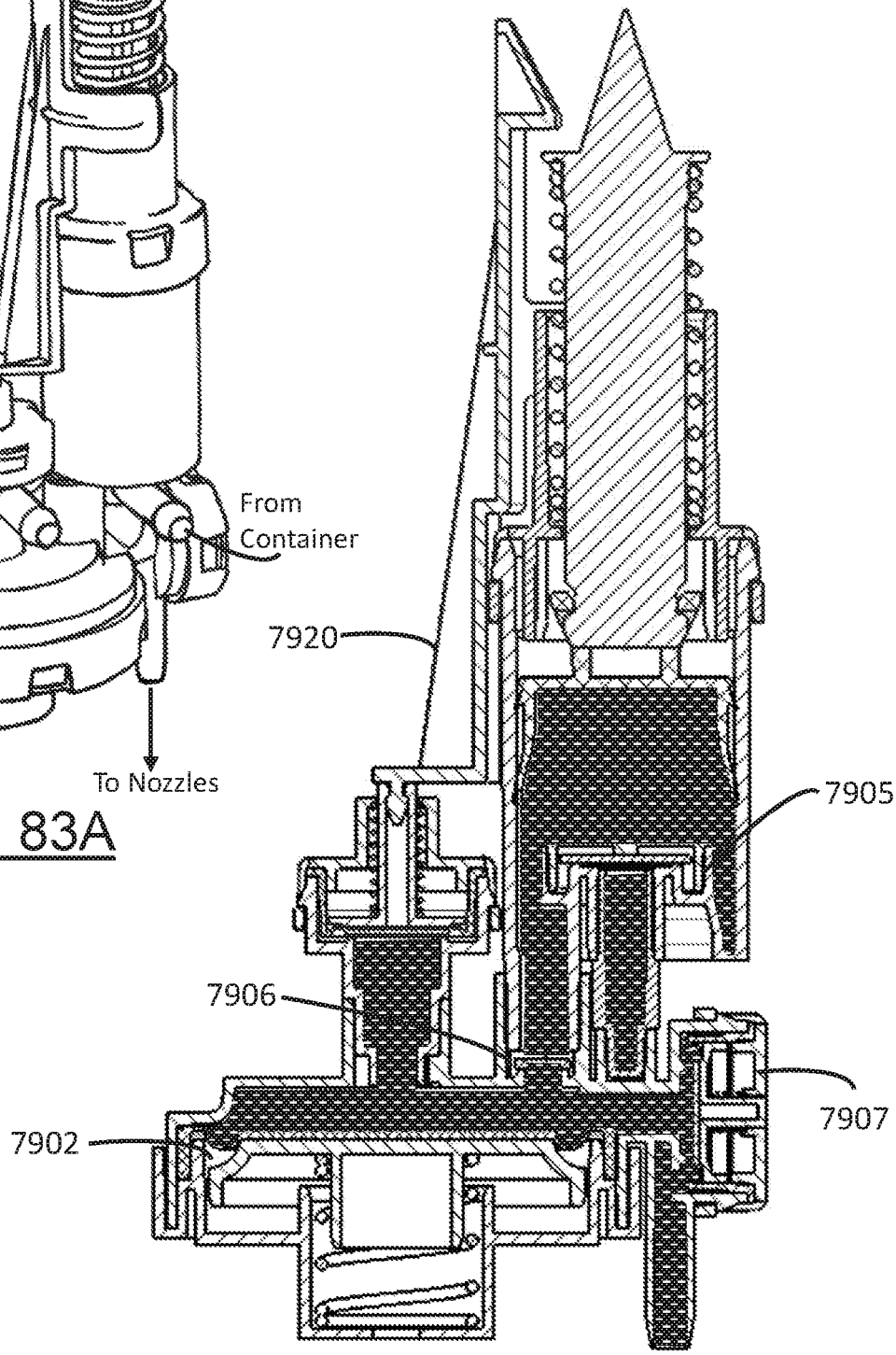
Figure 84:
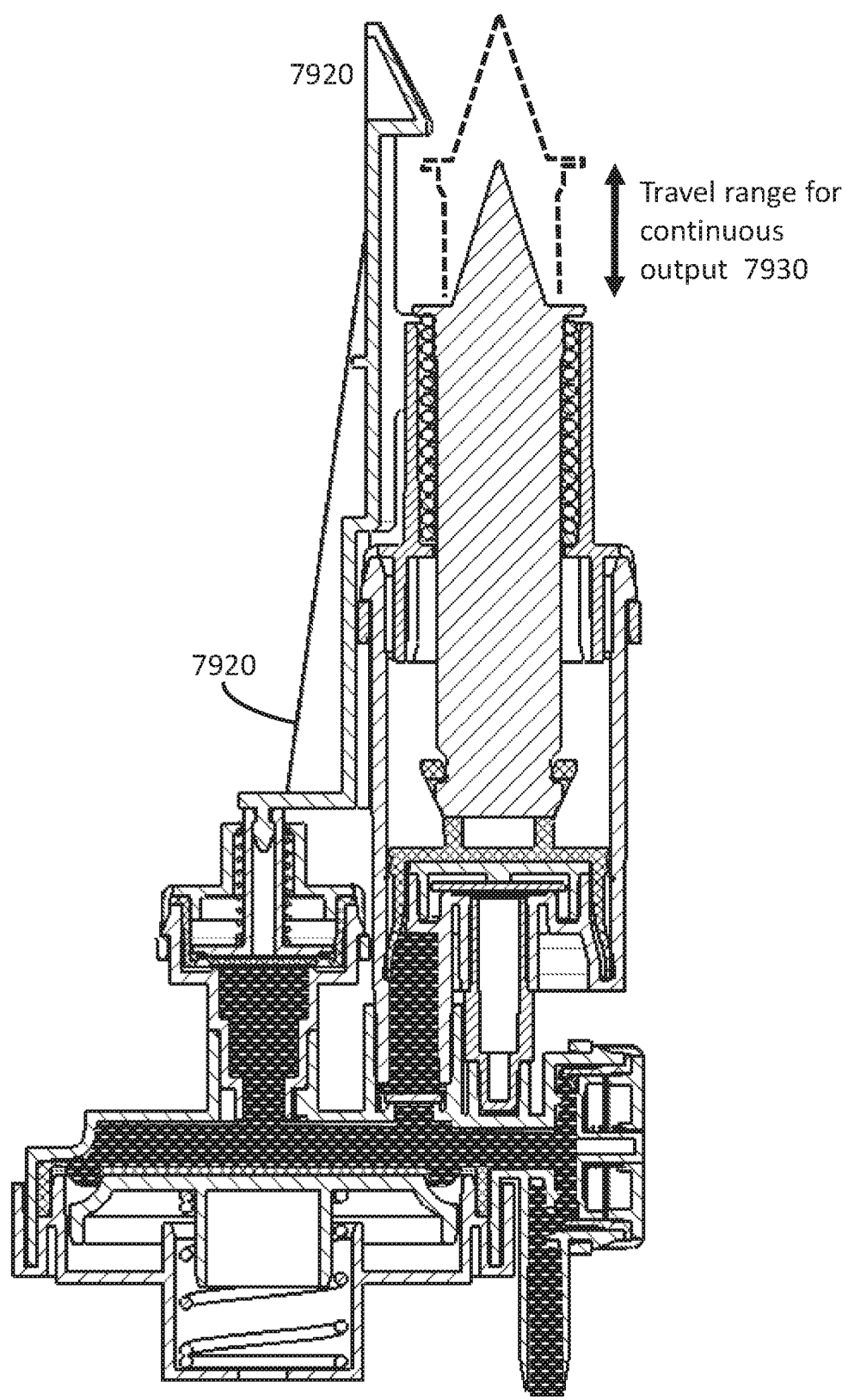
Figure 85A:
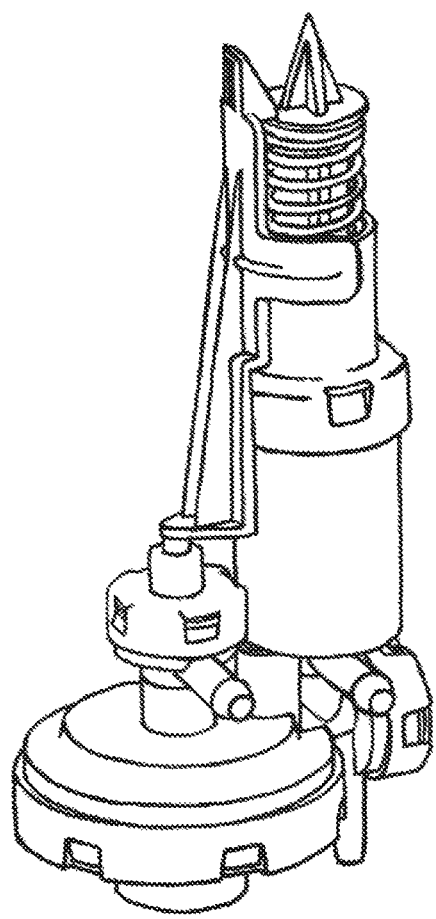
Figure 85B:
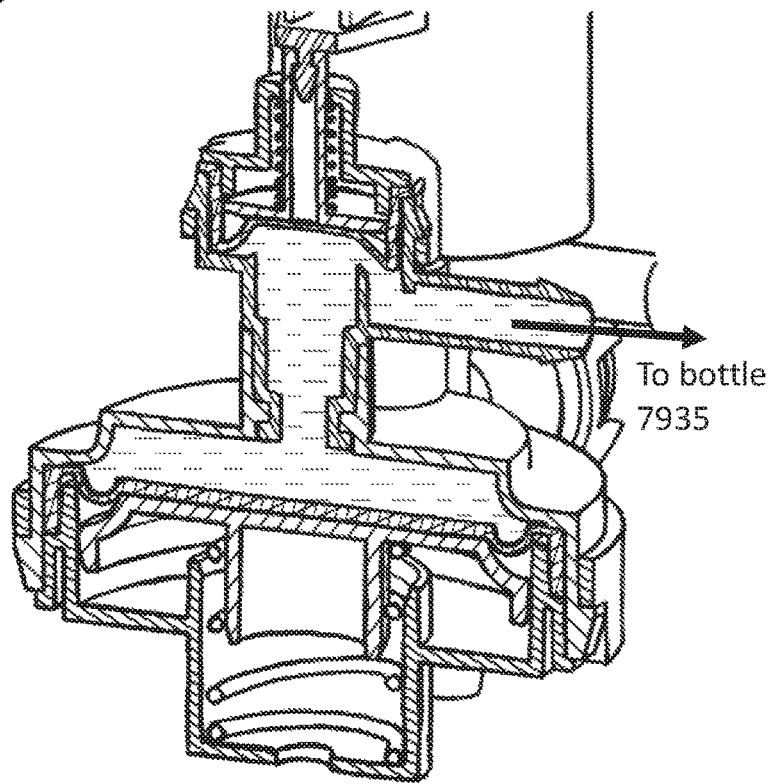
Figure 85C:
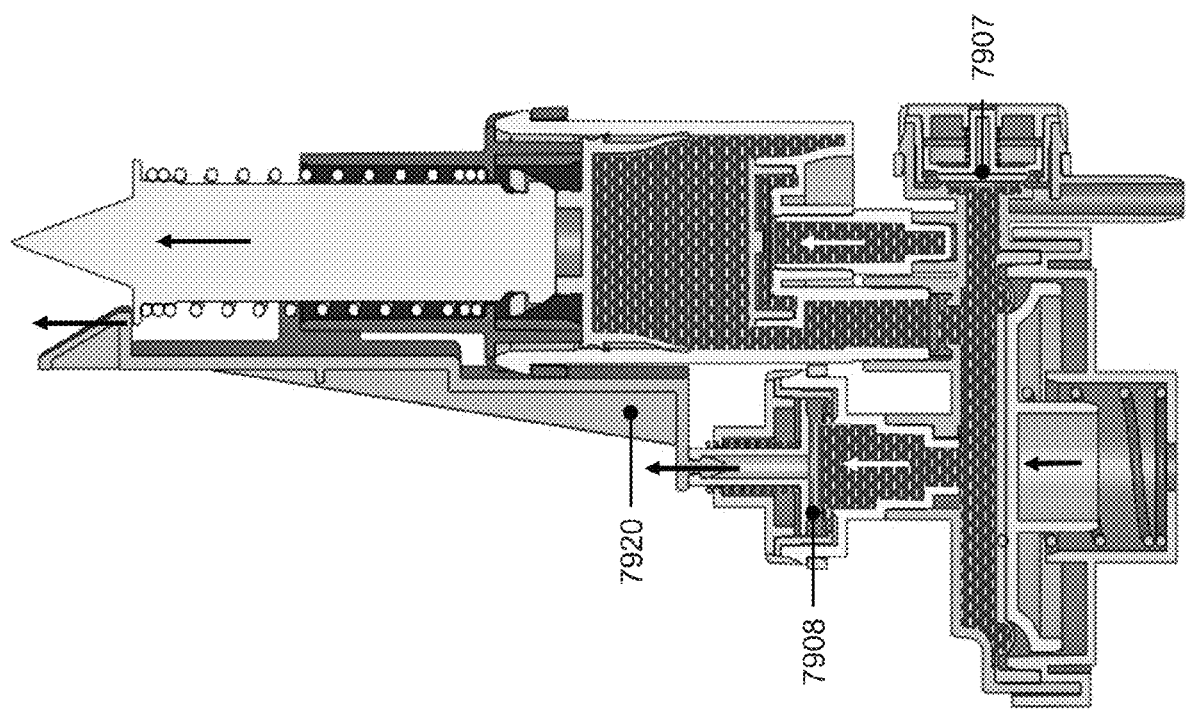

A continuous stop engine allows for continuous spray, as described above, but then immediate cessation of spray when desired by a user. This combines the benefits of a continuous spray engine with direct action. With reference to FIG. 79, for a high/low pressure system with liquid buffer:

Continuous:

When the piston moves up, liquid is taken from the container and enters the piston chamber. For this the container needs an air vent or Flair bottle. When pushing the piston downwards the liquid is forced to go to the (multiple) nozzle(s) and all liquid which cannot leave the nozzles is stored into the buffer. The buffer applies pressure to the liquid stored. When all of the liquid in the piston chamber is dispensed, the liquid stored in the buffer is dispensed through the nozzle(s), even when the piston moves up again to take in liquid from the container.

Stop:

When the release valve is activated, liquid stored in the buffer flows back into the container. This action immediately stops dispensing.

The schematic of FIG. 79, due to its detail, has its own specific index numbering system, different than any other figure hereof, although there is some overlap. With reference to FIG. 79, there is shown a container 7901, which could be a Flair container, a buffer 7902, a spring 7903, a piston 7904, an inlet valve 7905, a one-way valve 7906, a pre-compression valve 7907, a release valve 7908, a container air vent 7909, a filter 7910 and a floor plate 7911.

FIG. 80 illustrates exemplary parts: a piston 8101, an inlet valve 8102, a one way valve 8103, a buffer 81, a pre-compression valve 8105, a release valve 81 and a release valve actuator 8107. Index numbers for FIGS. 80 through 86 are specific to the "continuous stop engine" embodiment, as this embodiment has its own set of elements.

FIGS. 81-85 illustrate five steps in operation of the exemplary continuous stop engine, as follows:

FIG. 81:

1. Take in Liquid from Container

The piston moves up all the way. Liquid from the container is taken into the piston chamber past the inlet valve (8102). The one way valve (8103) closed off the passage between the piston chamber and the buffer. The release valve (8106) is open.

FIG. 82:

2. *Piston Moves Down

The inlet valve (8102) closes. Liquid from piston chamber is pushed past the one way valve (8103). Liquid travels via the buffer (8104) and past the pre-compression valve (8105) towards the nozzle(s). The overflow of liquid which cannot leave the nozzles is stored in the buffer. The release valve activator (8107) can move down and the release valve (8106) is closed.

FIG. 83

3. Piston Moves Up

The piston moves up, but not all the way. The release valve activator (8107) is not touched. Liquid from the container is taken into the piston chamber past the inlet valve (8102). The one way valve (8103) closes of the passage between the piston chamber and the buffer. The overflow of liquid stored in the buffer passes the outlet valve.

FIG. 84

4. Continuous Output When the piston moves up and down in given area, without touching the release valve activator (8107), a continuous output is generated.

FIG. 85

5. Stop

The piston moved up all the way. The release valve activator (8107) is pushed upwards The release valve opens (8106). The liquid stored in the buffer flows back to the container and the pre-compression valve (8105) closes, and dispensing stops immediately.

Figure 86:
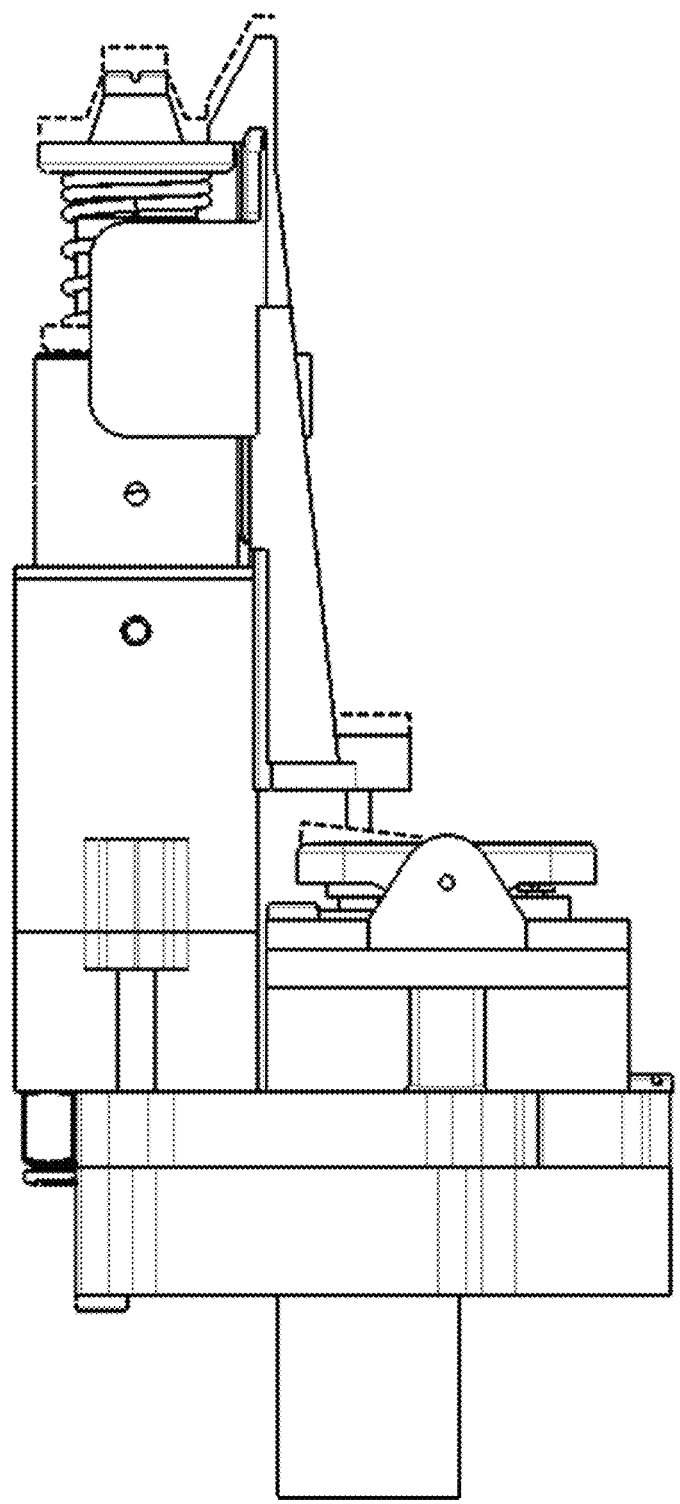
FIGS. 86-90 depict an improvement thereto.
Figures 87A, 87B, 87C:
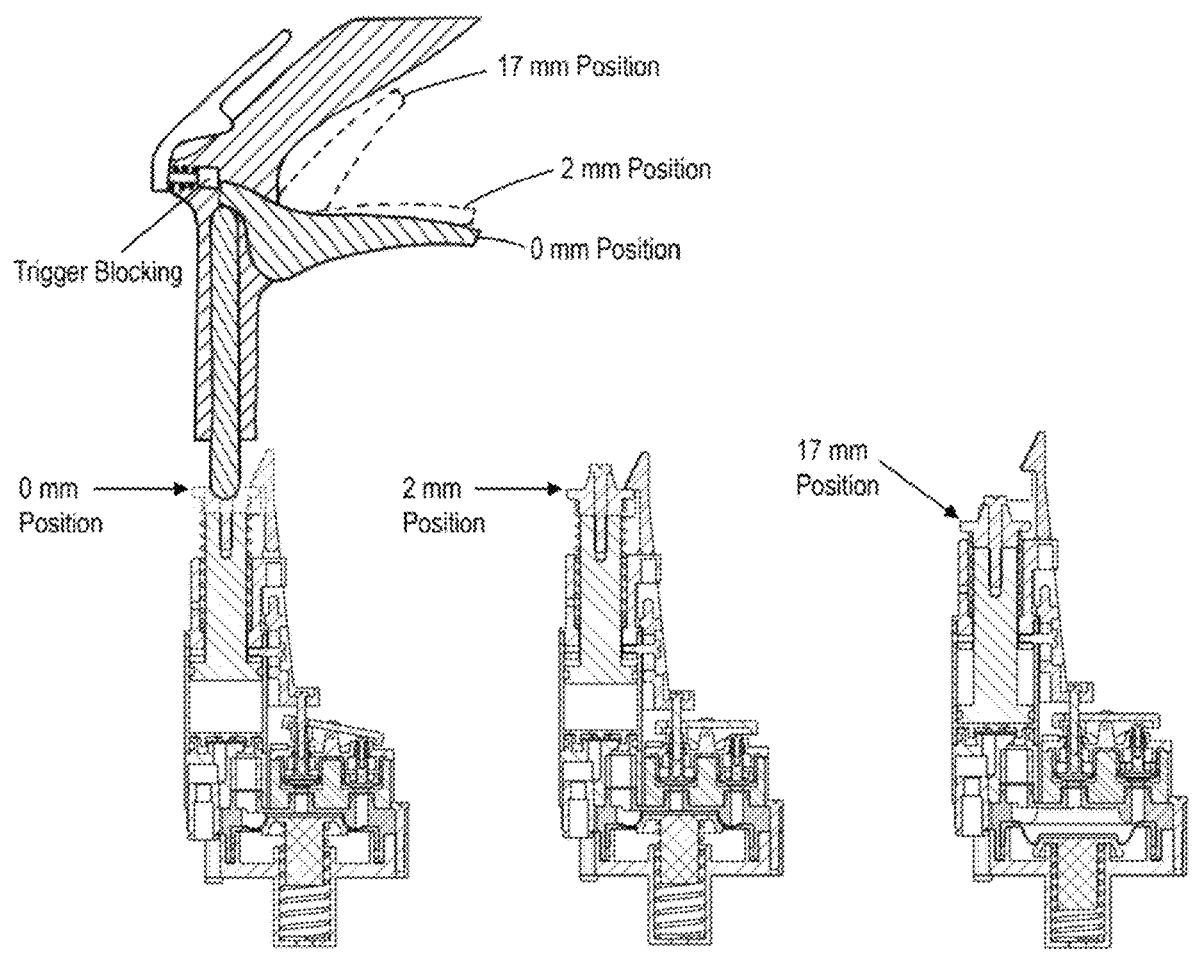

FIGS. 86-90 illustrate a method to improve the stopping feature, based on relocating the valves. In the 2 mm for releasing the accumulator, another valve can also be actuated. This also improves vertical assembly. As shown in FIG. 86, there can be a home or 0 mm position, a 2 mm position, and a 17 mm position. Once the trigger moves to the 2 mm position, there is a temporary stop, via a trigger blocking feature. If it is engaged, the trigger cannot return to the home position, as the trigger is now blocked, but the trigger is free to travel from the 2 mm to the 17 mm position repeatedly. However, once the blocking is disabled or released, the trigger can return to zero (home position) and activate the valve to redirect the flow out of the buffer, thus immediately stopping the spray. Such a system is implemented in the exemplary embodiment shown in FIG. 87. Thus, with reference to FIG. 87, the pump is actuated by a handle and trigger. The push rod is connected to the pump piston. The full stroke of the trigger equals a push rod travel of 15+2 mm. When the trigger is pulled from 0 mm to 2 mm, at 2 mm a feature automatically blocks the trigger from returning to 0 mm. The return valve is now closed. However, the trigger is able to travel from 2 mm to 17 mm. Within this zone actuating will give spray performance, prolonged or continuous depending on the actuation rate of the user. When disabling the blockage of the trigger, so it can and will return to 0 mm, the return valve can be opened and the liquid within the buffer can flow back to the bottle. Dispensing thus stops immediately.

Figure 88A:
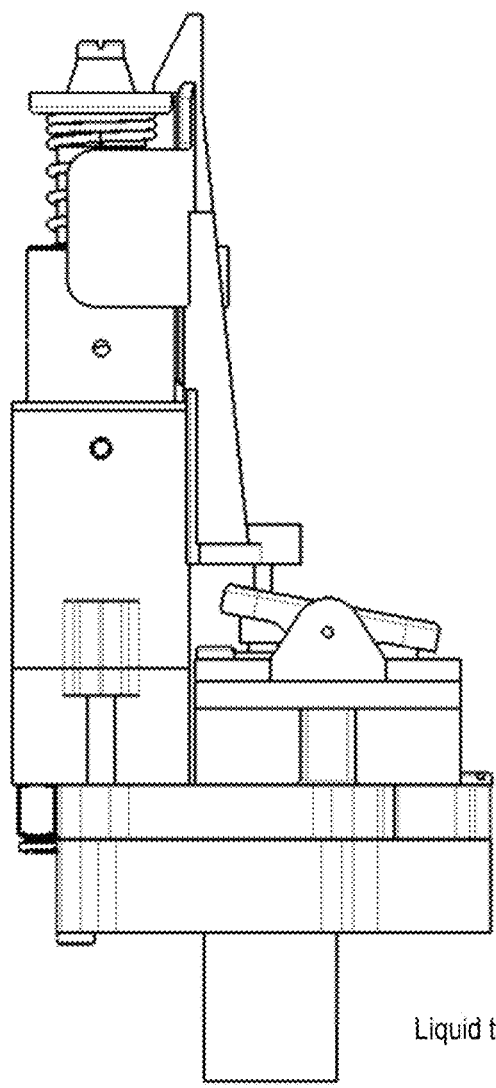
Figure 88B:
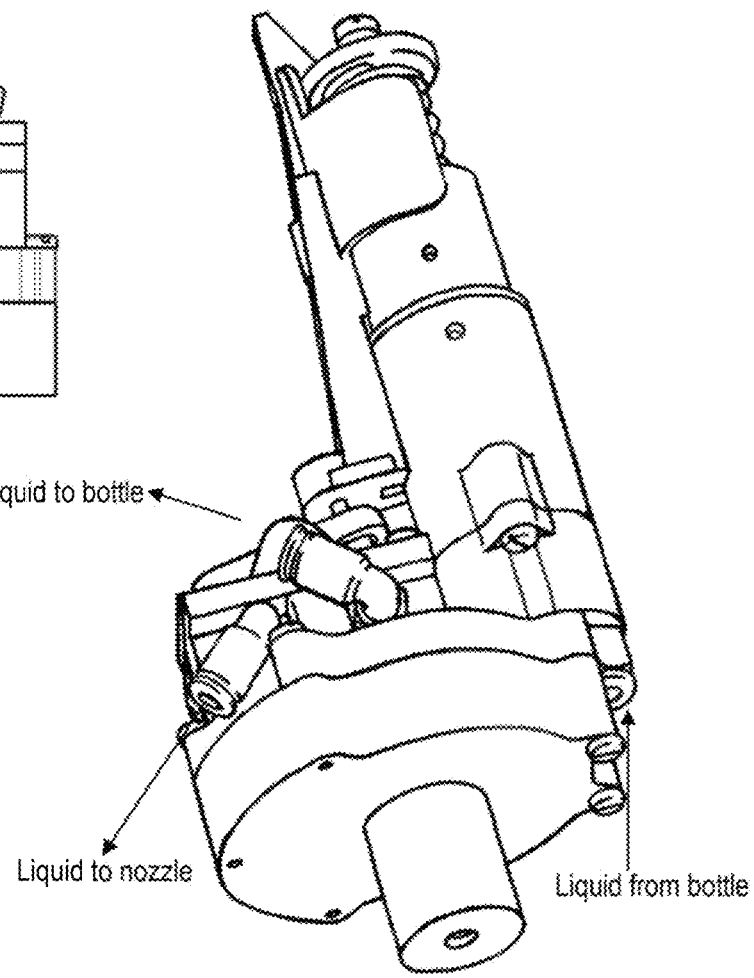
Figure 89A:
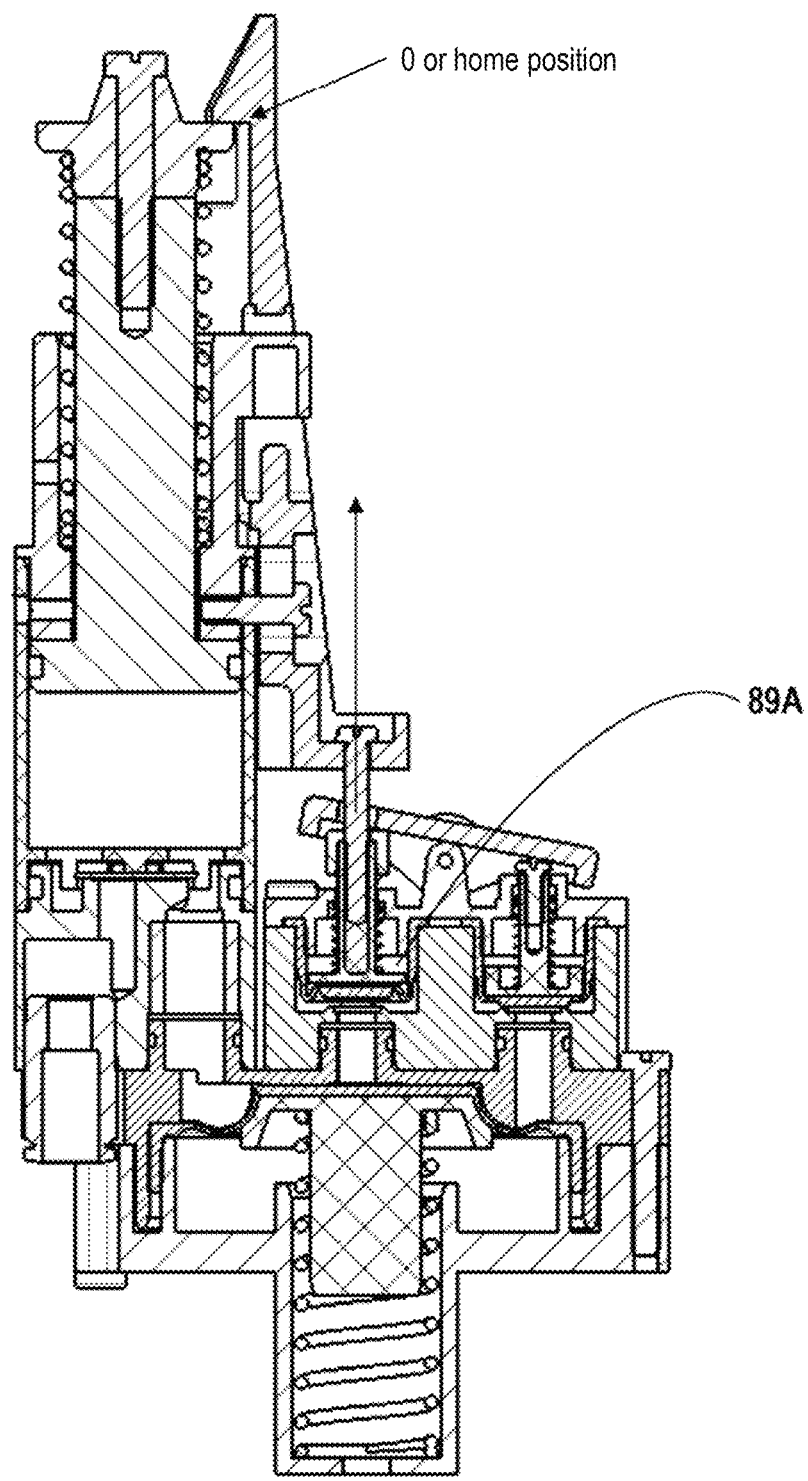
Figure 89B:
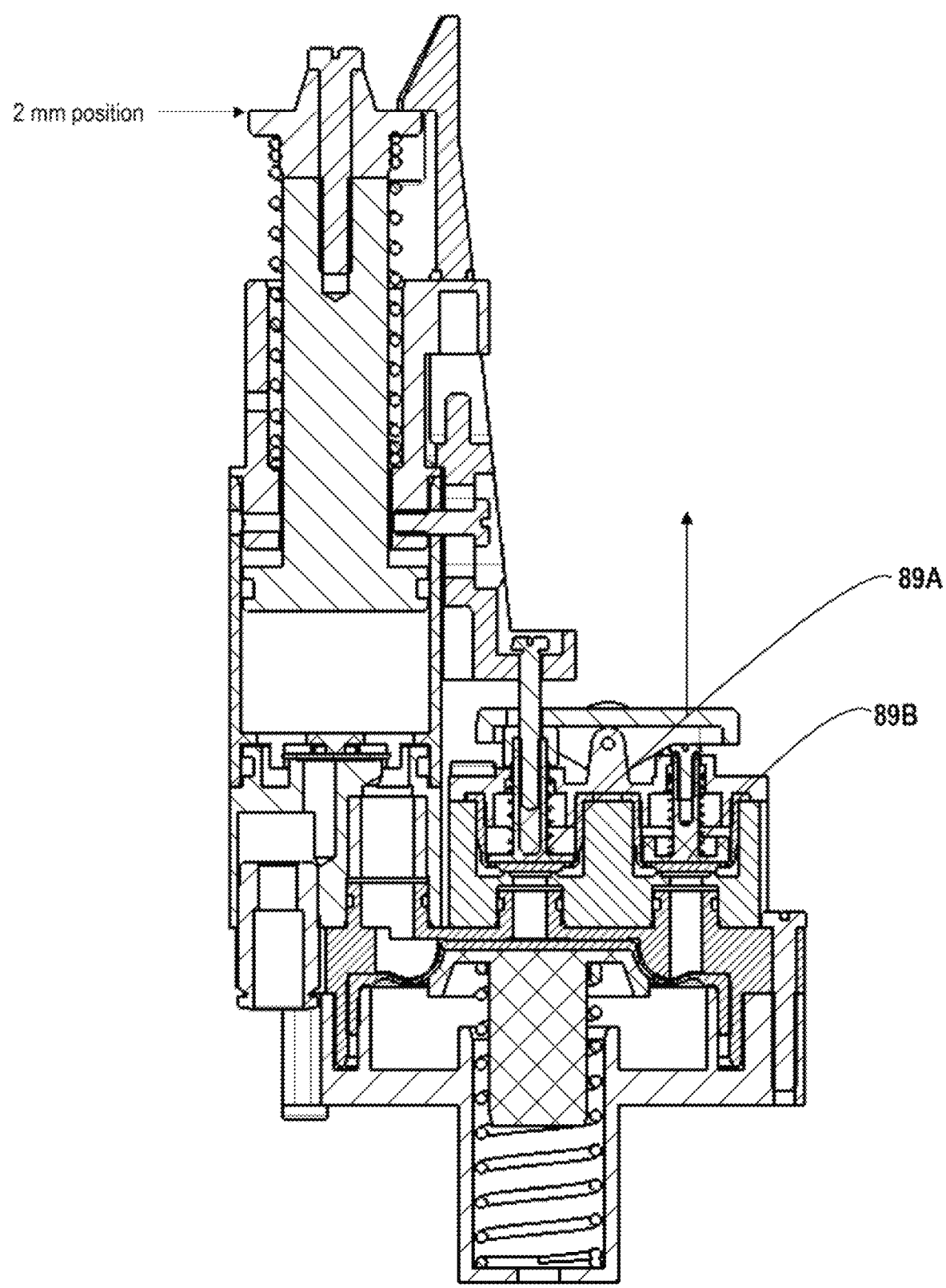

FIGS. 88-90 show how this is implemented within the device:

FIGS. 89A and 89B—Between 0 and 2 mm position: Within this area the liquid return valve is operated.

In position '0' the spring of the piston lifts up the liquid return valve 89A opening the passage towards the bottle. By means of a tumbler the same force opening the liquid return valve, closes the outlet valve 89B. As soon as the piston is pushed in 2 mm, the spring of the return valve 89A closes of the passage to the liquid. The pre-compressed outlet valve 89B is released.

Figure 90A:
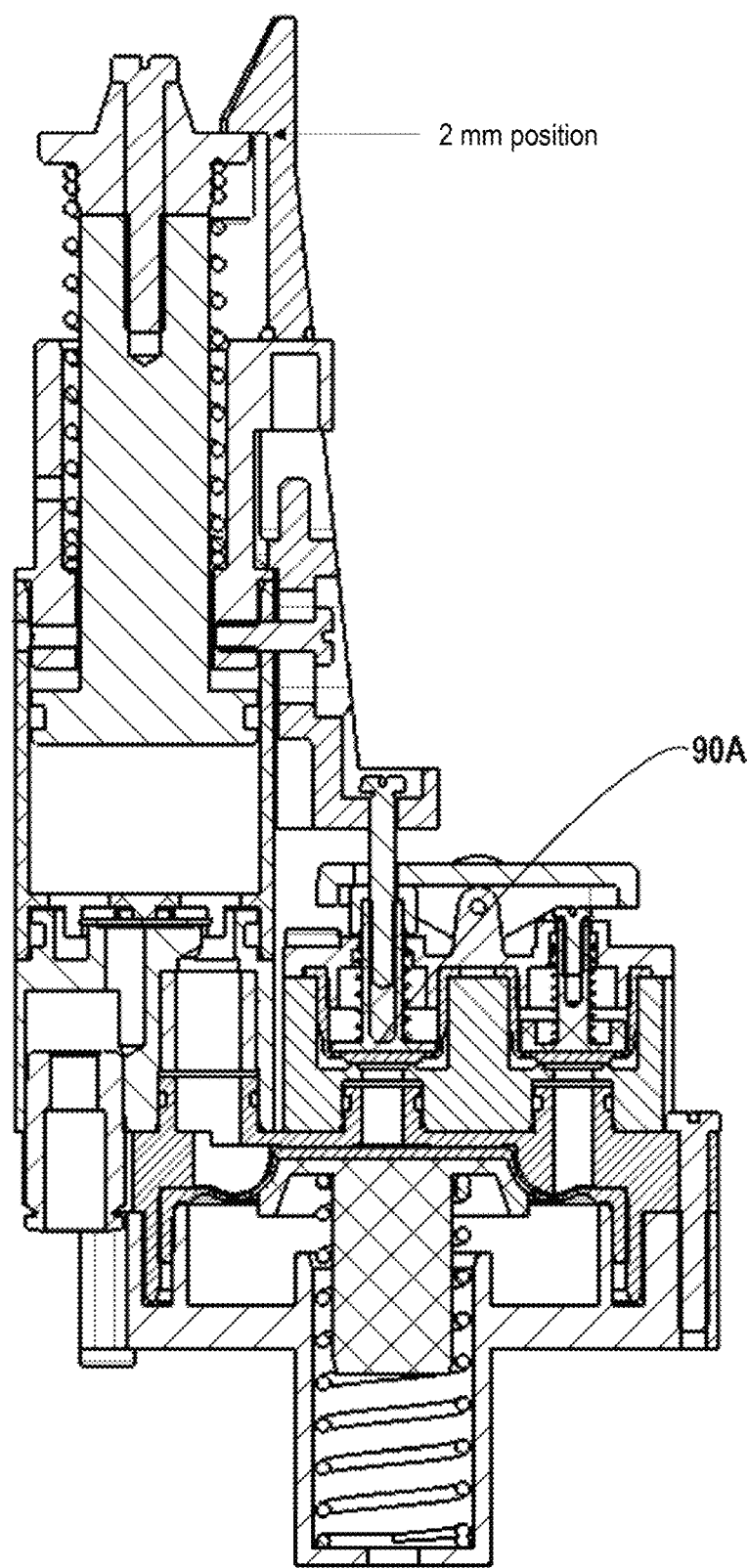
Figure 90B:
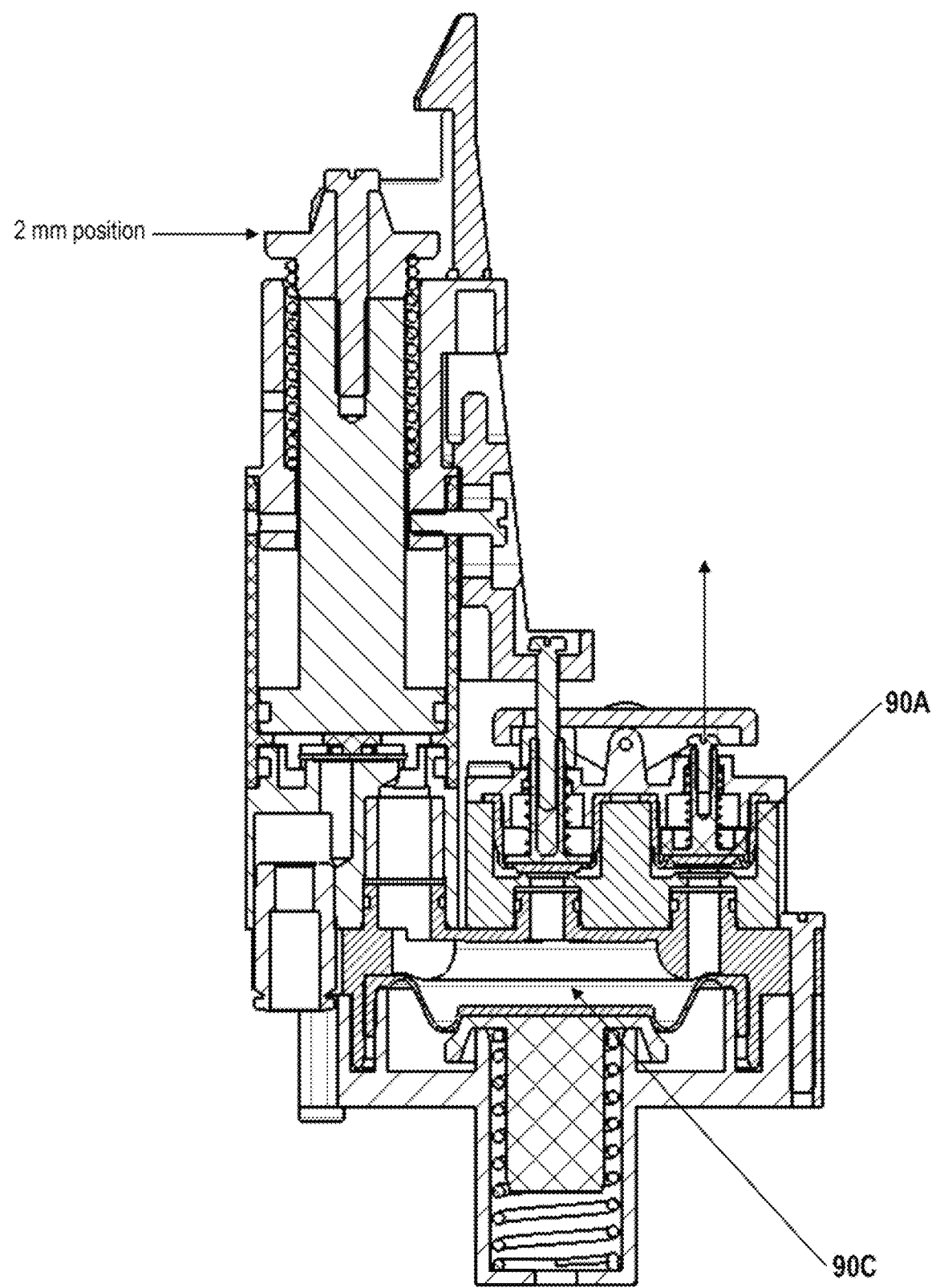

FIGS. 90A and 90B—Between 2 and 17 mm position:

Within this area the output is generated. Since the opening towards the bottle is closed in position 2 mm, liquid which is displaced by the piston no longer travel to the bottle but is pushed to the released outlet valve 90A. The liquid displaced pushes open the outlet valve. The overflow of liquid is stored in the buffer 90C. As long as the piston moves between position 2 mm and position 17 mm, a continuous output is created. When the piston moves beyond position 2 mm towards position '0', the outlet valve is forced to close and the liquid return valve is opened. The liquid passes to the bottle and output is stopped immediately.

Figure 91A:
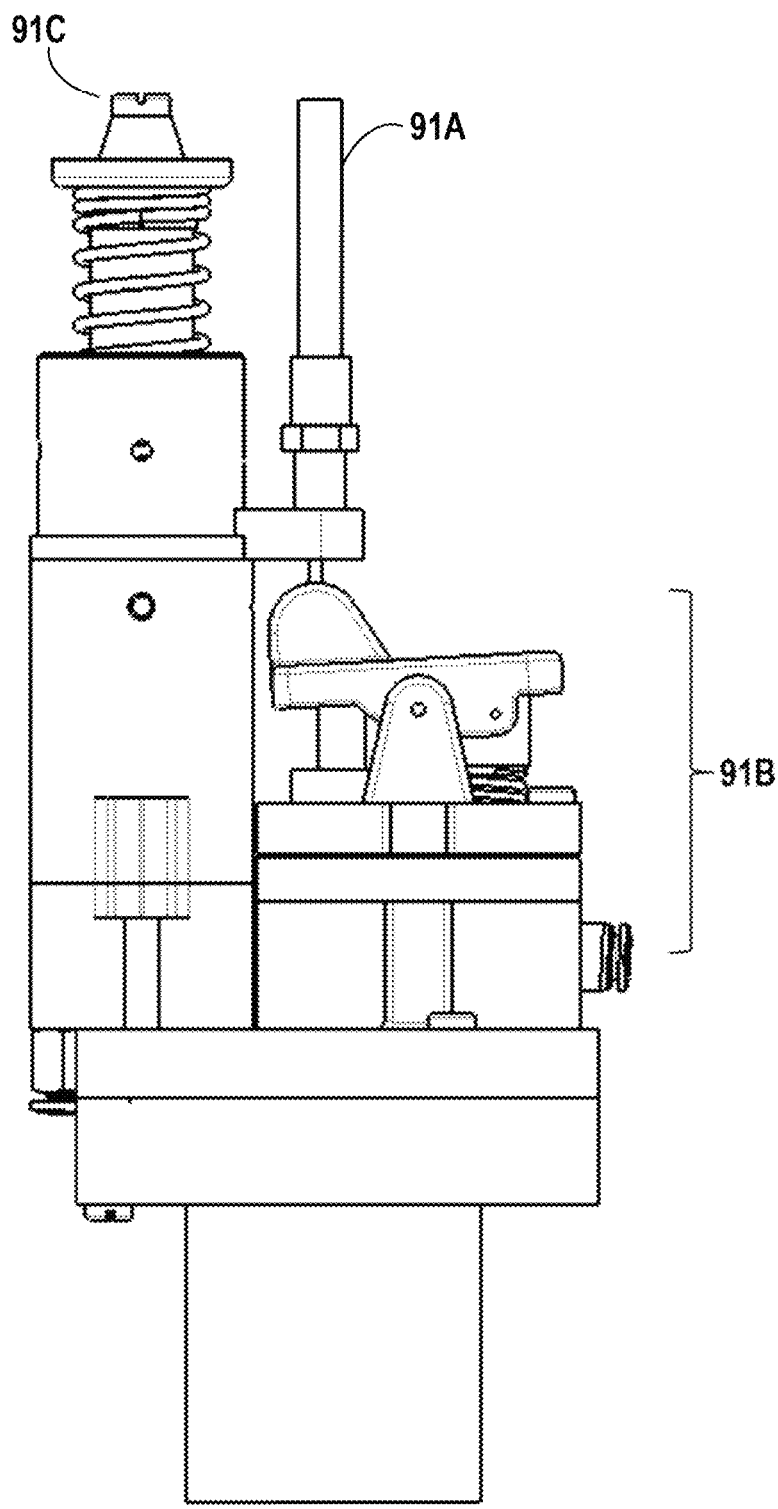
Figure 91B:
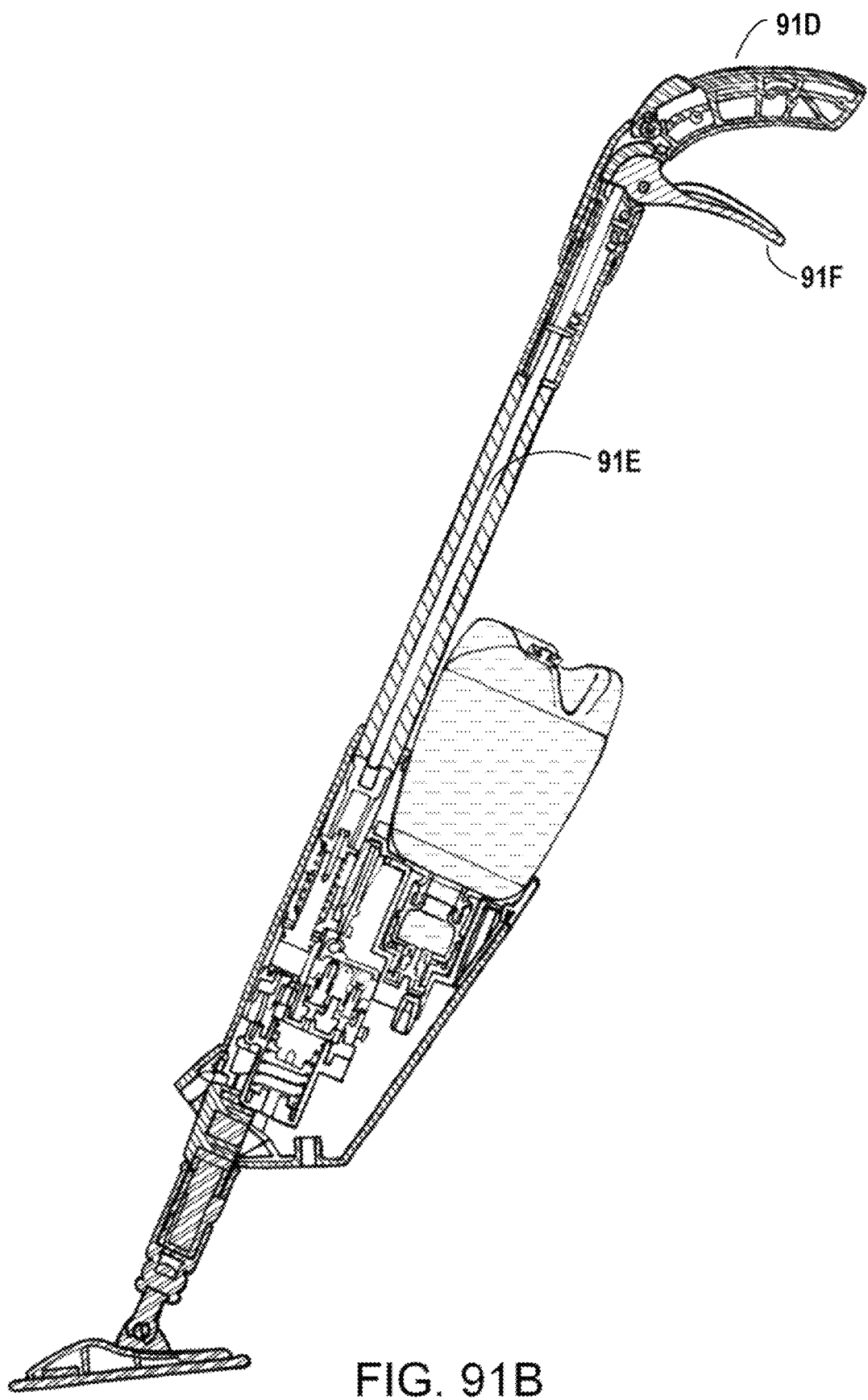
Figure 91B:
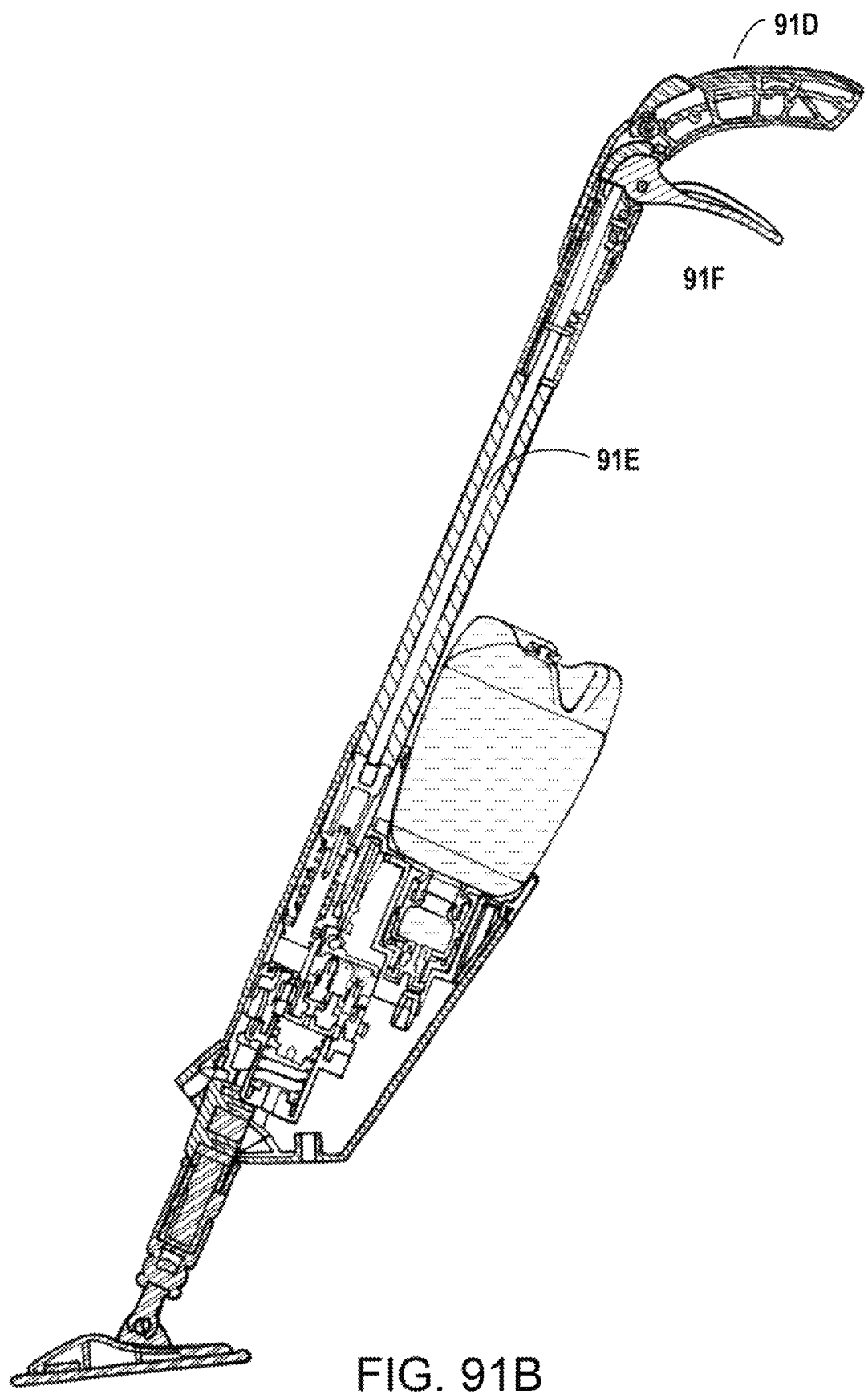

A further improvement to the stopping feature is illustrated in FIGS. 91-92. Here, as shown in FIG. 91A, the operation of the pump was separated from the operation of the liquid return valve/pre-compression outlet valve. A cable 91A operates the valve system 91B, and a push rod activates the pump 91C. As shown in FIG. 91B, the cable is activated by a feature 91D located at the handle. The push rod 91E operating the pump is activated by pulling the trigger 91F. This can be implemented, for example, as shown in FIGS. 92A through 92C, where: (a) upon pulling the cable, the liquid return valve is force to close, and the pre-compression outlet valve is released. Upon (b) releasing the cable:

The liquid return valve opens by spring force. Liquid pressure is let off, because the liquid can return towards the bottle. The same spring force opening the liquid return valve flips the tumbler and forces the pre compression outlet valve to close.

Standard DuO1 Sprayers with Buffering

Figure 93A:
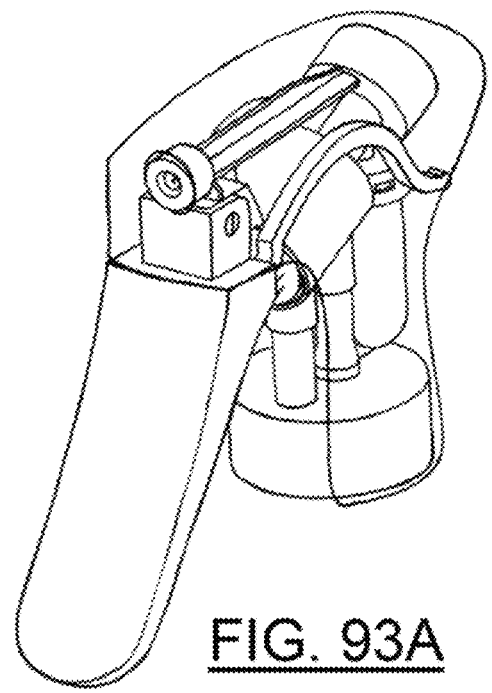
FIGS. 93-97 depict exemplary DuO1 sprayers with buffers not in-line with the piston bore, of various types.
Figure 93C:
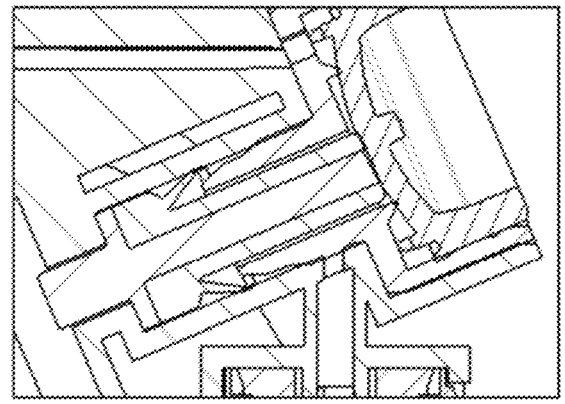
Figure 93B:
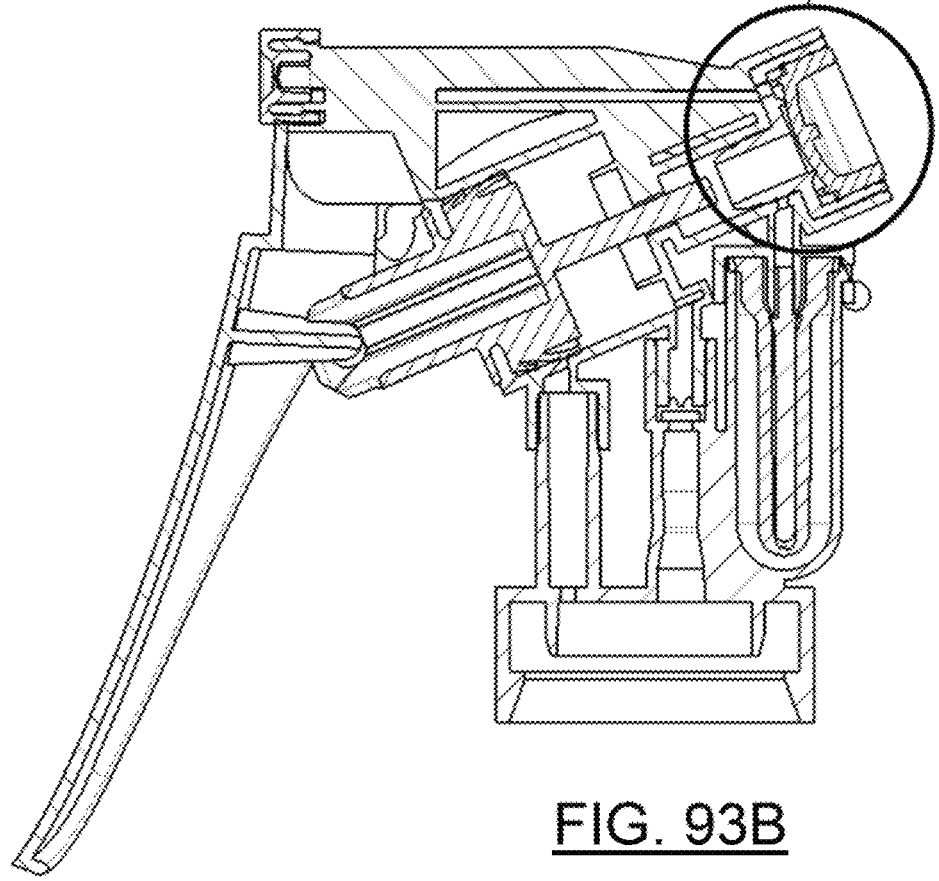

FIGS. 93A-96B illustrate applying the buffering and dome valve principles described above to standard sprayers, making "DuO1 Sprayers." FIG. 93 illustrate an exemplary direct stop sprayer. As shown in FIGS. 93A through 93C, the features of the direct stop sprayer include a classic sprayer like configuration of parts where no extra part is needed for venting, the piston moves when the user pumps and there is a static nozzle. A large buffer is needed and there is a larger travel distance of the trigger compared to standard sprayers. The long trigger is needed to compensate for the higher forces required to push liquid a larger piston volume, and therefore the direct stop sprayer is larger than a standard conventional sprayer. It is noted in FIG. 93C that no umbrella valve is used in the direct stop sprayer, and thus, when a user releases the trigger, liquid can flow from the buffer back into the piston chamber. This effectively stops all flow as soon as a user releases the trigger. Thus, a direct stop sprayer allows for prolonged spraying/foaming even after the downstroke is over, as long as a user holds the trigger down, and thus holds the piston chamber closed.

Figure 94A:
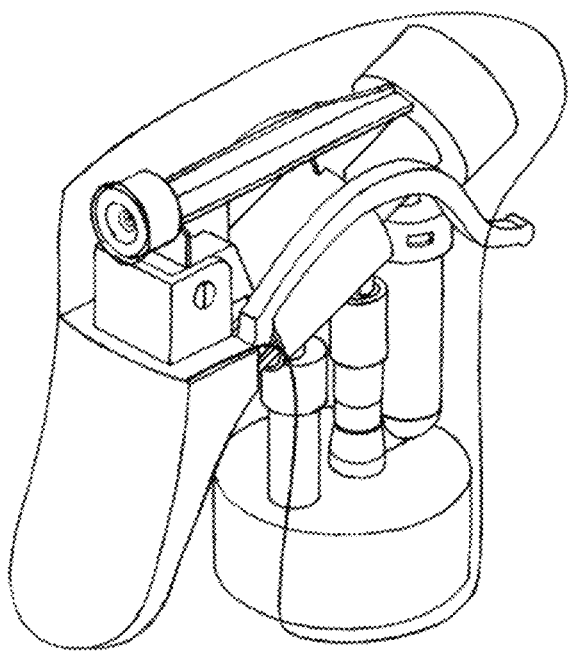
Figure 94B:
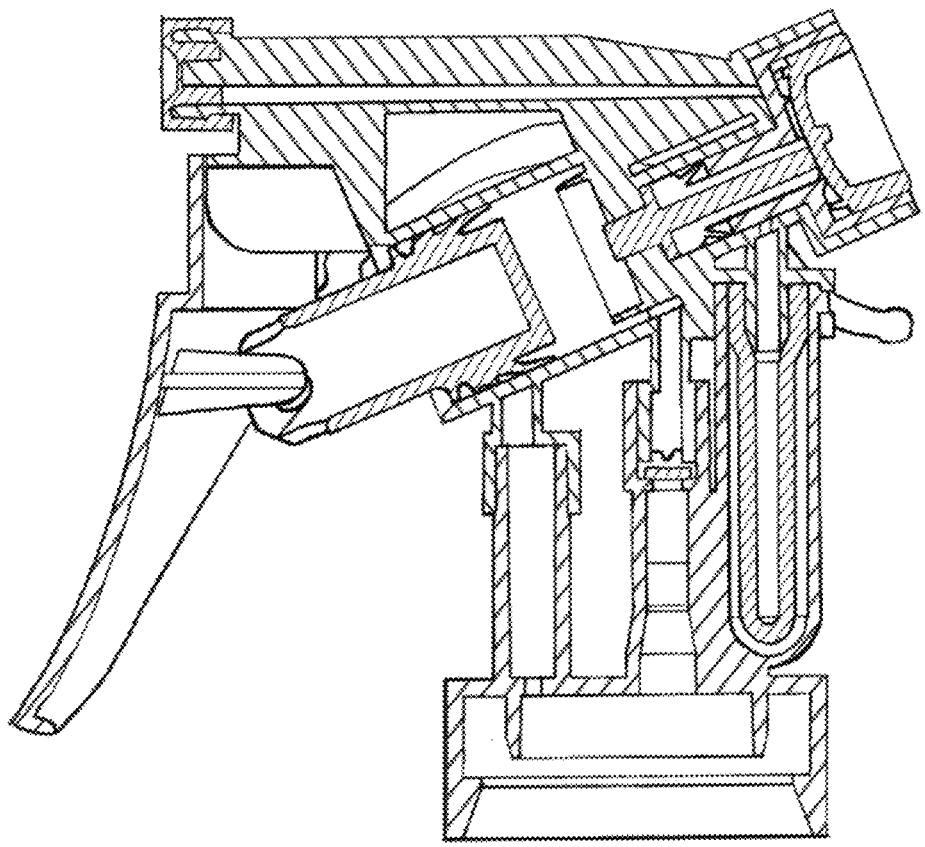

FIG. 94 presents details of an exemplary continuous sprayer according to exemplary embodiments of the present invention. As shown in FIGS. 94A and 94B, this sprayer also has a classic sprayer-like configuration of parts, with no extra part needed for venting. The piston moves when pumping and there is a static nozzle. The travel of the trigger is similar to other sprayers and this is visually similar to a standard sprayer. However, there is included in the buffer sprayer the umbrella valve as shown in FIG. 94B. This operates as a one-way valve between the piston chamber and the buffer, such that even when a user releases the trigger, no liquid can flow from the buffer into the piston chamber. Thus the liquid continues to flow from the buffer out through the nozzle as long as the buffer pressure exceeds the opening pressure of the dome valve.

Other DuO1 Sprayers

Figure 95A:
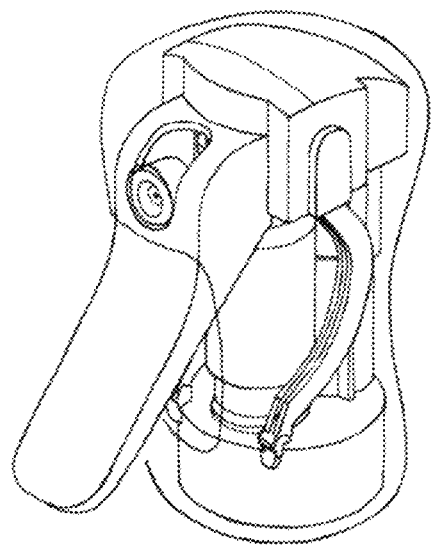
Figure 95B:
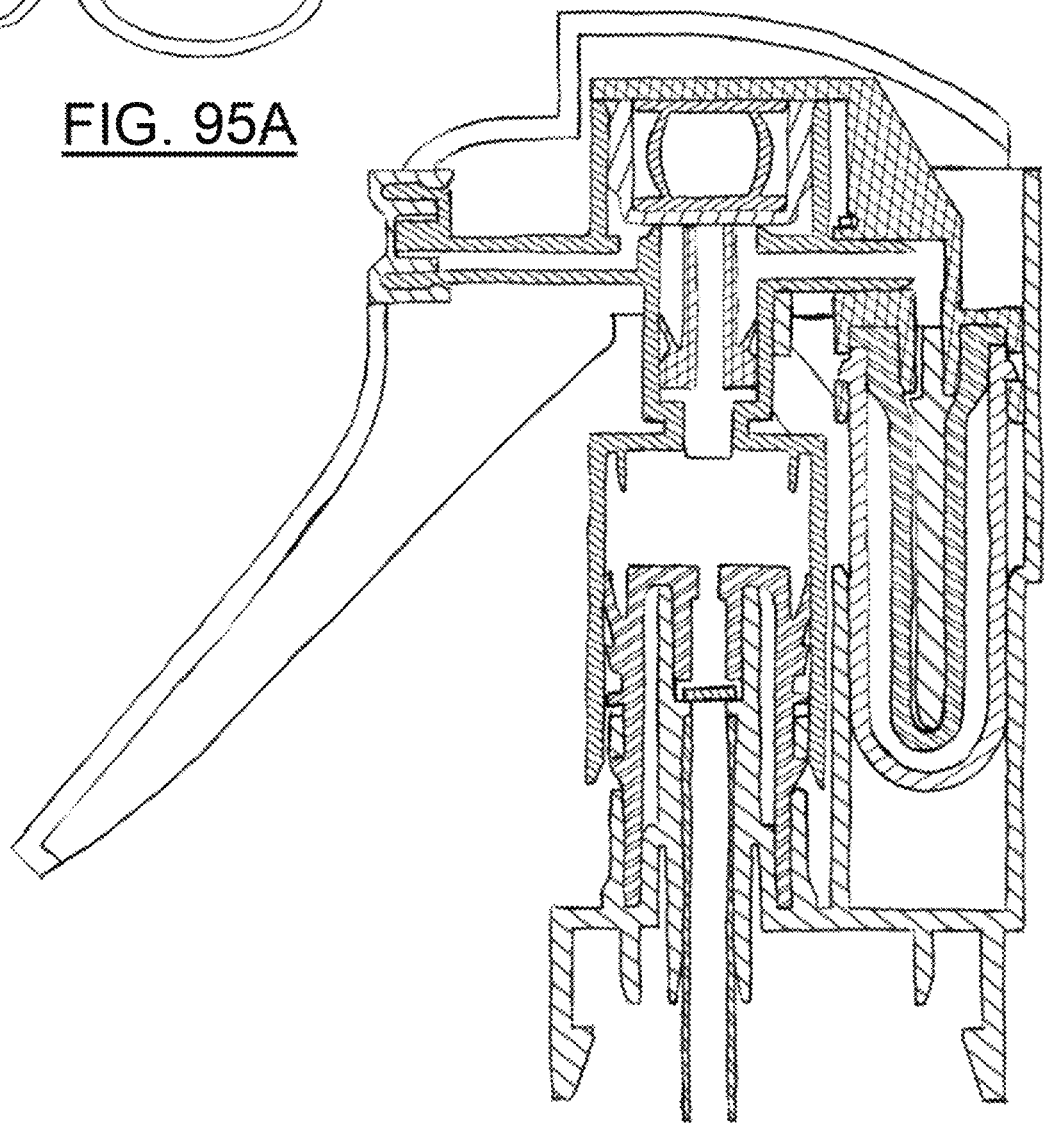
Figure 96A:
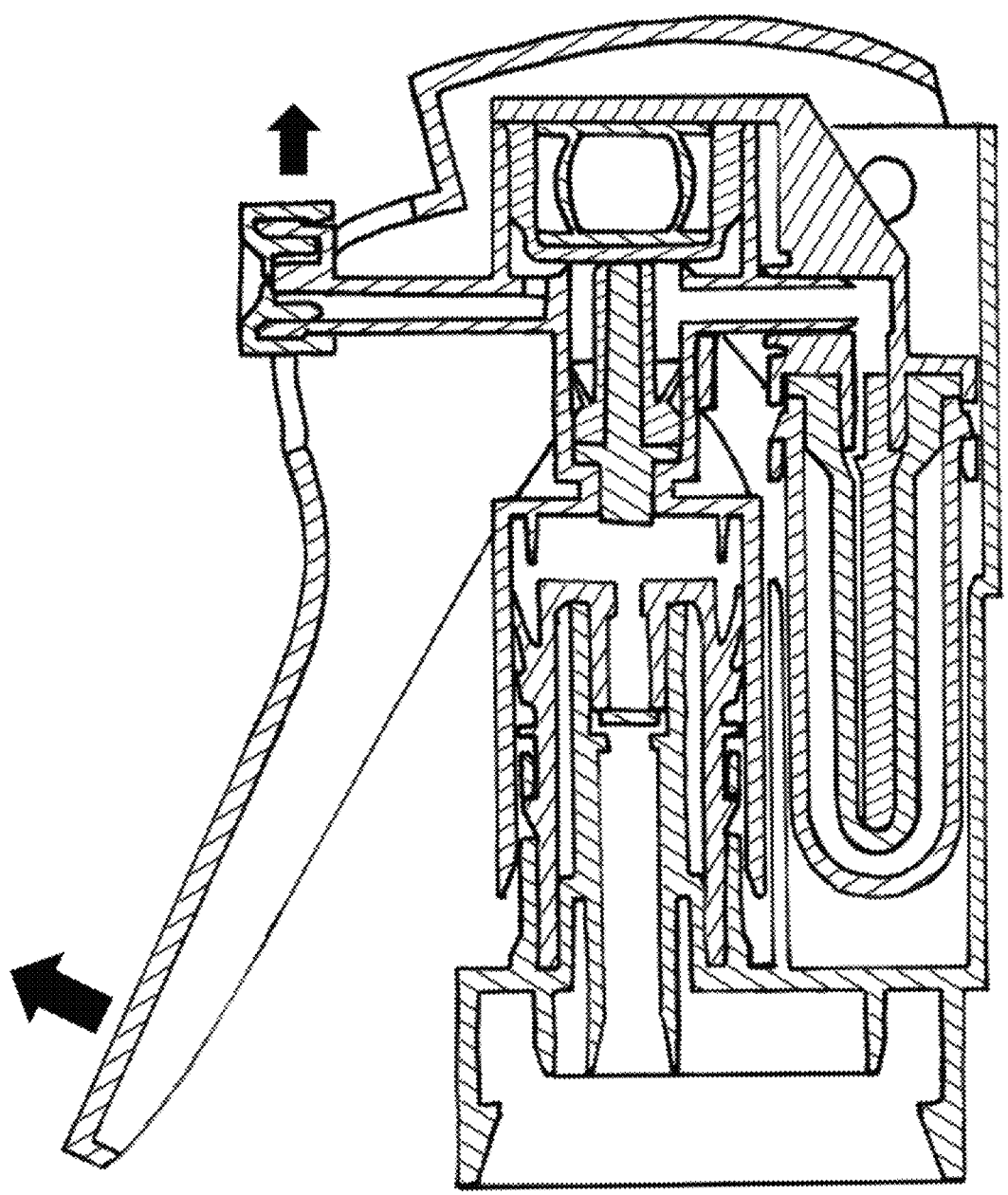
Figure 96B:
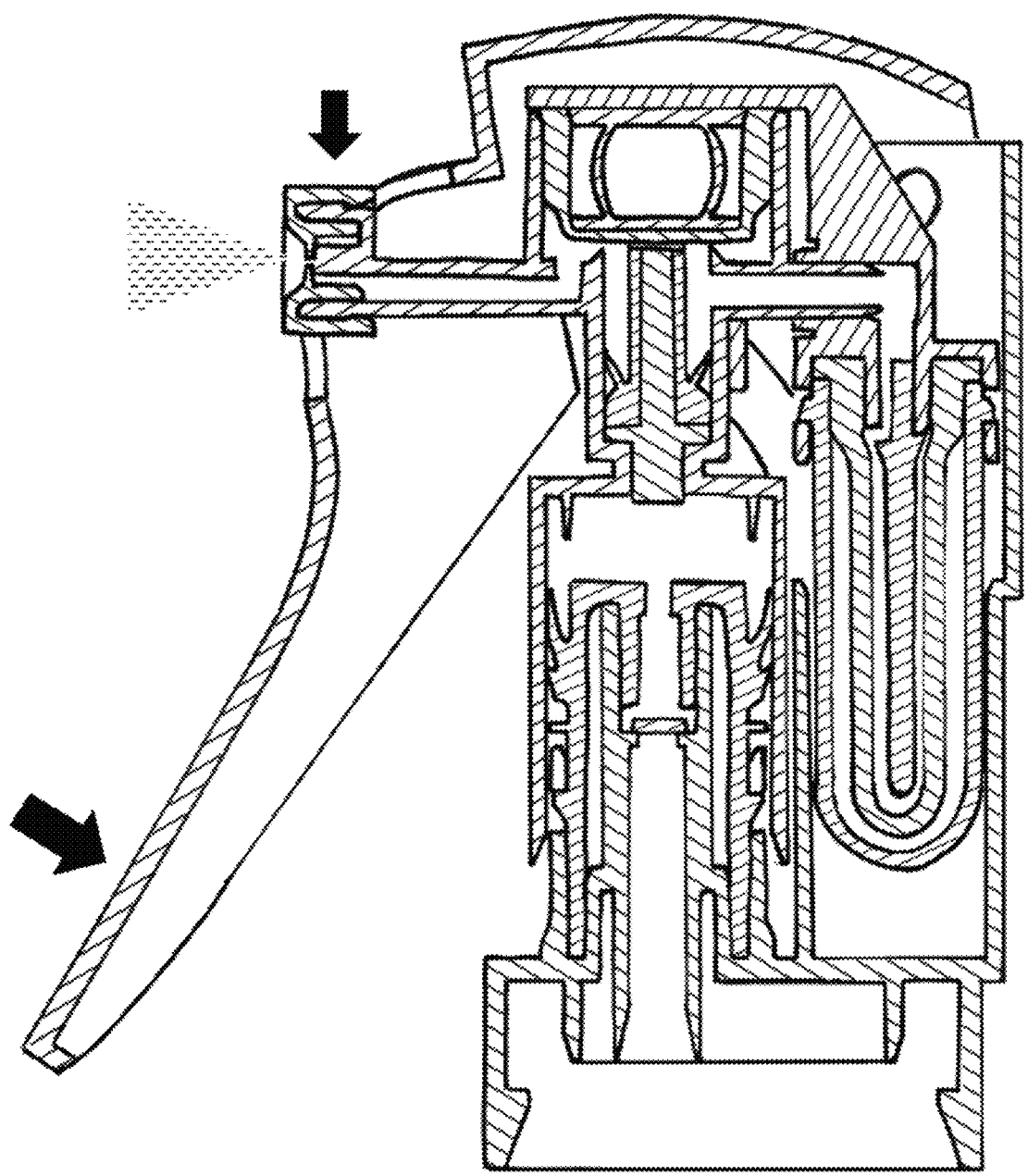
Figure 97A:
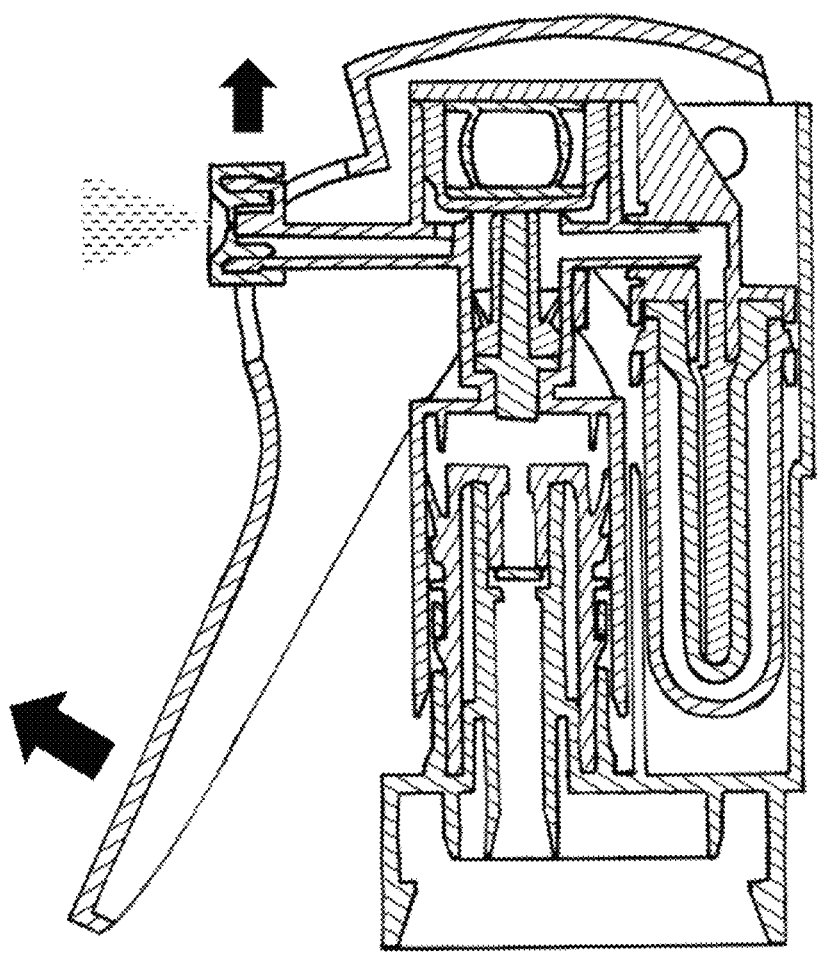

FIGS. 95A and 95B illustrate various features of a DuO1 dispenser with non-inline buffer according to exemplary embodiments of the present invention. This improves upon Dispensing Technologies' previous Flairosol technology, as described in U.S. Patent Application Ser. Nos. 13/068,267 and 13/623,860, now pending, the disclosures of each of which are hereby incorporated by reference herein (these describe what may be called "first generation" Flairosol). With reference to FIG. 95, which presents a perspective view in 95A and a cutaway cross-sectional view in 95B, there can be seen a configuration of parts of an exemplary DuO1 device. Although similar to that of the first generation Flairosol, an extra part is needed for venting. There is also a static piston where a nozzle moves up and down while spraying, and there is a larger travel distance of the trigger compared to a standard sprayer. Finally, the device is visually different from a standard sprayer. FIGS. 96A and 96B show various operational states of the DuO1 device of FIGS. 95A and 95B. With reference to FIG. 96A, when the trigger is released liquid is sucked into the liquid chamber through the inlet valve. With reference to FIG. 96B, when the trigger is pulled liquid is pushed past the outlet valve to the nozzle and whatever liquid cannot be handled by the nozzle (due to the restriction of the nozzle) such excess liquid is stored in the buffer, as shown. With reference to FIG. 97A, when the trigger is released by a user the excess liquid stored in the buffer is then released to the nozzle, as shown by the white arrow in FIG. 97A. At the same time the liquid chamber (piston chamber) is filled again in preparation for a further downstroke as shown in FIG. 96B. This allows for a continuous spray.

Figure 97B:
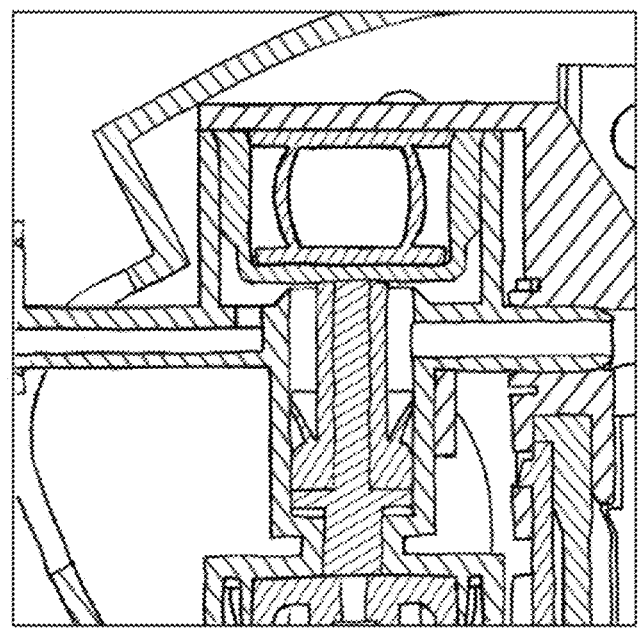

FIG. 97B shows detail of the umbrella valve and the dome valve with reinforcing spring. To make sure that the DuO1 device always primes, the valve is mechanically opened when the piston reaches the end of the stroke; by this means air can be evacuated. So generally the end of a stroke looks like the configuration of FIG. 97A which is right before the release by a user of the trigger, and there is some liquid remaining in the piston chamber. However, on the first stroke which primes the sprayer there is no liquid in the chamber, and the piston can move all the way up to completely close the piston chamber, thereby touching the umbrella valve which thereby pushes upwards and deforms the red dome valve, allowing the air to escape. By this means the outlet valve is forced open and the sprayer can be primed.

The above-presented description and figures are intended by way of example only and are not intended to limit the present invention in any way except as set forth in the following claims. It is particularly noted that the persons skilled in the art can readily combine the various technical aspects of the various exemplary embodiments described.

What is claimed is:

1. A liquid dispensing device, comprising:
    an inlet valve, configured to receive liquid from a reservoir and pass the liquid to a piston chamber;
    a piston and a piston chamber, the piston chamber emptying into an inlet of a buffer chamber, the buffer chamber coupled to an outlet path, the outlet path at an opposite end of the buffer chamber from the inlet;
    an actuator for controlling the piston;
    a compressible gas buffer provided in the buffer chamber, the compressible gas buffer including a closed outer surface and a fixed quantity of gas provided within the closed outer surface, the compressible gas buffer having an initial uncompressed volume;
    an outlet valve having a defined minimum opening pressure, the outlet valve provided between the buffer chamber and the outlet path; and
    a nozzle with a defined throughput in fluid communication with the outlet path.

2. The liquid dispensing device of claim 1, wherein, the volume of the piston chamber, the volume of the buffer, a pressure response of the buffer, the defined throughput of the nozzle, and the defined minimum opening pressure of the outlet valve are further arranged to allow for dispensing of the liquid between piston downstrokes.

3. The liquid dispensing device of claim 1, wherein at least one of:
    the buffer is in-line with the piston chamber; or
    there is a one-way valve connecting the buffer to the piston chamber, such that fluid cannot move from the buffer back into the piston chamber.

4. The liquid dispensing device of claim 1, wherein at least one of:
    when a user releases the actuator, fluid remaining in the buffer chamber moves back into the piston chamber, and stops exiting through the outlet valve; or
    fluid exiting through the outlet valve begins to taper off immediately upon the user releasing the actuator.

5. The liquid dispensing device of claim 1 further comprising at least one bypass channel provided in the buffer chamber, the at least one bypass channel including a groove on an inner surface of the buffer chamber, wherein the fluid flow path in the at least one bypass channel is along a direction parallel to at least one of a longitudinal axis of the buffer or a longitudinal axis of the buffer chamber.

6. The liquid dispensing device of claim 1, wherein the piston and piston chamber are at least one of: separate components, an integrated component, or comprise a stretched piston.

7. The liquid dispensing device of claim 1, wherein the outlet valve is one of a dome valve, a dome valve reinforced with a spring, and a plastic binary dome valve.

8. The liquid dispensing device of claim 1, wherein the liquid dispensing device is configured to dispense a spray, a foam or either a spray or a foam.

9. The liquid dispensing device of claim 1, further comprising a product container, in fluid communication with the inlet valve, wherein the product container is a container within a container bottle.

10. The liquid dispensing device of claim 1, wherein the volume of the buffer chamber is equal to or greater than the volume of the piston chamber by a factor of between 1.0 and 5.

11. The liquid dispensing device of claim 1, wherein one or more of the volume of the piston chamber, the volume of the buffer chamber, the uncompressed volume of the buffer, a pressure response of the buffer, the defined throughput of the nozzle, and the defined minimum opening pressure of the outlet valve, are co-operatively arranged to allow for dispensing of the liquid between piston downstrokes, and following the dispensing of liquid from the piston chamber to the nozzle, a quantity of fluid is dispensed from the buffer chamber to and out the nozzle.

12. The liquid dispensing device of claim 1, wherein, at least one of:
    in a liquid intake operation, a fluid is drawn from a container into the piston chamber, and in a dispensing operation a portion of the fluid is sent from the piston chamber towards the nozzle, and a remainder of the fluid is sent to the buffer chamber;
    there is a one-way valve connecting the buffer chamber to the piston chamber, such that fluid cannot move from the buffer chamber back into the piston chamber; and
    once a user releases a trigger, fluid flowing from the buffer chamber out through the outlet valve stops.

13. A liquid dispensing device, comprising:
    an inlet valve, configured to receive liquid from a reservoir and pass the liquid to a piston chamber;

a piston and a piston chamber, the piston chamber emptying into an inlet of a buffer chamber, the buffer chamber coupled to an outlet path, the outlet path at an opposite end of the buffer chamber from the inlet;

an actuator for controlling the piston;

a compressible gas buffer entirely disposed within the buffer chamber, the compressible gas buffer including a closed outer surface and a fixed quantity of gas provided within the closed outer surface, the compressible gas buffer having an initial uncompressed volume;

an outlet valve having a defined minimum opening pressure, the outlet valve provided between the buffer chamber and the outlet path; and a nozzle with a defined throughput in fluid communication with the outlet path, wherein fluid in excess of the defined throughput is stored in the buffer chamber by compressing a volume of the buffer.

14. The liquid dispensing device of claim 13, wherein the defined minimum opening pressure of the outlet valve is P1, and a minimum pressure to compress the gas buffer is P2 and wherein P2 is greater than or equal to P1.

15. The liquid dispensing device of claim 14, wherein the defined throughput of the nozzle is less than a output of the piston chamber, and, as a result, fluid exiting the piston chamber increases in pressure to a value greater than or equal to P2.

16. The liquid dispensing device of claim 15, wherein when fluid exiting the piston chamber is at a pressure greater than or equal to P2, fluid both exits the nozzle and is stored in the buffer chamber by compressing the buffer to a smaller volume than the initial volume.

17. The liquid dispensing device of claim 13, wherein the outlet channel is integrated with the buffer chamber.

18. The liquid dispensing device of claim 17, wherein the outlet channel includes at least one groove provided on an inner surface of the buffer chamber, the at least one groove defining a fluid flow path from the outlet of the piston chamber adjacent to the buffer when the buffer has its initial uncompressed volume, to the outlet of the buffer chamber.

19. The liquid dispensing device of claim 13, wherein the device is further configured such that at least one of:
    when a user releases the actuator, fluid remaining in the buffer chamber moves back into the piston chamber, and does not exit through the outlet valve;
    fluid flow exiting through the outlet valve begins to taper off immediately upon the user releasing the actuator; or
    the fluid flow path in each groove is along a direction parallel to at least one of a longitudinal axis of the buffer or a longitudinal axis of the buffer chamber.

20. The liquid dispensing device of claim 13, wherein one or more of the volume of the piston chamber, the volume of the buffer chamber, the initial uncompressed volume of the buffer, a pressure response of the buffer, the defined throughput of the nozzle, and the defined minimum opening pressure of the outlet valve, are co-operatively arranged to allow for dispensing of the liquid between piston downstrokes, and following the dispensing of liquid from the piston chamber to the nozzle, a quantity of fluid is dispensed from the buffer chamber to and out the nozzle.

* * * * *